(12) United States Patent
Tannous et al.

(10) Patent No.: US 12,521,439 B2
(45) Date of Patent: Jan. 13, 2026

(54) METHODS AND MATERIALS FOR MODULATING Nrf2 PATHWAY

(71) Applicants: The General Hospital Corporation, Boston, MA (US); President and Fellows of Harvard College, Cambridge, MA (US)

(72) Inventors: Bakhos Tannous, Lynnfield, MA (US); Christian Badr, Malden, MA (US); Ralph Mazitschek, Belmont, MA (US); Neil Connor Payne, Madison, CT (US)

(73) Assignees: The General Hospital Corporation, Boston, MA (US); President and Fellows of Harvard College, Cambridge, MA (US)

( * ) Notice: Subject to any disclaimer, the term of this patent is extended or adjusted under 35 U.S.C. 154(b) by 838 days.

(21) Appl. No.: 17/765,667

(22) PCT Filed: Oct. 2, 2020

(86) PCT No.: PCT/US2020/054062
§ 371 (c)(1),
(2) Date: Mar. 31, 2022

(87) PCT Pub. No.: WO2021/067799
PCT Pub. Date: Apr. 8, 2021

(65) Prior Publication Data
US 2022/0395577 A1    Dec. 15, 2022

Related U.S. Application Data

(60) Provisional application No. 62/909,375, filed on Oct. 2, 2019.

(51) Int. Cl.
| | | |
|---|---|---|
| *A61K 47/55* | (2017.01) | |
| *A61K 47/54* | (2017.01) | |
| *A61P 35/00* | (2006.01) | |
| *C07C 323/16* | (2006.01) | |

(52) U.S. Cl.
CPC ............ *A61K 47/55* (2017.08); *A61K 47/545* (2017.08); *A61P 35/00* (2018.01); *C07C 323/16* (2013.01)

(58) Field of Classification Search
CPC ....... A61K 47/55; A61K 47/545; A61P 35/00; C07C 323/16
See application file for complete search history.

(56) References Cited

U.S. PATENT DOCUMENTS

| | | |
|---|---|---|
| 3,865,748 A | 2/1975 | Jurd et al. |
| 5,304,121 A | 4/1994 | Sahatjian |
| 5,886,026 A | 3/1999 | Hunter et al. |
| 6,099,562 A | 8/2000 | Ding et al. |
| 6,803,031 B2 | 10/2004 | Rabinowitz et al. |

FOREIGN PATENT DOCUMENTS

| | | | |
|---|---|---|---|
| WO | WO 2000/045165 | 8/2000 | |
| WO | WO-0045165 A1 * | 8/2000 | ........... A61K 31/352 |
| WO | WO 2015/051447 | 4/2015 | |
| WO | WO 2016/118859 | 7/2016 | |
| WO | WO 2021/067799 | 4/2021 | |

OTHER PUBLICATIONS

Bultman, et al.; International Biodeterioration Bulletin, v15, pp. 19-27; 1979 (Year: 1979).*
Dufrasne, et al.; Current Medicinal Chemistry, v18, pp. 3995-4011; 2011 (Year: 2011).*
Iverson, et al.; Chemical Research in Toxicology, v8, pp. 537-544; 1995 (Year: 1995).*
Badr, et al.; Journal of the National Cancer Institute, v105, pp. 643-653; 2013 (Year: 2013).*
Badr et al., "A highly sensitive assay for monitoring the secretory pathway and ER stress," PLoS One, 2007, 2(6):e571, 8 pages.
Badr et al., "Obtusaquinone: A Cysteine-Modifying Compound That Targets Keap1 for Degradation," ACS Chem Bio, 2020, 15(6):1445-1454.
Badr et al., "Real-time monitoring of nuclear factor kappaB activity in cultured cells and in animal models," Molecular imaging, 2009, 8(5):278-290, 16 pages.
Badr et al., "Supplementary Materials: Obtusaquinone: A Cysteine-Modifying Compound That Targets Keap1 for Degradation," ACS Chem Bio, 2020, 15(6):1445-1454, 28 pages.
Badr et al., "Supplementary Materials: Targeting Cancer Cells With the Natural Compound Obtusaquinone," J Natl Cancer Inst., May 2013, 105(9)643-653, 12 pages.
Badr et al., "Targeting Cancer Cells With the Natural Compound Obtusaquinone," J Natl Cancer Inst., May 2013, 105(9)643-653.
Bell et al., "Activation of Nrf2-regulated glutathione pathway genes by ischemic preconditioning," Oxid Med Cell Longev, 2011, 2011:689524, 7 pages.
Bolton et al., "Formation and Biological Targets of Quinones: Cytotoxic versus Cytoprotective Effects," Chem Res Toxicol, 2017, 30(1):13-37.
Bradshaw et al., "Prolonged and tunable residence time using reversible covalent kinase inhibitors," Nat Chem Biol, Jul. 2015, 11(7):525-531, 27 pages.
Burslem and Crews, "Proteolysis-Targeting Chimeras as Therapeutics and Tools for Biological Discovery," Cell, Apr. 2020, 181(1):102-114.
Canning and Bullock, "New strategies to inhibit Keap1 and the Cul3-based E3 ubiquitin ligases," Biochem Soc Trans, 2014, 42(Pt 1):103-107.
Canning et al., "Structural basis of Keap1 interactions with Nrf2," Free radical biology & medicine, 2015, 88(Pt B):101-107.
Chew et al., "Cinnamaldehydes inhibit thioredoxin reductase and induce Nrf2: potential candidates for cancer therapy and chemoprevention," Free radical biology & medicine, 2010, 48(I):98-111.

(Continued)

*Primary Examiner* — Jeffrey S Lundgren
*Assistant Examiner* — W. Justin Youngblood
(74) *Attorney, Agent, or Firm* — Fish & Richardson P.C.

(57) ABSTRACT

The present application provides methods and compounds of modulating Nrf2 pathway. Methods for treating cancer and neurodegenerative conditions are also provided.

20 Claims, 51 Drawing Sheets

(56) References Cited

OTHER PUBLICATIONS

Chung et al., "Inhibition of cystine uptake disrupts the—growth of primary brain tumors," J Neurosci, Aug. 2005, 25(31):7101-7110.
Cloer et al., "NRF2 Activation in Cancer: From DNA to Protein, " Cancer research, Mar. 2019, 79(5):889-898, 14 pages.
Copeland et al., "Drug-target residence time and its implications for lead optimization," Nature reviews Drug discovery, Sep. 2006, 5:730-739.
Cuadrado et al., "Therapeutic targeting of the NRF2 and KEAP1 partnership in chronic diseases," Nature Reviews Drug Discovery, 2019, 18(4):295-317, 74 pages.
Deshaies, "Protein degradation: Prime time for PROTACs," Nat Chem Biol, 2015, 11(9):634-635.
Dinkova-Kostova et al., "Keap1, the cysteine-based mammalian intracellular sensor for electrophiles and oxidants," Archives of biochemistry and biophysics, 2017, 617:84-93.
Dixon, "Exemestane: a potent irreversible aromatase inactivator and a promising advance in breast cancer treatment," Expert review of anticancer therapy, 2002, 2(3):267-275, 10 pages.
Edwards and Haas, "Multiplexed Quantitative Proteomics for High-Throughput Comprehensive Proteome Comparisons of Human Cell Lines," Methods Mol Biol, 2016, 1394:1-13.
Elias and Gygi, "Target-decoy search strategy for increased confidence in large-scale protein identifications by mass spectrometry," Nature methods, 2007, 4(3):207-214.
Eng et al., "An approach to correlate tandem mass spectral data of peptides with amino acid sequences in a protein database," J Am Soc Mass Spectrom, 1994, 5:976-989.
Furukawa et al., "BTB protein Keap1 targets antioxidant transcription factor Nrf2 for ubiquitination by the Cullin 3-Roc1 ligase," Molecular and cellular biology, 2005, 25(1):162-71.
Godefroy et al., "Characteristics of Alzheimer's Disease Patients with Severe Executive Disorders," J Alzheimers Dis, 2016, 51:815-825.
Hayes et al., "Cancer chemoprevention mechanisms mediated through the Keap1-Nrf2 pathway," Antioxid Redox Signal, 2010, 13(11):1713-48.
Hirota et al., "Quantitative measurement of spliced XBP1 mRNA as an indicator of endoplasmic reticulum stress," J Toxicol Sci, 2006, 31(2):149-156.
Hu et al., "Discovery of a small-molecule inhibitor and cellular probe of Keap1-Nrf2 protein-protein interaction," Bioorg Med Chem Lett, 2013, 23(10):3039-43.
Hu et al., "Regulation of NF-E2-related factor 2 signaling for cancer chemoprevention: antioxidant coupled with antiinflammatory, " Antioxid Redox Signal, 2010, 13(11):1679-98.
Hur et al., "A small-molecule inducer of the antioxidant response element," Chemistry & biology, 2010, 17(5):537-47.
Huttlin et al., "A tissue-specific atlas of mouse protein phosphorylation and expression," Cell, Dec. 2010, 143:1174-1189.
Illum, "Is nose-to-brain transport of drugs in man a reality?," J Pharm Pharmacol, Jan. 2004, 56(1):3-17.
Illum, "Transport of drugs from the nasal cavity to the central nervous system," Eur J Pharm Sci, Jul. 2000, 11(1):1-18.
International Prelminary Report on Patentability in International Appln. No. PCT/US2020/054062, mailed on Apr. 14, 2022, 6 pages.
International Search Report and Written Opinion in International Appln. No. PCT/US2020/054062, mailed on Feb. 12, 2021, 9 pages.
Invitation to Pay Additional Fees and, Where Applicable, Protest Fee in International Appln. No. PCT/US2020/054062, mailed on Dec. 7, 2020, 2 pages.
Iverson et al., "The influence of the p-alkyl substituent on the isomerization of o-quinones to p-quinone methides: potential bioactivation mechanism for catechols," Chem Res Toxicol, 1995, 8(4):537-44.
Jaeger and Winter, "Expanding the Degradable Proteome: Designing PROTACs by the Book," Cell Chem Biol., Jan. 2020, 27(1):14-16.
Kang et al., "Molecular mechanism of nrf2 activation by oxidative stress," Antioxid Redox Signal, 2005, 7(11-12):1664-1673.
Kensler and Wakabayashi, "Nrf2: friend or foe for chemoprevention?," Carcinogenesis, 2010, 31(1):90-9.
Kensler et al., "Cell survival responses to environmental stresses via the Keap1-Nrf2-ARE pathway," Annu Rev Pharmacol Toxicol, 2007, 47:89-116.
Lai and Crews, "Induced protein degradation: an emerging drug discovery paradigm," Nat Rev Drug Discov, 2017, 16:101-114, 20 pages.
Lastres-Becker et al., "Repurposing the NRF2 Activator Dimethyl Fumarate as Therapy Against Synucleinopathy in Parkinson's Disease," Antioxid Redox Signal, 2016, 25(2):61-77.
Lee et al., "The hypertension drug, verapamil, activates Nrf2 by promoting p62-dependent autophagic Keap1 degradation, " 2017, 50(2):91-96.
Li et al., "Stabilization of Nrf2 by tBHQ confers protection against oxidative stress-induced cell death in human neural stem cells," Toxicological sciences: an official journal of the Society of Toxicology, 2005, 83(2):313-28.
Liby and Sporn, "Synthetic oleanane triterpenoids: multifunctional drugs with a broad range of applications for prevention and treatment of chronic disease," Pharmacol Rev, 2012, 64(4):972-1003.
Lindahl et al., "The disulfide proteome and other reactive cysteine proteomes: analysis and functional significance," Antioxid Redox Signal, 2011, 14:2581-2642.
Maguire et al., "Triple bioluminescence imaging for in vivo monitoring of cellular processes," Molecular therapy Nucleic acids, 2013, 2:e99, 8 pages.
Malhotra and Kaufman, "Endoplasmic reticulum stress and oxidative stress: a vicious cycle or a double-edged sword?," Antioxid Redox Signal, 2007, 9(12):2277-2293.
Mao et al., "Mesenchymal glioma stem cells are maintained by activated glycolytic metabolism involving aldehyde dehydrogenase 1A3," Proc Natl Acad Sci USA, 2013, 110(21):8644-9, 6 pages.
Marcotte et al., "Small molecules inhibit the interaction of Nrf2 and the Keap1 Kelch domain through a non-covalent mechanism," Bioorg Med Chem, 2013, 2120(14):4011-9.
Mayor-Ruiz et al., "Rational discovery of molecular glue degraders via scalable chemical profiling," Nat Chem Biol., Nov. 2020, 16(11):1199-1207, 24 pages.
McAlister et al., "Increasing the multiplexing capacity of TMTs using reporter ion isotopologues with isobaric masses, " Anal Chem, 2012, 84(17):7469-78, 20 pages.
McAlister et al., "MultiNotch MS3 enables accurate, sensitive, and multiplexed detection of differential expression across cancer cell line proteomes," Analytical chemistry, 2014, 86(14):7150-8.
McLellan and Wolf, "Glutathione and glutathione-dependent enzymes in cancer drug resistance," Drug Resist Updates, Jun. 1999, 2(3):153-164.
McMahon et al., "Keap1-dependent proteasomal degradation of transcription factor Nrf2 contributes to the negative regulation of antioxidant response element-driven gene expression," The Journal of biological chemistry, Jun. 2003, 278(24):21592-21600.
Nasiri et al., "Thermodynamic profiling of inhibitors of Nrf2:Keap1 interactions," Bioorg Med Chem Lett, 2016, 26(2):526-9.
Noseworthy et al., "The Mayo Clinic-Canadian Cooperative trial of sulfasalazine in active multiple sclerosis," Neurology, 1998, 51(5):1342-1352.
Petroski et al., "Function and regulation of cullin-RING ubiquitin ligases," Nat Rev Mol Cell Biol, Jan. 2005, 6(1):9-22.
Potashman and Duggan, "Covalent modifiers: an orthogonal approach to drug design," Journal of medicinal chemistry, Feb. 2009, 52(5):1231-1246.
Prestera et al., "Chemical and molecular regulation of enzymes that detoxify carcinogens," Proceedings of the National Academy of Sciences of the United States of America, Apr. 1993, 90(7):2965-9.
Prestera et al., "The electrophile counterattack response: protection against neoplasia and toxicity," Adv Enzyme Regul, 1993, 33:281-96.
PubChem CID No. 5967872, "Obtusaquinone," Create Date Sep. 12, 2005, 22 pages.

(56) References Cited

OTHER PUBLICATIONS

PubChem CID No. 5977863, "Obtusaquinone deriv jurd 1824," Create Date Sep. 12, 2005, 11 pages.
PubChem CID No. 71454058, "Dalparvinene," Create Date May 30, 2013, 14 pages.
Rojo de la Vega et al., "NRF2 and the Hallmarks of Cancer," Cancer Cell, 2018, 34(1):21-43.
Saddawi-Konefka et al., "Nrf2 Induces IL-17D to Mediate Tumor and Virus Surveillance," Cell reports, 2016, 16(9):2348-58.
Salminen et al., "Celastrol: Molecular targets of Thunder God Vine," Biochemical and biophysical research communications, 2010, 394(3):439-42.
Serafimova et al., "Reversible targeting of noncatalytic cysteines with chemically tuned electrophiles," Nature chemical biology, Apr. 2012, 8(5):471-476, 13 pages.
Singh et al., "The resurgence of covalent drugs," Nature reviews Drug discovery, 2011, 10:307-317.
Smith et al., "Beyond picomolar affinities: quantitative aspects of noncovalent and covalent binding of drugs to proteins," Journal of medicinal chemistry, 2009, 52(2):225-233, 18 pages.
Sporn and Liby, "NRF2 and cancer: the good, the bad and the importance of context," Nature Reviews Cancer, 2012, 12(8):564-71, 13 pages.
Steele et al., "Effect of Nrf2 activators on release of glutathione, cysteinylglycine and homocysteine by human U373 astroglial cells," Redox Biol, 2013, 1:441-5.
Sun et al., "PROTACs: great opportunities for academia and industry," Signal Transduction and Targeted Therapy, 2019, 4:64, 33 pages.
Teng et al., "Dissecting inherent intratumor heterogeneity in patient-derived glioblastoma culture models," Neuro-oncology, 2017, 19(6):820-832, 13 pages.
Thomas and Zalcberg, "5-fluorouracil: a pharmacological paradigm in the use of cytotoxics, " Clinical and experimental pharmacology & physiology, 1998, 25(11):887-895.
Ting et al., "MS3 eliminates ratio distortion in isobaric multiplexed quantitative proteomics," Nat Methods, 2011, 8(11):937-40, 6 pages.
Tong et al., "Two-site substrate recognition model for the Keap 1-Nrf2 system: a hinge and latch mechanism," Biol Chem, 2006, 387:1311-1320.
Wakabayashi et al., "Protection against electrophile and oxidant stress by induction of the phase 2 response: fate of cysteines of the Keap1 sensor modified by inducers," Proceedings of the National Academy of Sciences of the United States of America, 2004, 101(7):2040-5.
Wakimoto et al., "Human glioblastoma-derived cancer stem cells: establishment of invasive glioma models and treatment with oncolytic herpes simplex virus vectors," Cancer research, 2009, 69(8):3472-81.
Wakimoto et al., "Maintenance of primary tumor phenotype and genotype in glioblastoma stem cells," Neuro Oncol, 2012, 14:132-144.
Wang et al., "Generation of a stable antioxidant response element-driven reporter gene cell line and its use to show redox-dependent activation of nrf2 by cancer chemotherapeutic agents," Cancer Research, 2006, 66(22):10983-94.
Xu et al., "Structures of eukaryotic ribonucleotide reductase I define gemcitabine diphosphate binding and subunit assembly, " Proc Natl Acad Sci US A, 2006, 103(11):4028-4033.
Yin and Cao, "Toll-like receptor signaling induces Nrf2 pathway activation through p62-triggered Keap1 degradation," Molecular and Cellular Biology, Aug. 2015, 35(15):2673-2683.
Zhang et al., "Distinct cysteine residues in Keap1 are required for Keap1-dependent ubiquitination of Nrf2 and for stabilization of Nrf2 by chemopreventive agents and oxidative stress," Molecular and cellular biology, 2003, 23(22):8137-51.
Zhang et al., "Ubiquitination of Keap1, a BTB-Kelch substrate adaptor protein for Cul3, targets Keap1 for degradation by a proteasome-independent pathway," The Journal of biological chemistry, 2005, 280(34):30091-9.

* cited by examiner

Bovine Catalase

MADNRDPASDQMKHWKEQRAAQKPDVLTTGGGNPVGDKLNSLTVGPRGPLLVQDVVFTDEMAHFDRERIPERVVHAKGAG
AFGYFEVTHDITRYSKAKVFEHIGKRTPIAVRFSTVAGESGSADTVRDPRGFAVKFYTEDGNWDLVGNNTPIFFIRDALL
FPSFIHSQKRNPQTHLKDPDMVWDFWSLRPESLHQVSFLFSDRGIPDGHRHMNGYGSHTFKLVNANGEAVYC(232)KFH
YKTDQGIKNLSVEDAARLAHEDPDYGLRDLFNAIATGNYPSWTLYIQVMTFSEAEIFPFNPFDLTKVWPHGDYPLIPVGK
LVLNRNPVNYFAEVEQLAFDPSNMPPGIEPSPDKMLQGRLFAYPDTHRHRLGPNYLQIPVNC(377)PYRARVANYQRDG
PMCMMDNQGGAPNYYPNSFSAPEHQPSALEHRTHFSGDVQRENSANDDNVTQVRTFYLKVLNEEQRKRLC(460)ENIAG
HLKDAQLFIQKKAVKNFSDVHPEYGSRIQALLDKYNEEKPKNAVHTYVQHGSHLSAREKANL

FIG. 6E

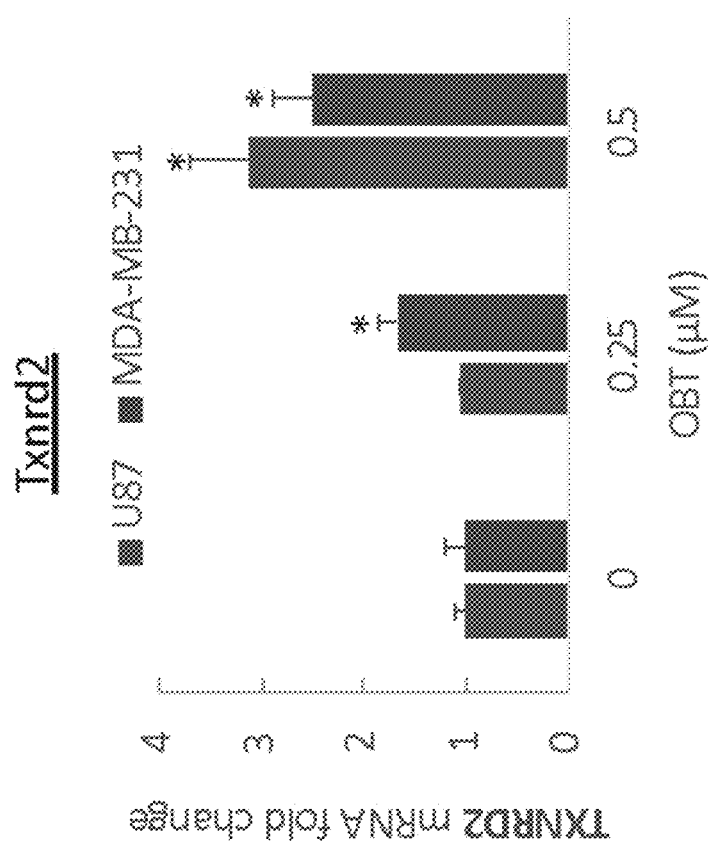
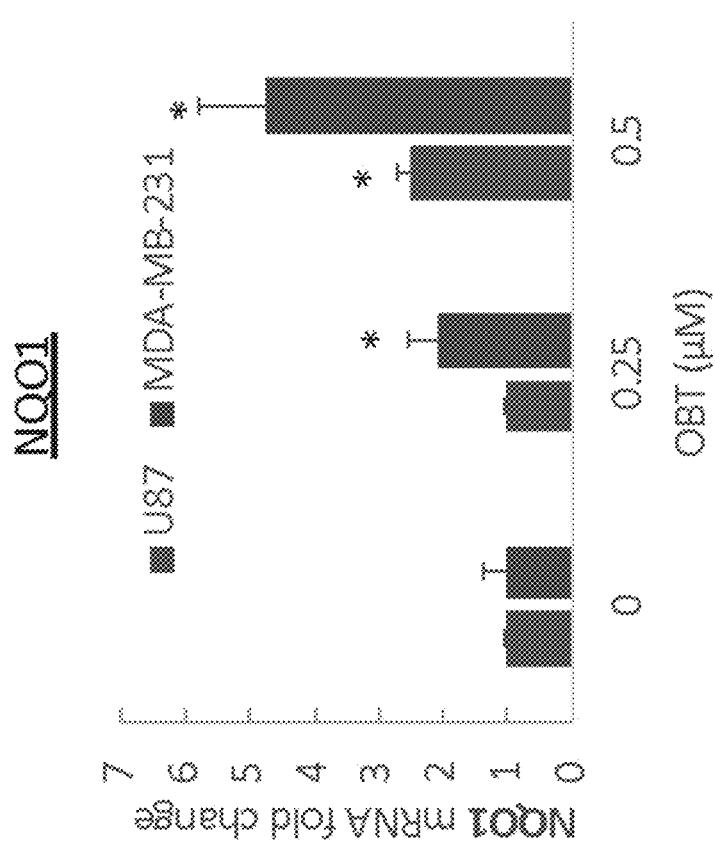
FIG. 8B

CTRL OBT

Adiponectin/Acrp30
Amphiregulin
Angiopoietin-1
Angiopoietin-2
Angiopoietin-like 3
BAFF/BLyS/TNFSF13B
C1q R1/CD93
CCL2UEMCP-1
CCL3/CCL4 MIP-1 alpha/beta
CCL5/RANTES
CCL6/C10
CCL11/Eotaxin
CCL12/MCP-5
CCL17/TARC
CCL19MMIP-3 beta
CCL20MMIP-3 alpha
CCL21/6Ckine
CCL22MMDC
CD14
CD40/T NFRSF5
CD160
Chemerin
Chitinase 3-lke 1
Coagulation Factor III/Tissue Fa
Complement Component C5/C!
Complement Factor D
C-Reactive Protein/CRP
CX3CL1/Fractalkine
CXCL1/KC
CXCL2MMIP-2
CXCL9MIG
CXCL10/P-10
CXCL11/I-TAC
CXCL13/BLC/BCA-1
CXCL16
Cystatin C
Dkk-1
DPPIV/CD26
EGF
Endoglin/CD105
Endostatin
Fetuin A/AHSG
FGF acidic
FGF-21
Ft-3 Ligand
Gas6
G-CSF
GDF-15
GM-CSF
HGF
ICAM-1/CD54
IFN-gamma
IGFBP-1
IGFBP-2
IGFBP-3
IGFBP-5
IGFBP-6

CTRL OBT

IL-1 alpha/IL1F1
IL-1 beta/IL-1F2
IL-1ra/IL-1F3
IL-2
IL-3
IL-4
IL-5
IL-6
IL-7
IL-10
IL-11
IL-12p40
IL-13
IL-15
IL-17A
IL-22
IL-23
IL-27
IL-28
IL-33
LDL R
Leptin
LIF
Lipo ca lin-2/NGAL.
LIX
M-CSF
MMP-2
MMP-3
MMP-9
Myeloperoxidase
Oste opon tin (OPN)
Oste opro te gerin/T NF
PD-ECGF/Thymidine
PDGF-BB
Pentraxin 2/SAP
Pentraxin 3/TSG-14
Periostin/OSF-2
Pref-1/DLK-1/FA1
Proli ferin
Proprotein Convertas
RAGE
RBP4
Reg3G
Resistin
E-Selectin/CD62E
P-Selectin/CD62P
Serpin E1/PAI-1
Serpin F1PEDF
Th rombo poie tin
TIM-1/KIM-1/HAVCR
TNF-alpha
VCAM-1/CD106
VEGF
WISP-1/CCN4

FIG. 24

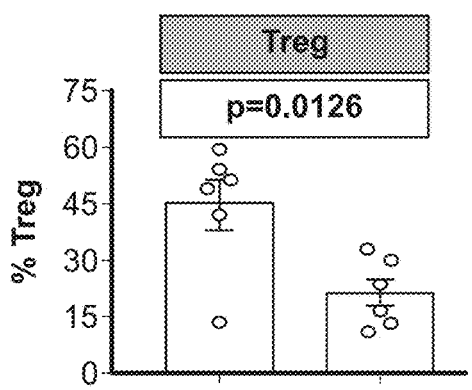
FIG. 25C
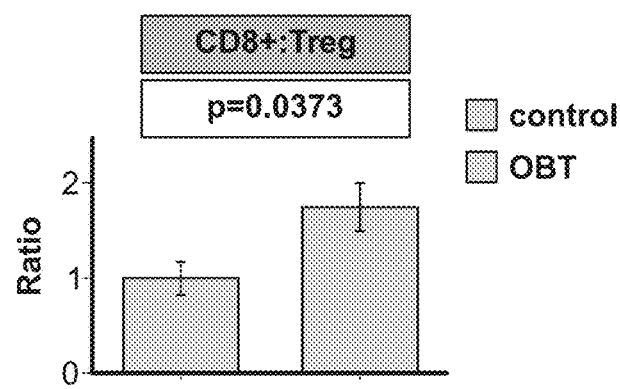
FIG. 25D
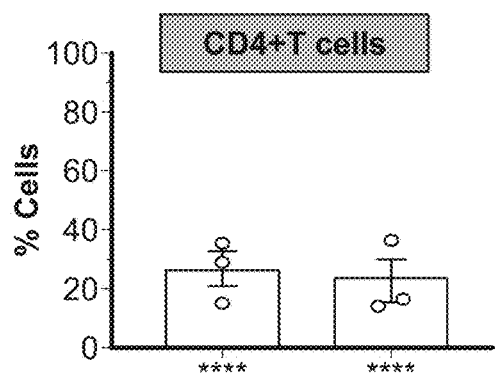
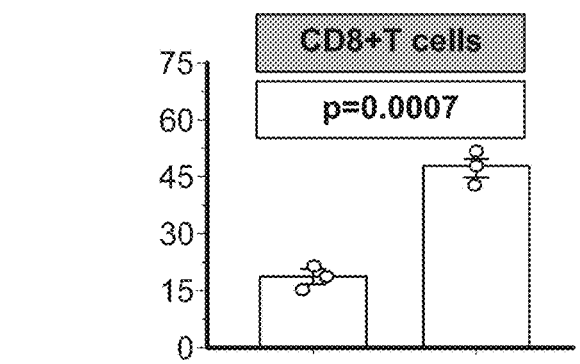
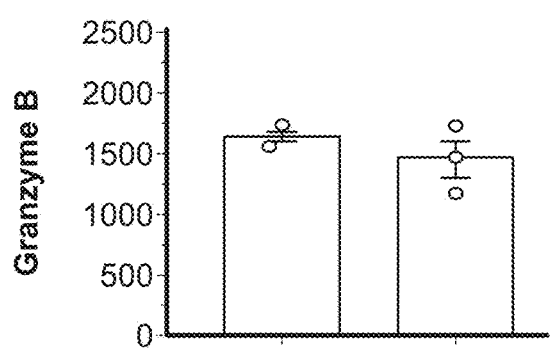
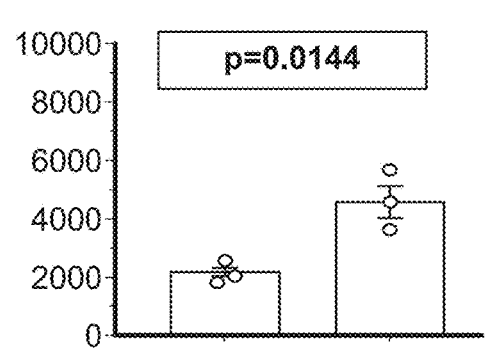
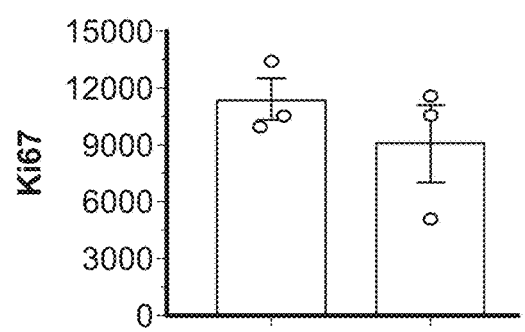
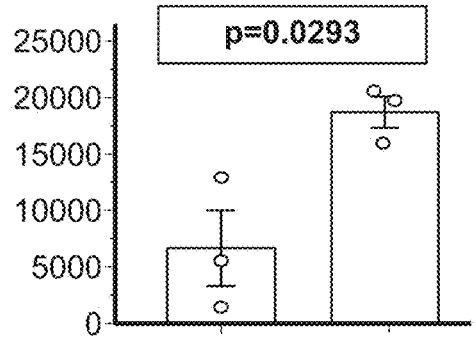
FIG. 25E

METHODS AND MATERIALS FOR MODULATING Nrf2 PATHWAY

CLAIM OF PRIORITY

This application is a national stage filing under 35 U.S.C. § 371 of PCT International Application No. PCT/US2020/054062, filed Oct. 2, 2020, which claims priority to U.S. Provisional Patent Application Ser. No. 62/909,375, filed on Oct. 2, 2019, the entire contents of which are hereby incorporated by reference.

STATEMENT REGARDING FEDERALLY SPONSORED RESEARCH OR DEVELOPMENT

This invention was made with government support under grant number NS064983 awarded by the National Institutes of Health (NIH). The government has certain rights in the invention.

TECHNICAL FIELD

This invention relates to phenylallylidene compounds that are useful, for example, in treating diseases and conditions in which Nrf2/KEAP1 complex is implicated, such as a cancer or inflammatory conditions.

BACKGROUND

Cancer is one of the leading causes of death in contemporary society. The numbers of new cancer cases and deaths is increasing each year. Currently, cancer incidence is nearly 450 cases of cancer per 100,000 men and women per year, while cancer mortality is nearly 71 cancer deaths per 100,000 men and women per year.

Likewise, inflammatory conditions and neurodegenerative diseases affect a significant segment of population. Neurodegenerative diseases especially affect the elderly. Alzheimer's disease (AD), a neurodegenerative disorder that affects approximately 44 million people world-wide, is the sixth leading cause of death with an estimated socioeconomic burden of more than $200 billion.

SUMMARY

The compounds described herein are capable of binding to cysteine residues and show affinity to cysteine-rich Keap1 protein, a member of CUL3 ubiquitin ligase complex. Advantageously, this binding promotes an overall stress response and results in ubiquitination and proteasomal degradation of KEAP1 and downstream activation of the Nrf2 pathway. The compounds are capable to penetrate the blood-brain barrier and functionally target brain cells and brain tumors. What is more, the compounds possess improved pharmacological properties, including potency, stability, and solubility, when compared to known compound obtusaquinone ("OBT"). The present application also advantageously provides compounds and conjugates useful as proteolysis targeting chimeras ("PROTAC"). That is, the compounds of this disclosure can be used as ubiquitin ligase recruiting moieties.

In some embodiments, the present disclosure provides compound selected from of Formula (Ia) and Formula (Ib):

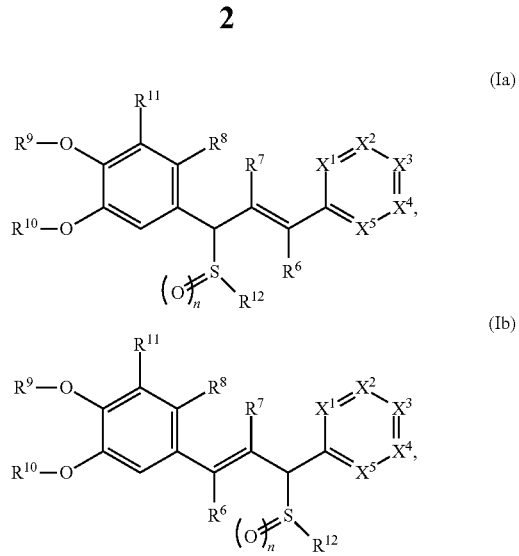

or a pharmaceutically acceptable salt thereof, wherein:
n is selected from 0, 1, and 2;
$X^1$ is selected from N and $CR^1$;
$X^2$ is selected from N and $CR^2$;
$X^3$ is selected from N and $CR^3$;
$X^4$ is selected from N and $CR^4$;
$X^5$ is selected from N and $CR^5$;
provided that no more than three of $X^1$, $X^2$, $X^3$, $X^4$, and $X^5$ are N;
$R^1$, $R^2$, $R^3$, $R^4$, $R^5$ and $R^{11}$ are each independently selected from H, halo, CN, $NO_2$, $C_{1-6}$ alkyl, $C_{1-6}$ haloalkyl, $C_{2-6}$ alkenyl, $C_{2-6}$ alkynyl, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$, $S(O)R^{b1}$, $S(O)NR^{c1}R^{d1}$, $S(O)_2R^{b1}$, and $S(O)_2NR^{c1}R^{d1}$; wherein said $C_{1-6}$ alkyl, $C_{2-6}$ alkenyl, and $C_{2-6}$ alkynyl are each optionally substituted with 1, 2, 3, 4, or 5 substituents independently selected from halo, CN, $NO_2$, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$, $S(O)R^{b1}$, $S(O)NR^{c1}R^{d1}$, $S(O)_2R^{b1}$ and $S(O)_2NR^{c1}R^{d1}$;
$R^6$ and $R^7$ are each independently selected from H, $C_{1-6}$ alkyl, $C_{1-6}$ haloalkyl, $C_{2-6}$ alkenyl, and $C_{2-6}$ alkynyl, wherein said $C_{1-6}$ alkyl, $C_{2-6}$ alkenyl, and $C_{2-6}$ alkynyl are each optionally substituted with 1, 2, or 3 substituents independently selected from halo, CN, $NO_2$, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$ $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$, $S(O)R^{b1}$, $S(O)NR^{c1}R^{d1}$, $S(O)_2R^{b1}$ and $S(O)_2NR^{c1}R^{d1}$;
$R^8$ is selected from halo, CN, $NO_2$, $C_{1-6}$ alkyl, $C_{1-6}$ haloalkyl, $C_{2-6}$ alkenyl, $C_{2-6}$ alkynyl, $OR^{a1}$, $SR^{a1}$, $C(O)R^{b1}$, $C(O)NR^{c1}NR^{d1}$, $C(O)OR^{a1}$, $OC(O)R^{b1}$, $OC(O)NR^{c1}R^{d1}$, $NR^{c1}R^{d1}$ $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$, $S(O)R^{b1}$, $S(O)NR^{c1}R^{d1}$, $S(O)_2R^{b1}$, and $S(O)_2NR^{c1}R^{d1}$; wherein said $C_{1-6}$ alkyl, $C_{2-6}$ alkenyl, and $C_{2-6}$ alkynyl are each optionally substituted with 1, 2, 3, 4, or 5 substituents independently selected from halo, CN, NO$_2$, OR$^{a1}$, SR$^{a1}$, C(O)R$^{b1}$, C(O)NR$^{c1}$R$^{d1}$, C(O)OR$^{a1}$, OC(O)R$^{b1}$, OC(O)NR$^{c1}$R$^{d1}$, NR$^{c1}$R$^{d1}$, NR$^{c1}$C(O)R$^{b1}$, NR$^{c1}$C(O)OR$^{a1}$, NR$^{c1}$C(O)NR$^{c1}$R$^{d1}$, NR$^{c1}$S(O)R$^{b1}$, NR$^{c1}$S(O)$_2$R$^{b1}$, NR$^{c1}$S(O)$_2$NR$^{c1}$R$^{d1}$, S(O)R$^{b1}$, S(O)NR$^{c1}$R$^{d1}$, S(O)$_2$R$^{d1}$, and S(O)$_2$NR$^{c1}$R$^{d1}$;

R$^9$ and R$^{10}$ are each independently selected from H, C(O)R$^{b1}$, C(O)NR$^{c1}$R$^{d1}$, C(O)OR$^{a1}$, S(O)R$^{b1}$, S(O)NR$^{c1}$R$^{d1}$, S(O)$_2$R$^{b1}$, and S(O)$_2$NR$^{c1}$R$^{d1}$;

R$^{12}$ is selected from C$_{1-6}$ alkyl, C$_{2-6}$ alkenyl, C$_{2-6}$ alkynyl, C$_{3-10}$ cycloalkyl, and a peptide, wherein said C$_{1-6}$ alkyl, C$_{2-6}$ alkenyl, C$_{2-6}$ alkynyl, and C$_{3-10}$ cycloalkyl are each optionally substituted with 1, 2, 3, 4, or 5 substituents independently selected from halo, CN, NO$_2$, OR$^{a1}$, SR$^{a1}$, C(O)R$^{b1}$, C(O)NR$^{c1}$R$^{d1}$, C(O)OR$^{a1}$, OC(O)R$^{b1}$, OC(O)NR$^{c1}$R$^{d1}$, NR$^{c1}$R$^{d1}$, NR$^{c1}$C(O)R$^{b1}$, NR$^{c1}$C(O)OR$^{a1}$, NR$^{c1}$C(O)NR$^{c1}$R$^{d1}$, NR$^{c1}$S(O)R$^{b1}$, NR$^{c1}$S(O)$_2$R$^{b1}$, NR$^{c1}$S(O)$_2$NR$^{c1}$R$^{d1}$ S(O)R$^{b1}$, S(O)NR$^{c1}$R$^{d1}$, S(O)$_2$R$^{b1}$ and S(O)$_2$NR$^{c1}$R$^{d1}$;

each R$^{b1}$ is independently selected from H, C$_{1-12}$ alkyl, C$_{1-4}$ haloalkyl, C$_{2-6}$ alkenyl, C$_{2-6}$ alkynyl, and C$_{3-10}$ cycloalkyl, wherein said C$_{1-6}$ alkyl, C$_{2-6}$ alkenyl, C$_{2-6}$ alkynyl, and C$_{3-10}$ cycloalkyl are each optionally substituted with 1, 2, or 3 substituents independently selected from R$^g$;

each R$^{a1}$, R$^{c1}$ and R$^{d1}$ is independently selected from H, C$_{1-6}$ alkyl, C$_{1-4}$ haloalkyl, C$_{2-6}$ alkenyl, C$_{2-6}$ alkynyl, C$_{3-10}$ cycloalkyl, C(O)R$^{b2}$, C(O)NR$^{c2}$R$^{d2}$, C(O)OR$^{a2}$, NR$^{c2}$R$^{d2}$, S(O)R$^{b2}$, S(O)NR$^{c2}$R$^{d2}$, S(O)$_2$R$^{b2}$, and S(O)$_2$NR$^{c2}$R$^{d2}$; wherein aid C$_{1-6}$ alkyl, C$_{2-6}$ alkenyl, C$_{2-6}$ alkynyl, and C$_{3-10}$ cycloalkyl are each optionally substituted with 1, 2, or 3 substituents independently selected from R$^g$;

each R$^{a2}$, R$^{b2}$, R$^{c2}$, and R$^{d2}$ is in dependently selected from H, C$_{1-6}$ alkyl, C$_{1-4}$ haloalkyl, C$_{2-6}$ alkenyl, C$_{2-6}$ alkynyl, and C$_{3-10}$ cycloalkyl; wherein said C$_{1-6}$ alkyl, C$_{2-6}$ alkenyl, C$_{2-6}$ alkynyl, and C$_{3-10}$ cycloalkyl are each optionally substituted with 1, 2, or 3 substituents independently selected from R$^g$;

or any R$^{c1}$ and R$^{d1}$ together with the N atom to which they are attached form a 4-, 5-, 6-, or 7-membered heterocycloalkyl group optionally substituted with 1, 2, or 3 substituents independently selected from R$^g$;

or any R$^{c2}$ and R$^{d2}$ together with the N atom to which they are attached form a 4-, 5-, 6-, or 7-membered heterocycloalkyl group optionally substituted with 1, 2, or 3 substituents independently selected from R$^g$; and each R$^g$ is independently selected from OH, NO$_2$, CN, halo, C$_{1-6}$ alkyl, C$_{2-6}$ alkenyl, C$_{2-6}$ alkynyl, C$_{1-4}$ haloalkyl, C$_{1-6}$ alkoxy, C$_{1-6}$ haloalkoxy, cyano-C$_{1-3}$ alkylene, HO—C$_{1-3}$ alkylene, amino, C$_{1-6}$ alkylamino, di(C$_{1-6}$ alkyl)amino, thio, C$_{1-6}$ alkylthio, C$_{1-6}$ alkylsulfinyl, C$_{1-6}$ alkylsulfonyl, carbamyl, C$_{1-6}$ alkylcarbamyl, di(C$_{1-6}$ alkyl)carbamyl, carboxy, C$_{1-6}$ alkylcarbonyl, C$_{1-6}$ alkoxycarbonyl, C$_{1-6}$ alkylcarbonylamino, C$_{1-6}$ alkylsulfonylamino, aminosulfonyl, C$_{1-6}$ alkylaminosulfonyl, di(C$_{1-6}$ alkyl)aminosulfonyl, aminosulfonylamino, C$_{1-6}$ alkylaminosulfonylamino, di(C$_{1-6}$ alkyl)aminosulfonylamino, aminocarbonylamino, C$_{1-6}$ alkylaminocarbonylamino, and di(C$_{1-6}$ alkyl)aminocarbonylamino.

In some embodiments, the compound is a compound of Formula (Ia):

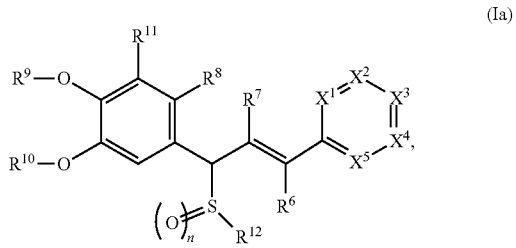

(Ia)

or a pharmaceutically acceptable salt thereof.

In some embodiments, the compound of Formula (Ia) has formula:

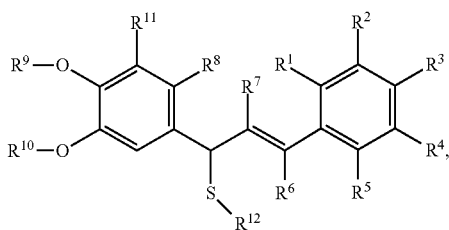

or a pharmaceutically acceptable salt thereof.

In some embodiments:

R$^2$, R$^3$, R$^4$, R$^5$ and R$^{11}$ are each independently selected from H, halo, CN, NO$_2$, OH, NH$_2$, C$_{1-6}$ alkyl, C$_{1-6}$ haloalkyl, C$_{1-6}$ alkoxy, C$_{1-6}$ haloalkoxy, C$_{1-6}$ alkylamino, and di(C$_{1-6}$ alkyl)amino;

R$^6$ and R$^7$ are each selected from H, C$_{1-6}$ alkyl, and C$_{1-6}$ haloalkyl;

R$^8$ is selected from halo, C$_{1-6}$ alkyl, C$_{1-6}$ haloalkyl, C$_{1-6}$ alkoxy, and C$_{1-6}$ haloalkoxy;

R$^9$ and R$^{10}$ are each independently selected from H and C(O)R$^{b1}$;

each R$^{b1}$ is independently C$_{1-12}$ alkyl;

R$^{12}$ is selected from C$_{1-6}$ alkyl and a peptide, wherein said C$_{1-6}$ alkyl is optionally substituted with 1, 2, or 3 substituents independently selected from OR$^{a1}$, SR$^{a1}$, C(O)OR$^{a1}$, and NR$^{c1}$R$^{d1}$;

each R$^{a1}$, R$^{c1}$, and R$^{d1}$ is independently selected from H, C$_{1-6}$ alkyl, C$_{1-4}$ haloalkyl, and C(O)R$^{b2}$; and each R$^{b2}$ is independently selected from C$_{1-6}$ alkyl and C$_{1-4}$ haloalkyl.

In some embodiments, the compound has formula:

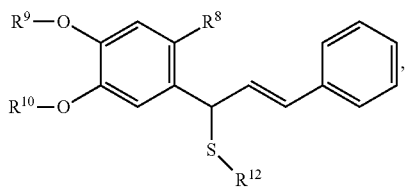

or a pharmaceutically acceptable salt thereof, wherein:

R$^8$ is C$_{1-6}$ alkoxy.

In some embodiments, the compound of Formula (Ia) is selected from any one of the following compounds:

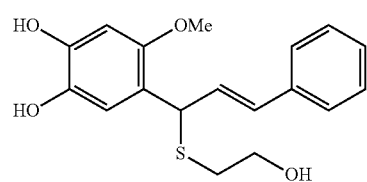
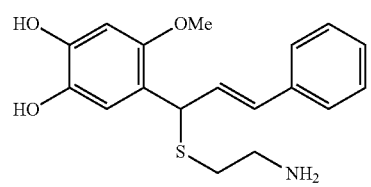
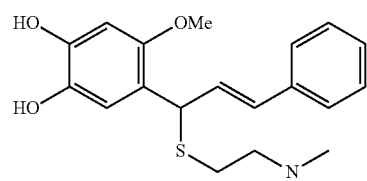
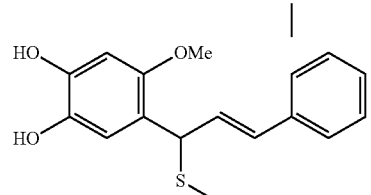
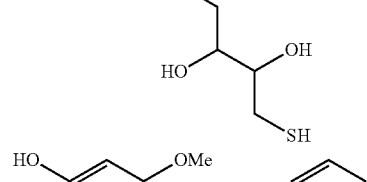
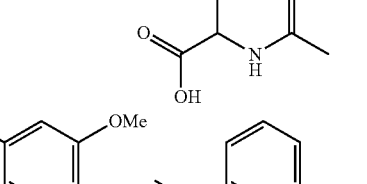
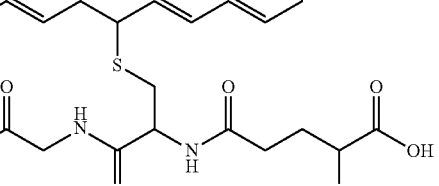
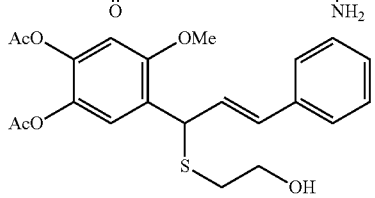
-continued
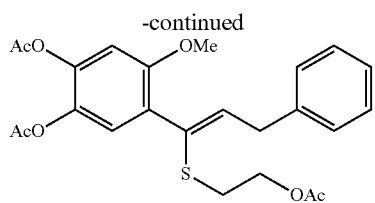
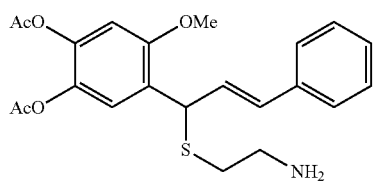
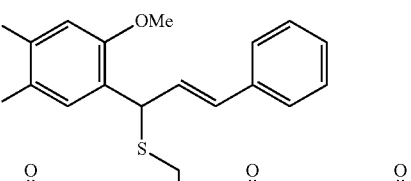
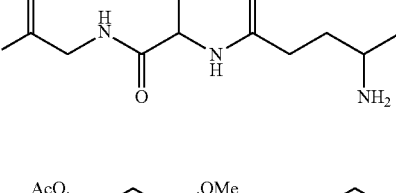
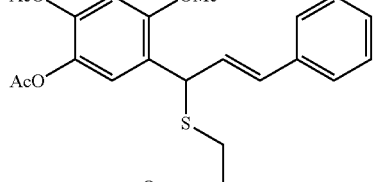
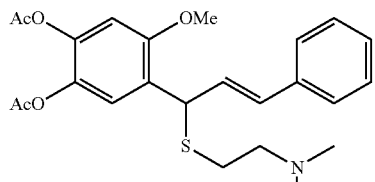
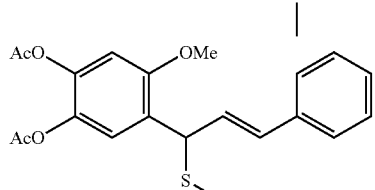
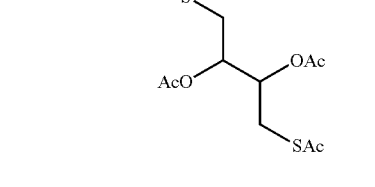
or a pharmaceutically acceptable salt thereof.

In some embodiments, the compound has Formula (Ib):

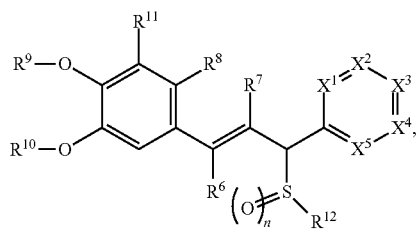

or a pharmaceutically acceptable salt thereof.

In some embodiments, the compound has formula:

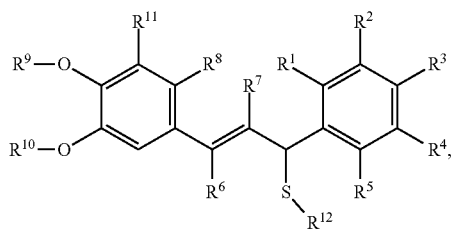

or a pharmaceutically acceptable salt thereof.

In some embodiments:

$R^1$, $R^2$, $R^3$, $R^4$, $R^5$ and $R^{11}$ are each independently selected from H, halo, CN, $NO_2$, OH, $NH_2$, $C_{1-6}$ alkyl, $C_{1-6}$ haloalkyl, $C_{1-6}$ alkoxy, $C_{1-6}$ haloalkoxy, $C_{1-6}$ alkylamino, and $di(C_{1-6}$ alkyl)amino;

$R^6$ and $R^7$ are each selected from H, $C_{1-6}$ alkyl, and $C_{1-6}$ haloalkyl;

$R^8$ is selected from halo, $C_{1-6}$ alkyl, $C_{1-6}$ haloalkyl, $C_{1-6}$ alkoxy, and $C_{1-6}$ haloalkoxy;

$R^9$ and $R^{10}$ are each independently selected from H and $C(O)R^{b1}$;

each $R^{b1}$ is independently $C_{1-12}$ alkyl;

$R^{12}$ is selected from $C_{1-6}$ alkyl and a peptide, wherein said $C_{1-6}$ alkyl is optionally substituted with 1, 2, or 3 substituents independently selected from $OR^{a1}$, $SR^{a1}$, $C(O)OR^{a1}$, and $NR^{c1}R^{d1}$;

each $R^{a1}$, $R^{c1}$, and $R^{d1}$ is independently selected from H, $C_{1-6}$ alkyl, $C_{1-4}$ haloalkyl, and $C(O)R^{b2}$;

each $R^{b2}$ is independently selected from $C_{1-6}$ alkyl and $C_{1-4}$ haloalkyl.

In some embodiments, the compound has formula:

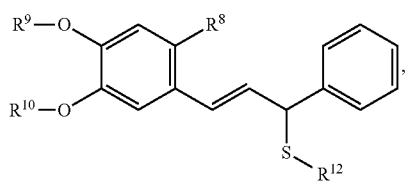

or a pharmaceutically acceptable salt thereof, wherein:

$R^8$ is $C_{1-6}$ alkoxy.

In some embodiments, the compound of Formula (Ib) is selected from any one of the following compounds:

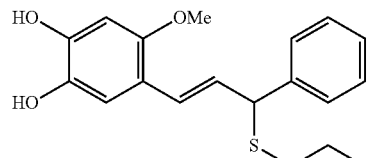

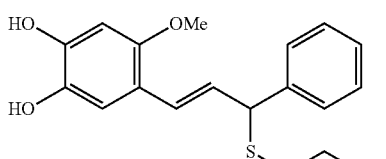

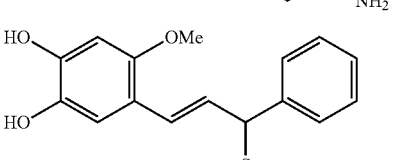

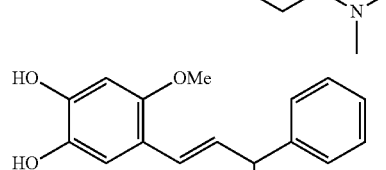

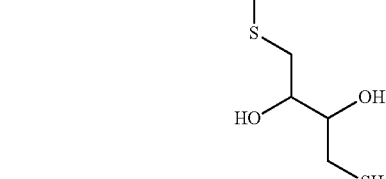

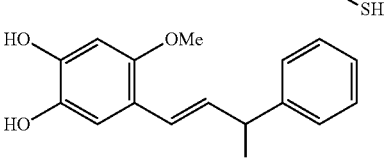

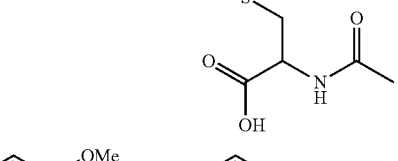

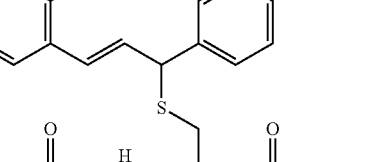

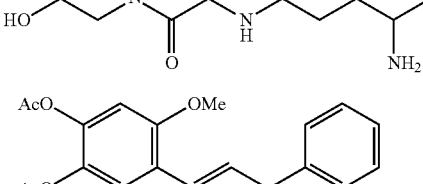

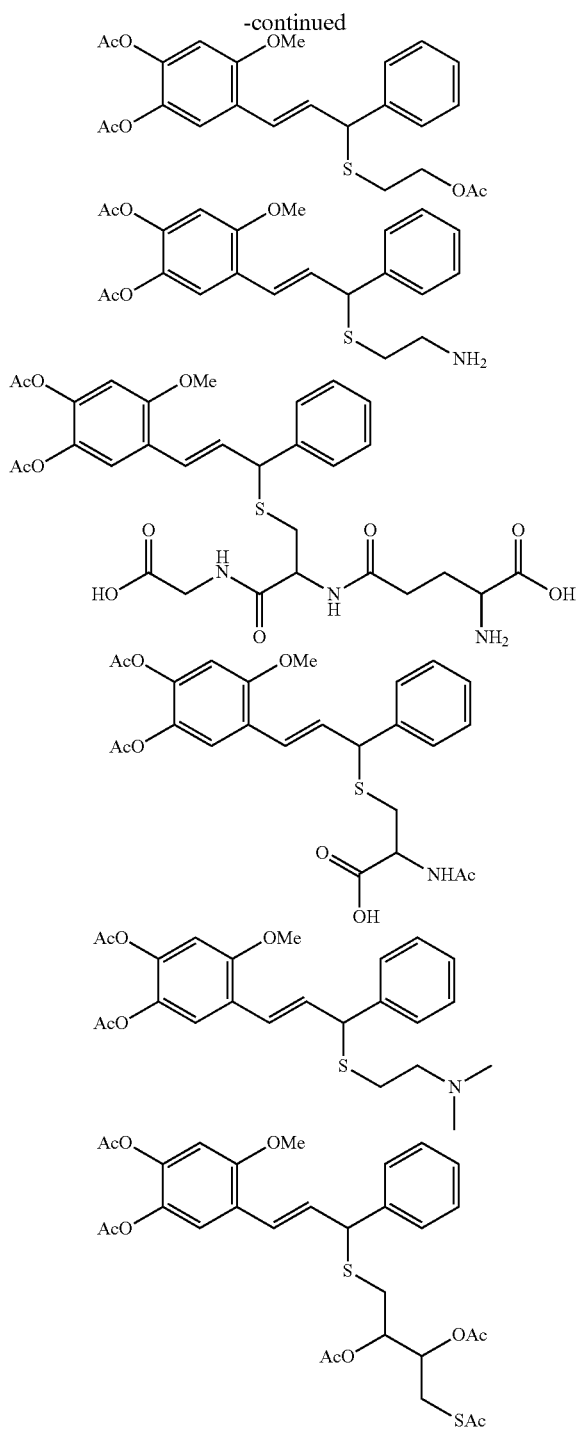

or a pharmaceutically acceptance salt thereof.

In some embodiments, the present disclosure provides a pharmaceutical composition comprising a compound of Formula (Ia) or (Ib), or a pharmaceutically acceptable salt thereof, and a pharmaceutically acceptable carrier.

In some embodiments, the present disclosure provides a method of treating a disease or condition in which Nrf2 pathway is implicated, the method comprising administering to the subject in need thereof a therapeutically effective amount of a compound of Formula (Ia) or (Ib), or a pharmaceutically acceptable salt thereof, or a pharmaceutical composition comprising same.

In some embodiments, the disease or condition is cancer.

In some embodiments, the cancer is selected from brain cancer and breast cancer.

In some embodiments, the disease or condition is a neurodegenerative disease.

In some embodiments, the neurodegenerative disease is selected from Alzheimer's disease, Parkinson's disease, Huntington's disease, Lewy body disease, dementia, motor neuron disease, multiple sclerosis, and amyotrophic lateral sclerosis.

In some embodiments, the disease or condition is selected from diabetes and stroke.

In some embodiments, the present disclosure provides a compound of Formula (II):

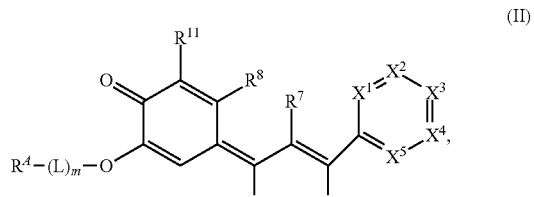

(II)

or a pharmaceutically acceptable salt thereof, wherein:
$X^1$ is selected from N and $CR^1$;
$X^2$ is selected from N and $CR^2$;
$X^3$ is selected from N and $CR^3$;
$X^4$ is selected from N and $CR^4$;
$X^5$ is selected from N and $CR^5$;
provided that no more than three of $X^1$, $X^2$, $X^3$, $X^4$, and $X^5$ are N;
$R^1$, $R^2$, $R^3$, $R^4$, $R^5$, $R^8$, and $R^{11}$ are each independently selected from H, halo, CN, $NO_2$, $C_{1-6}$ alkyl, $C_{1-6}$ haloalkyl, $C_{2-6}$ alkenyl, $C_{2-6}$ alkynyl, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$, $S(O)R^{b1}$, $S(O)NR^{c1}R^{d1}$, $S(O)_2R^{b1}$, and $S(O)_2NR^{c1}R^{d1}$; wherein said $C_{1-6}$ alkyl, $C_{2-6}$ alkenyl, and $C_{2-6}$ alkynyl are each optionally substituted with 1, 2, 3, 4, or 5 substituents independently selected from halo, CN, $NO_2$, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)NR^{b1}$, $NR^{c1}S(O)_2R^{b1}$, $NR^{c1}S(O)_2NR^{c1}R^{d1}$, $S(O)R^{b1}$, $S(O)NR^{c1}R^{d1}$, $S(O)_2R^{b1}$ and $S(O)_2NR^{c1}R^{d1}$;

$R^6$, $R^{6a}$, and $R^7$ are each independently selected from H, $C_{1-6}$ alkyl, $C_{2-6}$ alkenyl, and $C_{2-6}$ alkynyl, wherein said $C_{1-6}$ alkyl, $C_{2-6}$ alkenyl, and $C_{2-6}$ alkynyl are each optionally substituted with 1, 2, or 3 substituents independently selected from halo, CN, $NO_2$, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$ $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$, $S(O)R^{b1}$, $S(O)NR^{c1}R^{d1}$, $S(O)_2R^{b1}$ and $S(O)_2NR^{c1}R^{d1}$;

m is an integer from 2 to 20;
each L is independently selected from $N(R^N)$, O, C(=O), S, S(=O), $S(=O)_2$, $C_{1-6}$ alkylene, $C_{3-7}$ cycloalkylene, 4-10-membered heterocycloalkylene, 5-10-membered heteroarylene, $C_{6-10}$ arylene, $-(OCH_2CH_2)_x-$, $-(CH_2CH_2O)_x-$, $-(OCH(CH_3)CH_2)_x-$, $-(CH_2CH$ (CH₃)O)ₓ—, each of which is optionally substituted with 1 or 2 substituents independently selected from OH, NH₂, C(O)OH, SO₃H, C₁₋₃ alkylamino, di(C₁₋₃-alkyl)amino, C₁₋₃ haloalkyl, C₁₋₃ alkoxy, and C₁₋₃ haloalkoxy;

each x is independently an integer from 1 to 2,000;

each $R^N$ is independently selected from H, $C_{1-6}$ alkyl, $C_{2-6}$ alkenyl, and $C_{2-6}$ alkynyl;

$R^A$ is independently selected from H and a targeting ligand capable of selectively binding to a protein;

each $R^{b1}$ is independently selected from H, $C_{1-12}$ alkyl, $C_{1-4}$ haloalkyl, $C_{2-6}$ alkenyl, $C_{2-6}$ alkynyl, and $C_{3-10}$ cycloalkyl, wherein said $C_{1-6}$ alkyl, $C_{2-6}$ alkenyl, $C_{2-6}$ alkynyl, and $C_{3-10}$ cycloalkyl are each optionally substituted with 1, 2, or 3 substituents independently selected from $R^g$;

each $R^{a1}R^{c1}$ and $R^{d1}$ is independently selected from H, $C_{1-6}$ alkyl, $C_{1-4}$ haloalkyl, $C_{2-6}$ alkenyl, $C_{2-6}$ alkynyl, $C_{3-10}$ cycloalkyl, $C(O)R^{b2}$, $C(O)NR^{c2}R^{d2}$, $C(O)OR^{a2}$, $NR^{c2}R^{d2}$, $S(O)R^{b2}$, $S(O)NR^{c2}R^{d2}$, $S(O)_2R^{b2}$, and $S(O)_2 NR^{c2}R^{d2}$; wherein aid $C_{1-6}$ alkyl, $C_{2-6}$ alkenyl, $C_{2-6}$ alkynyl, and $C_{3-10}$ cycloalkyl are each optionally substituted with 1, 2, or 3 substituents independently selected from $R^g$;

each $R^{a2}$, $R^{b2}$, $R^{c2}$, and $R^{d2}$ is in dependently selected from H, $C_{1-6}$ alkyl, $C_{1-4}$ haloalkyl, $C_{2-6}$ alkenyl, $C_{2-6}$ alkynyl, and $C_{3-10}$ cycloalkyl; wherein said $C_{1-6}$ alkyl, $C_{2-6}$ alkenyl, $C_{2-6}$ alkynyl, and $C_{3-10}$ cycloalkyl are each optionally substituted with 1, 2, or 3 substituents independently selected from $R^g$;

or any $R^{c1}$ and $R^{d1}$ together with the N atom to which they are attached form a 4-, 5-, 6-, or 7-membered heterocycloalkyl group optionally substituted with 1, 2, or 3 substituents independently selected from $R^g$;

or any $R^{c2}$ and $R^{d2}$ together with the N atom to which they are attached form a 4-, 5-, 6-, or 7-membered heterocycloalkyl group optionally substituted with 1, 2, or 3 substituents independently selected from $R^g$; and each $R^g$ is independently selected from OH, NO₂, CN, halo, $C_{1-6}$ alkyl, $C_{2-6}$ alkenyl, $C_{2-6}$ alkynyl, $C_{1-4}$ haloalkyl, $C_{1-6}$ alkoxy, $C_{1-6}$ haloalkoxy, cyano-$C_{1-3}$ alkylene, HO—$C_{1-3}$ alkylene, amino, $C_{1-6}$ alkylamino, di($C_{1-6}$ alkyl)amino, thio, $C_{1-6}$ alkylthio, $C_{1-6}$ alkylsulfinyl, $C_{1-6}$ alkylsulfonyl, carbamyl, $C_{1-6}$ alkylcarbamyl, di($C_{1-6}$ alkyl)carbamyl, carboxy, $C_{1-6}$ alkylcarbonyl, $C_{1-6}$ alkoxycarbonyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino.

In some embodiments, the compound of Formula (II) has formula:

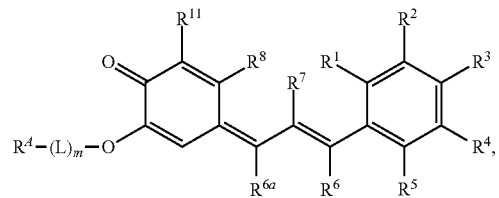

or a pharmaceutically acceptable salt thereof.

In some embodiments:

$R^1$, $R^2$, $R^3$, $R^4$, $R^5$, $R^8$, and $R^{11}$ are each independently selected from H, halo, CN, NO₂, OH, NH₂, $C_{1-6}$ alkyl, $C_{1-6}$ haloalkyl, $C_{1-6}$ alkoxy, $C_{1-6}$ haloalkoxy, $C_{1-6}$ alkylamino, and di($C_{1-6}$ alkyl)amino;

$R^6$, $R^{6a}$, and $R^7$ are each selected from H, $C_{1-6}$ alkyl, and $C_{1-6}$ haloalkyl;

m is an integer from 2 to 10;

each L is independently selected from $N(R^N)$, O, $C(=O)$, $C_{1-6}$ alkylene, $C_{3-7}$ cycloalkylene, 4-10-membered heterocycloalkylene, 5-10-membered heteroarylene, $C_{6-10}$ arylene, —(OCH₂CH₂)ₓ—, and —(CH₂CH₂O)ₓ—;

each x is independently an integer from 1 to 10; and each $R^N$ is independently selected from H and $C_{1-6}$ alkyl.

In some embodiments, the compound has formula:

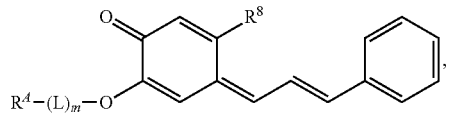

or a pharmaceutically acceptable salt thereof, wherein:

$R^8$ is selected from H and $C_{1-6}$ alkoxy.

In some embodiments, $R^A$ is H.

In some embodiments, $R^A$ is a targeting ligand capable of selectively binding to a protein.

In some embodiments, the protein is implicated in the pathology of cancer.

In some embodiments, the protein is implicated in the pathology of a neurodegenerative disease or condition.

In some embodiments, the compound of Formula (II) is selected from any one of the following compounds:

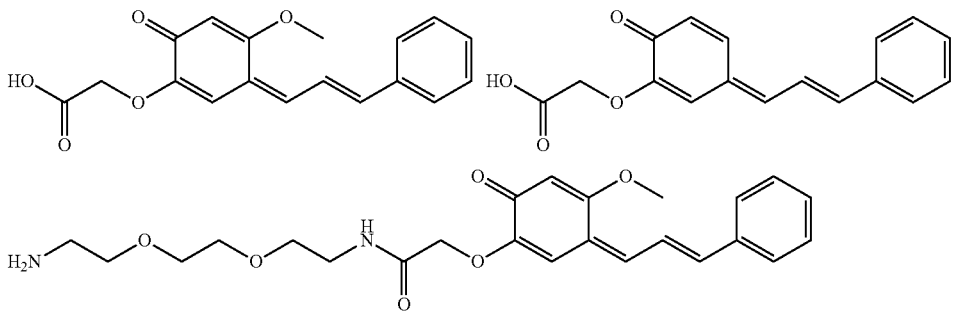

-continued

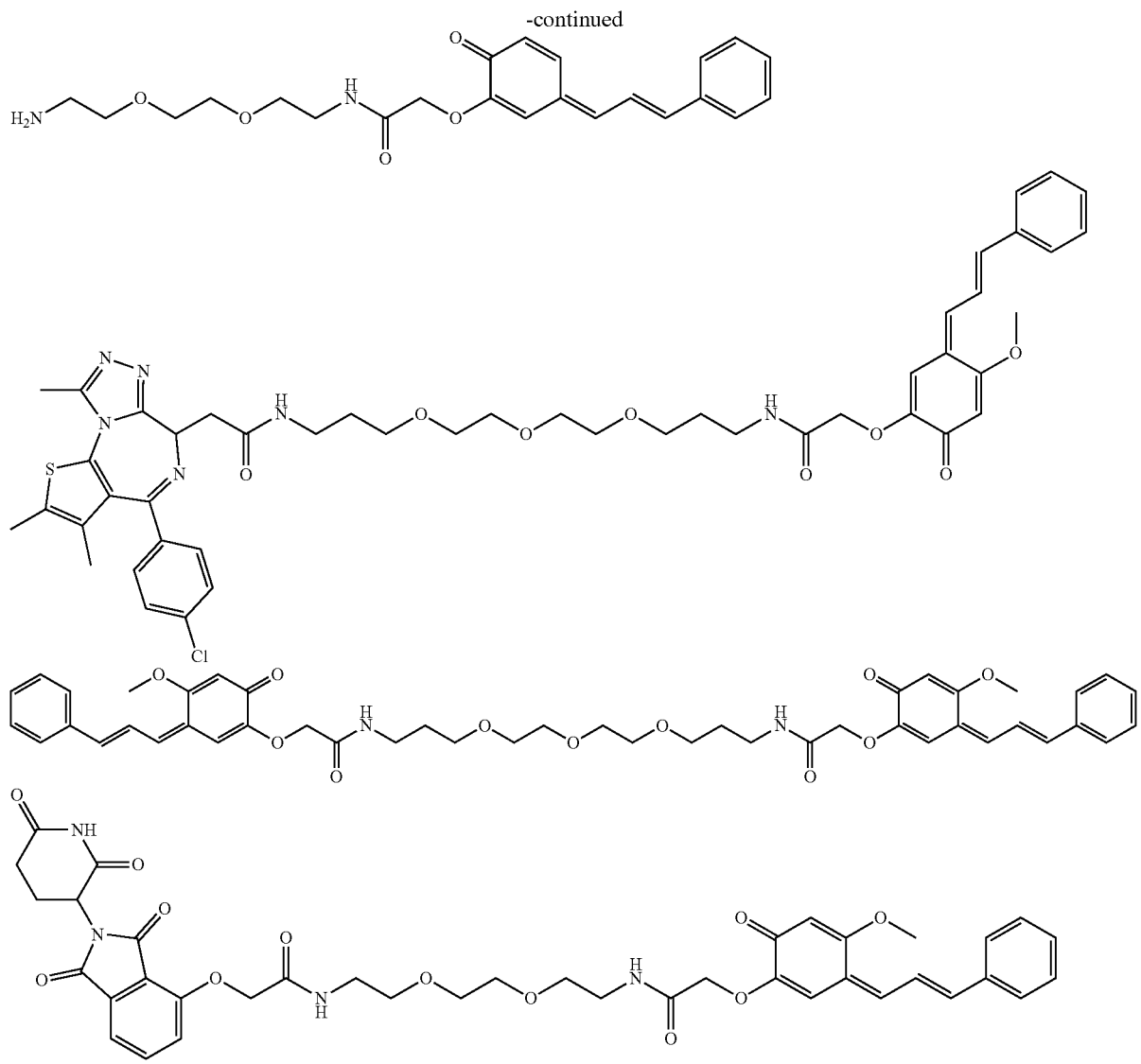

or a pharmaceutically acceptable salt thereof.

In some embodiments, the present disclosure provides a pharmaceutical composition comprising a compound of Formula (II), or a pharmaceutically acceptable salt thereof, wherein $R^A$ is a targeting ligand capable of selectively binding to a protein, and a pharmaceutically acceptable carrier.

In some embodiments, the present disclosure provides a method of reducing level of a protein in a cell, the method comprising contacting the cell with an effective amount of a compound of Formula (II), or a pharmaceutically acceptable salt thereof, wherein $R^A$ is a targeting ligand capable of selectively binding to the protein.

In some embodiments, contacting the cell is carried out in vitro, in vivo, or ex vivo.

In some embodiments, the present disclosure provides a method of treating cancer, the method comprising administering to a patient in need thereof a therapeutically effective amount of a compound of Formula (II), or a pharmaceutically acceptable salt thereof, wherein $R^A$ is a targeting ligand capable of binding a protein that is implicated in cancer.

In some embodiments, the present disclosure provides a method of treating a neurological disease or condition, the method comprising administering to a patient in need thereof a therapeutically effective amount of a compound of Formula (II), or a pharmaceutically acceptable salt thereof, wherein $R^A$ is a targeting ligand capable of binding a protein that is implicated in the neurological disease or condition.

In some embodiments, the present disclosure provides a compound selected from Formula (IIIa) and Formula (IIIb):

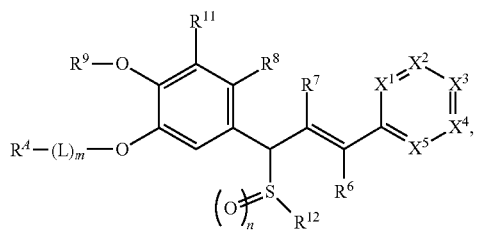

-continued or a pharmaceutically acceptable salt thereof, wherein:

n is selected from 0, 1, and 2;

$X^1$ is selected from N and $CR^1$;

$X^2$ is selected from N and $CR^2$;

$X^3$ is selected from N and $CR^3$;

$X^4$ is selected from N and $CR^4$;

$X^5$ is selected from N and $CR^5$;

provided that no more than three of $X^1$, $X^2$, $X^3$, $X^4$, and $X^5$ are N;

$R^1$, $R^2$, $R^3$, $R^4$, $R^5$, $R^8$, and $R^{11}$ are each independently selected from H, halo, CN, $NO_2$, $C_{1-6}$ alkyl, $C_{1-6}$ haloalkyl, $C_{2-6}$ alkenyl, $C_{2-6}$ alkynyl, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$, $S(O)R^{b1}$, $S(O)NR^{c1}R^{d1}$, $S(O)_2R^{b1}$, and $S(O)_2NR^{c1}R^{d1}$; wherein said $C_{1-6}$ alkyl, $C_{2-6}$ alkenyl, and $C_{2-6}$ alkynyl are each optionally substituted with 1, 2, 3, 4, or 5 substituents independently selected from halo, CN, $NO_2$, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$ $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$, $S(O)R^{b1}$, $S(O)NR^{c1}R^{d1}$, $S(O)_2R^{b1}$, and $S(O)_2NR^{c1}R^{d1}$;

$R^6$ and $R^7$ are each independently selected from H, $C_{1-6}$ alkyl, $C_{1-6}$ haloalkyl, $C_{2-6}$ alkenyl, and $C_{2-6}$ alkynyl, wherein said $C_{1-6}$ alkyl, $C_{2-6}$ alkenyl, and $C_{2-6}$ alkynyl are each optionally substituted with 1, 2, or 3 substituents independently selected from halo, CN, $NO_2$, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$ $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$, $S(O)R^{b1}$, $S(O)NR^{c1}R^{d1}$, $S(O)_2R^{b1}$, and $S(O)_2NR^{c1}R^{d1}$;

$R^9$ is selected from H, $C(O)R^{b1}$, $C(O)NR^{c1}R^{d1}$, $C(O)OR^{a1}$, $S(O)R^{b1}$, $S(O)NR^{c1}R^{d1}$, $S(O)_2R^{b1}$, and $S(O)_2NR^{c1}R^{d1}$;

m is an integer from 2 to 20;

each L is independently selected from $N(R^N)$, O, C(=O), S, S(=O), $S(=O)_2$, $C_{1-6}$ alkylene, $C_{3-7}$ cycloalkylene, 4-10-membered heterocycloalkylene, 5-10-membered heteroarylene, $C_{6-10}$ arylene, $-(OCH_2CH_2)_x-$, $-(CH_2CH_2O)_x-$, $-(OCH(CH_3)CH_2)_x-$, $-(CH_2CH(CH_3)O)_x-$, each of which is optionally substituted with 1 or 2 substituents independently selected from OH, $NH_2$, C(O)OH, $SO_3H$, $C_{1-3}$ alkylamino, di($C_{1-3}$-alkyl)amino, $C_{1-3}$ haloalkyl, $C_{1-3}$ alkoxy, and $C_{1-3}$ haloalkoxy;

each x is independently an integer from 1 to 2,000;

each $R^N$ is independently selected from H, $C_{1-6}$ alkyl, $C_{2-6}$ alkenyl, and $C_{2-6}$ alkynyl $R^A$ is independently selected from H and a targeting ligand capable of selectively binding to a protein;

$R^{12}$ is selected from $C_{1-6}$ alkyl, $C_{2-6}$ alkenyl, $C_{2-6}$ alkynyl, $C_{3-10}$ cycloalkyl, and a peptide, wherein said $C_{1-6}$ alkyl, $C_{2-6}$ alkenyl, $C_{2-6}$ alkynyl, and $C_{3-10}$ cycloalkyl are each optionally substituted with 1, 2, 3, 4, or 5 substituents independently selected from halo, CN, $NO_2$, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$ $NR^{c1}C(O)R^{b1}$, $NR^{c1}C(O)OR^{a1}$, $NR^{c1}C(O)NR^{c1}R^{d1}$, $NR^{c1}S(O)R^{b1}NR^{c1}S(O)_2R^{b1}$, $NR^{c1}S(O)_2NR^{c1}R^{d1}$, $S(O)R^{b1}$, $S(O)NR^{c1}R^{d1}$, $S(O)_2R^{b1}$, and $S(O)_2NR^{c1}R^{a1}$;

each $R^{b1}$ is independently selected from H, $C_{1-12}$ alkyl, $C_{1-4}$ haloalkyl, $C_{2-6}$ alkenyl, $C_{2-6}$ alkynyl, and $C_{3-10}$ cycloalkyl, wherein said $C_{1-6}$ alkyl, $C_{2-6}$ alkenyl, $C_{2-6}$ alkynyl, and $C_{3-10}$ cycloalkyl are each optionally substituted with 1, 2, or 3 substituents independently selected from $R^g$;

each $R^{a1}$, $R^{c1}$, and $R^{d1}$ is independently selected from H, $C_{1-6}$ alkyl, $C_{1-4}$ haloalkyl, $C_{2-6}$ alkenyl, $C_{2-6}$ alkynyl, $C_{3-10}$ cycloalkyl, $C(O)R^{b2}$, $C(O)NR^{c2}R^{d2}$, $C(O)OR^{a2}$, $NR^{c2}R^{d2}$, $S(O)R^{b2}$, $S(O)NR^{c2}R^{d2}$, $S(O)_2R^{b2}$, and $S(O)_2NR^{c2}R^{d2}$; wherein aid $C_{1-6}$ alkyl, $C_{2-6}$ alkenyl, $C_{2-6}$ alkynyl, and $C_{3-10}$ cycloalkyl are each optionally substituted with 1, 2, or 3 substituents independently selected from $R^g$;

each $R^{a2}$, $R^{b2}$, $R^{c2}$, and $R^{d2}$ is in dependently selected from H, $C_{1-6}$ alkyl, $C_{1-4}$ haloalkyl, $C_{2-6}$ alkenyl, $C_{2-6}$ alkynyl, and $C_{3-10}$ cycloalkyl; wherein said $C_{1-6}$ alkyl, $C_{2-6}$ alkenyl, $C_{2-6}$ alkynyl, and $C_{3-10}$ cycloalkyl are each optionally substituted with 1, 2, or 3 substituents independently selected from $R^g$;

or any $R^{c1}$ and $R^{d1}$ together with the N atom to which they are attached form a 4-, 5-, 6-, or 7-membered heterocycloalkyl group optionally substituted with 1, 2, or 3 substituents independently selected from $R^g$;

or any $R^{c2}$ and $R^{d2}$ together with the N atom to which they are attached form a 4-, 5-, 6-, or 7-membered heterocycloalkyl group optionally substituted with 1, 2, or 3 substituents independently selected from $R^g$; and each $R^g$ is independently selected from OH, $NO_2$, CN, halo, $C_{1-6}$ alkyl, $C_{2-6}$ alkenyl, $C_{2-6}$ alkynyl, $C_{1-4}$ haloalkyl, $C_{1-6}$ alkoxy, $C_{1-6}$ haloalkoxy, cyano-$C_{1-3}$ alkylene, HO—$C_{1-3}$ alkylene, amino, $C_{1-6}$ alkylamino, di($C_{1-6}$ alkyl)amino, thio, $C_{1-6}$ alkylthio, $C_{1-6}$ alkylsulfinyl, $C_{1-6}$ alkylsulfonyl, carbamyl, $C_{1-6}$ alkylcarbamyl, di($C_{1-6}$ alkyl)carbamyl, carboxy, $C_{1-6}$ alkylcarbonyl, $C_{1-6}$ alkoxycarbonyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino.

In some embodiments, the compound is a compound of Formula (IIIa):

(IIIa)

or a pharmaceutically acceptable salt thereof.

In some embodiments, the compound of Formula (IIIa) has formula:

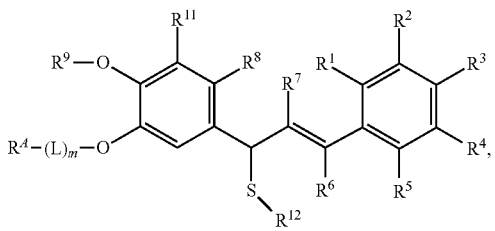

or a pharmaceutically acceptable salt thereof.

In some embodiments:
- $R^1$, $R^2$, $R^3$, $R^4$, $R^5$, $R^8$, and $R^{11}$ are each independently selected from H, halo, CN, $NO_2$, OH, $NH_2$, $C_{1-6}$ alkyl, $C_{1-6}$ haloalkyl, $C_{1-6}$ alkoxy, $C_{1-6}$ haloalkoxy, $C_{1-6}$ alkylamino, and di($C_{1-6}$ alkyl)amino;
- $R^6$ and $R^7$ are each selected from H, $C_{1-6}$ alkyl, and $C_{1-6}$ haloalkyl;
- $R^9$ is selected from H and $C(O)R^{b1}$;
- each $R^{b1}$ is independently $C_{1-12}$ alkyl;
- $R^{12}$ is selected from $C_{1-6}$ alkyl and a peptide, wherein said $C_{1-6}$ alkyl is optionally substituted with 1, 2, or 3 substituents independently selected from $OR^{a1}$, $SR^{a1}$, $C(O)OR^{a1}$, and $NR^{c1}R^{d1}$;
- each $R^{a1}$, $R^{c1}$, and $R^{d1}$ is independently selected from H, $C_{1-6}$ alkyl, $C_{1-4}$ haloalkyl, and $C(O)R^{b2}$;
- each $R^{b2}$ is independently selected from $C_{1-6}$ alkyl and $C_{1-4}$ haloalkyl;
- m is an integer from 2 to 10;
- each L is independently selected from $N(R^N)$, O, $C(=O)$, $C_{1-6}$ alkylene, $C_{3-7}$ cycloalkylene, 4-10-membered heterocycloalkylene, 5-10-membered heteroarylene, $C_{6-10}$ arylene, —$(OCH_2CH_2)_x$—, and —$(CH_2CH_2O)_x$—;
- each x is independently an integer from 1 to 10; and
- each $R^N$ is independently selected from H and $C_{1-6}$ alkyl.

In some embodiments, the compound of Formula (IIIa) has formula:

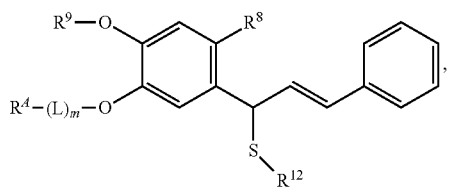

or a pharmaceutically acceptable salt thereof, wherein $R^8$ is selected from H and $C_{1-6}$ alkoxy.

In some embodiments, the compound has Formula (IIIb):

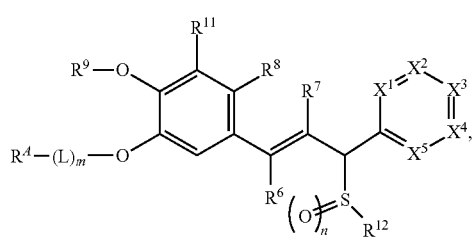

or a pharmaceutically acceptable salt thereof.

In some embodiments, the compound of Formula (IIIb) has formula:

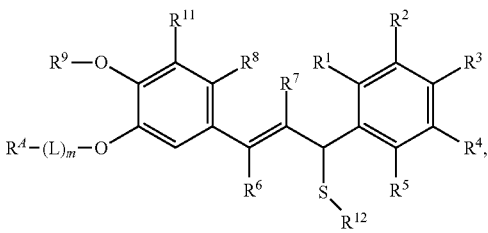

or a pharmaceutically acceptable salt thereof.

In some embodiments:
- $R^1$, $R^2$, $R^3$, $R^4$, $R^5$, $R^8$, and $R^{11}$ are each independently selected from H, halo, CN, $NO_2$, OH, $NH_2$, $C_{1-6}$ alkyl, $C_{1-6}$ haloalkyl, $C_{1-6}$ alkoxy, $C_{1-6}$ haloalkoxy, $C_{1-6}$ alkylamino, and di($C_{1-6}$ alkyl)amino;
- $R^6$ and $R^7$ are each selected from H, $C_{1-6}$ alkyl, and $C_{1-6}$ haloalkyl;
- $R^9$ is selected from H and $C(O)R^{b1}$;
- each $R^{b1}$ is independently $C_{1-12}$ alkyl;
- $R^{12}$ is selected from $C_{1-6}$ alkyl and a peptide, wherein said $C_{1-6}$ alkyl is optionally substituted with 1, 2, or 3 substituents independently selected from $OR^{a1}$, $SR^{a1}$, $C(O)OR^{a1}$, and $NR^{c1}R^{d1}$;
- each $R^{a1}$, $R^{c1}$, and $R^{d1}$ is independently selected from H, $C_{1-6}$ alkyl, $C_{1-4}$ haloalkyl, and $C(O)R^{b2}$;
- each $R^{b2}$ is independently selected from $C_{1-6}$ alkyl and $C_{1-4}$ haloalkyl;
- m is an integer from 2 to 10;
- each L is independently selected from $N(R^N)$, O, $C(=O)$, $C_{1-6}$ alkylene, $C_{3-7}$ cycloalkylene, 4-10-membered heterocycloalkylene, 5-10-membered heteroarylene, $C_{6-10}$ arylene, —$(OCH_2CH_2)_x$—, and —$(CH_2CH_2O)_x$—;
- each x is independently an integer from 1 to 10; and
- each $R^N$ is independently selected from H and $C_{1-6}$ alkyl.

In some embodiments, the compound of Formula (IIIb) has formula:

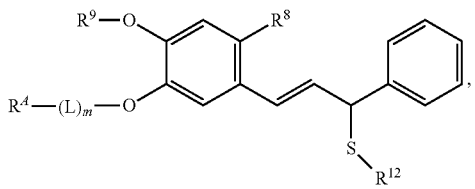

or a pharmaceutically acceptable salt thereof, wherein:
$R^8$ is selected from H and $C_{1-6}$ alkoxy.

In some embodiments, the present disclosure provides a pharmaceutical composition comprising a compound of Formula (IIIa) or (IIIb), or a pharmaceutically acceptable salt thereof, wherein $R^A$ is a targeting ligand capable of selectively binding to a protein, and a pharmaceutically acceptable carrier.

In some embodiments, the present disclosure provides a method of reducing level of a protein in a cell, the method comprising contacting the cell with an effective amount of a compound of Formula (IIIa) or (IIIb), or a pharmaceutically acceptable salt thereof, wherein $R^A$ is a targeting ligand capable of selectively binding to the protein.

In some embodiments, contacting the cell is carried out in vitro, in vivo, or ex vivo.

In some embodiments, the present disclosure provides a method of treating cancer, the method comprising administering to a patient in need thereof a therapeutically effective amount of a compound of Formula (IIIa) or (IIIb), or a pharmaceutically acceptable salt thereof, wherein $R^A$ is a targeting ligand capable of binding a protein that is implicated in cancer.

In some embodiments, the present disclosure provides a method of treating a neurological disease or condition, the method comprising administering to a patient in need thereof a therapeutically effective amount of a compound of Formula (IIIa) or (IIIb), or a pharmaceutically acceptable salt thereof, wherein $R^A$ is a targeting ligand capable of binding a protein that is implicated in the neurological disease or condition.

Unless otherwise defined, all technical and scientific terms used herein have the same meaning as commonly understood by one of ordinary skill in the art to which the present application belongs. Methods and materials are described herein for use in the present application; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control. Other features and advantages of the present application will be apparent from the following detailed description and figures, and from the claims.

DESCRIPTION OF DRAWINGS

FIG. 6E contains an amino acid sequence of the bovine catalase indicating in red the cysteine residue modified by OBT.

FIG. 24 shows that CT2A cells were treated with OBT and 24 hrs later cell lysates were analyzed by cytokine array.

FIGS. 25A-E OBT induces glioma cytotoxic T cells. Mice-bearing CT2A mouse gliomas were injected with OBT or PBS daily for 4 days. At day 5, tumors were dissociated and immunophenotyped. (A) % microglia, dendritic cells and macrophages at the tumor site and their relative CD47 and PD-L1 levels. (B) % CD4+ and CD8+ T cells and their relative levels of PD-1, granzyme B, and Ki-67. (C) Relative levels of Treg. (D) ratio of CD8+ T cells over Tregs. (E) CD4+ and CD8+ T cells were dissociated from tumors, stimulated and cultured for 3 days followed by analysis for relative cell number, Ki-67 and granzyme B levels. Box denotes panel with statistical significance and P value is presented on each panel. In all panels, left bar=control, right bar=OBT treatment

DETAILED DESCRIPTION

Figure 1:
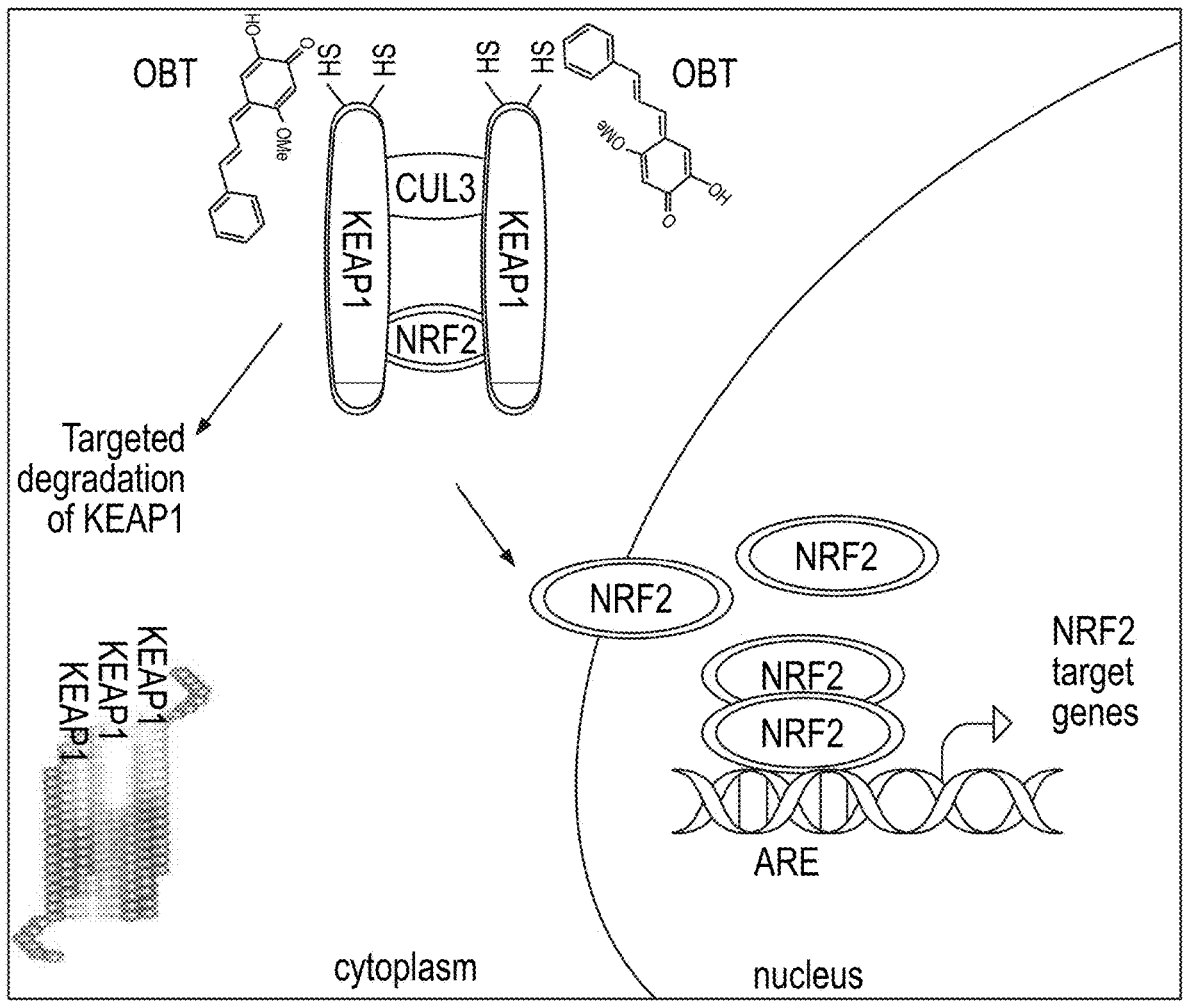
FIG. 1 contains a schematic representation of a mode of action of OBT-mediated degradation of Keap1, resulting in subsequent nuclear translocation of Nrf2 to bind ARE and activate transcription of downstream targets.

The transcription factor Nrf2 (Nuclear factor erythroid 2 (NFE2)-related factor 2) plays a key role in maintaining cellular homeostasis in response to oxidative stress by regulating the expression of antioxidant response element (ARE) dependent genes (Ref. 1) Keap1 (Kelch-like ECH-associated protein 1) is recognized as a predominant negative regulator of Nrf2, and functions as a substrate adaptor protein for the ubiquitin ligase CRL3 (cullin 3 (CUL3)-RING ubiquitin ligase). As shown in FIG. 1, during homeostasis, Keap1 recruits Nrf2 to CUL3 thereby promoting its ubiquitination and subsequent proteasomal degradation. Nrf2 has been recognized to exert either pro-tumorigenic or anti-tumorigenic properties (Ref 2) This apparent contradiction can be rationalized by differences in the cell state and the functional dependence on Nrf2 activation. Oncogenic activity is generally associated with constitutive activation of Nrf2 caused either by overexpression or somatic mutations of Nrf2 and/or other regulatory proteins (Ref. 3). Tumor suppressor activity, in contrast, is linked to transient activation of Nrf2, e.g., by small molecules (Refs. 3-4). In this context, the Nrf2-Keap1 module has been validated and successfully pursued as a target for small molecules that disrupt Nrf2 binding and/or induce the dissociation of Keap1 from CUL3 (Refs. 5-6) These efforts have identified several inhibitor classes, including cysteine-reactive natural products and synthetic compounds, that bind Keap1 and activate the Nrf2 pathway (Ref 7)

A quinone methide compound obtusaquinone ("OBT") is a potent antineoplastic agent with selectivity over normal cells for glioblastoma (GBM), and several other cancer types (Ref 8). OBT treatment of cells increases the production of reactive oxygen species (ROS) and induces DNA damage, leading to apoptotic cell death. As shown in FIG. 1, OBT is a thiol-reactive compound that reacts reversibly with cysteine residues, and particularly binds to Keap1, leading to CRL3-mediated autoubiquitination and proteasomal degradation of Keap1, thereby activating the Nrf2 pathway.

Accordingly, this application provides compounds capable of binding Keap1 and activating Nrf2 within cells. Compounds useful in proteolysis targeting chimeras ("PROTACs") are also provided. In these PROTACs, the compounds serve as recruiting ligands for a ubiquitin ligase (e.g., E3 ubiquitin ligase). Certain embodiments of such compounds, as well as the pharmaceutical compositions and methods of use of these compounds, are also provided.

Compounds of Formula (I)

In some embodiments, the present disclosure provides a compound of Formula (Ia):

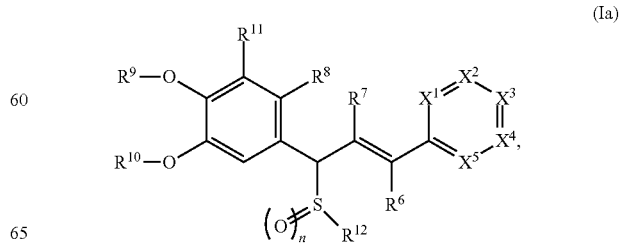

(Ia)

or a pharmaceutically acceptable salt thereof, wherein $X^1$, $X^2$, $X^3$, $X^4$, $X^5$, $R^6$, $R^7$, $R^8$, $R^9$, $R^{10}$, $R^{11}$, $R^{12}$, and n are as described herein.

In some embodiments, the present disclosure provides a compound of Formula (Ib):

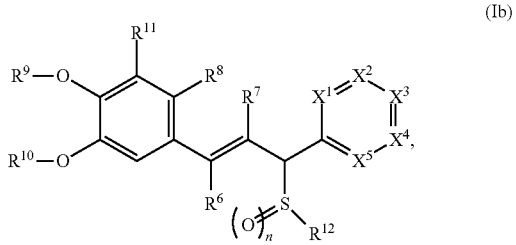

(Ib)

or a pharmaceutically acceptable salt thereof, wherein $X^1$, $X^2$, $X^3$, $X^4$, $X^5$, $R^6$, $R^7$, $R^8$, $R^9$, $R^{10}$; $R^{11}$, $R^{12}$, and n are as described herein.

In some embodiments of Formula (Ia) or Formula (Ib):

n is selected from 0, 1, and 2;

$X^1$ is selected from N and $CR^1$;

$X^2$ is selected from N and $CR^2$;

$X^3$ is selected from N and $CR^3$;

$X^4$ is selected from N and $CR^4$;

$X^5$ is selected from N and $CR^5$;

provided that no more than three of $X^1$, $X^2$, $X^3$, $X^4$, and $X^5$ are N;

$R^1$, $R^2$, $R^3$, $R^4$, $R^5$ and $R^{11}$ are each independently selected from H, halo, CN, $NO_2$, $C_{1-6}$ alkyl, $C_{1-6}$ haloalkyl, $C_{2-6}$ alkenyl, $C_{2-6}$ alkynyl, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$, $S(O)R^{b1}$, $S(O)NR^{c1}R^{d1}$, $S(O)_2R^{b1}$, and $S(O)_2NR^{c1}R^{d1}$; wherein said $C_{1-6}$ alkyl, $C_{2-6}$ alkenyl, and $C_{2-6}$ alkynyl are each optionally substituted with 1, 2, 3, 4, or 5 substituents independently selected from halo, CN, $NO_2$, $OR^{a1}$, $SR^{a1}$, $C(O)R^{b1}$ $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$, $S(O)R^{b1}$, $S(O)NR^{c1}R^{d1}$, $S(O)_2R^{b1}$ and $S(O)_2NR^{c1}R^{d1}$;

$R^6$ and $R^7$ are each independently selected from H, $C_{1-6}$ alkyl, $C_{1-6}$ haloalkyl, $C_{2-6}$ alkenyl, and $C_{2-6}$ alkynyl, wherein said $C_{1-6}$ alkyl, $C_{2-6}$ alkenyl, and $C_{2-6}$ alkynyl are each optionally substituted with 1, 2, or 3 substituents independently selected from halo, CN, $NO_2$, $OR^{a1}$, $SR^{a1}$, $CO(O)R^{b1}$; $C(O)NR^{c1}R^{d1}$; $C(O)OR^{a1}$, $OC(O)R^{b1}$, $OC(O)NR^{c1}R^{d1}$, $NR^{c1}R^{d1}$ $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$ $S(O)R^{b1}$, $S(O)NR^{c1}R^{d1}$, $S(O)_2R^{b1}$ and $S(O)_2NR^{c1}R^{d1}$;

$R^8$ is selected from halo, CN, $NO_2$, $C_{1-6}$ alkyl, $C_{1-6}$ haloalkyl, $C_{2-6}$ alkenyl, $C_{2-6}$ alkynyl, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)R^{b1}$, $S(O)_2R^{b1}$, $NR^{c1}S(O)_2NR^{c1}R^{d1}$, $S(O)R^{b1}$, $S(O)NR^{c1}R^{d1}$, $S(O)_2R^{b1}$ and $S(O)_2NR^{c1}R^{d1}$; wherein said $C_{1-6}$ alkyl, $C_{2-6}$ alkenyl, and $C_{2-6}$ alkynyl are each optionally substituted with 1, 2, 3, 4, or 5 substituents independently selected from halo, CN, $NO_2$, $OR^{a1}$ $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$, $S(O)R^{b1}$, $S(O)NR^{c1}R^{d1}$, $S(O)_2R^{b1}$, and $S(O)_2NR^{c1}R^{d1}$;

$R^9$ and $R^{10}$ are each independently selected from H, $C(O)R^{b1}$, $C(O)NR^{c1}R^{d1}$, $C(O)OR^{a1}$, $S(O)R^{b1}$ $S(O)NR^{c1}R^{d1}$, $S(O)_2R^{b1}$, and $S(O)_2NR^{c1}R^{d1}$;

$R^{12}$ is selected from $C_{1-6}$ alkyl, $C_{2-6}$ alkenyl, $C_{2-6}$ alkynyl, $C_{3-10}$ cycloalkyl, and a peptide, wherein said $C_{1-6}$ alkyl, $C_{2-6}$ alkenyl, $C_{2-6}$ alkynyl, and $C_{3-10}$ cycloalkyl are each optionally substituted with 1, 2, 3, 4, or 5 substituents independently selected from halo, CN, $NO_2$, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $N^{c1}S(O)_2NR^{c1}R^{d1}$, $S(O)R^{b1}$, $S(O)NR^{c1}R^{d1}$, $S(O)_2R^{b1}$ and $S(O)_2NR^{c1}R^{d1}$;

each $R^{b1}$ is independently selected from H, $C_{1-12}$ alkyl, $C_{1-4}$ haloalkyl, $C_{2-6}$ alkenyl, $C_{2-6}$ alkynyl, and $C_{3-10}$ cycloalkyl, wherein said $C_{1-6}$ alkyl, $C_{2-6}$ alkenyl, $C_{2-6}$ alkynyl, and $C_{3-10}$ cycloalkyl are each optionally substituted with 1, 2, or 3 substituents independently selected from $R^g$;

each $R^{a1}$, $R^{c1}$ and $R^{d1}$ is independently selected from H, $C_{1-6}$ alkyl, $C_{1-4}$ haloalkyl, $C_{2-6}$ alkenyl, $C_{2-6}$ alkynyl, $C_{3-10}$ cycloalkyl, $C(O)R^{b2}$, $C(O)NR^{c2}R^{d2}$, $C(O)OR^{a2}$, $NR^{c2}R^{d2}$, $S(O)R^{b2}$, $S(O)NR^{c2}R^{d2}$, $S(O)_2R^{b2}$, and $S(O)_2NR^{c2}R^{d2}$; wherein aid $C_{1-6}$ alkyl, $C_{2-6}$ alkenyl, $C_{2-6}$ alkynyl, and $C_{3-10}$ cycloalkyl are each optionally substituted with 1, 2, or 3 substituents independently selected from $R^g$;

each $R^{a2}$, $R^{b2}$, $R^{c2}$, and $R^{d2}$ is in dependently selected from H, $C_{1-6}$ alkyl, $C_{1-4}$ haloalkyl, $C_{2-6}$ alkenyl, $C_{2-6}$ alkynyl, and $C_{3-10}$ cycloalkyl; wherein said $C_{1-6}$ alkyl, $C_{2-6}$ alkenyl, $C_{2-6}$ alkynyl, and $C_{3-10}$ cycloalkyl are each optionally substituted with 1, 2, or 3 substituents independently selected from $R^g$;

or any $R^{c1}$ and $R^{d1}$ together with the N atom to which they are attached form a 4-, 5-, 6-, or 7-membered heterocycloalkyl group optionally substituted with 1, 2, or 3 substituents independently selected from $R^g$;

or any $R^{c2}$ and $R^{d2}$ together with the N atom to which they are attached form a 4-, 5-, 6-, or 7-membered heterocycloalkyl group optionally substituted with 1, 2, or 3 substituents independently selected from $R^g$; and each $R^g$ is independently selected from OH, $NO_2$, CN, halo, $C_{1-6}$ alkyl, $C_{2-6}$ alkenyl, $C_{2-6}$ alkynyl, $C_{1-4}$ haloalkyl, $C_{1-6}$ alkoxy, $C_{1-6}$ haloalkoxy, cyano-$C_{1-3}$ alkylene, HO—$C_{1-3}$ alkylene, amino, $C_{1-6}$ alkylamino, di($C_{1-6}$ alkyl)amino, thio, $C_{1-6}$ alkylthio, $C_{1-6}$ alkylsulfinyl, $C_{1-6}$ alkylsulfonyl, carbamyl, $C_{1-6}$ alkylcarbamyl, di($C_{1-6}$ alkyl)carbamyl, carboxy, $C_{1-6}$ alkylcarbonyl, $C_{1-6}$ alkoxycarbonyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino.

In some embodiments, n is 0. In some embodiments, n is 1. In some embodiments, n is 2.

In some embodiments, $X^1$ is N. In some embodiments, $X^1$ is $CR^1$. In some embodiments, $X^1$ is N. In some embodiments, $X^1$ is $CR^1$.

In some embodiments, $X^2$ is N. In some embodiments, $X^2$ is $CR^2$. In some embodiments, $X^2$ is N. In some embodiments, $X^2$ is $CR^2$.

In some embodiments, $X^3$ is N. In some embodiments, $X^3$ is $CR^3$. In some embodiments, $X^3$ is N. In some embodiments, $X^3$ is $CR^3$.

In some embodiments, $X^4$ is N. In some embodiments, $X^4$ is $CR^4$. In some embodiments, $X^4$ is N. In some embodiments, $X^4$ is $CR^4$.

In some embodiments, $X^5$ is N. In some embodiments, $X^5$ is $CR^5$. In some embodiments, $X^5$ is N. In some embodiments, $X^5$ is $CR^5$.

In some embodiments, no more than one of $X^1$, $X^2$, $X^3$, $X^4$, and $X^5$ is N. In some embodiments, no more than two of $X^1$, $X^2$, $X^3$, $X^4$, and $X^5$ are N. In some embodiments, no more than three of $X^1$, $X^2$, $X^3$, $X^4$, and $X^5$ are N.

In some embodiments, the compound of Formula (Ia) has formula:

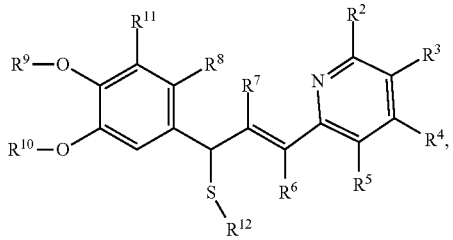

or a pharmaceutically acceptable salt thereof.

In some embodiments, the compound of Formula (Ia) has formula:

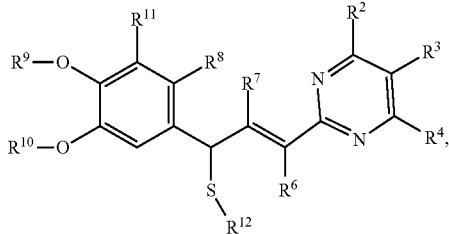

or a pharmaceutically acceptable salt thereof.

In some embodiments, the compound of Formula (Ia) has formula:

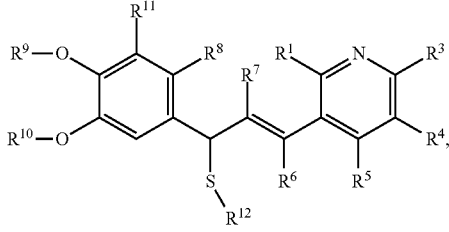

or a pharmaceutically acceptable salt thereof.

In some embodiments, the compound of Formula (Ia) has formula:

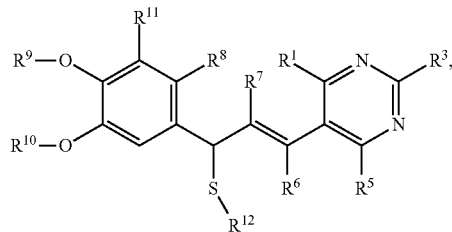

or a pharmaceutically acceptable salt thereof.

In some embodiments, the compound of Formula (Ia) has formula:

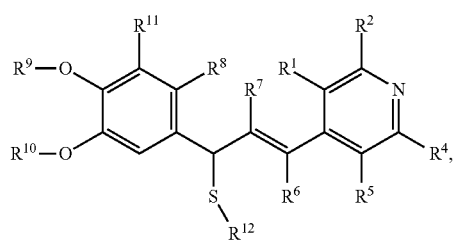

or a pharmaceutically acceptable salt thereof.

In some embodiments, the compound of Formula (Ia) has formula:

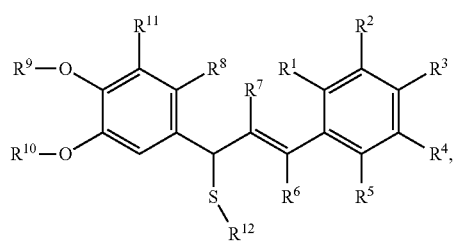

or a pharmaceutically acceptable salt thereof.

In some embodiments, the compound of Formula (Ia) has formula:

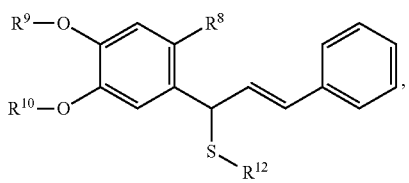

or a pharmaceutically acceptable salt thereof. In some aspects of these embodiments, $R^8$ is H. In other aspects of these embodiments, $R^8$ is selected from halo, $C_{1-6}$ alkyl, $C_{1-6}$ haloalkyl, $C_{1-6}$ alkoxy, and $C_{1-6}$ haloalkoxy. In some embodiments, $R^8$ is $C_{1-6}$ alkoxy.

In some embodiments, the compound of Formula (Ib) has formula:

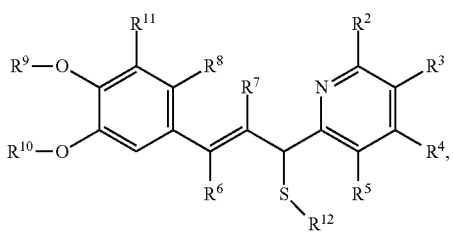

or a pharmaceutically acceptable salt thereof.

In some embodiments, the compound of Formula (Ib) has formula:

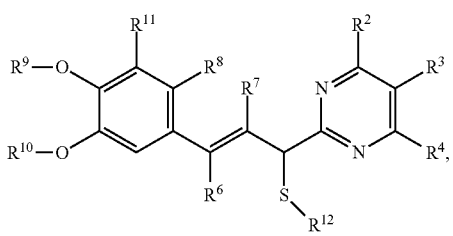

or a pharmaceutically acceptable salt thereof.

In some embodiments, the compound of Formula (Ib) has formula:

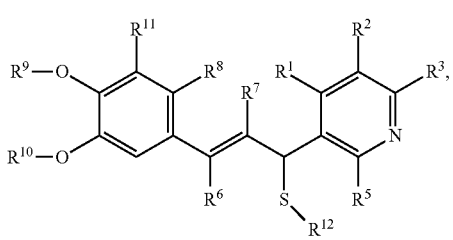

or a pharmaceutically acceptable salt thereof.

In some embodiments, the compound of Formula (Ib) has formula:

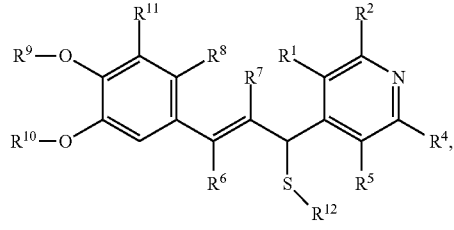

or a pharmaceutically acceptable salt thereof.

In some embodiments, the compound of Formula (Ib) has formula:

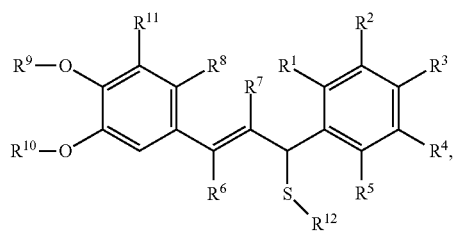

or a pharmaceutically acceptable salt thereof.

In some embodiments, the compound of Formula (Ib) has formula:

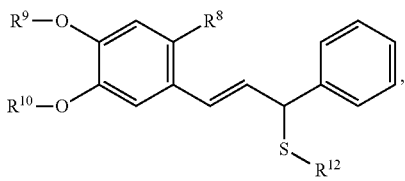

or a pharmaceutically acceptable salt thereof. In some aspects of these embodiments, $R^8$ is H. In other aspects of these embodiments, $R^8$ is selected from halo, $C_{1-6}$ alkyl, $C_{1-6}$ haloalkyl, $C_{1-6}$ alkoxy, and $C_{1-6}$ haloalkoxy. In some embodiments, $R^8$ is $C_{1-6}$ alkoxy.

In some embodiments, $R^1$, $R^2$, $R^3$, $R^4$, $R^5$ and $R^{11}$ (when present) are each independently selected from H, halo, CN, $NO_2$, $C_{1-6}$ alkyl, $C_{1-6}$ haloalkyl, $OR^{a1}$, $C(O)R^{b1}$, $C(O)NR^{c1}R^{d1}$, $C(O)OR^{a1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)_2R^{b1}$, $NR^{c1}S(O)_2NR^{c1}R^{d1}$, $S(O)_2R^{b1}$, and $S(O)_2NR^{c1}R^{d1}$; wherein said $C_{1-6}$ alkyl is optionally substituted with 1, 2, or 3 substituents independently selected from halo, CN, $NO_2$, $OR^{a1}$, $C(O)R^{b1}$, $C(O)NR^{c1}R^{d1}$, $C(O)OR^{a1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)_2R^{b1}$, $NR^{c1}S(O)_2NR^{c1}R^{d1}$, $S(O)_2R^{b1}$ and $S(O)_2NR^{c1}R^{d1}$.

In some embodiments, $R^1$, $R^2$, $R^3$, $R^4$, $R^5$ and $R^{11}$ (when present) are each independently selected from H, halo, CN, $NO_2$, $NH_2$, OH, $C_{1-6}$ alkyl, $C_{1-6}$ haloalkyl, $C_{1-6}$ alkoxy, $C_{1-6}$ haloalkoxy, $C_{1-6}$ alkylamino, and di($C_{1-6}$ alkyl)amino; wherein said $C_{1-6}$ alkyl is optionally substituted with 1, 2, or 3 substituents independently selected from halo, CN, $NO_2$, OH, $C_{1-6}$ alkoxy, $C_{1-6}$ haloalkoxy, $C_{1-6}$ alkylamino, and di($C_{1-6}$ alkyl)amino.

In some embodiments, $R^1$, $R^2$, $R^3$, $R^4$, $R^5$ and $R^{11}$ are each independently selected from H, halo, CN, $NO_2$, OH, $NH_2$, $C_{1-6}$ alkyl, $C_{1-6}$ haloalkyl, $C_{1-6}$ alkoxy, $C_{1-6}$ haloalkoxy, $C_{1-6}$ alkylamino, and di($C_{1-6}$ alkyl)amino.

In some embodiments, at least one of $R^1$, $R^2$, $R^3$, $R^4$, $R^5$ is an electron-donating group (e.g., $C_{1-6}$ alkyl, $C_{1-6}$ alkoxy, $C_{1-6}$ alkylamino, or di($C_{1-6}$ alkyl)amino). In some embodiment, at least one of $R^1$, $R^2$, $R^3$, $R^4$, $R^5$ is an electron-withdrawing group (e.g., halo, CN, $NO_2$, or $C_{1-6}$ haloalkyl).

In some embodiments, $R^6$ and $R^7$ are each independently selected from H, $C_{1-6}$ alkyl, and $C_{1-6}$ haloalkyl, wherein said $C_{1-6}$ alkyl is optionally substituted with 1, 2, or 3 substituents independently selected from halo, CN, $NO_2$, $OR^{a1}$, and $NR^{c1}R^{d1}$.

In some embodiments, $R^6$ and $R^7$ are each independently selected from H, $C_{1-6}$ alkyl, and $C_{1-6}$ haloalkyl. In some embodiments, $R^6$ is H. In some embodiments, $R^6$ is $C_{1-6}$ alkyl (e.g., methyl, ethyl, propyl, or isopropyl). In some embodiments, $R^7$ is H. In some embodiments, $R^7$ is $C_{1-6}$ alkyl (e.g., methyl, ethyl, propyl, or isopropyl).

In some embodiments, $R^8$ is selected from halo, $C_{1-6}$ alkyl, $C_{1-6}$ haloalkyl, $C_{1-6}$ alkoxy, and $C_{1-6}$ haloalkoxy. In some embodiments, $R^8$ is selected from $C_{1-6}$ alkyl and $C_{1-6}$ haloalkyl, wherein said $C_{1-6}$ alkyl is optionally substituted with 1, 2, or 3 substituents independently selected from CN, $NO_2$, OH, $C_{1-6}$ alkoxy, $C_{1-6}$ haloalkoxy, $C_{1-6}$ alkylamino, and di($C_{1-6}$ alkyl)amino. In some embodiments, $R^8$ is $C_{1-6}$ alkoxy or $C_{1-6}$ haloalkoxy. In some embodiments, $R^8$ is $C_{1-6}$ alkoxy.

In some embodiments, $R^9$ is H. In some embodiments, $R^9$ is selected from $C(O)R^{b1}$, $C(O)NR^{c1}R^{d1}$, $C(O)OR^{a1}$, $S(O)R^{b1}$, $S(O)NR^{c1}R^{d1}$, $S(O)_2R^{b1}$ and $S(O)_2NR^{c1}R^{d1}$. In some embodiments, $R^9$ is $C(O)R^{b1}$.

In some embodiments, $R^{10}$ is H. In some embodiments, $R^{10}$ is selected from $C(O)R^{b1}$, $C(O)NR^{c1}R^{d1}$, $C(O)OR^{a1}$, $S(O)R^{b1}$, $S(O)NR^{c1}R^{d1}$, $S(O)_2R^{b1}$, and $S(O)_2NR^{c1}R^{d1}$. In some embodiments, $R^{10}$ is $C(O)R^{b1}$.

In some embodiments, $R^9$ and $R^{10}$ are both H. In some embodiments, $R^9$ is H, and $R^{10}$ is other than H. In some embodiments, at least one of $R^9$ and $R^{10}$ is $C(O)R^{b1}$.

In some embodiments, $R^{12}$ is selected from $C_{1-6}$ alkyl, $C_{3-10}$ cycloalkyl, and a peptide, wherein said $C_{1-6}$ alkyl and $C_{3-10}$ cycloalkyl are each optionally substituted with 1, 2, or 3 substituents independently selected from halo, CN, $NO_2$, $OR^{a1}$, $SR^{a1}$, $C(O)R^{b1}$, $C(O)NR^{c1}R^{d1}$, $C(O)OR^{a1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)_2R^{b1}$, $NR^{c1}S(O)_2NR^{c1}R^{d1}$, $S(O)_2R^{b1}$ and $S(O)_2NR^{c1}R^{d1}$.

In some embodiments, $R^{12}$ is $C_{1-6}$ alkyl, optionally substituted with 1, 2, 3, 4, or 5 substituents independently selected from $OR^{a1}$, $SR^{a1}$, $C(O)OR^{a1}$, and $NR^{c1}R^{d1}$.

In some embodiments, $R^{12}$ is a peptide. Suitable examples of such peptides include dipeptides, tripeptides, and tetrapeptides. A peptide may include a cysteine, and any one of the known natural or unnatural amino acids. Any one of the amino acids within the peptide may be protected by one or more protecting groups. Suitable examples of protecting groups are described, for example, in Greene, et. al., Greene's Protective Groups in Organic Synthesis, Fourth Edition (ISBN:9780471697541). In some embodiments, the peptide is connected to the compound of Formula (Ia) or (Ib) through a sulfur atom of a side chain of a cysteine. In some embodiments, the peptide is a glutathione.

In some embodiments, each $R^{b1}$ is selected from $C_{1-12}$ alkyl, $C_{1-4}$ haloalkyl, $C_2$- and $C_{3-10}$ cycloalkyl, wherein said $C_{1-6}$ alkyl and $C_{3-10}$ cycloalkyl are each optionally substituted with 1, 2, or 3 substituents independently selected from $R^g$.

In some embodiments, each $R^{b1}$ is $C_{1-12}$ alkyl, optionally substituted with 1, 2, or 3 substituents independently selected from $R^g$. In some embodiments, each $R^{b1}$ is $C_{1-12}$ alkyl.

In some embodiments, each $R^{a1}$, $R^{c1}$ and $R^{d1}$ is independently selected from H, $C_{1-6}$ alkyl, $C_{1-4}$ haloalkyl, $C_{3-10}$ cycloalkyl, $C(O)R^{b2}$, $C(O)NR^{c2}R^{d2}$, $C(O)OR^{a2}$, $S(O)_2R^{b2}$, and $S(O)_2NR^{c2}R^{d2}$; wherein aid $C_{1-6}$ alkyl and $C_{3-10}$ cycloalkyl are each optionally substituted with 1, 2, or 3 substituents independently selected from $R^g$.

In some embodiments, each $R^{a1}$, $R^{c1}$, and $R^{d1}$ is independently selected from H, $C_{1-6}$ alkyl, $C_{1-4}$ haloalkyl, and $C(O)R^{b2}$. In some embodiments, each $R^{a1}$, $R^{c1}$ and $R^{d1}$ is independently selected from H, $C_{1-6}$ alkyl, and $C(O)R^{b2}$.

In some embodiments, each $R^{a2}$, $R^{b2}$, $R^{c2}$ and $R^{d2}$ is independently selected from H, $C_{1-6}$ alkyl, and $C_{1-4}$ haloalkyl.

In some embodiments, each $R^g$ is independently selected from OH, $NO_2$, CN, halo, $C_{1-6}$ alkyl, $C_{1-4}$ haloalkyl, $C_{1-6}$ alkoxy, $C_{1-6}$ haloalkoxy, carboxy, amino, $C_{1-6}$ alkylamino, and di($C_{1-6}$ alkyl)amino.

In some embodiments of Formula (Ia) or Formula (Ib):
$R^1$, $R^2$, $R^3$, $R^4$, $R^5$ and $R^{11}$ are each independently selected from H, halo, CN, $NO_2$, OH, $NH_2$, $C_{1-6}$ alkyl, $C_{1-6}$ haloalkyl, $C_{1-6}$ alkoxy, $C_{1-6}$ haloalkoxy, $C_{1-6}$ alkylamino, and di($C_{1-6}$ alkyl)amino;

$R^6$ and $R^7$ are each selected from H, $C_{1-6}$ alkyl, and $C_{1-6}$ haloalkyl;

$R^8$ is selected from halo, $C_{1-6}$ alkyl, $C_{1-6}$ haloalkyl, $C_{1-6}$ alkoxy, and $C_{1-6}$ haloalkoxy;

$R^9$ and $R^{10}$ are each independently selected from H and $C(O)R^{b1}$;

each $R^{b1}$ is independently $C_{1-12}$ alkyl;

$R^{12}$ is selected from $C_{1-6}$ alkyl and a peptide, wherein said $C_{1-6}$ alkyl is optionally substituted with 1, 2, or 3 substituents independently selected from $OR^{a1}$, $SR^{a1}$, $C(O)OR^{a1}$, and $NR^{c1}R^{d1}$;

each $R^{a1}$, $R^{c1}$ and $R^{d1}$ is independently selected from H, $C_{1-6}$ alkyl, $C_{1-4}$ haloalkyl, and $C(O)R^{b2}$;

each $R^{b2}$ is independently selected from $C_{1-6}$ alkyl and $C_{1-4}$ haloalkyl.

In some embodiments of Formula (Ia) or Formula (Ib):
$R^6$ and $R^7$ are each selected from H, $C_{1-6}$ alkyl, and $C_{1-6}$ haloalkyl;

$R^8$ is selected from halo, $C_{1-6}$ alkyl, $C_{1-6}$ haloalkyl, $C_{1-6}$ alkoxy, and $C_{1-6}$ haloalkoxy;

$R^9$ and $R^{10}$ are each independently selected from H and $C(O)R^{b1}$;

each $R^{b1}$ is independently $C_{1-12}$ alkyl;

$R^{12}$ is selected from $C_{1-6}$ alkyl and a peptide, wherein said $C_{1-6}$ alkyl is optionally substituted with 1, 2, or 3 substituents independently selected from $OR^{a1}$, $SR^{a1}$, $C(O)OR^{a1}$, and $NR^{c1}R^{d1}$;

each $R^{a1}$, $R^{c1}$ and $R^{d1}$ is independently selected from H, $C_{1-6}$ alkyl, $C_{1-4}$ haloalkyl, and $C(O)R^{b2}$;

each $R^{b2}$ is independently selected from $C_{1-6}$ alkyl and $C_{1-4}$ haloalkyl.

In some embodiments, the compound of Formula (Ia) or Formula (Ib) is selected from any one of the following compounds:

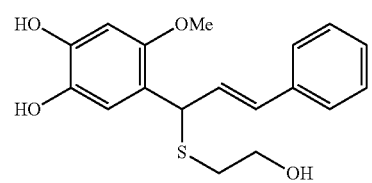

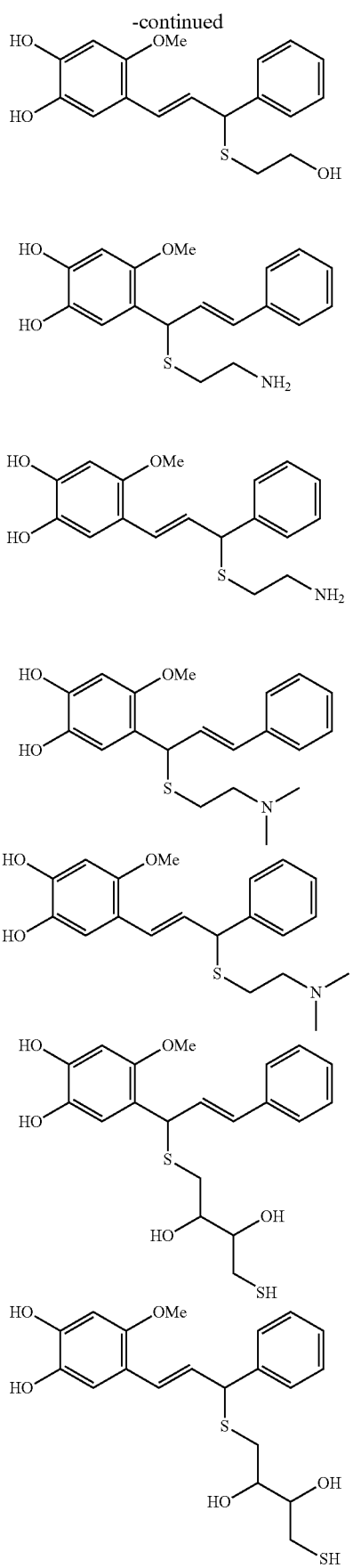
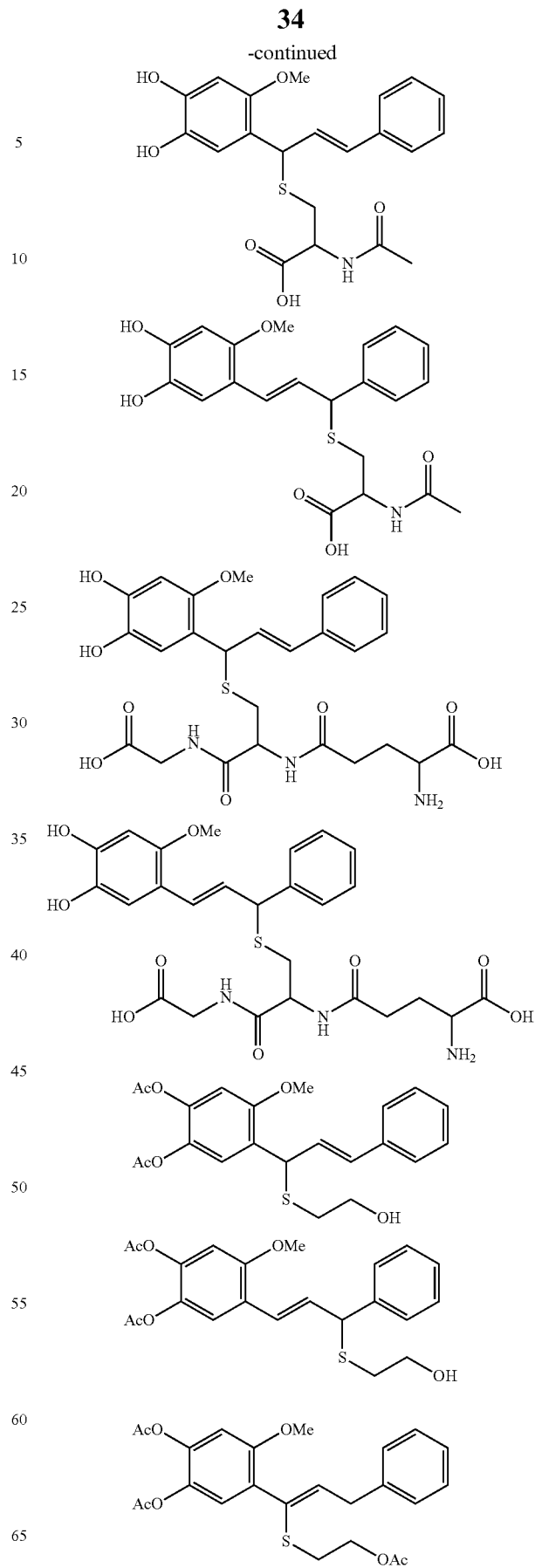

-continued

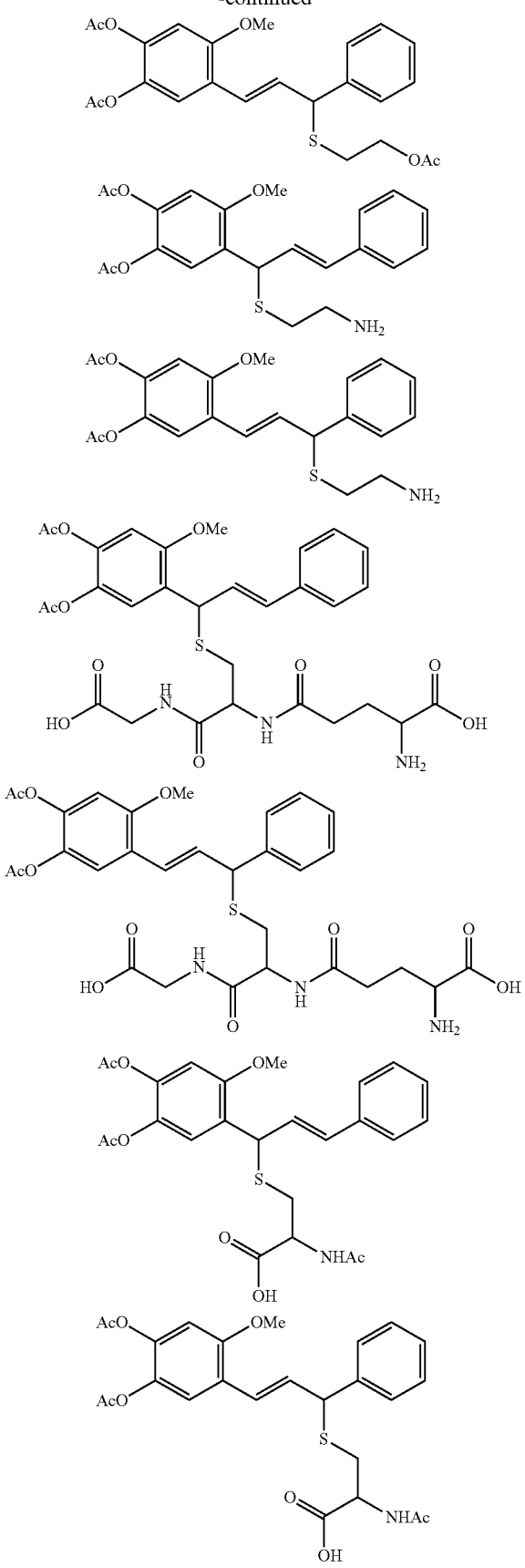

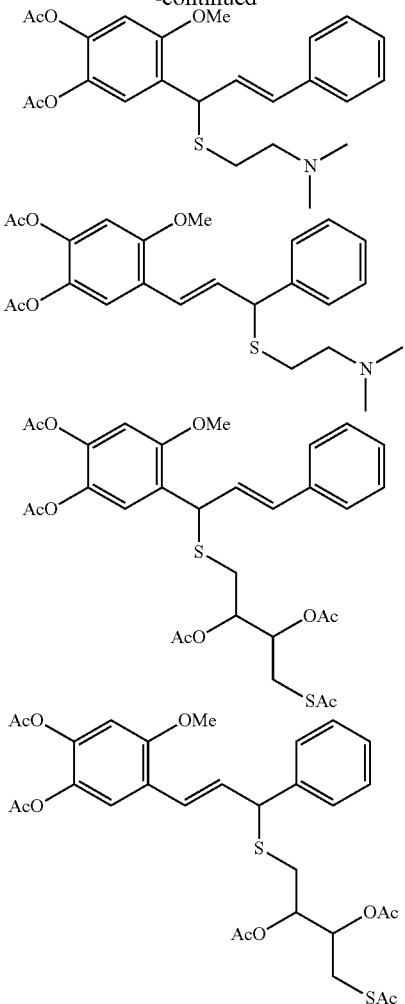

or a pharmaceutically acceptable salt thereof.

Compounds of Formula (II)

In some embodiments, the present disclosure provides a compound of Formula (II),

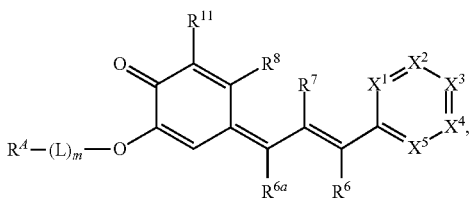

or a pharmaceutically acceptable salt thereof, wherein $X^1$, $X^2$, $X^3$, $X^4$, $X^5$, $R^6$, $R^{6a}$, $R^7$, $R^8$, $R^{11}$, m, L, and $R^4$ are as described herein.

In some embodiments:
$X^1$ is selected from N and $CR^1$;
$X^2$ is selected from N and $CR^2$;
$X^3$ is selected from N and $CR^3$;
$X^4$ is selected from N and $CR^4$;
$X^5$ is selected from N and $CR^5$;
provided that no more than three of $X^1$, $X^2$, $X^3$, $X^4$, and $X^5$ are N;

$R^1$, $R^2$, $R^3$, $R^4$, $R^5$, $R^8$, and $R^{11}$ are each independently selected from H, halo, CN, $NO_2$, $C_{1-6}$ alkyl, $C_{1-6}$ haloalkyl, $C_{2-6}$ alkenyl, $C_{2-6}$ alkynyl, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$, $S(O)R^{b1}$, $S(O)NR^{c1}R^{d1}$, $S(O)_2R^{b1}$, and $S(O)_2NR^{c1}R^{d1}$; wherein said $C_{1-6}$ alkyl, $C_{2-6}$ alkenyl, and $C_{2-6}$ alkynyl are each optionally substituted with 1, 2, 3, 4, or 5 substituents independently selected from halo, CN, $NO_2$, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$, $S(O)R^{b1}$, $S(O)NR^{c1}R^{d1}$, $S(O)_2R^{b1}$ and $S(O)_2NR^{c1}R^{d1}$;

$R^6$, $R^{6a}$, and $R^7$ are each independently selected from H, $C_{1-6}$ alkyl, $C_{2-6}$ alkenyl, and $C_{2-6}$ alkynyl, wherein said $C_{1-6}$ alkyl, $C_{2-6}$ alkenyl, and $C_{2-6}$ alkynyl are each optionally substituted with 1, 2, or 3 substituents independently selected from halo, CN, $NO_2$, $OR^{a1}$ $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$, $S(O)R^{b1}$, $S(O)NR^{c1}R^{d1}$, $S(O)_2R^{b1}$, and $S(O)_2NR^{c1}R^{d1}$;

m is an integer from 2 to 20;

each L is independently selected from $N(R^N)$, O, $C(=O)$, S, $S(=O)$, $S(=O)_2$, $C_{1-6}$ alkylene, $C_{3-7}$ cycloalkylene, 4-10-membered heterocycloalkylene, 5-10-membered heteroarylene, $C_{6-10}$ arylene, $-(OCH_2CH_2)_x-$, $-(CH_2CH_2O)_x-$, $-(OCH(CH_3)CH_2)_x-$, $-(CH_2CH(CH_3)O)_x-$, each of which is optionally substituted with 1 or 2 substituents independently selected from OH, $NH_2$, C(O)OH, $SO_3H$, $C_{1-3}$ alkylamino, di($C_{1-3}$-alkyl)amino, $C_{1-3}$ haloalkyl, $C_{1-3}$ alkoxy, and $C_{1-3}$ haloalkoxy;

each x is independently an integer from 1 to 2,000;

each $R^N$ is independently selected from H, $C_{1-6}$ alkyl, $C_{2-6}$ alkenyl, and $C_{2-6}$ alkynyl;

$R^A$ is independently selected from H and a targeting ligand capable of selectively binding to a protein;

each $R^{b1}$ is independently selected from H, $C_{1-12}$ alkyl, $C_{1-4}$ haloalkyl, $C_{2-6}$ alkenyl, $C_{2-6}$ alkynyl, and $C_{3-10}$ cycloalkyl, wherein said $C_{1-6}$ alkyl, $C_{2-6}$ alkenyl, $C_{2-6}$ alkynyl, and $C_{3-10}$ cycloalkyl are each optionally substituted with 1, 2, or 3 substituents independently selected from $R^g$;

each $R^{a1}$, $R^{c1}$ and $R^{d1}$ is independently selected from H, $C_{1-6}$ alkyl, $C_{1-4}$ haloalkyl, $C_{2-6}$ alkenyl, $C_{2-6}$ alkynyl, $C_{3-10}$ cycloalkyl, $C(O)R^{b2}$, $C(O)NR^{c2}R^{d2}$, $C(O)OR^{a2}$, $NR^{c2}R^{d2}$, $S(O)R^{b2}$, $S(O)NR^{c2}R^{d2}$, $S(O)_2R^{b2}$, and $S(O)_2NR^{c2}R^{d2}$; wherein aid $C_{1-6}$ alkyl, $C_{2-6}$ alkenyl, $C_{2-6}$ alkynyl, and $C_{3-10}$ cycloalkyl are each optionally substituted with 1, 2, or 3 substituents independently selected from $R^g$;

each $R^{a2}$, $R^{b2}$, $R^{c2}$, and $R^{d2}$ is in dependently selected from H, $C_{1-6}$ alkyl, $C_{1-4}$, haloalkyl, $C_{2-6}$ alkenyl, $C_{2-6}$ alkynyl, and $C_{3-10}$ cycloalkyl; wherein said $C_{1-6}$ alkyl, $C_{2-6}$ alkenyl, $C_{2-6}$ alkynyl, and $C_{3-10}$ cycloalkyl are each optionally substituted with 1, 2, or 3 substituents independently selected from $R^g$;

or any $R^{c1}$ and $R^{d1}$ together with the N atom to which they are attached form a 4-, 5-, 6-, or 7-membered heterocycloalkyl group optionally substituted with 1, 2, or 3 substituents independently selected from $R^g$;

or any $R^{c2}$ and $R^{d2}$ together with the N atom to which they are attached form a 4-, 5-, 6-, or 7-membered heterocycloalkyl group optionally substituted with 1, 2, or 3 substituents independently selected from $R^g$; and each $R^g$ is independently selected from OH, $NO_2$, CN, halo, $C_{1-6}$ alkyl, $C_{2-6}$ alkenyl, $C_{2-6}$ alkynyl, $C_{1-4}$ haloalkyl, $C_{1-6}$ alkoxy, $C_{1-6}$ haloalkoxy, cyano-$C_{1-3}$ alkylene, HO—$C_{1-3}$ alkylene, amino, $C_{1-6}$ alkylamino, di($C_{1-6}$ alkyl)amino, thio, $C_{1-6}$ alkylthio, $C_{1-6}$ alkylsulfinyl, $C_{1-6}$ alkylsulfonyl, carbamyl, $C_{1-6}$ alkylcarbamyl, di($C_{1-6}$ alkyl)carbamyl, carboxy, $C_{1-6}$ alkylcarbonyl, $C_{1-6}$ alkoxycarbonyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino.

In some embodiments, $X^1$ is N. In some embodiments, $X^1$ is $CR^1$. In some embodiments, $X^1$ is N. In some embodiments, $X^1$ is $CR^1$.

In some embodiments, $X^2$ is N. In some embodiments, $X^2$ is $CR^2$. In some embodiments, $X^2$ is N. In some embodiments, $X^2$ is $CR^2$.

In some embodiments, $X^3$ is N. In some embodiments, $X^3$ is $CR^3$. In some embodiments, $X^3$ is N. In some embodiments, $X^3$ is $CR^3$.

In some embodiments, $X^4$ is N. In some embodiments, $X^4$ is $CR^4$. In some embodiments, $X^4$ is N. In some embodiments, $X^4$ is $CR^4$.

In some embodiments, $X^5$ is N. In some embodiments, $X^5$ is $CR^5$. In some embodiments, $X^5$ is N. In some embodiments, $X^5$ is $CR^5$.

In some embodiments, no more than one of $X^1$, $X^2$, $X^3$, $X^4$, and $X^5$ is N. In some embodiments, no more than two of $X^1$, $X^2$, $X^3$, $X^4$, and $X^5$ are N. In some embodiments, no more than three of $X^1$, $X^2$, $X^3$, $X^4$, and $X^5$ are N.

In some embodiments, the compound of Formula (II) has formula:

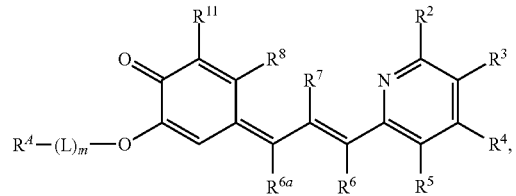

or a pharmaceutically acceptable salt thereof.

In some embodiments, the compound of Formula (II) has formula:

or a pharmaceutically acceptable salt thereof.

In some embodiments, the compound of Formula (II) has formula:

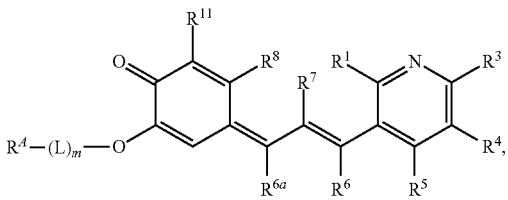

or a pharmaceutically acceptable salt thereof.

In some embodiments, the compound of Formula (II) has formula:

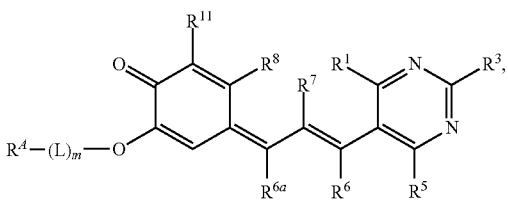

or a pharmaceutically acceptable salt thereof.

In some embodiments, the compound of Formula (II) has formula:

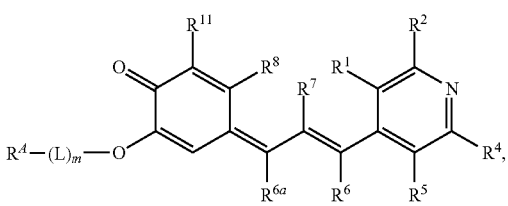

or a pharmaceutically acceptable salt thereof.

In some embodiments, the compound of Formula (II) has formula:

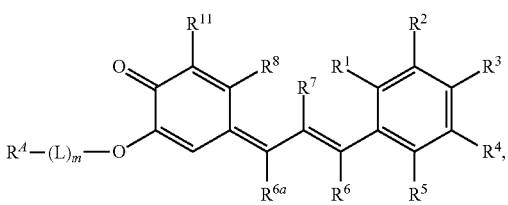

or a pharmaceutically acceptable salt thereof.

In some embodiments, the compound of Formula (II) has formula:

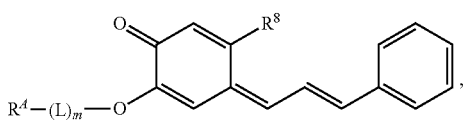

or a pharmaceutically acceptable salt thereof. In some aspects of these embodiments, $R^8$ is H. In other aspects of these embodiments, $R^8$ is selected from halo, $C_{1-6}$ alkyl, $C_{1-6}$ haloalkyl, $C_{1-6}$ alkoxy, and $C_{1-6}$ haloalkoxy. In some embodiments, $R^8$ is $C_{1-6}$ alkoxy.

In some embodiments, $R^1$, $R^2$, $R^3$, $R^4$, $R^5$, $R^8$, and $R^{11}$ (when present) are each independently selected from H, halo, CN, $NO_2$, $C_{1-6}$ alkyl, $C_{1-6}$ haloalkyl, $OR^{a1}$ $C(O)R^{b1}$, $C(O)NR^{c1}R^{d1}$, $C(O)OR^{a1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)_2R^{b1}$, $NR^{c1}S(O)_2NR^{c1}R^{d1}$, $S(O)_2R^{b1}$, and $S(O)_2NR^{c1}R^{d1}$; wherein said $C_{1-6}$ alkyl is optionally substituted with 1, 2, or 3 substituents independently selected from halo, CN, $NO_2$, $OR^{a1}$, $C(O)R^{b1}$, $C(O)NR^{c1}R^{d1}$, $C(O)OR^{a1}$, $NR^{c1}R^{d1}$ $NR^{c1}C(O)R^{b1}$, $NR^{c1}C(O)OR^{a1}$, $NR^{c1}C(O)NR^{c1}R^{d1}$, $NR^{c1}S(O)_2R^{b1}$, $NR^{c1}S(O)_2NR^{c1}K^{d1}$ $S(O)_2R^{b1}$ and $S(O)_2NR^{c1}R^{d1}$.

In some embodiments, $R^1$, $R^2$, $R^3$, $R^4$, $R^5$, $R^8$, and $R^{11}$ (when present) are each independently selected from H, halo, CN, $NO_2$, $NH_2$, OH, $C_{1-6}$ alkyl, $C_{1-6}$ haloalkyl, $C_{1-6}$ alkoxy, $C_{1-6}$ haloalkoxy, $C_{1-6}$ alkylamino, and di($C_{1-6}$ alkyl)amino; wherein said $C_{1-6}$ alkyl is optionally substituted with 1, 2, or 3 substituents independently selected from halo, CN, $NO_2$, OH, $C_{1-6}$ alkoxy, $C_{1-6}$ haloalkoxy, $C_{1-6}$ alkylamino, and di($C_{1-6}$ alkyl)amino.

In some embodiments, $R^2$, $R^3$, $R^4$, $R^5$, $R^8$, and $R^{11}$ are each independently selected from H, halo, CN, $NO_2$, OH, $NH_2$, $C_{1-6}$ alkyl, $C_{1-6}$ haloalkyl, $C_{1-6}$ alkoxy, $C_{1-6}$ haloalkoxy, $C_{1-6}$ alkylamino, and di($C_{1-6}$ alkyl)amino.

In some embodiments, at least one of $R^1$, $R^2$, $R^3$, $R^4$, $R^5$ is an electron-donating group (e.g., $C_{1-6}$ alkyl, $C_{1-6}$ alkoxy, $C_{1-6}$ alkylamino, or di($C_{1-6}$ alkyl)amino). In some embodiment, at least one of $R^1$, $R^2$, $R^3$, $R^4$, $R^5$ is an electron-withdrawing group (e.g., halo, CN, $NO_2$, or $C_{1-6}$ haloalkyl).

In some embodiments, $R^6$, $R^{6a}$, and $R^7$ are each independently selected from H, $C_{1-6}$ alkyl, and $C_{1-6}$ haloalkyl, wherein said $C_{1-6}$ alkyl is optionally substituted with 1, 2, or 3 substituents independently selected from halo, CN, $NO_2$, $OR^{a1}$, and $NR^{c1}R^{d1}$.

In some embodiments, $R^6$, $R^{6a}$, and $R^7$ are each independently selected from H, $C_{1-6}$ alkyl, and $C_{1-6}$ haloalkyl. In some embodiments, $R^6$ is H. In some embodiments, $R^{6a}$ is H. In some embodiments, $R^6$ is $C_{1-6}$ alkyl (e.g., methyl, ethyl, propyl, or isopropyl). In some embodiments, $R^{6a}$ is $C_{1-6}$ alkyl (e.g., methyl, ethyl, propyl, or isopropyl). In some embodiments, $R^7$ is H. In some embodiments, $R^7$ is $C_{1-6}$ alkyl (e.g., methyl, ethyl, propyl, or isopropyl).

In some embodiments, $R^8$ is selected from halo, $C_{1-6}$ alkyl, $C_{1-6}$ haloalkyl, $C_{1-6}$ alkoxy, and $C_{1-6}$ haloalkoxy. In some embodiments, $R^8$ is selected from $C_{1-6}$ alkyl and $C_{1-6}$ haloalkyl, wherein said $C_{1-6}$ alkyl is optionally substituted with 1, 2, or 3 substituents independently selected from CN, $NO_2$, OH, $C_{1-6}$ alkoxy, $C_{1-6}$ haloalkoxy, $C_{1-6}$ alkylamino, and di($C_{1-6}$ alkyl)amino. In some embodiments, $R^8$ is $C_{1-6}$ alkoxy or $C_{1-6}$ haloalkoxy. In some embodiments, $R^8$ is $C_{1-6}$ alkoxy.

In some embodiments, each $R^{b1}$ is selected from $C_{1-12}$ alkyl, $C_{1-4}$ haloalkyl, $C_2$- and $C_{3-10}$ cycloalkyl, wherein said $C_{1-6}$ alkyl and $C_{3-10}$ cycloalkyl are each optionally substituted with 1, 2, or 3 substituents independently selected from $R^g$.

In some embodiments, each $R^{a1}$, $R^{c1}$ and $R^{d1}$ is independently selected from H, $C_{1-6}$ alkyl, $C_{1-4}$ haloalkyl, $C_{3-10}$ cycloalkyl, $C(O)R^{b2}$, $C(O)NR^{c2}R^{d2}$, $C(O)OR^2$, $S(O)_2R^{b2}$, and $S(O)_2NR^{c2}R^{d2}$; wherein aid $C_{1-6}$ alkyl and $C_{3-10}$ cycloalkyl are each optionally substituted with 1, 2, or 3 substituents independently selected from $R^g$.

In some embodiments, each $R^{a2}$, $R^{b2}$, $R^{c2}$, and $R^{d2}$ is independently selected from H, $C_{1-6}$ alkyl, and $C_{1-4}$ haloalkyl.

In some embodiments, each $R^g$ is independently selected from OH, $NO_2$, CN, halo, $C_{1-6}$ alkyl, $C_{1-4}$ haloalkyl, $C_{1-6}$ alkoxy, $C_{1-6}$ haloalkoxy, carboxy, amino, $C_{1-6}$ alkylamino, and di($C_{1-6}$alkyl)amino.

In some embodiments, m is an integer from 2 to 20. In some embodiments, m is an integer from 2 to 10. In some embodiments, m is 2, 4, 5, 6, or 8.

In some embodiments, each L is independently selected from $N(R^N)$, O, C(=O), $C_{1-6}$ alkylene, $C_{3-7}$ cycloalkylene, 4-10-membered heterocycloalkylene, 5-10-membered heteroarylene, $C_{6-10}$ arylene, —(OCH$_2$CH$_2$)$_x$—, and —(CH$_2$CH$_2$O)$_x$—.

In some embodiments, each L is independently selected from NH, O, C(=O), $C_{1-6}$ alkylene, $C_{3-7}$ cycloalkylene, 4-10-membered heterocycloalkylene, 5-10-membered heteroarylene, $C_{6-10}$ arylene, —(OCH$_2$CH$_2$)$_x$—, and —(CH$_2$CH$_2$O)$_x$—. In some embodiments, at least one L is $C_{1-6}$ alkylene. In some embodiments, at least one L is C(=O). In some embodiments, at least one L is O. In some embodiments, group (L)$_m$ comprises at least one 4-10-membered heterocycloalkylene. In some embodiments, group (L)$_m$ comprises at least one $C_{6-10}$ arylene. In some embodiments, group (L)$_m$ comprises at least one moiety C(=O)O, OC(=O), C(=O)NH, or C(=O)NH. In some embodiments, at least one L is —(OCH$_2$CH$_2$)$_x$— or —(CH$_2$CH$_2$O)$_x$—.

In some embodiments, x is an integer from 1 to 100. In some embodiments, x is an integer from 1 to 20. In some embodiments, x is an integer from 1 to 10.

In some embodiments, $R^N$ is selected from H and $C_{1-6}$ alkyl. In some embodiments, $R^N$ is H. In some embodiments, $R^N$ is $C_{1-6}$ alkyl.

In some embodiments of Formula (II):
- $R^1$, $R^2$, $R^3$, $R^4$, $R^5$, $R^8$, and $R^{11}$ are each independently selected from H, halo, CN, NO$_2$, OH, NH$_2$, $C_{1-6}$ alkyl, $C_{1-6}$ haloalkyl, $C_{1-6}$ alkoxy, $C_{1-6}$ haloalkoxy, $C_{1-6}$ alkylamino, and di($C_{1-6}$alkyl)amino;
- $R^6$, $R^{6a}$, and $R^7$ are each selected from H, $C_{1-6}$ alkyl, and $C_{1-6}$ haloalkyl; m is an integer from 2 to 10;
- each L is independently selected from $N(R^N)$, O, C(=O), $C_{1-6}$ alkylene, $C_{3-7}$ cycloalkylene, 4-10-membered heterocycloalkylene, 5-10-membered heteroarylene, $C_{6-10}$ arylene, —(OCH$_2$CH$_2$)$_x$—, and —(CH$_2$CH$_2$O)$_x$—;
- each x is independently an integer from 1 to 10; and
- each $R^N$ is independently selected from H and $C_{1-6}$ alkyl.

In some embodiments:
- $R^6$, $R^{6a}$, and $R^7$ are each selected from H, $C_{1-6}$ alkyl, and $C_{1-6}$ haloalkyl;
- m is an integer from 2 to 10;
- each L is independently selected from $N(R^N)$, O, C(=O), $C_{1-6}$ alkylene, $C_{3-7}$ cycloalkylene, 4-10-membered heterocycloalkylene, 5-10-membered heteroarylene, $C_{6-10}$ arylene, —(OCH$_2$CH$_2$)$_x$—, and —(CH$_2$CH$_2$O)$_x$—;
- each x is independently an integer from 1 to 10; and
- each $R^N$ is independently selected from H and $C_{1-6}$ alkyl.

In some embodiments of Formula (II), $R^4$ is H.

In some embodiments of Formula (II), $R^4$ is a targeting ligand capable of selectively binding to a protein (e.g., a pharmacologically relevant protein, such as a protein implicated in a disease or condition). Suitable examples of such proteins include damaged proteins, proteins containing a genetic mutation, and aggregation-prone proteins.

In some embodiments, the protein is implicated in the pathology of cancer. Suitable examples of such proteins include hormone receptor, androgen receptor, estrogen receptor, KRAS, BRD4 (bromodomain and extraterminal (BET) domain epigenetic reader protein BRD4), anaplastic lymphoma kinase (ALK), BCL2, BCL6, BCR-ABL, BRD9, BRD7, BTK, CDK4/6, cyclin-dependent kinase 8 (CDK8), cyclin-dependent kinase 9 (CDK9), casein kinase 2 (CK2), c-Met, dihydroorotate dehydrogenase (DHODH), epidermal growth factor receptor (EGFR), eukaryotic translation initiation factor 4E (eIF4E), ER, ERK1, ERK2, focal adhesion kinase (FAK), FMS-like tyrosine kinase 3 (FLT3), myeloid cell leukemia 1 (MCL1), murine double minute 2 (MDM2), poly (ADP-ribose) polymerases (PARPs), pirin, phosphoinositide 3-kinases (P13Ks), polycomb repressive complex 2 (PRC2), serine-threonine kinase (RIPK2), rpn13, serum/glucocorticoid-inducible protein kinase (SGK), smad3, STAT protein (STAT1, STAT2, STAT3, STAT4, STAT5A, STAT5B, and STAT6), TANK-binding kinase 1 (TBK1), TRIM24, the hepatitis C virus (HCV) NS3 protein, interleukin-1 receptor-associated kinase 4 (IRAK4), P300/CBP-associated factor (PCAF), and sirtuin. Other examples of pharmacologically relevant proteins include immunosuppressive proteins, such as PD-L1, CD47, cytokines (e.g., IL-2, IL-7, IL-12, IL-15, IL-10, IL-21, or INF-alfa) and chemokines (e.g., CCL2, CCL3, or CCL5). These examples also include immunosuppressive antigens, such as PD-1, CTLA-4, CD20, Lag-3 or Tim-3.

Suitable examples of targeting ligands capable of binding to the proteins implicated in the pathology of cancer include small-molecule therapeutics. Small-molecule therapeutics are low molecular weight organic compounds, typically about 2000 daltons or less. The small-molecule therapeutics may include various heterocyclic moieties, such as pyridine, pyrimidine, pyrazole, oxazole, or indole, and various functional groups, such as hydroxy, carboxy, or amino groups. The small-molecule targeting ligands may bind proteins covalently or non-covalently. Examples of non-covalent binding include electrostatic interactions, hydrophobic interactions, and Van der Waals forces. In some embodiments, the targeting ligand binds the protein selectively, that is, the ligand does not substantially bind to any other protein in the cell. Examples of small-molecule targeting ligands capable of selective binding to the proteins implicated in the pathology of cancer include JQ1, imatinib, enzalutamide, thalidomide, lenalidomide, fulvestrant, tazemetostat, MAK683, UNC1999, adavosertib, AZD1775, carfilzomib, MG-132, apigenin, alectinib, brigatinib, ceritinib, crizotinib, and lorlatinib, TAE684, pomalidomide, bosutinib, dasatinib, SNS-032, CX-4945, foretinib, brequinar, lapatinib, gefitinib, afatinib, fulvestrant, defactinib, quizartinib, gilteritinib, MLN-518, sunitinib, ponatinib, MI-1061, olaparib, niraparib, iniparib, veliparib, and bortezomib. Other examples of targeting ligands capable of selective binding to the proteins implicated in the pathology of cancer include ligands targeting epigenetic modifier, such as HDAC, KDM, HAT, and HSP90.

In some embodiments, the protein is implicated in the pathology of a neurodegenerative disease or condition. Suitable examples of such proteins include alpha-synuclein, transthyretin, tau protein, and amyloid-β peptide. Other examples of proteins and ligands capable of binding to such proteins are described, for example, in Sun et. al., Signal Transduction and Targeted Therapy, 2019, 4, 64, which is incorporated herein by reference in its entirety.

In some embodiments, the compound of Formula (II) is selected from:
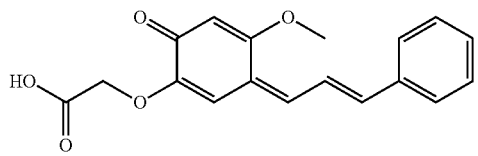
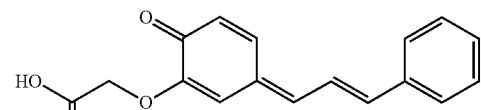
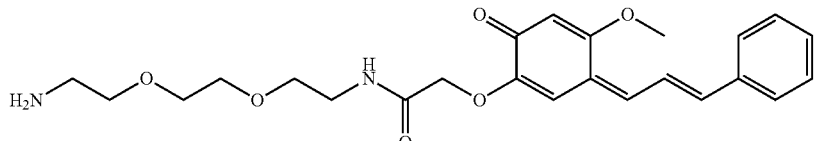
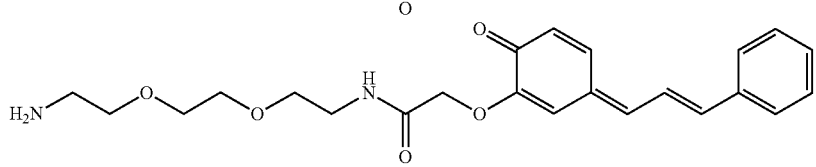
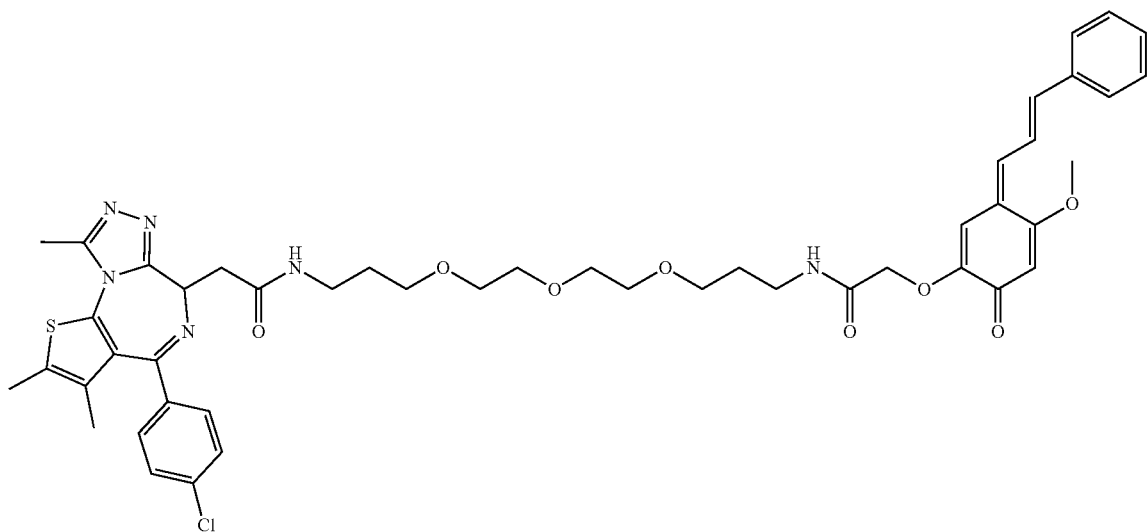
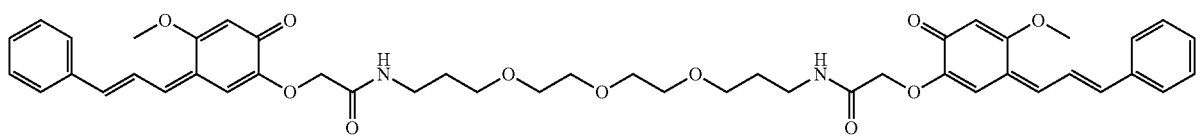
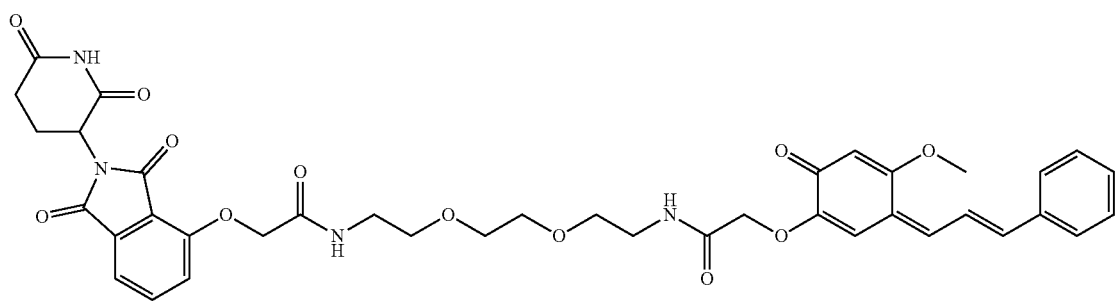
or a pharmaceutically acceptable salt thereof.

Compound of Formula (III)

In some embodiments, the present disclosure provides a compound of Formula (IIIa):

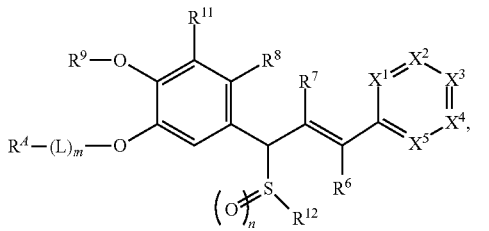

(IIIa)

or a pharmaceutically acceptable salt thereof, wherein $X^1$, $X^2$, $X^3$, $X^4$, $X^5$, $R^6$, $R^7$, $R^8$, $R^9$, $R^{11}$, $R^{12}$ n, m, L, and $R^A$ are as described herein.

In some embodiments, the present disclosure provides a compound of Formula (IIIb):

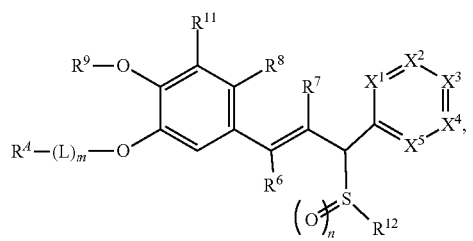

(IIIb)

or a pharmaceutically acceptable salt thereof, wherein $X^1$, $X^2$, $X^3$, $X^4$, $X^5$, $R^6$, $R^7$, $R^8$, $R^9$, $R^{11}$, $R^{12}$, n, m, L, and $R^A$ are as described herein.

In some embodiments of Formula (IIIa) or Formula (IIIb):

n is selected from 0, 1, and 2;

$X^1$ is selected from N and $CR^1$;

$X^2$ is selected from N and $CR^2$;

$X^3$ is selected from N and $CR^3$;

$X^4$ is selected from N and $CR^4$;

$X^5$ is selected from N and $CR^5$;

provided that no more than three of $X^1$, $X^2$, $X^3$, $X^4$, and $X^5$ are N;

$R^1$, $R^2$, $R^3$, $R^4$, $R^5$, $R^8$, and $R^{11}$ are each independently selected from H, halo, CN, $NO_2$, $C_{1-6}$ alkyl, $C_{1-6}$ haloalkyl, $C_{2-6}$ alkenyl, $C_{2-6}$ alkynyl, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$, $S(O)R^{b1}$, $S(O)NR^{c1}R^{d1}$, $S(O)_2R^{b1}$, and $S(O)_2NR^{c1}R^{d1}$; wherein said $C_{1-6}$ alkyl, $C_{2-6}$ alkenyl, and $C_{2-6}$ alkynyl are each optionally substituted with 1, 2, 3, 4, or 5 substituents independently selected from halo, CN, $NO_2$, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$ $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$, $S(O)R^{b1}$, $S(O)NR^{c1}R^{d1}$, $S(O)_2R^{b1}$, and $S(O)_2NR^{c1}R^{d1}$;

$R^6$ and $R^7$ are each independently selected from H, $C_{1-6}$ alkyl, $C_{1-6}$ haloalkyl, $C_{2-6}$ alkenyl, and $C_{2-6}$ alkynyl, wherein said $C_{1-6}$ alkyl, $C_{2-6}$ alkenyl, and $C_{2-6}$ alkynyl are each optionally substituted with 1, 2, or 3 substituents independently selected from halo, CN, $NO_2$, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$ $NR^{c1}C(O)NR^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$, $S(O)R^{b1}$, $S(O)NR^{c1}R^{d1}$, $S(O)_2R^{b1}$, and $S(O)_2NR^{c1}R^{d1}$;

$R^9$ is selected from H, $C(O)R^{b1}$, $C(O)NR^{c1}R^{d1}$, $C(O)OR^{a1}$, $S(O)R^{b1}$, $S(O)NR^{c1}R^{d1}$, $S(O)_2R^{b1}$, and $S(O)_2NR^{c1}R^{d1}$;

m is an integer from 2 to 20;

each L is independently selected from $N(R^N)$, O, C(=O), S, S(=O), $S(=O)_2$, $C_{1-6}$ alkylene, $C_{3-7}$ cycloalkylene, 4-10-membered heterocycloalkylene, 5-10-membered heteroarylene, $C_{6-10}$ arylene, $-(OCH_2CH_2)_x-$, $-(CH_2CH_2O)_x-$, $-(OCH(CH_3)CH_2)_x-$, $-(CH_2CH(CH_3)O)_x-$, each of which is optionally substituted with 1 or 2 substituents independently selected from OH, $NH_2$, C(O)OH, $SO_3H$, $C_{1-3}$ alkylamino, di($C_{1-3}$-alkyl)amino, $C_{1-3}$ haloalkyl, $C_{1-3}$ alkoxy, and $C_{1-3}$ haloalkoxy;

each x is independently an integer from 1 to 2,000;

each $R^N$ is independently selected from H, $C_{1-6}$ alkyl, $C_{2-6}$ alkenyl, and $C_{2-6}$ alkynyl $R^A$ is independently selected from H and a targeting ligand capable of selectively binding to a protein;

$R^{12}$ is selected from $C_{1-6}$ alkyl, $C_{2-6}$ alkenyl, $C_{2-6}$ alkynyl, $C_{3-10}$ cycloalkyl, and a peptide, wherein said $C_{1-6}$ alkyl, $C_{2-6}$ alkenyl, $C_{2-6}$ alkynyl, and $C_{3-10}$ cycloalkyl are each optionally substituted with 1, 2, 3, 4, or 5 substituents independently selected from halo, CN, $NO_2$, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$, $S(O)R^{b1}$, $S(O)NR^{c1}N^{d1}$, $S(O)_2R^{b1}$, and $S(O)_2NR^{c1}R^{d1}$;

each $R^{b1}$ is independently selected from H, $C_{1-12}$ alkyl, $C_{1-4}$ haloalkyl, $C_{2-6}$ alkenyl, $C_{2-6}$ alkynyl, and $C_{3-10}$ cycloalkyl, wherein said $C_{1-6}$ alkyl, $C_{2-6}$ alkenyl, $C_{2-6}$ alkynyl, and $C_{3-10}$ cycloalkyl are each optionally substituted with 1, 2, or 3 substituents independently selected from $R^g$;

each $R^{a1}$, $R^{c1}$, and $R^{d1}$ is independently selected from H, $C_{1-6}$ alkyl, $C_{1-4}$ haloalkyl, $C_{2-6}$ alkenyl, $C_{2-6}$ alkynyl, $C_{3-10}$ cycloalkyl, $C(O)R^{b2}$, $C(O)NR^{c2}R^{d2}$, $C(O)OR^{a2}$, $NR^{c2}R^{d2}$, $S(O)R^{b2}$, $S(O)NR^{c2}R^{d2}$, $S(O)_2R^{b2}$, and $S(O)_2NR^{c2}R^{d2}$; wherein aid $C_{1-6}$ alkyl, $C_{2-6}$ alkenyl, $C_{2-6}$ alkynyl, and $C_{3-10}$ cycloalkyl are each optionally substituted with 1, 2, or 3 substituents independently selected from $R^g$;

each $R^{a2}$, $R^{b2}$, $R^{c2}$, and $R^{d2}$ is in dependently selected from H, $C_{1-6}$ alkyl, $C_{1-4}$ haloalkyl, $C_{2-6}$ alkenyl, $C_{2-6}$ alkynyl, and $C_{3-10}$ cycloalkyl; wherein said $C_{1-6}$ alkyl, $C_{2-6}$ alkenyl, $C_{2-6}$ alkynyl, and $C_{3-10}$ cycloalkyl are each optionally substituted with 1, 2, or 3 substituents independently selected from $R^g$;

or any $R^{c1}$ and $R^{d1}$ together with the N atom to which they are attached form a 4-, 5-, 6-, or 7-membered heterocycloalkyl group optionally substituted with 1, 2, or 3 substituents independently selected from $R^g$;

or any $R^{c2}$ and $R^{d2}$ together with the N atom to which they are attached form a 4-, 5-, 6-, or 7-membered heterocycloalkyl group optionally substituted with 1, 2, or 3 substituents independently selected from $R^g$; and each $R^g$ is independently selected from OH, $NO_2$, CN, halo, $C_{1-6}$ alkyl, $C_{2-6}$ alkenyl, $C_{2-6}$ alkynyl, $C_{1-4}$ haloalkyl, $C_{1-6}$ alkoxy, $C_{1-6}$ haloalkoxy, cyano-$C_{1-3}$ alkylene, HO—$C_{1-3}$ alkylene, amino, $C_{1-6}$ alkylamino, di($C_{1-6}$ alkyl)amino, thio, $C_{1-6}$ alkylthio, $C_{1-6}$ alkylsulfinyl, $C_{1-6}$ alkylsulfonyl, carbamyl, $C_{1-6}$ alkylcarbamyl, di($C_{1-6}$ alkyl)carbamyl, carboxy, $C_{1-6}$ alkylcarbonyl, $C_{1-6}$ alkoxycarbonyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino.

In some embodiments, n is 0. In some embodiments, n is 1. In some embodiments, n is 2.

In some embodiments, $X^1$ is N. In some embodiments, $X^1$ is $CR^1$. In some embodiments, $X^1$ is N. In some embodiments, $X^1$ is $CR^1$.

In some embodiments, $X^2$ is N. In some embodiments, $X^2$ is $CR^2$. In some embodiments, $X^2$ is N. In some embodiments, $X^2$ is $CR^2$.

In some embodiments, $X^3$ is N. In some embodiments, $X^3$ is $CR^3$. In some embodiments, $X^3$ is N. In some embodiments, $X^3$ is $CR^3$.

In some embodiments, $X^4$ is N. In some embodiments, $X^4$ is $CR^4$. In some embodiments, $X^4$ is N. In some embodiments, $X^4$ is $CR^4$.

In some embodiments, $X^5$ is N. In some embodiments, $X^5$ is $CR^5$. In some embodiments, $X^5$ is N. In some embodiments, $X^5$ is $CR^5$.

In some embodiments, no more than one of $X^1$, $X^2$, $X^3$, $X^4$, and $X^5$ is N. In some embodiments, no more than two of $X^1$, $X^2$, $X^3$, $X^4$, and $X^5$ are N. In some embodiments, no more than three of $X^1$, $X^2$, $X^3$, $X^4$, and $X^5$ are N.

In some embodiments, the compound of Formula (IIIa) has formula:

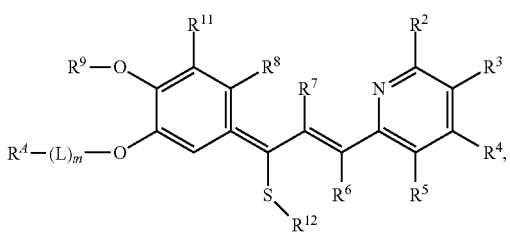

or a pharmaceutically acceptable salt thereof.

In some embodiments, the compound of Formula (IIIa) has formula:

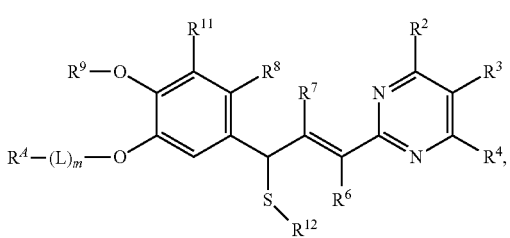

or a pharmaceutically acceptable salt thereof.

In some embodiments, the compound of Formula (IIIa) has formula:

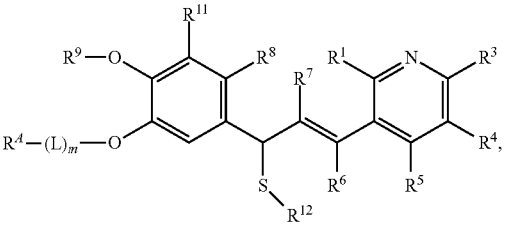

or a pharmaceutically acceptable salt thereof.

In some embodiments, the compound of Formula (IIIa) has formula:

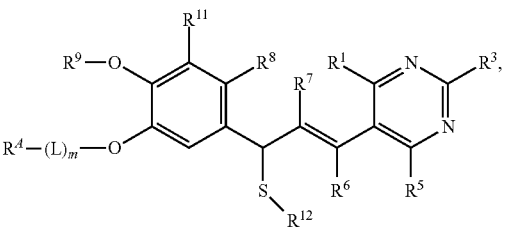

or a pharmaceutically acceptable salt thereof.

In some embodiments, the compound of Formula (IIIa) has formula:

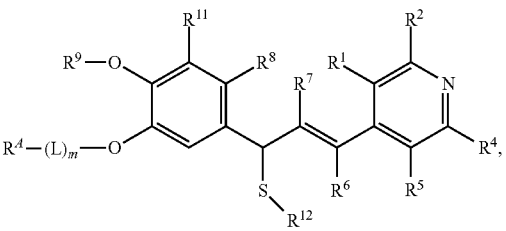

or a pharmaceutically acceptable salt thereof.

In some embodiments, the compound of Formula (IIIa) has formula:

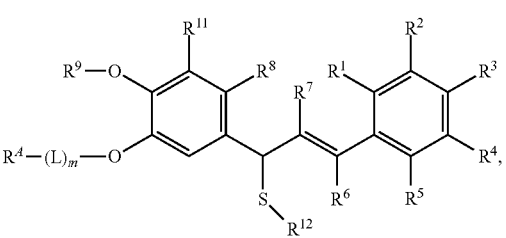

or a pharmaceutically acceptable salt thereof.

In some embodiments, the compound of Formula (IIIa) has formula:

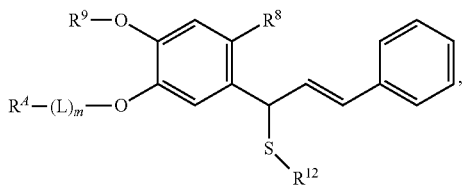

or a pharmaceutically acceptable salt thereof. In some aspects of these embodiments, $R^8$ is H. In other aspects of these embodiments, $R^8$ is selected from halo, $C_{1-6}$ alkyl, $C_{1-6}$ haloalkyl, $C_{1-6}$ alkoxy, and $C_{1-6}$ haloalkoxy. In some embodiments, $R^8$ is $C_{1-6}$ alkoxy.

In some embodiments, the compound of Formula (IIIb) has formula:

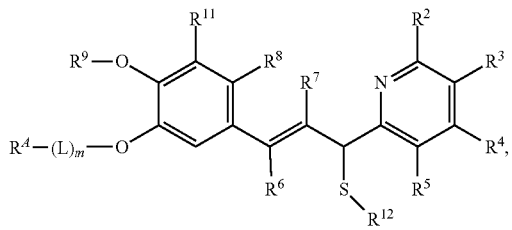

or a pharmaceutically acceptable salt thereof.

In some embodiments, the compound of Formula (IIIb) has formula:

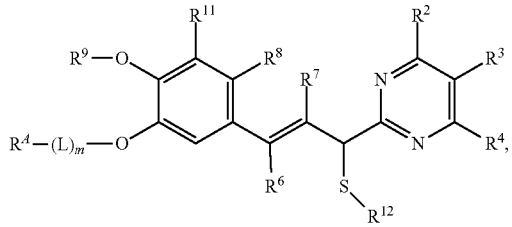

or a pharmaceutically acceptable salt thereof.

In some embodiments, the compound of Formula (IIIb) has formula:

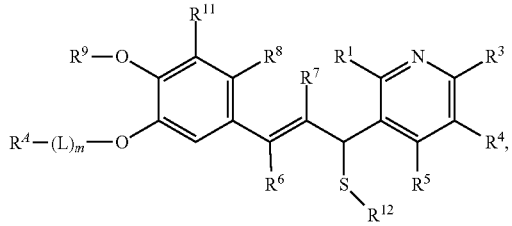

or a pharmaceutically acceptable salt thereof.

In some embodiments, the compound of Formula (IIIb) has formula:

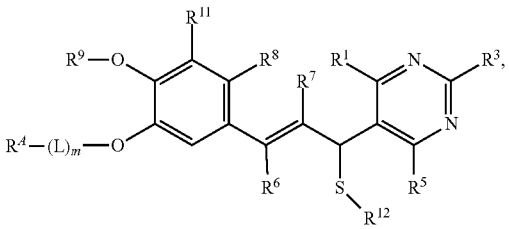

or a pharmaceutically acceptable salt thereof.

In some embodiments, the compound of Formula (IIIb) has formula:

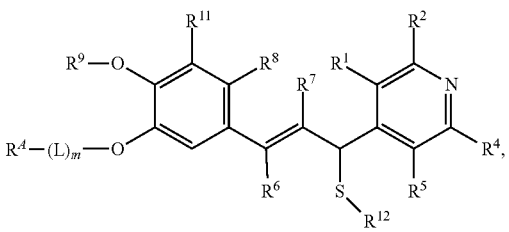

or a pharmaceutically acceptable salt thereof.

In some embodiments, the compound of Formula (IIIb) has formula:

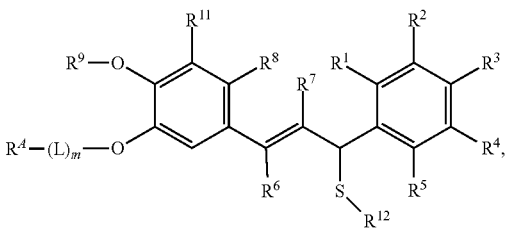

or a pharmaceutically acceptable salt thereof.

In some embodiments, the compound of Formula (IIIb) has formula:

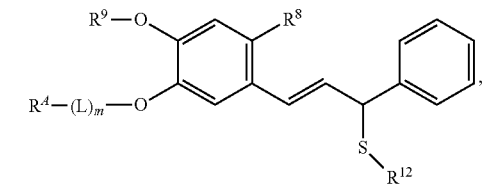

or a pharmaceutically acceptable salt thereof. In some aspects of these embodiments, $R^8$ is H. In other aspects of these embodiments, $R^8$ is selected from halo, $C_{1-6}$ alkyl, $C_{1-6}$ haloalkyl, $C_{1-6}$ alkoxy, and $C_{1-6}$ haloalkoxy. In some embodiments, $R^8$ is $C_{1-6}$ alkoxy.

In some embodiments, $R^1$, $R^2$, $R^3$, $R^4$, $R^5$, $R^8$, and $R^{11}$ (when present) are each independently selected from H, halo, CN, $NO_2$, $C_{1-6}$ alkyl, $C_{1-6}$ haloalkyl, $OR^{a1}$, $C(O)R^{b1}$, $C(O)NR^{c1}R^{d1}$, $C(O)OR^{a1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)_2R^{b1}$, $NR^{c1}S(O)_2NR^{c1}R^{d1}$, $S(O)_2R^{b1}$, and $S(O)_2NR^{c1}R^{d1}$; wherein said $C_{1-6}$ alkyl is optionally substituted with 1, 2, or 3 substituents independently selected from halo, CN, $NO_2$, $OR^{a1}$, C(O)

$R^{b1}$, $C(O)NR^{c1}R^{d1}$, $C(O)OR^{a1}$, $NR^{c1}R^{d1}$, $NR^{c1}C(O)R^{b1}$, $NR^{c1}C(O)OR^{a1}$, $NR^{c1}C(O)NR^{c1}R^{d1}$, $S(O)_2R^{b1}$, $NR^{c1}S(O)_2NR^{c1}R^{d1}$, $S(O)_2R^{b1}$, and $S(O)_2NR^{c1}R^{d1}$.

In some embodiments, $R^1$, $R^2$, $R^3$, $R^4$, $R^5$, $R^8$, and $R^{11}$ (when present) are each independently selected from H, halo, CN, $NO_2$, $NH_2$, OH, $C_{1-6}$ alkyl, $C_{1-6}$ haloalkyl, $C_{1-6}$ alkoxy, $C_{1-6}$ haloalkoxy, $C_{1-6}$ alkylamino, and di($C_{1-6}$ alkyl) amino; wherein said $C_{1-6}$ alkyl is optionally substituted with 1, 2, or 3 substituents independently selected from halo, CN, $NO_2$, OH, $C_{1-6}$ alkoxy, $C_{1-6}$ haloalkoxy, $C_{1-6}$ alkylamino, and di($C_{1-6}$ alkyl)amino.

In some embodiments, $R^1$, $R^2$, $R^3$, $R^4$, $R^5$, $R^8$, and $R^{11}$ are each independently selected from H, halo, CN, $NO_2$, OH, $NH_2$, $C_{1-6}$ alkyl, $C_{1-6}$ haloalkyl, $C_{1-6}$ alkoxy, $C_{1-6}$ haloalkoxy, $C_{1-6}$ alkylamino, and di($C_{1-6}$ alkyl)amino.

In some embodiments, at least one of $R^1$, $R^2$, $R^3$, $R^4$, $R^5$ is an electron-donating group (e.g., $C_{1-6}$ alkyl, $C_{1-6}$ alkoxy, $C_{1-6}$ alkylamino, or di($C_{1-6}$ alkyl)amino). In some embodiment, at least one of $R^2$, $R^3$, $R^4$, $R^5$ is an electron-withdrawing group (e.g., halo, CN, $NO_2$, or $C_{1-6}$ haloalkyl).

In some embodiments, $R^6$ and $R^7$ are each independently selected from H, $C_{1-6}$ alkyl, and $C_{1-6}$ haloalkyl, wherein said $C_{1-6}$ alkyl is optionally substituted with 1, 2, or 3 substituents independently selected from halo, CN, $NO_2$, $OR^{a1}$, and $NR^{c1}R^{d1}$.

In some embodiments, $R^6$ and $R^7$ are each independently selected from H, $C_{1-6}$ alkyl, and $C_{1-6}$ haloalkyl. In some embodiments, $R^6$ is H. In some embodiments, $R^6$ is $C_{1-6}$ alkyl (e.g., methyl, ethyl, propyl, or isopropyl). In some embodiments, $R^7$ is H. In some embodiments, $R^7$ is $C_{1-6}$ alkyl (e.g., methyl, ethyl, propyl, or isopropyl).

In some embodiments, $R^8$ is selected from halo, $C_{1-6}$ alkyl, $C_{1-6}$ haloalkyl, $C_{1-6}$ alkoxy, and $C_{1-6}$ haloalkoxy. In some embodiments, $R^8$ is selected from $C_{1-6}$ alkyl and $C_{1-6}$ haloalkyl, wherein said $C_{1-6}$ alkyl is optionally substituted with 1, 2, or 3 substituents independently selected from CN, $NO_2$, OH, $C_{1-6}$ alkoxy, $C_{1-6}$ haloalkoxy, $C_{1-6}$ alkylamino, and di($C_{1-6}$ alkyl)amino. In some embodiments, $R^8$ is $C_{1-6}$ alkoxy or $C_{1-6}$ haloalkoxy. In some embodiments, $R^8$ is $C_{1-6}$ alkoxy.

In some embodiments, $R^9$ is H. In some embodiments, $R^9$ is selected from $C(O)R^{b1}$, $C(O)NR^{c1}R^{d1}$, $C(O)OR^{a1}$, $S(O)R^{b1}$, $S(O)NR^{c1}R^{d1}$, $S(O)_2R^{b1}$, and $S(O)_2NR^{c1}R^{d1}$. In some embodiments, $R^9$ is $C(O)R^{b1}$.

In some embodiments, $R^{12}$ is selected from $C_{1-6}$ alkyl, $C_{3-10}$ cycloalkyl, and a peptide, wherein said $C_{1-6}$ alkyl and $C_{3-10}$ cycloalkyl are each optionally substituted with 1, 2, or 3 substituents independently selected from halo, CN, $NO_2$, $OR^{a1}$, $SR^{a1}$, $C(O)R^{b1}$, $C(O)NR^{c1}R^{d1}$, $C(O)OR^{a1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)_2R^{b1}$, $NR^{c1}S(O)_2NR^{c1}R^{d1}$, $S(O)_2R^{b1}$ and $S(O)_2NR^{c1}R^{d1}$.

In some embodiments, $10^2$ is $C_{1-6}$ alkyl, optionally substituted with 1, 2, 3, 4, or 5 substituents independently selected from $OR^{a1}$, $SR^{a1}$, $C(O)OR^{a1}$, and $NR^{c1}R^{d1}$.

In some embodiments, $10^2$ is a peptide. Suitable examples of such peptides include dipeptides, tripeptides, and tetrapeptides. A peptide may include a cysteine, and any one of the known natural or unnatural amino acids. Any one of the amino acids within the peptide may be protected by one or more protecting groups. Suitable examples of protecting groups are described, for example, in Greene, et. al., Greene's Protective Groups in Organic Synthesis, Fourth Edition (ISBN:9780471697541). In some embodiments, the peptide is connected to the compound of Formula (Ia) or (Ib) through a sulfur atom of a side chain of a cysteine. In some embodiments, the peptide is a glutathione.

In some embodiments, each $R^{b1}$ is selected from $C_{1-12}$ alkyl, $C_{1-4}$ haloalkyl, $C_2$- and $C_{3-10}$ cycloalkyl, wherein said $C_{1-6}$ alkyl and $C_{3-10}$ cycloalkyl are each optionally substituted with 1, 2, or 3 substituents independently selected from $R^g$.

In some embodiments, each $R^{b1}$ is $C_{1-12}$ alkyl, optionally substituted with 1, 2, or 3 substituents independently selected from $R^g$. In some embodiments, each $R^{b1}$ is $C_{1-12}$ alkyl.

In some embodiments, each $R^{a1}$, $R^{c1}$ and $R^{d1}$ is independently selected from H, $C_{1-6}$ alkyl, $C_{1-4}$ haloalkyl, $C_{3-10}$ cycloalkyl, $C(O)R^{b2}$, $C(O)NR^{c2}R^{d2}$, $C(O)OR^{a2}$, $S(O)_2R^{b2}$, and $S(O)_2NR^{c2}R^{d2}$; wherein aid $C_{1-6}$ alkyl and $C_{3-10}$ cycloalkyl are each optionally substituted with 1, 2, or 3 substituents independently selected from $R^g$.

In some embodiments, each $R^{a1}$, $R^{c1}$, and $R^{d1}$ is independently selected from H, $C_{1-6}$ alkyl, $C_{1-4}$ haloalkyl, and $C(O)R^{b2}$. In some embodiments, each $R^{a1}$, $R^{c1}$ and $R^{d1}$ is independently selected from H, $C_{1-6}$ alkyl, and $C(O)R^{b2}$.

In some embodiments, each $R^{b1}$, $R^{b2}$, $R^{c2}$, and $R^{d2}$ is independently selected from H, $C_{1-6}$ alkyl, and $C_{1-4}$ haloalkyl.

In some embodiments, each $R^g$ is independently selected from OH, $NO_2$, CN, halo, $C_{1-6}$ alkyl, $C_{1-4}$ haloalkyl, $C_{1-6}$ alkoxy, $C_{1-6}$ haloalkoxy, carboxy, amino, $C_{1-6}$ alkylamino, and di($C_{1-6}$ alkyl)amino.

In some embodiments, m is an integer from 2 to 20. In some embodiments, m is an integer from 2 to 10. In some embodiments, m is 2, 4, 5, 6, or 8.

In some embodiments, each L is independently selected from $N(R^N)$, O, $C(=O)$, $C_{1-6}$ alkylene, $C_{3-7}$ cycloalkylene, 4-10-membered heterocycloalkylene, 5-10-membered heteroarylene, $C_{6-10}$ arylene, $-(OCH_2CH_2)_x-$, and $-(CH_2CH_2O)_x-$.

In some embodiments, each L is independently selected from NH, 0, $C(=O)$, $C_{1-6}$ alkylene, $C_{3-7}$ cycloalkylene, 4-10-membered heterocycloalkylene, 5-10-membered heteroarylene, $C_{6-10}$ arylene, $-(OCH_2CH_2)_x-$, and $-(CH_2CH_2O)_x-$. In some embodiments, at least one L is $C_{1-6}$ alkylene. In some embodiments, at least one L is $C(=O)$. In some embodiments, at least one L is O. In some embodiments, group $(L)_m$ comprises at least one 4-10-membered heterocycloalkylene. In some embodiments, group $(L)_m$ comprises at least one $C_{6-10}$ arylene. In some embodiments, group $(L)_m$ comprises at least one moiety $C(=O)O$, $OC(=O)$, $C(=O)NH$, or $C(=O)NH$. In some embodiments, at least one L is $-(OCH_2CH_2)_x-$ or $-(CH_2CH_2O)_x-$.

In some embodiments, x is an integer from 1 to 100. In some embodiments, x is an integer from 1 to 20. In some embodiments, x is an integer from 1 to 10.

In some embodiments, $R^N$ is selected from H and $C_{1-6}$ alkyl. In some embodiments, $R^N$ is H. In some embodiments, $R^N$ is $C_{1-6}$ alkyl.

In some embodiments of Formula (IIIa) or Formula (IIIb):
$R^1$, $R^2$, $R^3$, $R^4$, $R^5$, $R^8$, and $R^{11}$ are each independently selected from H, halo, CN, $NO_2$, OH, $NH_2$, $C_{1-6}$ alkyl, $C_{1-6}$ haloalkyl, $C_{1-6}$ alkoxy, $C_{1-6}$ haloalkoxy, $C_{1-6}$ alkylamino, and di($C_{1-6}$ alkyl)amino;
$R^6$ and $R^7$ are each selected from H, $C_{1-6}$ alkyl, and $C_{1-6}$ haloalkyl;
$R^9$ is selected from H and $C(O)R^{b1}$;
each $R^{b1}$ is independently $C_{1-12}$ alkyl;
$R^{12}$ is selected from $C_{1-6}$ alkyl and a peptide, wherein said $C_{1-6}$ alkyl is optionally substituted with 1, 2, or 3 substituents independently selected from $OR^{a1}$, $SR^{a1}$, $C(O)OR^{a1}$, and $NR^{c1}R^{d1}$;

each $R^{a1}$, $R^{c1}$, and $R^{d1}$ is independently selected from H, $C_{1-6}$ alkyl, $C_{1-4}$ haloalkyl, and $C(O)R^{b2}$;

each $R^{b2}$ is independently selected from $C_{1-6}$ alkyl and $C_{1-4}$ haloalkyl;

m is an integer from 2 to 10;

each L is independently selected from $N(R^N)$, O, $C(=O)$, $C_{1-6}$ alkylene, $C_{3-7}$ cycloalkylene, 4-10-membered heterocycloalkylene, 5-10-membered heteroarylene, $C_{6-10}$ arylene, —$(OCH_2CH_2)_x$—, and —$(CH_2CH_2O)_x$—;

each x is independently an integer from 1 to 10; and each $R^N$ is independently selected from H and $C_{1-6}$ alkyl.

In some embodiments of Formula (IIIa) or Formula (IIIb):

$R^6$ and $R^7$ are each selected from H, $C_{1-6}$ alkyl, and $C_{1-6}$ haloalkyl;

$R^9$ is selected from H and $C(O)R^{b1}$;

each $R^{b1}$ is independently $C_{1-12}$ alkyl;

$R^{12}$ is selected from $C_{1-6}$ alkyl and a peptide, wherein said $C_{1-6}$ alkyl is optionally substituted with 1, 2, or 3 substituents independently selected from $OR^{a1}$, $SR^{a1}$, $C(O)OR^{a1}$, and $NR^{c1}R^{d1}$;

each $R^{a1}$, $R^{c1}$, and $R^{d1}$ is independently selected from H, $C_{1-6}$ alkyl, $C_{1-4}$ haloalkyl, and $C(O)R^{b2}$;

each $R^{b2}$ is independently selected from $C_{1-6}$ alkyl and $C_{1-4}$ haloalkyl;

m is an integer from 2 to 10;

each L is independently selected from $N(R^N)$, O, $C(=O)$, $C_{1-6}$ alkylene, $C_{3-7}$ cycloalkylene, 4-10-membered heterocycloalkylene, 5-10-membered heteroarylene, $C_{6-10}$ arylene, —$(OCH_2CH_2)_x$—, and —$(CH_2CH_2O)_x$—;

each x is independently an integer from 1 to 10; and each $R^N$ is independently selected from H and $C_{1-6}$ alkyl.

In some embodiments of Formula (IIIa) or Formula (IIIb), $R^A$ is H.

In some embodiments of Formula (IIIa) or Formula (IIIb), $R^A$ is a targeting ligand capable of selectively binding to a protein (e.g., any one of targeting ligands and proteins described herein for Formula (II)).

Pharmaceutically Acceptable Salts

In some embodiments, a salt of any one of the compounds of the present disclosure is formed between an acid and a basic group of the compound, such as an amino functional group, or a base and an acidic group of the compound, such as a carboxyl functional group. According to another embodiment, the compound is a pharmaceutically acceptable acid addition salt.

In some embodiments, acids commonly employed to form pharmaceutically acceptable salts of the compounds include inorganic acids such as hydrogen bisulfide, hydrochloric acid, hydrobromic acid, hydroiodic acid, sulfuric acid and phosphoric acid, as well as organic acids such as para-toluenesulfonic acid, salicylic acid, tartaric acid, bitartaric acid, ascorbic acid, maleic acid, besylic acid, fumaric acid, gluconic acid, glucuronic acid, formic acid, glutamic acid, methanesulfonic acid, ethanesulfonic acid, benzenesulfonic acid, lactic acid, oxalic acid, para-bromophenylsulfonic acid, carbonic acid, succinic acid, citric acid, benzoic acid and acetic acid, as well as related inorganic and organic acids. Such pharmaceutically acceptable salts thus include sulfate, pyrosulfate, bisulfate, sulfite, bisulfite, phosphate, monohydrogenphosphate, dihydrogenphosphate, metaphosphate, pyrophosphate, chloride, bromide, iodide, acetate, propionate, decanoate, caprylate, acrylate, formate, isobutyrate, caprate, heptanoate, propiolate, oxalate, malonate, succinate, suberate, sebacate, fumarate, maleate, butyne-1,4-dioate, hexyne-1,6-dioate, benzoate, chlorobenzoate, methylbenzoate, dinitrobenzoate, hydroxybenzoate, methoxybenzoate, phthalate, terephthalate, sulfonate, xylene sulfonate, phenylacetate, phenylpropionate, phenylbutyrate, citrate, lactate, β-hydroxybutyrate, glycolate, maleate, tartrate, methanesulfonate, propanesulfonate, naphthalene-1-sulfonate, naphthalene-2-sulfonate, mandelate and other salts. In one embodiment, pharmaceutically acceptable acid addition salts include those formed with mineral acids such as hydrochloric acid and hydrobromic acid, and especially those formed with organic acids such as maleic acid.

In some embodiments, bases commonly employed to form pharmaceutically acceptable salts of the compounds include hydroxides of alkali metals, including sodium, potassium, and lithium; hydroxides of alkaline earth metals such as calcium and magnesium; hydroxides of other metals, such as aluminum and zinc; ammonia, organic amines such as unsubstituted or hydroxyl-substituted mono-, di-, or tri-alkylamines, dicyclohexylamine; tributyl amine; pyridine; N-methyl, N-ethylamine; diethylamine; triethylamine; mono-, bis-, or tris-(2-OH—($C_1$-$C_6$)-alkylamine), such as N,N-dimethyl-N-(2-hydroxyethyl)amine or tri-(2-hydroxyethyl)amine; N-methyl-D-glucamine; morpholine; thiomorpholine; piperidine; pyrrolidine; and amino acids such as arginine, lysine, and the like.

Methods of Use

In some embodiments, the present disclosure provides method of modulating activity of Nrf2 in a cell, the method comprising contacting the cell with an effective amount of a compound of Formula (Ia) or Formula (Ib) as described herein, or a pharmaceutically acceptable salt thereof. In some embodiments, the contacting is carried out in vitro, in vivo, or ex vivo. In some embodiments, modulating comprises activating Nrf2 in the cell (e.g., leading to expression of antioxidant response element (ARE) dependent genes), as described herein.

Accordingly, the present disclosure provides a method of treating a disease or condition in which Nrf2 pathway is implicated, the method comprising administering to the subject in need thereof a therapeutically effective amount of a compound of Formula (Ia) or Formula (Ib), or a pharmaceutically acceptable salt thereof, or a pharmaceutical composition comprising same.

In some embodiments, the disease or condition is cancer. Suitable examples of cancers include bladder cancer, brain cancer, breast cancer, colorectal cancer, cervical cancer, gastrointestinal cancer, genitourinary cancer, head and neck cancer, lung cancer, ovarian cancer, pancreatic cancer, prostate cancer, renal cancer, skin cancer, and testicular cancer. In some embodiments, the cancer is selected from sarcoma, angiosarcoma, fibrosarcoma, rhabdomyosarcoma, liposarcoma, myxoma, rhabdomyoma, fibroma, lipoma, teratoma, lung cancer, bronchogenic carcinoma squamous cell, undifferentiated small cell, undifferentiated large cell, adenocarcinoma, alveolar bronchiolar carcinoma, bronchial adenoma, sarcoma, lymphoma, chondromatous hamartoma, mesothelioma, gastrointestinal cancer, cancer of the esophagus, squamous cell carcinoma, adenocarcinoma, leiomyosarcoma, lymphoma, cancer of the stomach, carcinoma, lymphoma, leiomyosarcoma, cancer of the pancreas, ductal adenocarcinoma, insulinoma, glucagonoma, gastrinoma, carcinoid tumor, vipoma, cancer of the small bowel, adenocarcinoma, lymphoma, carcinoid tumors, Kaposi's sarcoma, leiomyoma, hemangioma, lipoma, neurofibroma, fibroma, cancer of the large bowel or colon, tubular adenoma, villous adenoma, hamartoma, leiomyoma, genitourinary tract cancer, cancer of the kidney adenocarcinoma, Wilm's tumor (nephroblastoma), cancer of the bladder, cancer of the urethra, squamous cell carcinoma, transitional cell carcinoma, cancer of the prostate, cancer of the testis, seminoma, teratoma, embryonal carcinoma, teratocarcinoma, choriocarcinoma, sarcoma, interstitial cell carcinoma, fibroma, fibroadenoma, adenomatoid tumors, lipoma, liver cancer, hepatoma hepatocellular carcinoma, cholangiocarcinoma, hepatoblastoma, angiosarcoma, hepatocellular adenoma, hemangioma, bone cancer, osteogenic sarcoma (osteosarcoma), fibrosarcoma, malignant fibrous histiocytoma, chondrosarcoma, Ewing's sarcoma, malignant lymphoma (reticulum cell sarcoma), malignant giant cell tumor, chordoma, osteochrondroma (osteocartilaginous exostoses), benign chondroma, chondroblastoma, chondromyxofibroma, osteoid osteoma giant cell tumor, nervous system cancer, cancer of the skull, osteoma, hemangioma, granuloma, xanthoma, osteitis deformans, cancer of the meninges meningioma, meningiosarcoma, gliomatosis, cancer of the brain, astrocytoma, medulloblastoma, glioma, ependymoma, germinoma (pinealoma), glioblastoma multiforme, oligodendroglioma, schwannoma, retinoblastoma, congenital tumors, cancer of the spinal cord, neurofibroma, meningioma, glioma, sarcoma, gynecological cancer, cancer of the uterus, endometrial carcinoma, cancer of the cervix, cervical carcinoma, pre tumor cervical dysplasia, cancer of the ovaries, ovarian carcinoma, serous cystadenocarcinoma, mucinous cystadenocarcinoma, unclassified carcinoma, granulosa-theca cell tumor, Sertoli Leydig cell tumor, dysgerminoma, malignant teratoma, cancer of the vulva, squamous cell carcinoma, intraepithelial carcinoma, adenocarcinoma, fibrosarcoma, melanoma, cancer of the vagina, clear cell carcinoma, squamous cell carcinoma, botryoid sarcoma, embryonal rhabdomyosarcoma, cancer of the fallopian tubes, hematologic cancer, cancer of the blood, lymphoma, leukemia, acute myeloid leukemia (AML), chronic myeloid leukemia (CML), acute lymphoblastic leukemia (ALL), chronic lymphoblastic leukemia, chronic lymphocytic leukemia, myeloproliferative diseases, multiple myeloma, myelodysplastic syndrome, Hodgkin's lymphoma, non-Hodgkin's lymphoma (malignant lymphoma), Waldenstrom's macroglobulinemia, skin cancer, malignant melanoma, basal cell carcinoma, squamous cell carcinoma, Kaposi's sarcoma, moles dysplastic nevi, lipoma, angioma, dermatofibroma, keloids, adrenal gland cancer, and neuroblastoma. In some embodiments, the cancer is brain cancer or breast cancer.

In some embodiments, the disease or condition is an inflammatory disease or condition. Examples of such conditions include psoriasis, gastritis, colitis, arthritis, pneumonia, liver damage, cardiovascular disease, chronic obstructive pulmonary disease, emphysema, lung injury, arthritis, autoimmune disease, sepsis, fibrosis, diabetes, and stroke.

In some embodiments, the disease or condition is a neurodegenerative disease. Examples of neurodegenerative diseases include Huntington's disease (HD), Alzheimer's disease (AD), Parkinson's disease (PD), multiple sclerosis (MS), frontotemporal dementia (FTD) and amyotrophic lateral sclerosis (ALS). Other examples of neurodegenerative disease include Lewy body disease, dementia, motor neuron disease (MND), Prion disease, cerebral amyloid angiopathy, vascular cognitive impairment (VCI), hippocampal sclerosis, Binswanger's disease, Creutzfeldt-Jakob disease, cerebral ischemia, cerebrovascular ischemia, brain ischemia, cerebral palsy, chemotherapy-induced brain damage; cisplatin-induced neurotoxicity, diabetic neuropathy; Down's syndrome, epilepsy and post-traumatic epilepsy; Friedreich's ataxia; Hallervorden-Spatz disease; macular degeneration; methanol-induced neurotoxicity; meningitis (aseptic and tuberculous); Pick's disease; progressive supra-nuclear palsy; radiotherapy-induced brain damage; senile dementia; schizophrenia; traumatic brain injury (TBI); traumatic spinal injury; viral meningitis; encephalitis, and viral encephalitis.

In some embodiments, the disease or condition is in an infectious disease or condition. Suitable examples include diseases caused by bacteria, viruses, fungi, or parasites. Examples of a parasitic infection include a plasmodium infection such as malaria. Examples of viral infections include HIV infections (including AIDS), COVID-19 infection, SARS-CoV infection, MERS-CoV infection, Eastern equine encephalitis (EEE) infection, and ebola virus infection.

In some embodiments, the present disclosure also provides a method of modulating an immune response to a cancer cell or a cancer antigen, the method comprising contacting the cell (e.g., in vitro, in vivo, or ex vivo) with an effective amount of any one of the compounds disclosed herein, or a pharmaceutically acceptable salt thereof. In some embodiments, modulating the immune response includes initiating or potentiating the immune response.

The compound of Formulae (II), (IIIa), or (IIIb), or a pharmaceutically acceptable salt thereof, wherein $R^A$ is a targeting ligand capable of selectively binding to a protein, are useful as PROTACs. Generally, PROTACS are bi-functional conjugates containing three elements: (i) a targeting ligand capable of selectively binding a protein for degradation; (ii) a ubiquitin ligase recruiting ligand; and (iii) a linker between the ubiquitin ligase (ii) and the targeting ligand (i). In the PROTACS of the present disclosure, the OBT or OBT-prodrug fragment in the compound of any one of Formulae (II), (IIIa), or (IIIb) is the ubiquitin ligase recruiting ligand (ii). As discussed herein, covalent binding of OBT or an OBT-prodrug to Keap1 leads to ubiquitination and degradation of CUL3-Keap1 ubiquitin ligase complex, as well as the liberation and activation of Nrf2. When a protein target is bound to an OBT or OBT-prodrug fragment in the PROTAC compound of Formulae though the linker and the targeting ligand, a ternary complex is formed between Cul3, Keap1, and the protein target. As a result, the protein target is ubiquitinated and further degraded by the proteasome machinery of the cell. Hence, when the protein target is implicated in a pathology of a disease or condition, contacting the cell with the PROTAC of any one of Formulae (II), (IIIa), or (IIIb) results in a degradation of that protein and, concomitantly, a favorable therapeutic outcome.

Accordingly, in some embodiments, the present disclosure provides a method of reducing level of a protein in a cell, the method comprising contacting the cell with an effective amount of a compound of any one of Formulae (II), (IIIa), or (IIIb), or a pharmaceutically acceptable salt thereof (wherein $R^A$ in the Formulae is a targeting ligand capable of selectively binding to the protein). Contacting the cell may occur in vitro, in vivo, or ex vivo.

Suitable targeting ligands and target proteins are described herein for Formula (II). When the protein is implicated in cancer, and the targeting ligand in any one of the Formulae (II), (IIIa), or (IIIb) is capable of selectively binding to such protein, the present disclosure provides a method of treating cancer, the method comprising administering to a patient in need thereof a therapeutically effective amount of a compound of any one of Formulae (II), (IIIa), or (IIIb), or a pharmaceutically acceptable salt thereof. Suitable examples of cancers treatable by the compounds of Formulae (II), (IIIa), and (IIIb) are described hereinabove for Formula (I).

Similarly, when the protein is implicated in a neurological disease or condition, and the targeting ligand in any one of the Formulae (II), (IIIa), or (IIIb) is capable of selectively binding to such protein, the present disclosure provides a method of treating a neurological disease or condition, the method comprising administering to a patient in need thereof a therapeutically effective amount of a compound of any one of Formulae (II), (IIIa), or (IIIb), or a pharmaceutically acceptable salt thereof. Suitable examples of neurological diseases treatable by the compounds of Formulae (II), (IIIa), and (IIIb) are described hereinabove for Formula (I).

When the protein is implicated in an infectious disease or condition, and the targeting ligand in any one of the Formulae (II), (IIIa), or (IIIb) is capable of selectively binding to such protein, the present disclosure provides a method of treating an infectious disease or condition, the method comprising administering to a patient in need thereof a therapeutically effective amount of a compound of any one of Formulae (II), (IIIa), or (IIIb), or a pharmaceutically acceptable salt thereof. Suitable examples of infectious diseases treatable by the compounds of Formulae (II), (IIIa), and (IIIb) are described hereinabove for Formula (I).

Pharmaceutical Compositions

The present application also provides pharmaceutical compositions comprising an effective amount of a compound of the present disclosure (e.g., Formula (I), Formula (II), or (III)) disclosed herein, or a pharmaceutically acceptable salt thereof; and a pharmaceutically acceptable carrier. The pharmaceutical composition may also comprise any one of the additional therapeutic agents described herein. In certain embodiments, the application also provides pharmaceutical compositions and dosage forms comprising any one the additional therapeutic agents described herein. The carrier(s) are "acceptable" in the sense of being compatible with the other ingredients of the formulation and, in the case of a pharmaceutically acceptable carrier, not deleterious to the recipient thereof in an amount used in the medicament.

Pharmaceutically acceptable carriers, adjuvants and vehicles that may be used in the pharmaceutical compositions of the present application include, but are not limited to, ion exchangers, alumina, aluminum stearate, lecithin, serum proteins, such as human serum albumin, buffer substances such as phosphates, glycine, sorbic acid, potassium sorbate, partial glyceride mixtures of saturated vegetable fatty acids, water, salts or electrolytes, such as protamine sulfate, disodium hydrogen phosphate, potassium hydrogen phosphate, sodium chloride, zinc salts, colloidal silica, magnesium tri silicate, polyvinyl pyrrolidone, cellulose-based substances, polyethylene glycol, sodium carboxymethylcellulose, polyacrylates, waxes, polyethylene-polyoxypropylene-block polymers, polyethylene glycol, and wool fat.

The compositions or dosage forms may contain any one of the compounds and therapeutic agents described herein in the range of 0.005% to 100% with the balance made up from the suitable pharmaceutically acceptable excipients. The contemplated compositions may contain 0.001%-100% of any one of the compounds and therapeutic agents provided herein, in one embodiment 0.1-95%, in another embodiment 75-85%, in a further embodiment 20-80%, wherein the balance may be made up of any pharmaceutically acceptable excipient described herein, or any combination of these excipients.

Routes of Administration and Dosage Forms

The pharmaceutical compositions of the present application include those suitable for any acceptable route of administration. Acceptable routes of administration include, but are not limited to, buccal, cutaneous, endocervical, endosinusial, endotracheal, enteral, epidural, interstitial, intra-abdominal, intra-arterial, intrabronchial, intrabursal, intracerebral, intracisternal, intracoronary, intradermal, intraductal, intraduodenal, intradural, intraepidermal, intraesophageal, intragastric, intragingival, intraileal, intralymphatic, intramedullary, intrameningeal, intramuscular, intranasal, intraovarian, intraperitoneal, intraprostatic, intrapulmonary, intrasinal, intraspinal, intrasynovial, intratesticular, intrathecal, intratubular, intratumoral, intrauterine, intravascular, intravenous, nasal, nasogastric, oral, parenteral, percutaneous, peridural, rectal, respiratory (inhalation), subcutaneous, sublingual, submucosal, topical, transdermal, transmucosal, transtracheal, ureteral, urethral and vaginal.

Compositions and formulations described herein may conveniently be presented in a unit dosage form, e.g., tablets, sustained release capsules, and in liposomes, and may be prepared by any methods well known in the art of pharmacy. See, for example, Remington: The Science and Practice of Pharmacy, Lippincott Williams & Wilkins, Baltimore, MD (20th ed. 2000). Such preparative methods include the step of bringing into association with the molecule to be administered ingredients such as the carrier that constitutes one or more accessory ingredients. In general, the compositions are prepared by uniformly and intimately bringing into association the active ingredients with liquid carriers, liposomes or finely divided solid carriers, or both, and then, if necessary, shaping the product.

In some embodiments, any one of the compounds and therapeutic agents disclosed herein are administered orally. Compositions of the present application suitable for oral administration may be presented as discrete units such as capsules, sachets, granules or tablets each containing a predetermined amount (e.g., effective amount) of the active ingredient; a powder or granules; a solution or a suspension in an aqueous liquid or a non-aqueous liquid; an oil-in-water liquid emulsion; a water-in-oil liquid emulsion; packed in liposomes; or as a bolus, etc. Soft gelatin capsules can be useful for containing such suspensions, which may beneficially increase the rate of compound absorption. In the case of tablets for oral use, carriers that are commonly used include lactose, sucrose, glucose, mannitol, and silicic acid and starches. Other acceptable excipients may include: a) fillers or extenders such as starches, lactose, sucrose, glucose, mannitol, and silicic acid, b) binders such as, for example, carboxymethylcellulose, alginates, gelatin, polyvinylpyrrolidinone, sucrose, and acacia, c) humectants such as glycerol, d) disintegrating agents such as agar-agar, calcium carbonate, potato or tapioca starch, alginic acid, certain silicates, and sodium carbonate, e) solution retarding agents such as paraffin, f) absorption accelerators such as quaternary ammonium compounds, g) wetting agents such as, for example, cetyl alcohol and glycerol monostearate, h) absorbents such as kaolin and bentonite clay, and i) lubricants such as talc, calcium stearate, magnesium stearate, solid polyethylene glycols, sodium lauryl sulfate, and mixtures thereof. For oral administration in a capsule form, useful diluents include lactose and dried corn starch. When aqueous suspensions are administered orally, the active ingredient is combined with emulsifying and suspending agents. If desired, certain sweetening and/or flavoring and/or coloring agents may be added. Compositions suitable for oral administration include lozenges comprising the ingredients in a flavored basis, usually sucrose and acacia or tragacanth; and pastilles comprising the active ingredient in an inert basis such as gelatin and glycerin, or sucrose and acacia.

Compositions suitable for parenteral administration include aqueous and non-aqueous sterile injection solutions or infusion solutions which may contain antioxidants, buffers, bacteriostats and solutes which render the formulation isotonic with the blood of the intended recipient; and aqueous and non-aqueous sterile suspensions which may include suspending agents and thickening agents. The formulations may be presented in unit-dose or multi-dose containers, for example, sealed ampules and vials, and may be stored in a freeze dried (lyophilized) condition requiring only the addition of the sterile liquid carrier, for example water for injections, saline (e.g., 0.9% saline solution) or 5% dextrose solution, immediately prior to use. Extemporaneous injection solutions and suspensions may be prepared from sterile powders, granules and tablets. The injection solutions may be in the form, for example, of a sterile injectable aqueous or oleaginous suspension. This suspension may be formulated according to techniques known in the art using suitable dispersing or wetting agents and suspending agents. The sterile injectable preparation may also be a sterile injectable solution or suspension in a non-toxic parenterally-acceptable diluent or solvent, for example, as a solution in 1,3-butanediol. Among the acceptable vehicles and solvents that may be employed are mannitol, water, Ringer's solution and isotonic sodium chloride solution. In addition, sterile, fixed oils are conventionally employed as a solvent or suspending medium. For this purpose, any bland fixed oil may be employed including synthetic mono- or diglycerides. Fatty acids, such as oleic acid and its glyceride derivatives are useful in the preparation of injectables, as are natural pharmaceutically-acceptable oils, such as olive oil or castor oil, especially in their polyoxyethylated versions. These oil solutions or suspensions may also contain a long-chain alcohol diluent or dispersant.

The pharmaceutical compositions of the present application may be administered in the form of suppositories for rectal administration. These compositions can be prepared by mixing a compound of the present application with a suitable non-irritating excipient which is solid at room temperature but liquid at the rectal temperature and therefore will melt in the rectum to release the active components. Such materials include, but are not limited to, cocoa butter, beeswax, and polyethylene glycols.

The pharmaceutical compositions of the present application may be administered by nasal aerosol or inhalation. Such compositions are prepared according to techniques well-known in the art of pharmaceutical formulation and may be prepared as solutions in saline, employing benzyl alcohol or other suitable preservatives, absorption promoters to enhance bioavailability, fluorocarbons, and/or other solubilizing or dispersing agents known in the art. See, for example, U.S. Pat. No. 6,803,031. Additional formulations and methods for intranasal administration are found in Ilium, L., *J Pharm Pharmacol*, 56:3-17, 2004 and Ilium, L., *Eur J Pharm Sci* 11:1-18, 2000.

The topical compositions of the present disclosure can be prepared and used in the form of an aerosol spray, cream, emulsion, solid, liquid, dispersion, foam, oil, gel, hydrogel, lotion, mousse, ointment, powder, patch, pomade, solution, pump spray, stick, towelette, soap, or other forms commonly employed in the art of topical administration and/or cosmetic and skin care formulation. The topical compositions can be in an emulsion form. Topical administration of the pharmaceutical compositions of the present application is especially useful when the desired treatment involves areas or organs readily accessible by topical application. In some embodiments, the topical composition comprises a combination of any one of the compounds and therapeutic agents disclosed herein, and one or more additional ingredients, carriers, excipients, or diluents including, but not limited to, absorbents, anti-irritants, anti-acne agents, preservatives, antioxidants, coloring agents/pigments, emollients (moisturizers), emulsifiers, film-forming/holding agents, fragrances, leave-on exfoliants, prescription drugs, preservatives, scrub agents, silicones, skin-identical/repairing agents, slip agents, sunscreen actives, surfactants/detergent cleansing agents, penetration enhancers, and thickeners.

The compounds and therapeutic agents of the present application may be incorporated into compositions for coating an implantable medical device, such as prostheses, artificial valves, vascular grafts, stents, or catheters. Suitable coatings and the general preparation of coated implantable devices are known in the art and are exemplified in U.S. Pat. Nos. 6,099,562; 5,886,026; and 5,304,121. The coatings are typically biocompatible polymeric materials such as a hydrogel polymer, polymethyldisiloxane, polycaprolactone, polyethylene glycol, polylactic acid, ethylene vinyl acetate, and mixtures thereof. The coatings may optionally be further covered by a suitable topcoat of fluorosilicone, polysaccharides, polyethylene glycol, phospholipids or combinations thereof to impart controlled release characteristics in the composition. Coatings for invasive devices are to be included within the definition of pharmaceutically acceptable carrier, adjuvant or vehicle, as those terms are used herein.

According to another embodiment, the present application provides an implantable drug release device impregnated with or containing a compound or a therapeutic agent, or a composition comprising a compound of the present application or a therapeutic agent, such that said compound or therapeutic agent is released from said device and is therapeutically active.

Dosages and Regimens

In the pharmaceutical compositions of the present application, a compound of the present disclosure (e.g., a compound of Formula (I), Formula (II), or Formula (III)) is present in an effective amount (e.g., a therapeutically effective amount). Effective doses may vary, depending on the diseases treated, the severity of the disease, the route of administration, the sex, age and general health condition of the subject, excipient usage, the possibility of co-usage with other therapeutic treatments such as use of other agents and the judgment of the treating physician.

In some embodiments, an effective amount of the compound (e.g., Formula (I), Formula (II), or Formula (III)) can range, for example, from about 0.001 mg/kg to about 500 mg/kg (e.g., from about 0.001 mg/kg to about 200 mg/kg; from about 0.01 mg/kg to about 200 mg/kg; from about 0.01 mg/kg to about 150 mg/kg; from about 0.01 mg/kg to about 100 mg/kg; from about 0.01 mg/kg to about 50 mg/kg; from about 0.01 mg/kg to about 10 mg/kg; from about 0.01 mg/kg to about 5 mg/kg; from about 0.01 mg/kg to about 1 mg/kg; from about 0.01 mg/kg to about 0.5 mg/kg; from about 0.01 mg/kg to about 0.1 mg/kg; from about 0.1 mg/kg to about 200 mg/kg; from about 0.1 mg/kg to about 150 mg/kg; from about 0.1 mg/kg to about 100 mg/kg; from about 0.1 mg/kg to about 50 mg/kg; from about 0.1 mg/kg to about 10 mg/kg; from about 0.1 mg/kg to about 5 mg/kg; from about 0.1 mg/kg to about 2 mg/kg; from about 0.1 mg/kg to about 1 mg/kg; or from about 0.1 mg/kg to about 0.5 mg/kg). In some embodiments, an effective amount of a compound of Formula (I), Formula (II), or Formula (III) is about 0.1 mg/kg, about 0.5 mg/kg, about 1 mg/kg, about 2 mg/kg, or about 5 mg/kg.

The foregoing dosages can be administered on a daily basis (e.g., as a single dose or as two or more divided doses, e.g., once daily, twice daily, thrice daily) or non-daily basis (e.g., every other day, every two days, every three days, once weekly, twice weekly, once every two weeks, once a month).

Kits

The present invention also includes pharmaceutical kits useful, for example, in the treatment of disorders, diseases and conditions referred to herein, which include one or more containers containing a pharmaceutical composition comprising a therapeutically effective amount of a compound of the present disclosure. Such kits can further include, if desired, one or more of various conventional pharmaceutical kit components, such as, for example, containers with one or more pharmaceutically acceptable carriers, additional containers, etc. Instructions, either as inserts or as labels, indicating quantities of the components to be administered, guidelines for administration, and/or guidelines for mixing the components, can also be included in the kit. The kit may optionally include an additional therapeutic agent as described herein.

Combinations

The compounds of the present disclosure can be used on combination with at least one medication or therapy useful, e.g., in treating or alleviating symptoms of cancer, an inflammatory condition, or a neurodegenerative disease or condition. Suitable examples of anticancer agents include cisplatin, carboplatin, oxaliplatin, satraplatin, picoplatin, nedaplatin, triplatin, lipoplatin, nitrogen mustards, cyclophosphamide, mechlorethamine or mustine (HN2), uramustine or uracil mustard, melphalan, chlorambucil, ifosfamide, bendamustine, nitrosoureas, carmustine, lomustine, streptozocin, alkyl sulfonates, busulfan, thiotepa, procarbazine, altretamine, triazenes, dacarbazine, mitozolomide, temozolomide, necitumumab, dinutuximab, nivolumab, blinatumomab, pembrolizumab, ramucirumab, obinutuzumab, ado-trastuzumab emtansine, pertuzumab, brentuximab, ipilimumab, ofatumumab, catumaxomab, bevacizumab, cetuximab, tositumomab, ibritumomab tiuxetan, alemtuzumab, gemtuzumab ozogamicin, trastuzumab, rituximab, vinblastine, vincristine, vindesine, vinorelbine, desoxyvincaminol, vincaminol, vinburnine, vincamajine, vineridine, vinburnine, vinpocetine, fluorouracil, cladribine, capecitabine, mercaptopurine, pemetrexed, fludarabine, gemcitabine, hydroxyurea, methotrexate, nelarbine, clofarabine, cytarabine, decitabine, pralatrexate, floxuridine, and thioguanine, or a pharmaceutically acceptable salt thereof. In some embodiments, the anti-cancer therapy is selected from the group consisting of surgery, radiation therapy, chemotherapy, gene therapy, DNA therapy, viral therapy, RNA therapy, adjuvant therapy, and immunotherapy. Suitable examples of anti-cancer agents also include bromodomain inhibitors (e.g., BRD2, BRD3, BRD4, or BRDT inhibitors). Examples of such inhibitors include I-BET 151, JQ1, I-BET 762, OTX-015, TEN-010, CPI-203, CPI-0610, olinone, RVX-208, ABBV-744, LY294002, AZD5153, MT-1, and MS645. Suitable examples of anti-cancer agents also include immunotherapies, such as anti-PD1 antibodies or anti-CTLA4 antibodies.

Suitable examples of anti-inflammatory agents include steroids, antibodies against IL-6 or TNF-alpha, and NSAIDs (e.g., aspirin, acetaminophen, ibuprofen, naproxen, or diclofenac). Suitable examples of therapies for a neurodegenerative disease include L-DOPA, memantine, riluzole, edaravone, tetrabenazine, nicotinamide riboside, and nicotinamide mononucleotide.

The compound of the present disclosure may be administered to the patient simultaneously with the additional therapeutic agent (in the same pharmaceutical composition or dosage form or in different compositions or dosage forms) or consecutively (the additional therapeutic agent may be administered in a separate pharmaceutical composition or dosage form before or after administration of the compound of the present disclosure).

Definitions

As used herein, the term "about" means "approximately" (e.g., plus or minus approximately 10% of the indicated value).

At various places in the present specification, substituents of compounds of the invention are disclosed in groups or in ranges. It is specifically intended that the invention include each and every individual subcombination of the members of such groups and ranges. For example, the term "$C_{1-6}$ alkyl" is specifically intended to individually disclose methyl, ethyl, $C_3$ alkyl, $C_4$ alkyl, $C_5$ alkyl, and $C_6$ alkyl.

At various places in the present specification various aryl, heteroaryl, cycloalkyl, and heterocycloalkyl rings are described. Unless otherwise specified, these rings can be attached to the rest of the molecule at any ring member as permitted by valency. For example, the term "a pyridine ring" or "pyridinyl" may refer to a pyridin-2-yl, pyridin-3-yl, or pyridin-4-yl ring.

It is further appreciated that certain features of the invention, which are, for clarity, described in the context of separate embodiments, can also be provided in combination in a single embodiment. Conversely, various features of the invention which are, for brevity, described in the context of a single embodiment, can also be provided separately or in any suitable subcombination.

The term "aromatic" refers to a carbocycle or heterocycle having one or more polyunsaturated rings having aromatic character (i.e., having (4n+2) delocalized π (pi) electrons where n is an integer).

The term "n-membered" where n is an integer typically describes the number of ring-forming atoms in a moiety where the number of ring-forming atoms is n. For example, piperidinyl is an example of a 6-membered heterocycloalkyl ring, pyrazolyl is an example of a 5-membered heteroaryl ring, pyridyl is an example of a 6-membered heteroaryl ring, and 1,2,3,4-tetrahydro-naphthalene is an example of a 10-membered cycloalkyl group.

As used herein, the phrase "optionally substituted" means unsubstituted or substituted. The substituents are independently selected, and substitution may be at any chemically accessible position. As used herein, the term "substituted" means that a hydrogen atom is removed and replaced by a substituent. A single divalent substituent, e.g., oxo, can replace two hydrogen atoms. It is to be understood that substitution at a given atom is limited by valency.

Throughout the definitions, the term "Cn-m" indicates a range which includes the endpoints, wherein n and m are integers and indicate the number of carbons. Examples include $C_{1-4}$, $C_{1-6}$, and the like.

As used herein, the term "Cn-m alkyl", employed alone or in combination with other terms, refers to a saturated hydrocarbon group that may be straight-chain or branched, having n to m carbons. Examples of alkyl moieties include, but are not limited to, chemical groups such as methyl, ethyl, n-propyl, isopropyl, n-butyl, tert-butyl, isobutyl, sec-butyl; higher homologs such as 2-methyl-1-butyl, n-pentyl, 3-pentyl, n-hexyl, 1,2,2-trimethylpropyl, and the like. In some embodiments, the alkyl group contains from 1 to 6 carbon atoms, from 1 to 4 carbon atoms, from 1 to 3 carbon atoms, or 1 to 2 carbon atoms.

As used herein, the term "Cn-m haloalkyl", employed alone or in combination with other terms, refers to an alkyl group having from one halogen atom to 2s+1 halogen atoms which may be the same or different, where "s" is the number of carbon atoms in the alkyl group, wherein the alkyl group has n to m carbon atoms. In some embodiments, the haloalkyl group is fluorinated only. In some embodiments, the alkyl group has 1 to 6, 1 to 4, or 1 to 3 carbon atoms.

As used herein, "Cn-m alkenyl" refers to an alkyl group having one or more double carbon-carbon bonds and having n to m carbons. Example alkenyl groups include, but are not limited to, ethenyl, n-propenyl, isopropenyl, n-butenyl, sec-butenyl, and the like. In some embodiments, the alkenyl moiety contains 2 to 6, 2 to 4, or 2 to 3 carbon atoms.

As used herein, "$C_{n-m}$ alkynyl" refers to an alkyl group having one or more triple carbon-carbon bonds and having n to m carbons. Example alkynyl groups include, but are not limited to, ethynyl, propyn-1-yl, propyn-2-yl, and the like. In some embodiments, the alkynyl moiety contains 2 to 6, 2 to 4, or 2 to 3 carbon atoms.

As used herein, the term "$C_{n-m}$ alkylene", employed alone or in combination with other terms, refers to a divalent alkyl linking group having n to m carbons. Examples of alkylene groups include, but are not limited to, ethan-1,1-diyl, ethan-1,2-diyl, propan-1,1,-diyl, propan-1,3-diyl, propan-1,2-diyl, butan-1,4-diyl, butan-1,3-diyl, butan-1,2-diyl, 2-methylpropan-1,3-diyl, and the like. In some embodiments, the alkylene moiety contains 2 to 6, 2 to 4, 2 to 3, 1 to 6, 1 to 4, or 1 to 2 carbon atoms.

As used herein, the term "$C_{n-m}$ alkoxy", employed alone or in combination with other terms, refers to a group of formula —O-alkyl, wherein the alkyl group has n to m carbons. Example alkoxy groups include, but are not limited to, methoxy, ethoxy, propoxy (e.g., n-propoxy and isopropoxy), butoxy (e.g., n-butoxy and tert-butoxy), and the like. In some embodiments, the alkyl group has 1 to 6, 1 to 4, or 1 to 3 carbon atoms.

As used herein, "$C_{n-m}$ haloalkoxy" refers to a group of formula —O-haloalkyl having n to m carbon atoms. An example haloalkoxy group is OCF3. In some embodiments, the haloalkoxy group is fluorinated only. In some embodiments, the alkyl group has 1 to 6, 1 to 4, or 1 to 3 carbon atoms.

As used herein, the term "amino" refers to a group of formula —$NH_2$.

As used herein, the term "$C_{n-m}$ alkylamino" refers to a group of formula —NH(alkyl), wherein the alkyl group has n to m carbon atoms. In some embodiments, the alkyl group has 1 to 6, 1 to 4, or 1 to 3 carbon atoms. Examples of alkylamino groups include, but are not limited to, N-methylamino, N-ethylamino, N-propylamino (e.g., N-(n-propyl)amino and N-isopropylamino), N-butylamino (e.g., N-(n-butyl)amino and N-(tert-butyl)amino), and the like.

As used herein, the term "di($C_{n-m}$-alkyl)amino" refers to a group of formula —N(alkyl)$_2$, wherein the two alkyl groups each has, independently, n to m carbon atoms. In some embodiments, each alkyl group independently has 1 to 6, 1 to 4, or 1 to 3 carbon atoms.

As used herein, the term "$C_{n-m}$ alkoxycarbonyl" refers to a group of formula —C(O)O-alkyl, wherein the alkyl group has n to m carbon atoms. In some embodiments, the alkyl group has 1 to 6, 1 to 4, or 1 to 3 carbon atoms. Examples of alkoxycarbonyl groups include, but are not limited to, methoxycarbonyl, ethoxycarbonyl, propoxycarbonyl (e.g., n-propoxycarbonyl and isopropoxycarbonyl), butoxycarbonyl (e.g., n-butoxycarbonyl and tert-butoxycarbonyl), and the like.

As used herein, the term "$C_{n-m}$ alkylcarbonyl" refers to a group of formula —C(O)-alkyl, wherein the alkyl group has n to m carbon atoms. In some embodiments, the alkyl group has 1 to 6, 1 to 4, or 1 to 3 carbon atoms. Examples of alkylcarbonyl groups include, but are not limited to, methylcarbonyl, ethylcarbonyl, propylcarbonyl (e.g., n-propylcarbonyl and isopropylcarbonyl), butylcarbonyl (e.g., n-butylcarbonyl and tert-butylcarbonyl), and the like.

As used herein, the term "$C_{n-m}$ alkylcarbonylamino" refers to a group of formula —NHC(O)-alkyl, wherein the alkyl group has n to m carbon atoms. In some embodiments, the alkyl group has 1 to 6, 1 to 4, or 1 to 3 carbon atoms.

As used herein, the term "$C_{n-m}$ alkylsulfonylamino" refers to a group of formula —NHS(O)$_2$-alkyl, wherein the alkyl group has n to m carbon atoms. In some embodiments, the alkyl group has 1 to 6, 1 to 4, or 1 to 3 carbon atoms.

As used herein, the term "aminosulfonyl" refers to a group of formula —S(O)$_2$NH$_2$.

As used herein, the term "$C_{n-m}$ alkylaminosulfonyl" refers to a group of formula —S(O)$_2$NH(alkyl), wherein the alkyl group has n to m carbon atoms. In some embodiments, the alkyl group has 1 to 6, 1 to 4, or 1 to 3 carbon atoms.

As used herein, the term "di($C_{n-m}$ alkyl)aminosulfonyl" refers to a group of formula —S(O)$_2$N(alkyl)$_2$, wherein each alkyl group independently has n to m carbon atoms. In some embodiments, each alkyl group has, independently, 1 to 6, 1 to 4, or 1 to 3 carbon atoms.

As used herein, the term "aminosulfonylamino" refers to a group of formula —NHS(O)$_2$NH$_2$.

As used herein, the term "$C_{n-m}$ alkylaminosulfonylamino" refers to a group of formula —NHS(O)$_2$NH(alkyl), wherein the alkyl group has n to m carbon atoms. In some embodiments, the alkyl group has 1 to 6, 1 to 4, or 1 to 3 carbon atoms.

As used herein, the term "di($C_{n-m}$ alkyl)aminosulfonylamino" refers to a group of formula —NHS(O)$_2$N(alkyl)$_2$, wherein each alkyl group independently has n to m carbon atoms. In some embodiments, each alkyl group has, independently, 1 to 6, 1 to 4, or 1 to 3 carbon atoms.

As used herein, the term "aminocarbonylamino", employed alone or in combination with other terms, refers to a group of formula —NHC(O)NH$_2$.

As used herein, the term "$C_{n-m}$ alkylaminocarbonylamino" refers to a group of formula —NHC(O)NH(alkyl), wherein the alkyl group has n to m carbon atoms. In some embodiments, the alkyl group has 1 to 6, 1 to 4, or 1 to 3 carbon atoms.

As used herein, the term "di($C_{n-m}$ alkyl)aminocarbonylamino" refers to a group of formula —NHC(O)N(alkyl)$_2$, wherein each alkyl group independently has n to m carbon atoms. In some embodiments, each alkyl group has, independently, 1 to 6, 1 to 4, or 1 to 3 carbon atoms.

As used herein, the term "carbamyl" to a group of formula —C(O)NH$_2$.

As used herein, the term "$C_{n-m}$ alkylcarbamyl" refers to a group of formula —C(O)—NH(alkyl), wherein the alkyl group has n to m carbon atoms. In some embodiments, the alkyl group has 1 to 6, 1 to 4, or 1 to 3 carbon atoms.

As used herein, the term "di($C_{n-m}$-alkyl)carbamyl" refers to a group of formula —C(O)N(alkyl)$_2$, wherein the two alkyl groups each has, independently, n to m carbon atoms.

In some embodiments, each alkyl group independently has 1 to 6, 1 to 4, or 1 to 3 carbon atoms.

As used herein, the term "thio" refers to a group of formula —SH.

As used herein, the term "$C_{n\text{-}m}$ alkylthio" refers to a group of formula —S-alkyl, wherein the alkyl group has n to m carbon atoms. In some embodiments, the alkyl group has 1 to 6, 1 to 4, or 1 to 3 carbon atoms.

As used herein, the term "$C_{n\text{-}m}$ alkylsulfinyl" refers to a group of formula —S(O)-alkyl, wherein the alkyl group has n to m carbon atoms. In some embodiments, the alkyl group has 1 to 6, 1 to 4, or 1 to 3 carbon atoms.

As used herein, the term "$C_{n\text{-}m}$ alkylsulfonyl" refers to a group of formula —S(O)$_2$-alkyl, wherein the alkyl group has n to m carbon atoms. In some embodiments, the alkyl group has 1 to 6, 1 to 4, or 1 to 3 carbon atoms.

As used herein, the term "carbonyl", employed alone or in combination with other terms, refers to a —C(=O)— group, which may also be written as C(O).

As used herein, the term "carboxy" refers to a —C(O)OH group.

As used herein, the term "cyano-$C_{1\text{-}3}$ alkyl" refers to a group of formula —($C_{1\text{-}3}$ alkylene)-CN.

As used herein, the term "HO—$C_{1\text{-}3}$ alkyl" refers to a group of formula —($C_{1\text{-}3}$ alkylene)-OH.

As used herein, "halo" refers to F, $C_1$, Br, or I. In some embodiments, a halo is F, Cl, or Br.

As used herein, the term "aryl," employed alone or in combination with other terms, refers to an aromatic hydrocarbon group, which may be monocyclic or polycyclic (e.g., having 2, 3 or 4 fused rings). The term "$C_{n\text{-}m}$ aryl" refers to an aryl group having from n to m ring carbon atoms. Aryl groups include, e.g., phenyl, naphthyl, anthracenyl, phenanthrenyl, indanyl, indenyl, and the like. In some embodiments, aryl groups have from 6 to 10 carbon atoms. In some embodiments, the aryl group is phenyl or naphtyl. "Arylene" is a divalent aryl group.

As used herein, "cycloalkyl" refers to non-aromatic cyclic hydrocarbons including cyclized alkyl and/or alkenyl groups. Cycloalkyl groups can include mono- or polycyclic (e.g., having 2, 3 or 4 fused rings) groups and spirocycles. Ring-forming carbon atoms of a cycloalkyl group can be optionally substituted by 1 or 2 independently selected oxo or sulfide groups (e.g., C(O) or C(S)). Also included in the definition of cycloalkyl are moieties that have one or more aromatic rings fused (i.e., having a bond in common with) to the cycloalkyl ring, for example, benzo or thienyl derivatives of cyclopentane, cyclohexane, and the like. A cycloalkyl group containing a fused aromatic ring can be attached through any ring-forming atom including a ring-forming atom of the fused aromatic ring. Cycloalkyl groups can have 3, 4, 5, 6, 7, 8, 9, or 10 ring-forming carbons ($C_{3\text{-}10}$). In some embodiments, the cycloalkyl is a $C_{3\text{-}10}$ monocyclic or bicyclic cyclocalkyl. In some embodiments, the cycloalkyl is a $C_{3\text{-}7}$ monocyclic cyclocalkyl. Example cycloalkyl groups include cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcarnyl, adamantyl, and the like. In some embodiments, cycloalkyl is cyclopropyl, cyclobutyl, cyclopentyl, or cyclohexyl. "Cycloalkylene" is a divalent cycloalkyl group.

As used herein, "heteroaryl" refers to a monocyclic or polycyclic aromatic heterocycle having at least one heteroatom ring member selected from sulfur, oxygen, and nitrogen. In some embodiments, the heteroaryl ring has 1, 2, 3, or 4 heteroatom ring members independently selected from nitrogen, sulfur and oxygen. In some embodiments, any ring-forming N in a heteroaryl moiety can be an N-oxide. In some embodiments, the heteroaryl is a 5-10 membered monocyclic or bicyclic heteroaryl having 1, 2, 3 or 4 heteroatom ring members independently selected from nitrogen, sulfur and oxygen. In some embodiments, the heteroaryl is a 5-6 monocyclic heteroaryl having 1 or 2 heteroatom ring members independently selected from nitrogen, sulfur and oxygen. In some embodiments, the heteroaryl is a five-membered or six-membered heteroaryl ring. A five-membered heteroaryl ring is a heteroaryl with a ring having five ring atoms wherein one or more (e.g., 1, 2, or 3) ring atoms are independently selected from N, O, and S. Exemplary five-membered ring heteroaryls are thienyl, furyl, pyrrolyl, imidazolyl, thiazolyl, oxazolyl, pyrazolyl, isothiazolyl, isoxazolyl, 1,2,3-triazolyl, tetrazolyl, 1,2,3-thiadiazolyl, 1,2,3-oxadiazolyl, 1,2,4-triazolyl, 1,2,4-thiadiazolyl, 1,2,4-oxadiazolyl, 1,3,4-triazolyl, 1,3,4-thiadiazolyl, and 1,3,4-oxadiazolyl. A six-membered heteroaryl ring is a heteroaryl with a ring having six ring atoms wherein one or more (e.g., 1, 2, or 3) ring atoms are independently selected from N, O, and S. Exemplary six-membered ring heteroaryls are pyridyl, pyrazinyl, pyrimidinyl, triazinyl and pyridazinyl. "Heteroarylene" is a divalent heteroaryl group.

As used herein, "heterocycloalkyl" refers to non-aromatic monocyclic or polycyclic heterocycles having one or more ring-forming heteroatoms selected from O, N, or S. Included in heterocycloalkyl are monocyclic 4-, 5-, 6-, 7-, 8-, 9- or 10-membered heterocycloalkyl groups. Heterocycloalkyl groups can also include spirocycles. Example heterocycloalkyl groups include pyrrolidin-2-one, 1,3-isoxazolidin-2-one, pyranyl, tetrahydropuran, oxetanyl, azetidinyl, morpholino, thiomorpholino, piperazinyl, tetrahydrofuranyl, tetrahydrothienyl, piperidinyl, pyrrolidinyl, isoxazolidinyl, isothiazolidinyl, pyrazolidinyl, oxazolidinyl, thiazolidinyl, imidazolidinyl, azepanyl, benzazapene, and the like. Ring-forming carbon atoms and heteroatoms of a heterocycloalkyl group can be optionally substituted by 1 or 2 independently selected oxo or sulfido groups (e.g., C(O), S(O), C(S), or S(O)$_2$, etc.). The heterocycloalkyl group can be attached through a ring-forming carbon atom or a ring-forming heteroatom. In some embodiments, the heterocycloalkyl group contains 0 to 3 double bonds. In some embodiments, the heterocycloalkyl group contains 0 to 2 double bonds. Also included in the definition of heterocycloalkyl are moieties that have one or more aromatic rings fused (i.e., having a bond in common with) to the cycloalkyl ring, for example, benzo or thienyl derivatives of piperidine, morpholine, azepine, etc. A heterocycloalkyl group containing a fused aromatic ring can be attached through any ring-forming atom including a ring-forming atom of the fused aromatic ring. In some embodiments, the heterocycloalkyl is a monocyclic 4-6 membered heterocycloalkyl having 1 or 2 heteroatoms independently selected from nitrogen, oxygen, or sulfur and having one or more oxidized ring members. In some embodiments, the heterocycloalkyl is a monocyclic or bicyclic 4-10 membered heterocycloalkyl having 1, 2, 3, or 4 heteroatoms independently selected from nitrogen, oxygen, or sulfur and having one or more oxidized ring members. "Heterocycloalkylene" is a divalent heterocycloalkyl group.

At certain places, the definitions or embodiments refer to specific rings (e.g., an azetidine ring, a pyridine ring, etc.). Unless otherwise indicated, these rings can be attached to any ring member provided that the valency of the atom is not exceeded. For example, an azetidine ring may be attached at any position of the ring, whereas a pyridin-3-yl ring is attached at the 3-position.

As used herein, the term "oxo" refers to an oxygen atom as a divalent substituent, forming a carbonyl group when attached to a carbon (e.g., C=O), or attached to a heteroatom forming a sulfoxide or sulfone group.

The term "compound" as used herein is meant to include all stereoisomers, geometric isomers, tautomers, and isotopes of the structures depicted. Compounds herein identified by name or structure as one particular tautomeric form are intended to include other tautomeric forms unless otherwise specified.

The compounds described herein can be asymmetric (e.g., having one or more stereocenters). All stereoisomers, such as enantiomers and diastereomers, are intended unless otherwise indicated. Compounds of the present invention that contain asymmetrically substituted carbon atoms can be isolated in optically active or racemic forms. Methods on how to prepare optically active forms from optically inactive starting materials are known in the art, such as by resolution of racemic mixtures or by stereoselective synthesis. Many geometric isomers of olefins, C=N double bonds, N=N double bonds, and the like can also be present in the compounds described herein, and all such stable isomers are contemplated in the present invention. Cis and trans geometric isomers of the compounds of the present invention are described and may be isolated as a mixture of isomers or as separated isomeric forms. In some embodiments, the compound has the (R)-configuration. In some embodiments, the compound has the (S)-configuration.

Compounds provided herein also include tautomeric forms. Tautomeric forms result from the swapping of a single bond with an adjacent double bond together with the concomitant migration of a proton. Tautomeric forms include prototropic tautomers which are isomeric protonation states having the same empirical formula and total charge. Example prototropic tautomers include ketone—enol pairs, amide-imidic acid pairs, lactam—lactim pairs, enamine—imine pairs, and annular forms where a proton can occupy two or more positions of a heterocyclic system, for example, 1H- and 3H-imidazole, 1H-, 2H- and 4H-1,2,4-triazole, 1H- and 2H-isoindole, and 1H- and 2H-pyrazole. Tautomeric forms can be in equilibrium or sterically locked into one form by appropriate substitution.

As used herein, the term "cell" is meant to refer to a cell that is in vitro, ex vivo or in vivo. In some embodiments, an ex vivo cell can be part of a tissue sample excised from an organism such as a mammal. In some embodiments, an in vitro cell can be a cell in a cell culture. In some embodiments, an in vivo cell is a cell living in an organism such as a mammal.

As used herein, the term "contacting" refers to the bringing together of indicated moieties in an in vitro system or an in vivo system. For example, "contacting" the cell with a compound of the invention includes the administration of a compound of the present invention to an individual or patient, such as a human, having the cell, as well as, for example, introducing a compound of the invention into a sample containing a cellular or purified preparation containing the cell.

As used herein, the term "individual", "patient", or "subject" used interchangeably, refers to any animal, including mammals, preferably mice, rats, other rodents, rabbits, dogs, cats, swine, cattle, sheep, horses, or primates, and most preferably humans.

As used herein, the phrase "effective amount" or "therapeutically effective amount" refers to the amount of active compound or pharmaceutical agent that elicits the biological or medicinal response in a tissue, system, animal, individual or human that is being sought by a researcher, veterinarian, medical doctor or other clinician.

As used herein the term "treating" or "treatment" refers to 1) inhibiting the disease; for example, inhibiting a disease, condition or disorder in an individual who is experiencing or displaying the pathology or symptomatology of the disease, condition or disorder (i.e., arresting further development of the pathology and/or symptomatology), or 2) ameliorating the disease; for example, ameliorating a disease, condition or disorder in an individual who is experiencing or displaying the pathology or symptomatology of the disease, condition or disorder (i.e., reversing the pathology and/or symptomatology).

As used herein, the term "preventing" or "prevention" of a disease, condition or disorder refers to decreasing the risk of occurrence of the disease, condition or disorder in a subject or group of subjects (e.g., a subject or group of subjects predisposed to or susceptible to the disease, condition or disorder). In some embodiments, preventing a disease, condition or disorder refers to decreasing the possibility of acquiring the disease, condition or disorder and/or its associated symptoms. In some embodiments, preventing a disease, condition or disorder refers to completely or almost completely stopping the disease, condition or disorder from occurring.

EXAMPLES

Materials and Methods

Reagents: OBT was purchased from Gaia Chemicals. N-acetyl-L-cysteine, dithiothreitol, L-glutathione, tert-butylhydroquinone, N-ethylmaleimide, dithiothreitol, iodoacetamide, Cinnamaldehyde, diethyl fumarate and sulforaphane were purchased from Sigma-Aldrich. Trolox, sulfasalazine, CDDO-Me and MG-132 were purchased from Cayman Chemical. Non-targeting shRNA control (shCtrl) and shRNA constructs targeting Keap1 (TRCN0000156676) and CUL3 (TRCN0000012778) were purchased from Sigma and packaged into lentiviral vectors using standard protocols.

Cell culture: MDA-MB-231 and U87 (U87-MG) cells were obtained from the American Type Culture Collection (ATCC). 293T human embryonic kidney fibroblasts were provided by Dr. Xandra Breakefield (Massachusetts General Hospital). All three cell lines were grown in Dulbecco's modified Eagle medium supplemented with 10% fetal bovine serum (Gemini Bio-products), 100 U penicillin, and 0.1 mg/mL streptomycin (Sigma). All cells were maintained at 37° C. in a humidified 5% CO2 incubator. GSCs were obtained from tumor tissues of GBM patients following surgical resection, under approval from the corresponding Institutional Review Board. These cells have been previously characterized (ref. 37-39) and were maintained in culture as neurospheres in Neurobasal medium (Gibco) supplemented with heparin (2 μg/mL; Sigma) and recombinant EGF (20 ng/mL) and bFGF-2 (10 ng/mL; Peprotech). Human Astrocytes were obtained from ScienCell and cultured in Astrocytes Medium (ScienCell)

Cell viability: Cells were plated in 96-well plates and treated with the corresponding compounds. Cell viability was measured by adding 25 μl/well of CellTiter-Glo (Promega) followed by 10 minutes incubation and transfer to a white 96-well plate. Bioluminescence was quantified using Synergy HTX multimode reader (Biotek).

Statistical analysis: GraphPad Prism v6.01 software (La-Jolla, CA) was used for statistical analysis of all data. A p-value less than 0.05 was considered to be statistically significant. For analysis between multiple groups, a two-tailed Student's t test (unpaired), ANOVA, and Tukey's post-hoc test was performed as indicated. All experiments were performed at least in 3-replicates and repeated 3 independent times.

DNA expression constructs: ARE reporter was designed and generated based on our previously published reporter for monitoring of the transcription factor Nuclear Factor Kappa B (NFkB). NFkB TRE elements were removed and replaced with four copies of the ARE enhancer sequence. This reporter consists of a CSCW lentivirus vector in which we have introduced two copies of the 1.2 kb chicken beta-globin (HS4) insulator elements, a TATA box acting as a minimal promoter upstream of the secreted *Gaussia* luciferase (Gluc). pcDNA3-HA2-Keap1 (Addgene plasmid #21556) and pcDNA3-HA2-Keap1 delta BTB (Addgene plasmid #21593) were a gift from Yue Xiong[2]. pHAGE DN Cullin 3 (DN-CUL3) was a gift from Stephen Elledge (Addgene plasmid #41913). Constructs expressing constitutively active Gluc, Firefly luciferase (Fluc) and *Vargula* luciferase (Vluc) were previously describe. MISSION shRNA Bacterial Glycerol Stocks for Keap1 as well as a non-target shRNA were obtained from Sigma. Transfection of plasmid DNA was performed using Lipofectamine 2000 (Invitrogen) as per manufacturer's guidelines. Lentivirus packaging and titration was performed in 293T cells by the MGH viral vector core facility following standard protocols. Keap1 mutant $C_{151}S$ plasmid was kindly provided by Dr. Wooyoung Hur.

Luciferase assay: Coelenterazine (20 μM; Nanolight), The Gluc substrate was added to a 25 μL aliquot of conditioned medium and photon counts were measured using a luminometer. Similarly, the secreted Vluc activity was measured by adding its substrate vargulin (5 ng/mL; Nanolight). Cells stably expressing Gluc under the ARE enhancer sequence and Vluc under the constitutively active SV40 minimal promoter were used to determine the ARE reporter activity. The normalized Gluc/Vluc ratio was used as a marker for ARE activation.

Pharmacokinetics studies: These studies were performed by SAI Lifesciences using Male Swiss Albino mice. OBT was resuspended in a solution formulation of 10% DMA, 10% EtOH, 10% PEG400 in 70% of (2-hydroxypropyl)-O-cyclodextrin (HPβCD). OBT was administered by intraperitoneal (i.p.) injection at 7.5 mg/kg. Blood samples were collected from mice, at 0, 0.08, 0.25, 0.5, 1, 2, 4, 8 and 24 hr. Immediately after blood collection, plasma was harvested by centrifugation and stored until analysis. After collection of blood, brain samples were collected from each mouse at 0.5, 4 and 24 h. Tissue samples were homogenized using ice-cold phosphate buffer saline (pH7.4) and homogenates were stored until analysis. Total homogenate volume was three times the tissue weight. Plasma samples were quantified by LC-MS/MS method (LLOQ=1.00 ng/mL) for plasma and brain.

Immunoblotting and Immunoprecipitation analysis: Antibodies against PDI, GAPDH, HA-tag, Ubiquitin, Keap1 and beta-actin (Cell Signaling) as well as secondary Horseradish peroxidase (HRP) conjugated antibodies: sheep anti-mouse IgG-HRP and donkey antirabbit IgG-HRP (Amersham Pharmacia Biotech) were used in this study. For protein expression analysis, cells were lysed in RIPA buffer (150 mM NaCl, 50 mM TRIS, pH 8.0, 1% NP-40, 0.5% deoxycholate, 0.1% SDS) supplemented with 1× protease inhibitors cocktail (Roche). Proteins were quantified using a Bradford protein determination assay (Bio-Rad) followed by electrophoresis in 10% NuPAGE Bis-Tris gels (Life Technologies) and transfer to nitrocellulose membranes (Bio-Rad). Membranes were incubated overnight with antibodies in 1-5% non-fat milk powder in PBS/0.5% TWEEN. Proteins were detected with SuperSignal West Pico Chemiluminescent Substrate (Pierce). For immunoprecipitation assays, cells were lysed in RIPA buffer supplemented with protease inhibitors and 2 mM N-ethylmaleimide. Cell lysates were pre-cleared with protein A agarose beads (Cell Signaling) and incubated with anti-HA antibody with gentle rocking overnight at 4° C. followed by incubation with protein A agarose beads and subsequent washing and elution steps. Electrophoresis, transfer and immunoblot analysis was performed as described above.

Real-time qRT-PCR: Total RNA isolation from cultured cells was performed using RNeasy kit (Qiagen), followed by reverse transcription with OneScript cDNA synthesis Kit (ABM). mRNA expression of different genes was then analyzed by quantitative PCR using PowerUp SYBR Green Master Mix (Applied Biosystems) and performed using a QuantStudio3 real-time PCR system (Applied Biosystems). Primer sequences for HO1, NQO1, TXNRD2 were obtained from the MGH primer bank and were as follows: HO1 Forward, 5'-AAGACTGCGTTCCTGCTCAAC-3' and reverse 5'-AAAGCCCTACAGCAACTGTCG-3'; NQO1 Forward 5'-GAAGAGCACTGATCGTACTGGC-3' and reverse 5'-GGATACTGAAAGTTCGCAGGG-3' and Txnrd2 forward 5'-CTAGCCCCGACACTCAGAAGA-3 and reverse 5'-GGCCATGATCGCTATGGGT. Oligonucleotides were synthesized by the CCIB DNA Core Facility at Massachusetts General Hospital. Expression of human GAPDH was used to mRNA normalization and relative mRNA expression was calculated using the comparative Ct method.

In vivo Tumor Models: Animal experiments performed by our laboratory were approved by the Massachusetts General Hospital Subcommittee on Research Animal Care. Female athymic nude mice (6-8 weeks) were used in all studies with the exception of pharmacokinetics analysis. For brain tumors xenograft model, GBM8 cells ($1 \times 10^5$ cells/mouse) stably expressing Fluc were stereotactically implanted into the left striatum of animals. Following implantation, animals were regularly imaged for Fluc to monitor brain tumor growth. To generate the breast cancer model, MDA-MB-231 cells ($2.5 \times 10^5$ cells/mouse) expressing Fluc were mixed with Matrigel 1:1 (v/v) (BD Matrigel) and injected into the mammary fat pad of mice. Tris-OBT was dissolved in PBS and administered intraperitoneally. Tumor volumes were measured using a caliper and calculated according to the following formula: volume=(width)$^2$×length/2. For Fluc bioluminescence imaging, Fluc substrate, D-luciferin (Gold Biotechnology) (150 mg/kg body weight diluted in PBS) was injected i.p. and animals were imaged using an IVIS Spectrum optical imaging system (Caliper Life Sciences) under isofluorane gas anesthesia.

FDG-PET imaging: Mouse PET/CT scans (n=6, 3 per group) were performed sequentially using a custom-designed mouse bed and PET/CT gantry adapter. Mice were injected intravenously through the tail vein with approximately 600 uCi of fluorodeoxyglucose (F-18-FDG) and imaged on the Inveon small animal imaging system (Siemens Healthcare, Malvern, PA) for positron emission computed tomography and computed tomography (PET-CT) ~45 minutes after injection. Isovue 370 (Bracco Diagnostics, East Princeton, NJ) CT contrast was administered through a tail vein catheter at a rate of 10 ul/min for the duration of the 10 min CT scan for a total volume of 200 ul per mouse, prior to the acquisition of PET images. CT images were acquired over 360 projection with a 500 uA 80 kVp cone beam x-ray tube and a flat panel CMOS detector and reconstructed with a modified Feldkamp cone beam reconstruction algorithm (COBRA) (Exxim Computing Company, Pleasanton, CA) into a 110 micron isotropic voxel matrix. The PET scan was acquired over 30 minutes and reconstructed by filtered back projection with Fourier rebinning and a ramp filter with a Nyquist cutoff frequency of 0.5. The contrast-enhanced CT images were used to identify the location of the tumor and delineate its margins as regions-of-interest (ROI). The same ROIs are then copied to the matching PET images for quantification of the $^{18}$F-FDG PET signal as the standard uptake values (SUVs). The SUVs of the tumor are then divided by the SUVs of muscle for each mouse to normalize differences between animals.

Compound purification and characterization: Thin layer chromatography was performed with precoated aluminum-backed TLC plates (Silica XG Plates, w/UV254, 200 uM, 20×20 cm) obtained from Sorbtech Sorbent Technologies. Visualization of TLC plates was performed with a UVGL-25 Compact UV Lamp (4 watt, 254/365 nm, 115 V ~60 Hz/0.16 Amps). Flash column chromatography was performed on a Biotage Isolera Four Flash Purification System equipped with a 200-400 nm diode array detector using Sorbtech Sorbent Technologies Purity Flash Cartridges (Spherical Silica Gel 12 g, 20-45 uM, 70 A). Purity of compounds was determined by analytical LC-ELSD-MS performed on a Waters 2545 HPLC equipped with a 2998 diode array detector and a Waters 3100 ESI-MS module, using a XTerraMS C18 5 µm, 4.6×50 mm column at a flow rate of 5 mL/min with a linear gradient (95% A/5% B →100% B with 90 s and 30 s hold at 100% B, solvent A=water+0.1% formic acid, solvent B=acetonitrile+0.1% formic acid). 41 and $^{13}$C NMR spectra were recorded on a Bruker Ascend™ spectrometer at 400 and 100 MHz, respectively. Chemical shifts for protons are reported in parts per million (ppm) and are referenced to residual solvent peaks for CHCl$_3$ (7.26 ppm). Data is reported as follows: chemical shift, multiplicity (s=singlet, d=doublet, t=triplet, q=quadruplet, m=multiplet, br=broad), coupling constants (Hz), and integration.

Differential Alkylation for OBT Binding Characterization: 10 µg of bovine catalase (Sigma-Aldrich) was suspended in 100 µl of 50 mM HEPES (pH 8.5)/0.5% SDS and OBT, iodoacetamide (IAA), or N-ethylmaleimide (NEM) was added to a final concentration of 5 mM and the mixtures were incubated for 30 min at RT in the dark before adding IAA to all three reactions to a final concentration of 10 mM in the sample treated with IAA in the first alkylation step, and of 5 mM in the other two samples. Upon incubation at RT for 30 min in the dark dithiothreitol (DTT) was added to all reaction to a final concentration of 20 mM and the reactions were first incubated at RT in the dark for 15 min and then at 56° C. for 30 min. Then, NEM was added to all reactions to a final concentration of 100 mM followed by incubation at RT in the dark for 30 min. The experiments were done in triplicate. Samples were analyzed by mass spectrometry as described below.

Quantitative Proteomics: Cell pellets were lysed in a buffer of 75 mM NaCl, 50 mM HEPES pH 8.5, 10 mM sodium pyrophosphate, 10 mM sodium fluoride, 10 mM β-glycerophosphate, 10 mM sodium orthovanadate, 10 mM PMSF, Roche complete mini EDTA free protease inhibitors (1 tablet per 20 ml), and 3% SDS. Lysis was achieved by passing the suspension through a 21-gauge needle 20 times. Proteins were prepared for proteomics analysis as described previously. Proteins from the lysates or the differential alkylation experiments were reduced with DTT; free thiols were alkylated with iodoacetamide; proteins were purified by MeOH/CHCl$_3$ precipitation and digested with Lys-C and trypsin, and peptides were labeled with TMT-10plex reagents (Thermo Scientific). Labeled peptide mixtures were pooled, and for the cell line samples, they were fractionated by basic reversed-phase HPLC as described previously. Twelve fractions were analyzed by multiplexed quantitative proteomics performed on an Orbitrap Fusion mass spectrometer (Thermo Scientifc) using a Simultaneous Precursor Selection (SPS) based MS3 method. Proteins from the differential alkylation experiments were not fractionated prior to analysis by mass spectrometry. MS2 spectra were assigned using a SEQUEST-based proteomics analysis platform. Cysteine residues were allowed to either carry an IAA (mass increment, 57.021464) or an NEM remnant (mass increment, 229.162932). Peptide and protein assignments were filtered to a false discovery rate of <1% employing the target-decoy database search strategy and using linear discriminant analysis and posterior error histogram sorting. Peptides with sequences contained in more than one protein sequence from the UniProt database were assigned to the protein with most matching peptides. We extracted TMT reporter ion intensities as those of the most intense ions within a 0.03 Th window around the predicted reporter ion intensities in the collected MS3 spectra. For the cell line samples only MS3 with an average signal-to-noise value of larger than 40 per reporter ion as well as with an isolation specificity of larger than 0.75 were considered for quantification. Only isolation specificity filtering was used when analyzing the data from the differential alkylation experiments. A two-step normalization of the protein TMT-intensities was performed by first normalizing the protein intensities over all acquired TMT channels for each protein based on the median average protein intensity calculated for all proteins. To correct for slight mixing errors of the peptide mixture from each sample a median of the normalized intensities was calculated from all protein intensities in each TMT channel and the protein intensities were normalized to the median value of these median intensities. For the samples from the differential alkylation experiments the latter normalization was done only considering peptides not carrying a cysteine residue.

Example 1—OBT Forms Reversible Covalent Adducts with Thiols

Figure 2A:
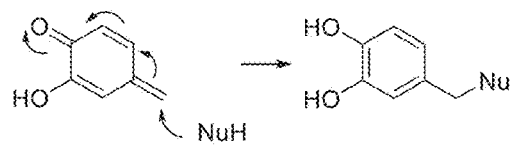
FIG. 2. Reactivity of OBT and exemplified compounds. (A) OBT features a hydroxy para-quinone methide, which readily reacts with nucleophilesunder the formation of catechols. (B) Glutathione (GSH) reacts with the quinone methide compound SI1 to form two distinct diastereomeric pairs derived from direct (SI2a, SI2b) and vinylogous (SI3a, SI3b) addition. (C) OBT reacts with beta-mercaptoethanol (BME) forming the products derived from direct (AF20a) and vinylogous (AF20b) addition to the quinone-methide core (individual enantiomers are not shown). Addition of excess cystamine to AF20 results in displacement of BME and the formation of SI4a and SI4b.
Figure 2B:
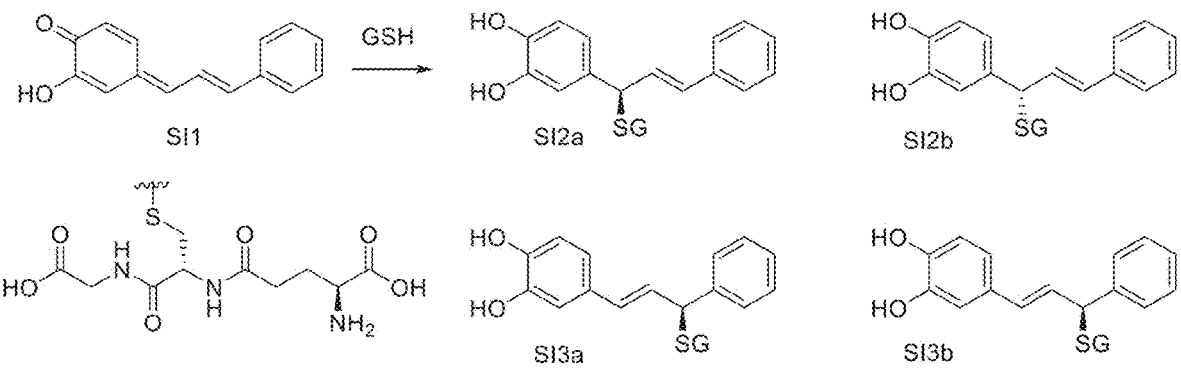
Figure 2C:
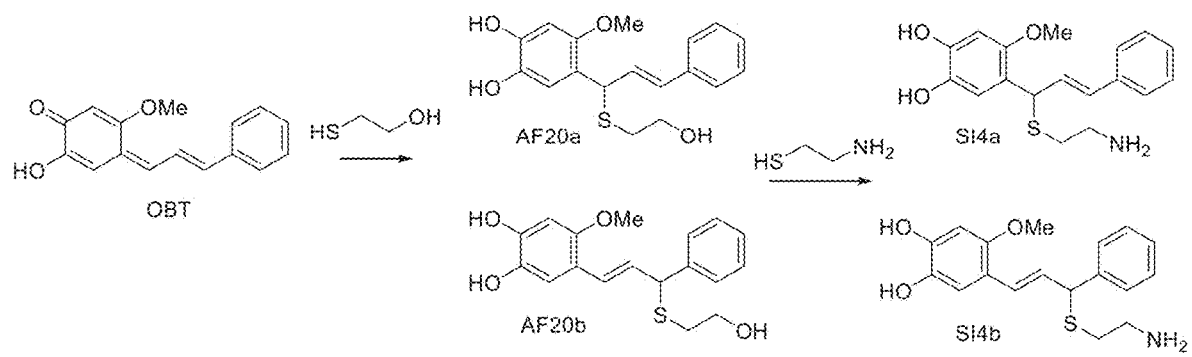
Figure 3:
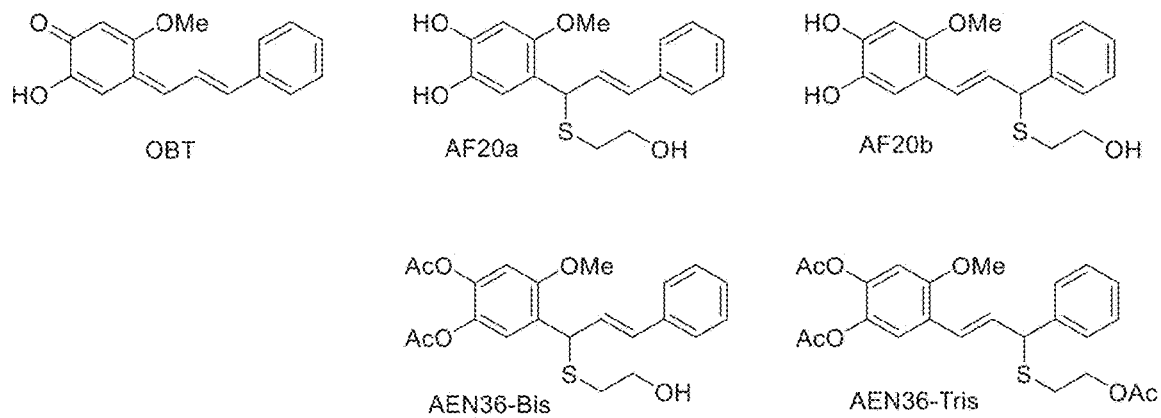
FIG. 3 contains chemical structures of prodrugs of OBT.

OBT features a 2-hydroxy para-quinone methide, a moiety found in other natural products such as Celastrol (ref 9), which efficiently reacts with thiol nucleophiles including cysteine side chains to form substituted catechols (FIG. 2A). It has previously been shown that the desmethoxy analog of OBT SI1 (FIG. 2B) reacts with glutathione (GSH) in aqueous buffer to form four distinct addition products, corresponding to the diastereomers derived from direct SI2a,b and vinylogous SI1a,b addition (Ref. 10). To demonstrate that OBT retains the ability to form sulfhydryl adducts, OBT was incubated with β-mercaptoethanol (BME) in ethanol and found that BME was readily added to OBT, preferentially (10:1) forming the direct addition product of the vinylogous addition product (AF20: AF20a and AF20b, FIG. 3). To investigate the reversibility of the thionucleophile addition to OBT, AF20 in the presence of 5-fold excess cysteamine. Monitoring the reaction mix by LC/MS showed the formation of the corresponding amine functionalized analogs SI4a and SI4b (FIG. 2C), demonstrating that the addition of thiols is reversible or that the substitution proceeds through an SN2' mechanism, and that the corresponding adducts exist in a dynamic equilibrium (FIG. 2C).

Figure 4A:
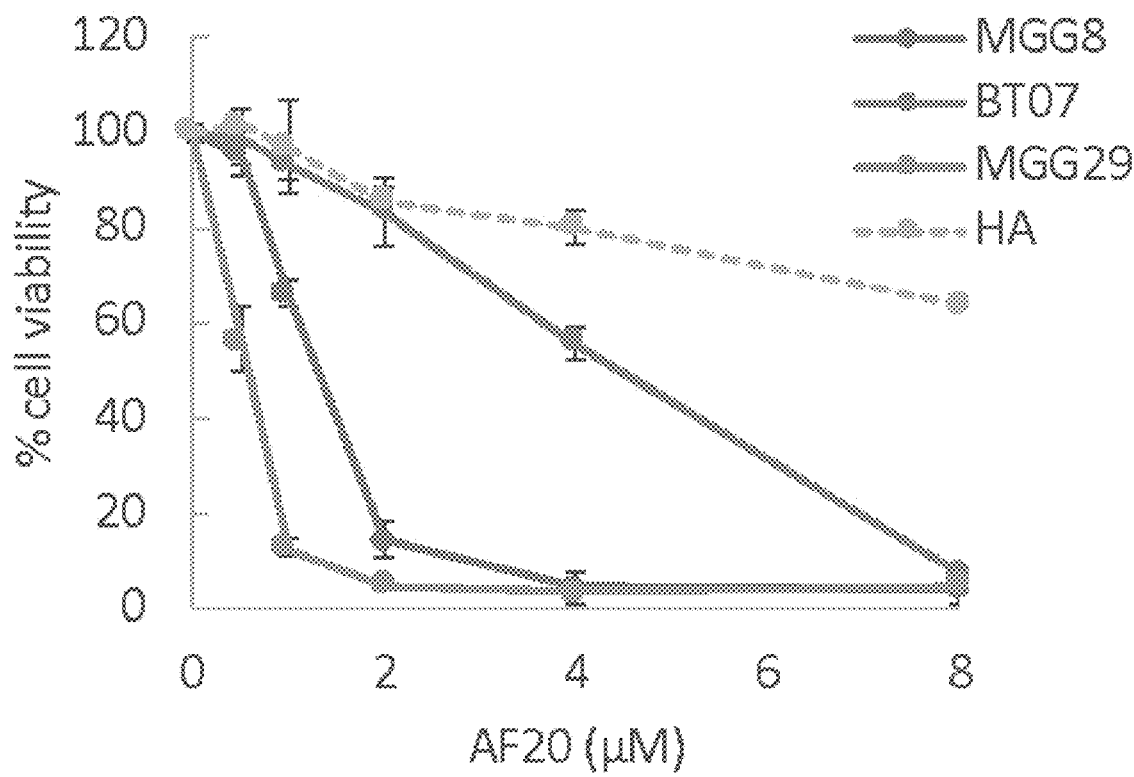
FIG. 4 Efficacy of prodrugs of OBT. (A) Different GSCs (MGG8; BT07 and MGG29) and normal human astrocytes (HA) were treated with AF20 at the indicated doses. Cell viability was measured four days after treatment and expressed as percentage of control. (B) U87 glioma cells were treated with OBT or AF20 in the presence or absence of NAC (3 mM) and cell viability was measured 48 h later. (C) U87 cells were treated with different doses of OBT or analogs and cell viability was measured four days later and expressed as percentage of vehicle control; *P<0.05 Student t test; statistical significance depicts the difference in cell viability between OBT and its analogs FIG. 5 Characterization of OBT and its derivatives as reversible cysteine modifying drugs. MDA-MB231 cells were treated with different doses of OBT or analogs in 4-replicates and cell viability was measured four days later and expressed as % of vehicle control. *P<0.05 Student t test versus OBT.
Figure 4B:
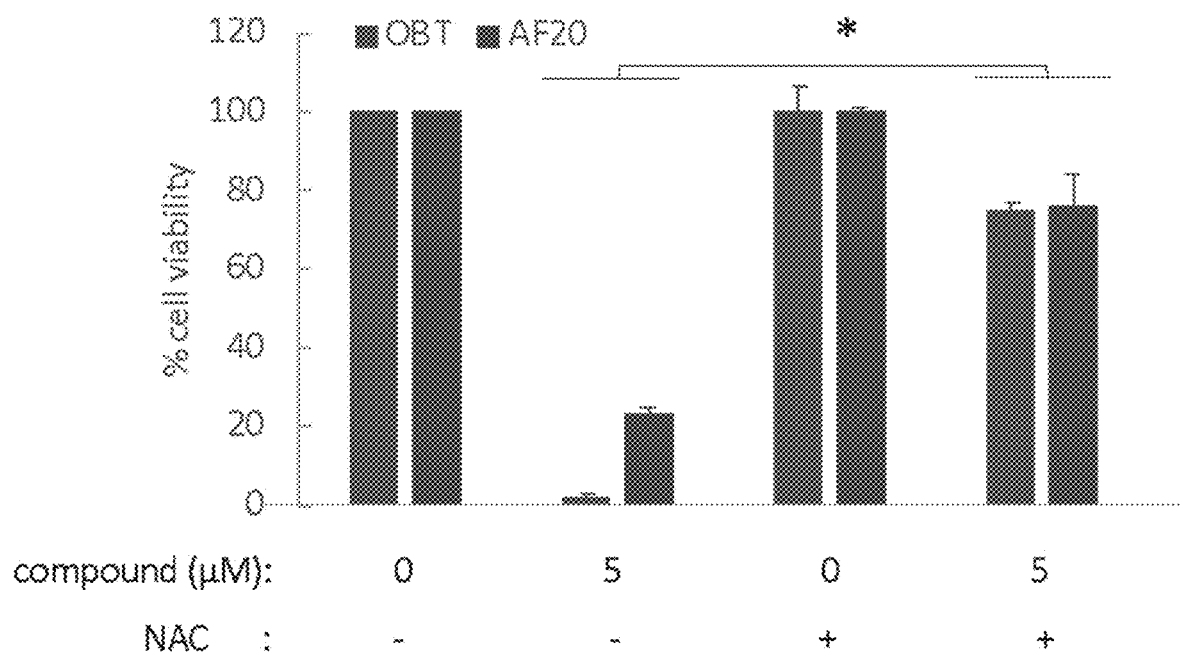

Novel compounds AF20a, AF20b, AEN-36-Bis, and AEN36-Tris possess improved pharmacological properties compared to OBT, overcome the limited solubility of OBT in aqueous media, and buffer the abrupt oxidative stress as a result of rapid depletion of the intracellular GSH pool caused by thiol-reactive compounds (Ref. 11). Addition of GSH or N-acetyl cysteine (NAC) reduces the activity of OBT in cell culture, likely by extracellular scavenging of OBT (Ref. 8). Based on the hypothesis that the ability to react with cysteine side chains is critical for OBT's activity, it was postulated that prodrugs designed to liberate OBT or analogs that retain the ability to react with cysteines yield improved inhibitors, including compounds with enhanced solubility, while mitigating the general toxicity as a result of GSH depletion by OBT. AF20, the adduct of OBT and BME, which is more soluble and liberates OBT in PBS, potently killed patient-derived glioma stem-like cells ("GSCs") neurospheres, while exhibiting lower toxicity towards primary human astrocytes (HA) (FIG. 4A) (Ref 8). As previously observed with OBT, the activity of AF20 is reversed in the presence of NAC (FIG. 4B). These results are consistent with the proposed mechanism that AF20 converts to OBT as active compound and that NAC may not only function as a ROS antagonist but also as a direct scavenger of OBT.

Figure 4C:
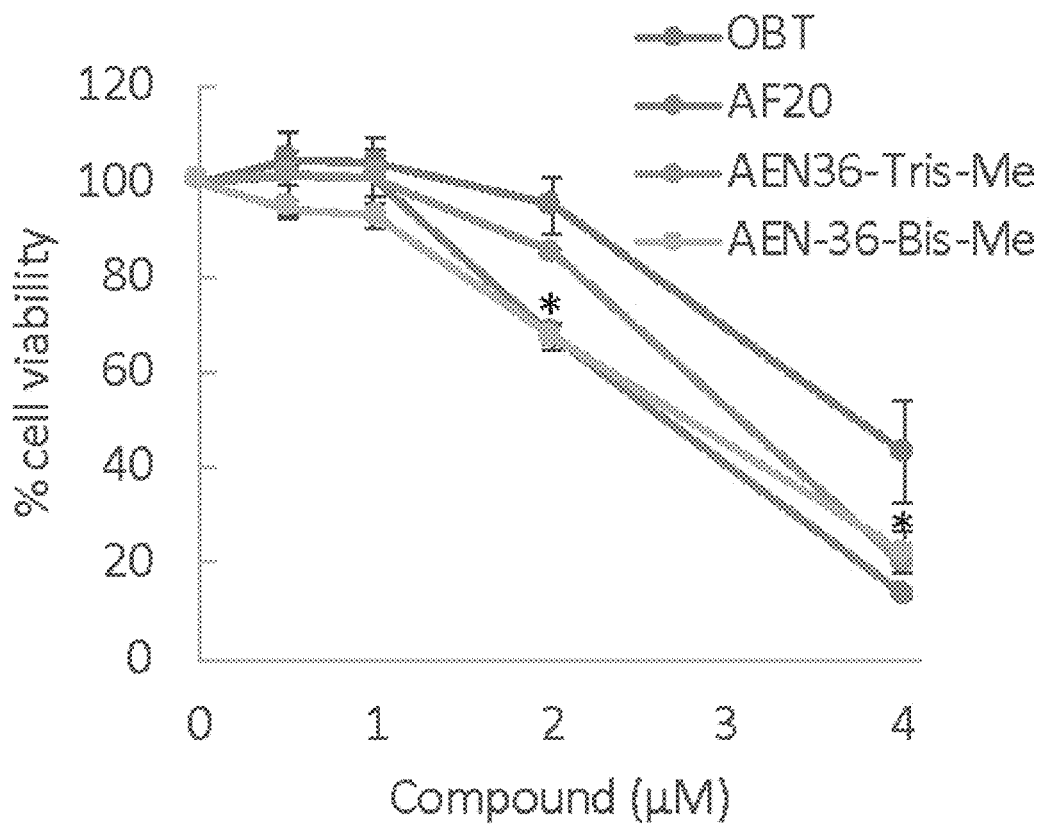
Figure 5:
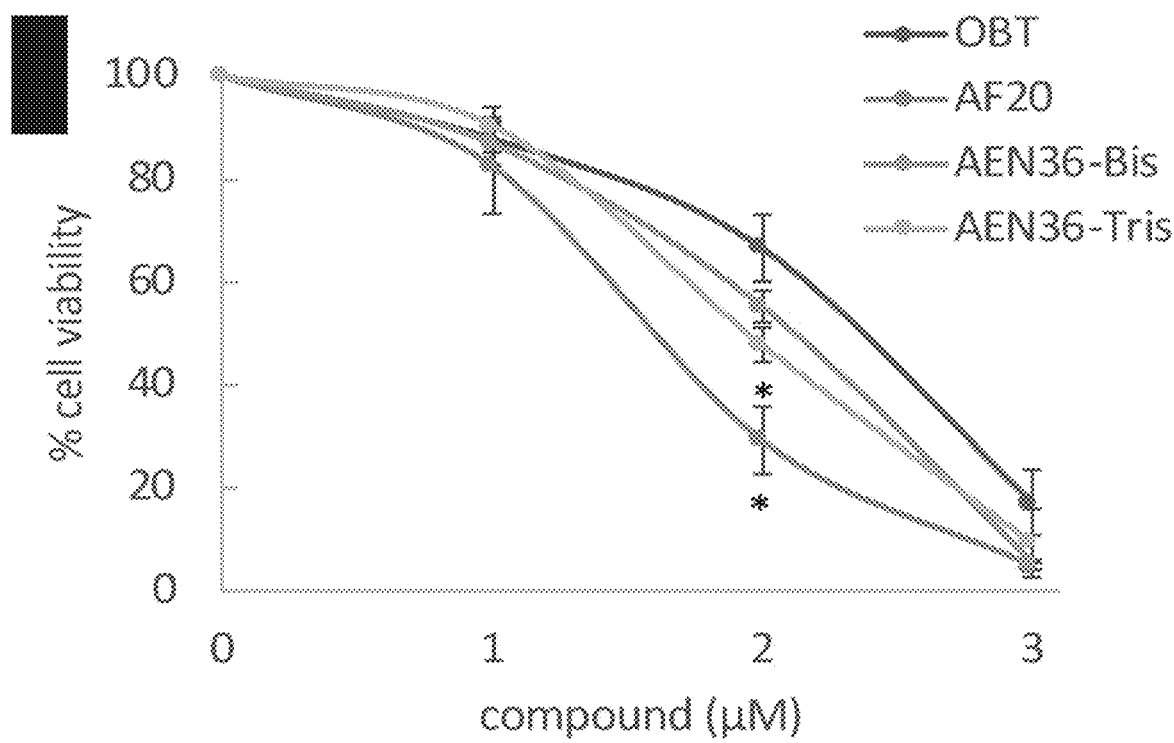

Acetylation of the catechol stabilizes the thiol adduct in aqueous media and blocks the direct reversibility observed with AF20. However, phenolic esters are cleaved intracellularly allowing for intracellular release of OBT via AF20 or following displacement by an $S_N2'$ mechanism. Treatment of AF20 with 2 eq. and 3 eq. acetic anhydride yielded AEN36 Bis and AEN36 Tris (FIG. 3), respectively. Both compounds demonstrated increased stability and increased potency on different cancer cells as compared to OBT (FIG. 5 and FIG. 4C).

Figure 6A:
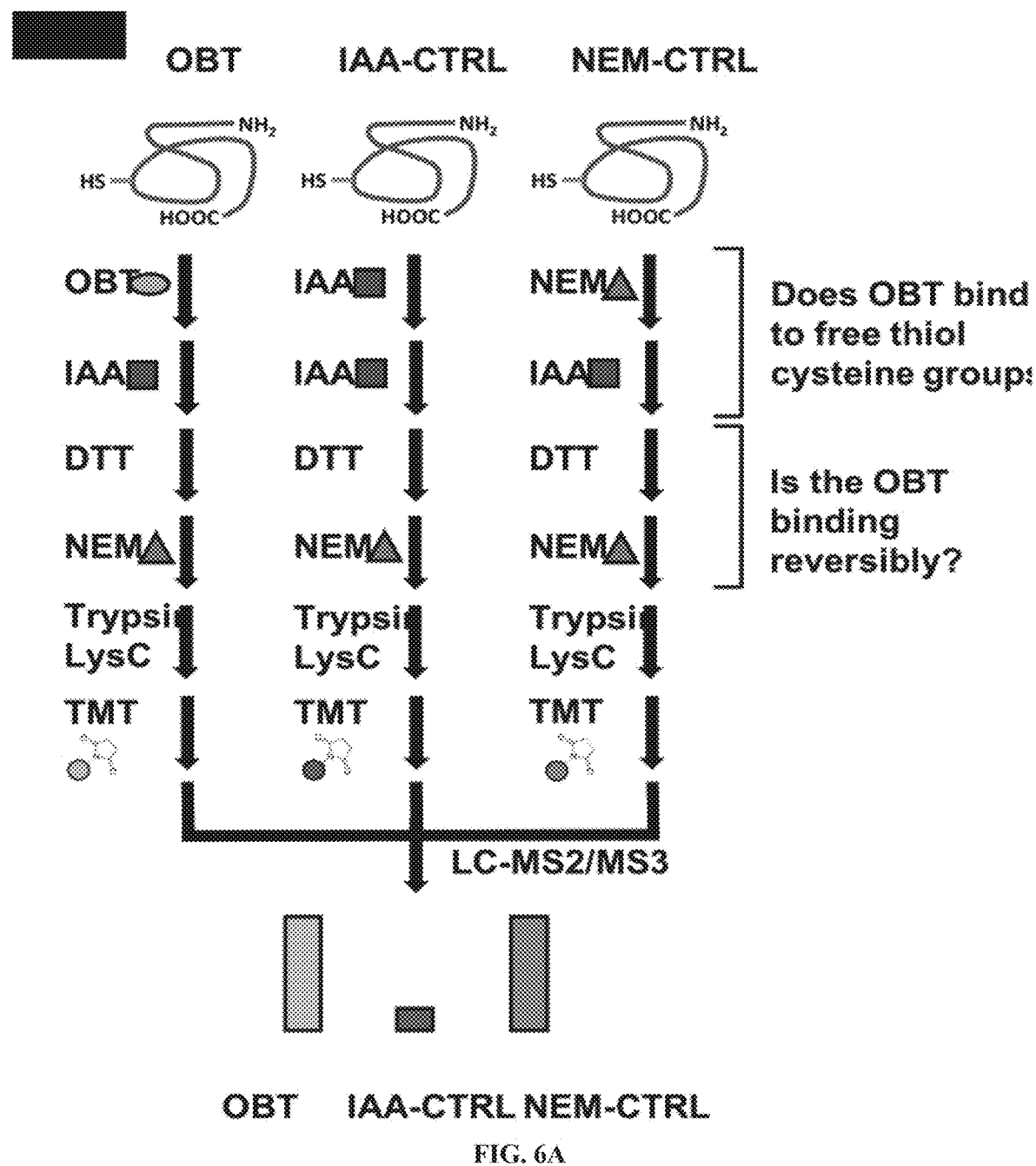
FIG. 6A. Characterization of OBT and its derivatives as reversible cysteine modifying drugs. An overview of the mass spectrometry-based approach to interrogate OBT binding to cysteine residues. OBT is given to the protein and will or will not react free thiol groups. In a second step, an alkylating reagent, iodoacetamide (IAA), is added to the mixture, which will react with free thiols if they are not blocked by OBT. In a third step a reductant, dithiothreitol (DTT), is added to the mixture. If OBT binding is reversible under these reductive conditions, free thiol groups will be available for reaction with another alkylating reagent, N-ethylmaleimide (NEM), added in the last step. The combined reaction product is digested, and peptides are subjected to mass spectrometry followed by multiplexed quantitative proteomics to determine for each cysteine if OBT did bind to it and if this binding can be reversed; results are compared to 2 controls (1) sample with protein alkylated only with IAA and (2) sample alkylated only with NEM. Each cysteine-containing peptide will reveal a certain intensity pattern across the three samples allowing to determine site-specific binding activity of OBT.
Figure 6B:
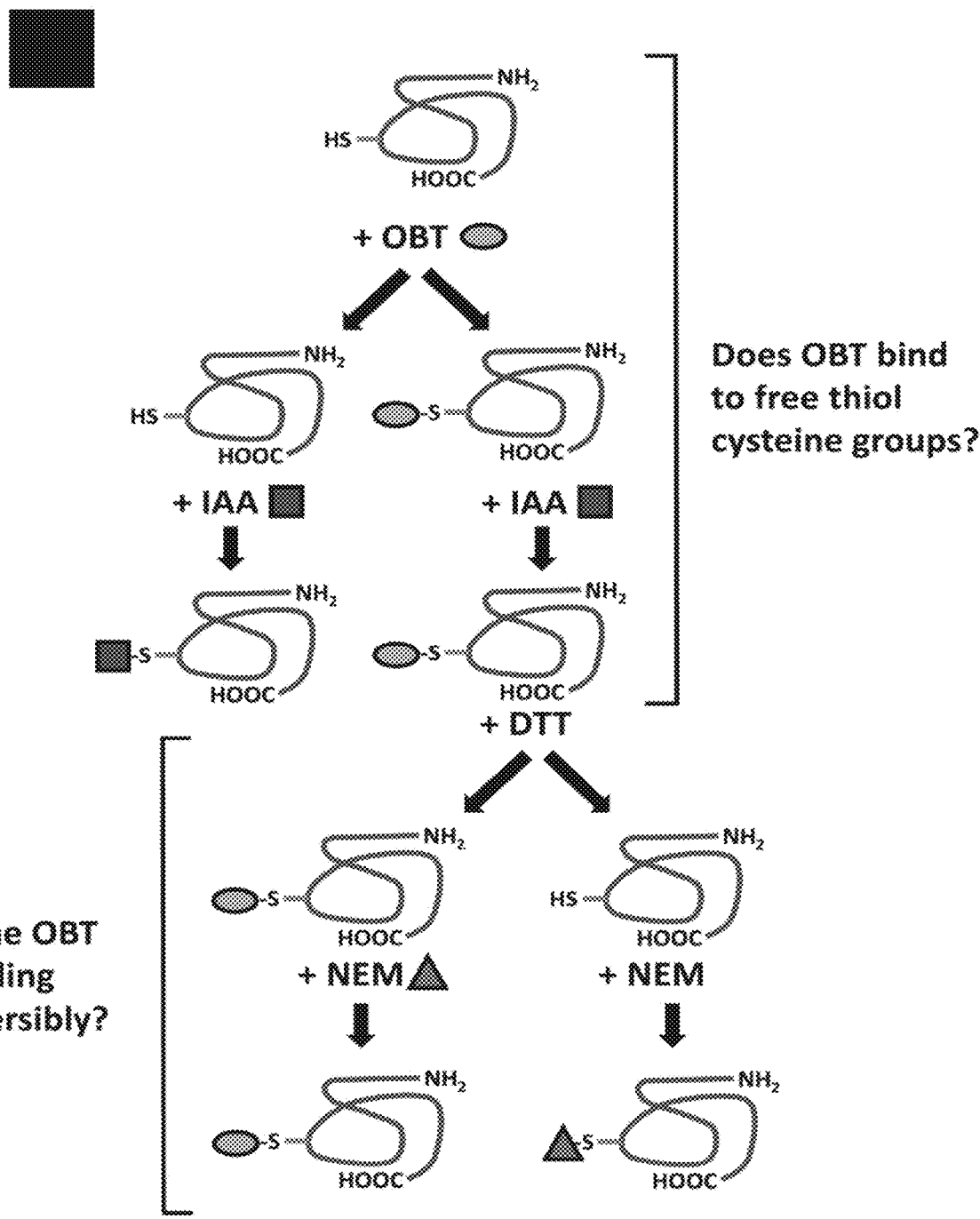
FIG. 6B Characterization of OBT and its derivatives as reversible cysteine modifying drugs. Potential outcomes for OBT treated sample in the differential alkylation reaction process discussed for FIG. 6A.
Figure 6C:
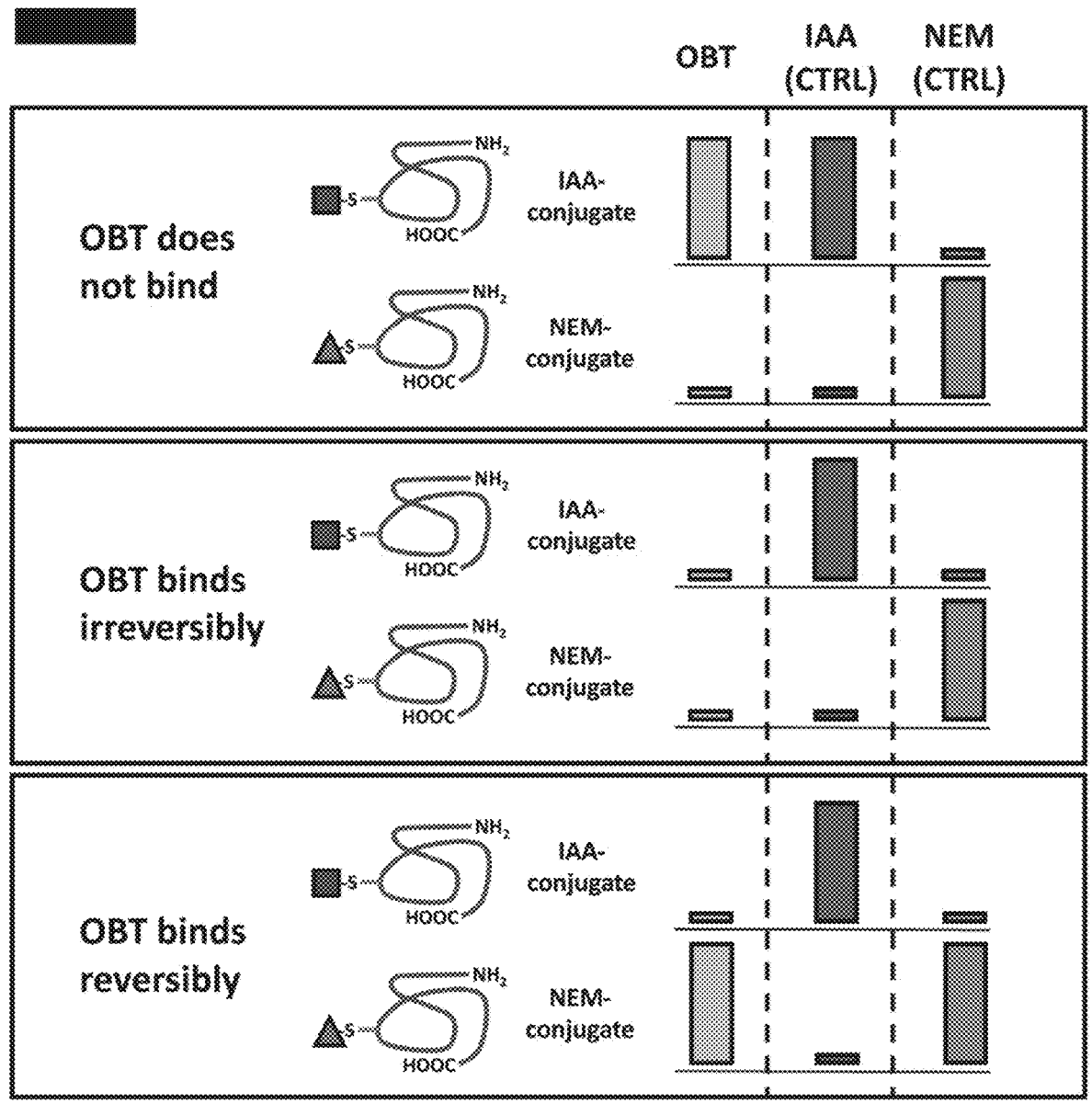
FIG. 6C Characterization of OBT and its derivatives as reversible cysteine modifying drugs. Multiplexed mass spectrometry is used to quantify peptides containing only cysteine residue generated from a consecutive trypsin and LysC digest across all samples. Quantifying IAA and NEM modified peptides across all three samples produces unique patterns of peptide intensities for each of the three options: (i) OBT does not bind, (ii) OBT binds irreversibly, and (iii) OBT binds reversibly.
Figure 6D:
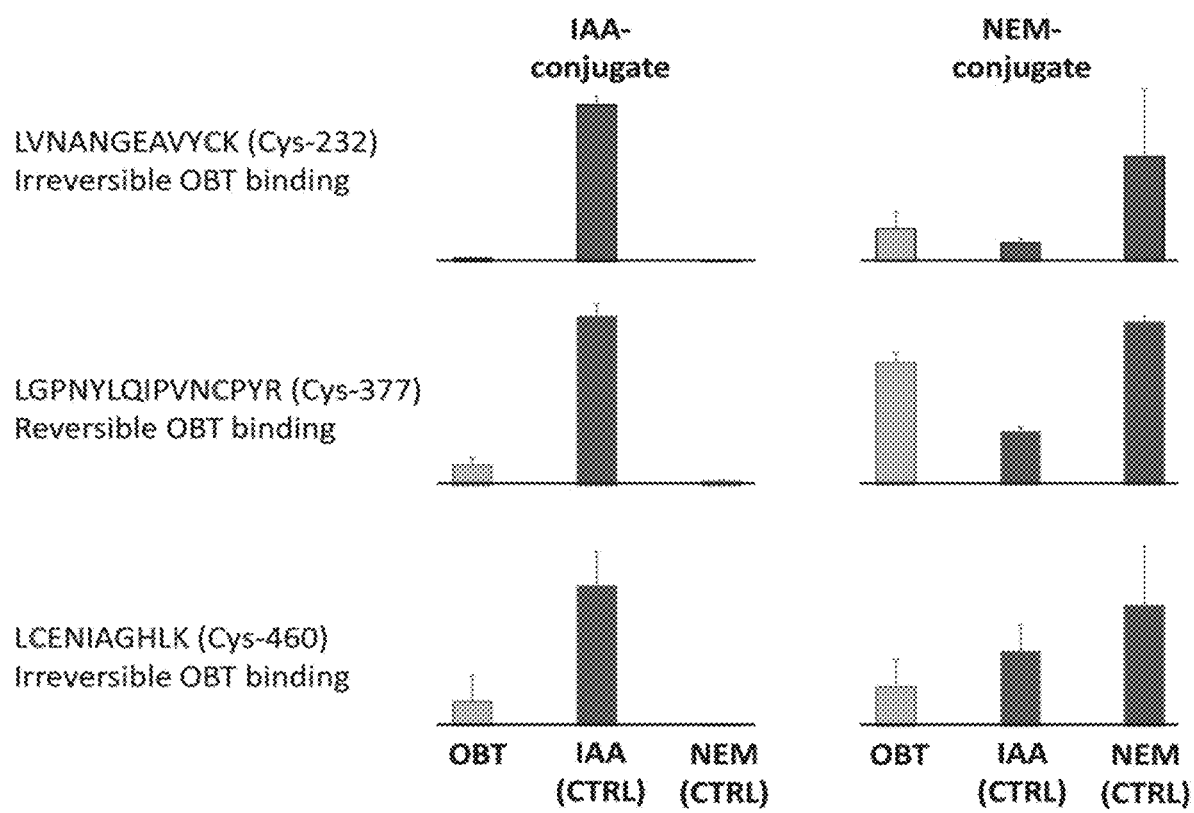
FIG. 6D Characterization of OBT and its derivatives as reversible cysteine modifying drugs. Differential alkylation was used on bovine catalase to study OBT-binding properties. The IAA conjugate intensity patterns showed that OBT reacted with all three identified cysteines (Cys-232, 377, and 460). The NEM-conjugate patterns showed that binding was irreversible for cysteines 232 and 460 but reversible for cysteine 377 under these experimental conditions.

To confirm reversible cysteine modification by OBT, a mass spectrometry-based approach was established that allows the identification of specific cysteine side chains in native proteins that covalently react with OBT and differentiate reversible from irreversible interactions. The experimental set-up is outlined in FIGS. 6A and 6B, and the potential outcome in FIG. 6C. The method is based on serial exposure of a protein to OBT, the cysteine-alkylating reagents iodoacetamide (IAA) to monitor derivatization with OBT, to dithiothreitol (DTT) to probe reversibility of OBT binding, and to another alkylating reagent, N-methylmaleimide (NEM), to allow a readout of probing the reversibility. In two parallel reactions, OBT is replaced by IAA and NEM. These reactions are used as standards to enable a final reaction read-out by multiplexed quantitative mass spectrometry (Refs. 12 and 13). A rule was established to allow an unambiguous interpretation of the data and assigned three different binding types for OBT: (1) irreversible binding, with OBT and IAA channels at an intensity at least 2-fold lower than the NEM channel, and the OBT channel not being significantly ($p \leq 0.01$) higher than the IAA channel intensity; (2) partially reversible binding, as irreversible binding but with an OBT channel intensity significantly higher than the IAA intensity; (3) undefined binding, the IAA channel intensity is at least as high as the NEM channel intensity. We performed this experiment using bovine catalase, a cysteine-rich antioxidant (FIG. 6E), and found that OBT binds to all detected peptides with cysteine residues (FIG. 6D). For Cys-377, where the cysteine is followed by a proline in the protein sequence, we observed reversible binding, while the two other monitored cysteine residues (Cys-232 and Cys-460), showed tight or irreversible binding under the tested reaction conditions (FIG. 6D). Unexpectedly, high IAA signal was observed in the NEM-conjugate, which could be attributed to deviations in the experimentally determined and predicted intensity patterns, likely due to disulfide bonds reduced and re-alkylated during the experiment. These results show that OBT is an effective cysteine-alkylating reagent and that the alkylation is reversible but might depend on structure of peptide or amino acids adjacent to cysteine residue, binding affinity and/or dissociation kinetics. It is to be noted that reversibility was determined under the condition of 2-fold excess of DTT over alkylating reagents and that OBT binding may be affected differentially under other conditions.

Example 2—OBT Activates the Nrf2 Pathway In Vitro and In Vivo

Figure 7A:
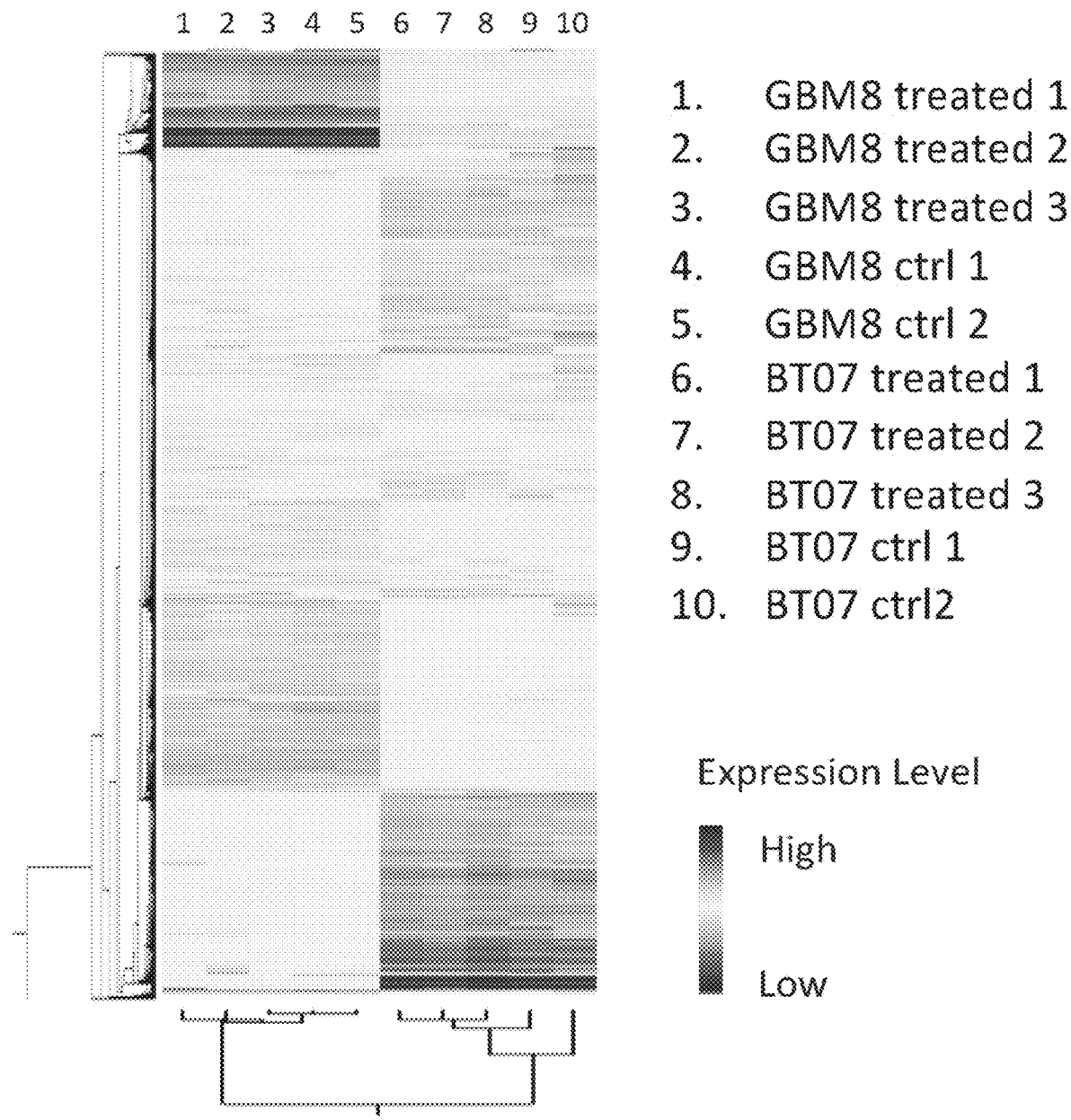
FIG. 7 OBT activates Nrf2 pathway in vitro and in vivo. (A-C) Quantitative mass spectrometry-based proteomics post-OBT treatment using 10-plexed tandem mass tags (TMT) to simultaneously map protein concentration changes of 7,904 proteins in two GSCs (GBM8 and BT07), either treated with OBT (triplicates) or untreated (duplicates) for 20 hours. (A) heat map derived from unsupervised hierarchical clustering of the data. (B) Relative protein concentration differences between OBT treated and control cells. (C) Functional network of upregulated proteins following OBT treatment using STRING database showing high-confidence direct interactors with HMOX1, protein connection containing five of proteins upregulated in the OBT-treated samples as well as Nrf2. (D) HO1 mRNA levels were determined by qRT-PCR (normalized to GAPDH) in MDA-MB-231 cells treated with the indicated doses of OBT for 8 hours. (E) U87 cells stably expressing *Gaussia* luciferase under the control of ARE response elements (ARE-Gluc) and the constitutively active *Vargula* luciferase (Vluc under control of SV40 promoter for normalization of cell number) were treated with OBT and different antioxidants. Sixteen hrs post-treatment, aliquots of the conditioned medium were assayed for Gluc and Vluc activities and data were expressed as ratio of Gluc/Vluc, normalized to the control (set at 1). (F) Mice carrying fat pad MDA-MB231 tumors were treated with a daily dose of either DMSO or OBT (7.5 mg/kg, intraperitoneally) for four consecutive days. At day 5, tumors were removed, RNA was extracted and analyzed for HO1 mRNA by qRT-PCR (normalized to GAPDH). **$P<0.05$ Student t test versus control. (G) Mapping of OBT covalent binding to cysteine residues in Keap1. OBT was found to bind covalently to all identified cysteine sites and this modification was found to be partially reversible at two sites (Cys151 and Cys434).
Figure 7B:
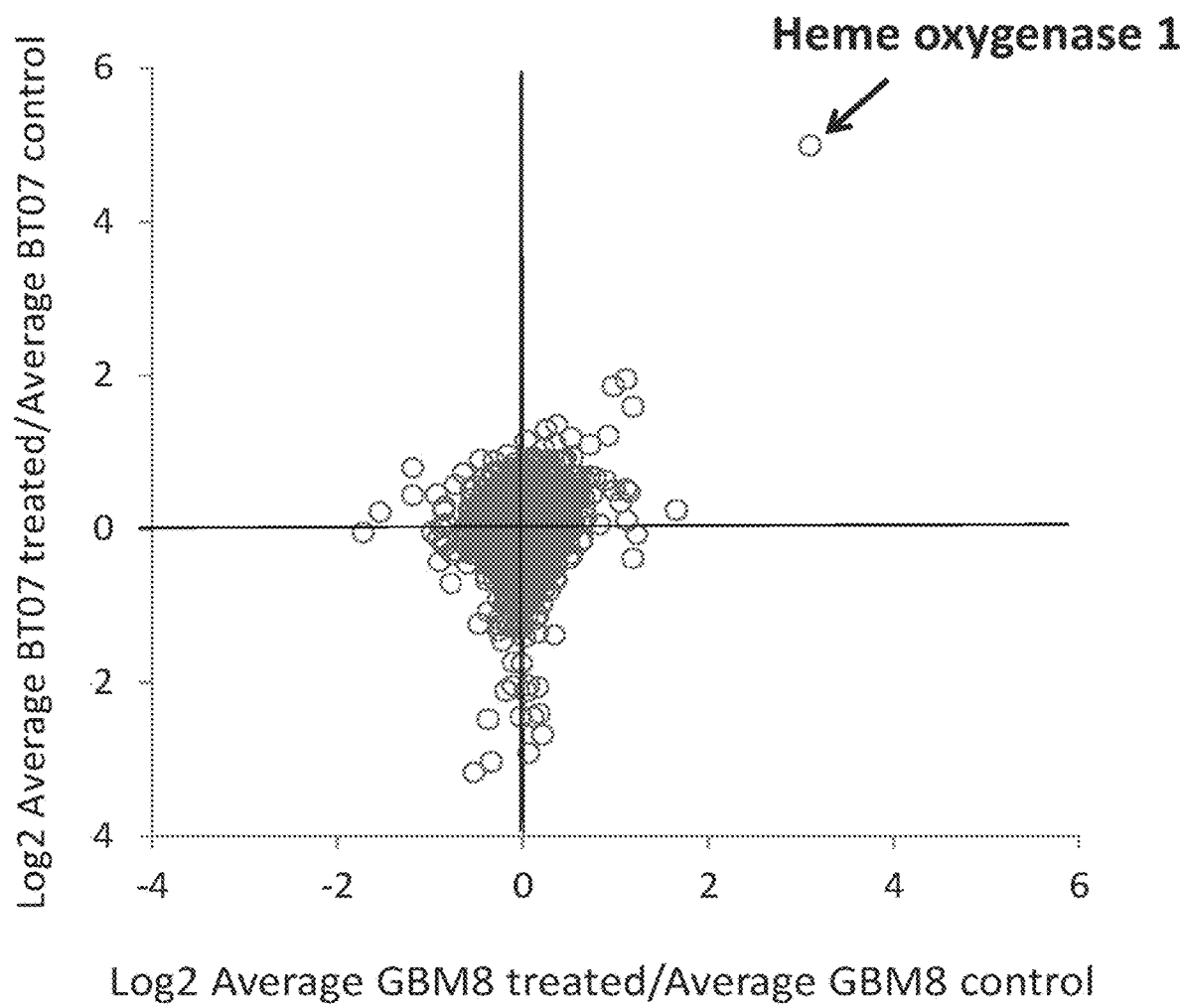
Figure 7C:
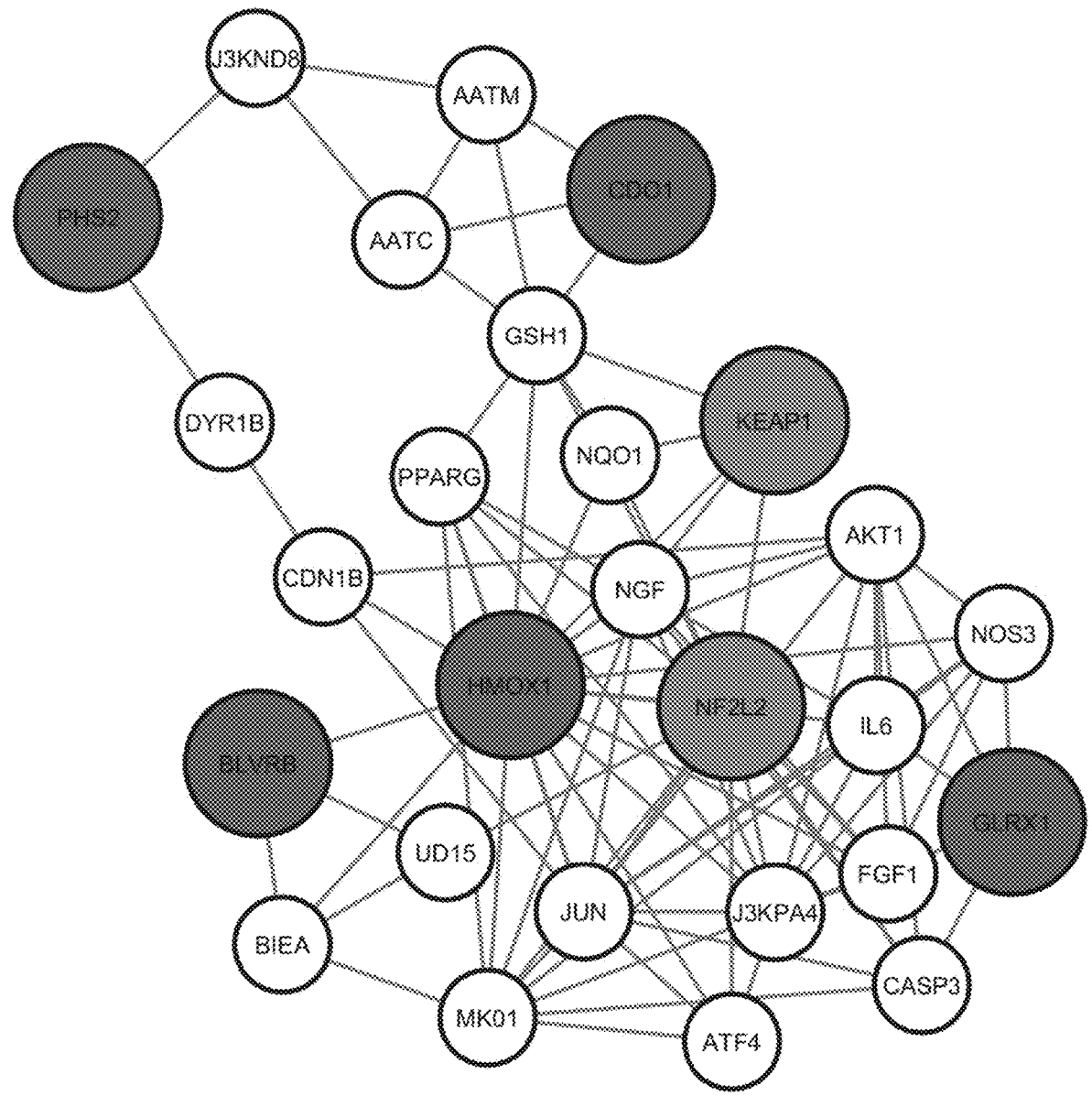
Figure 7D:
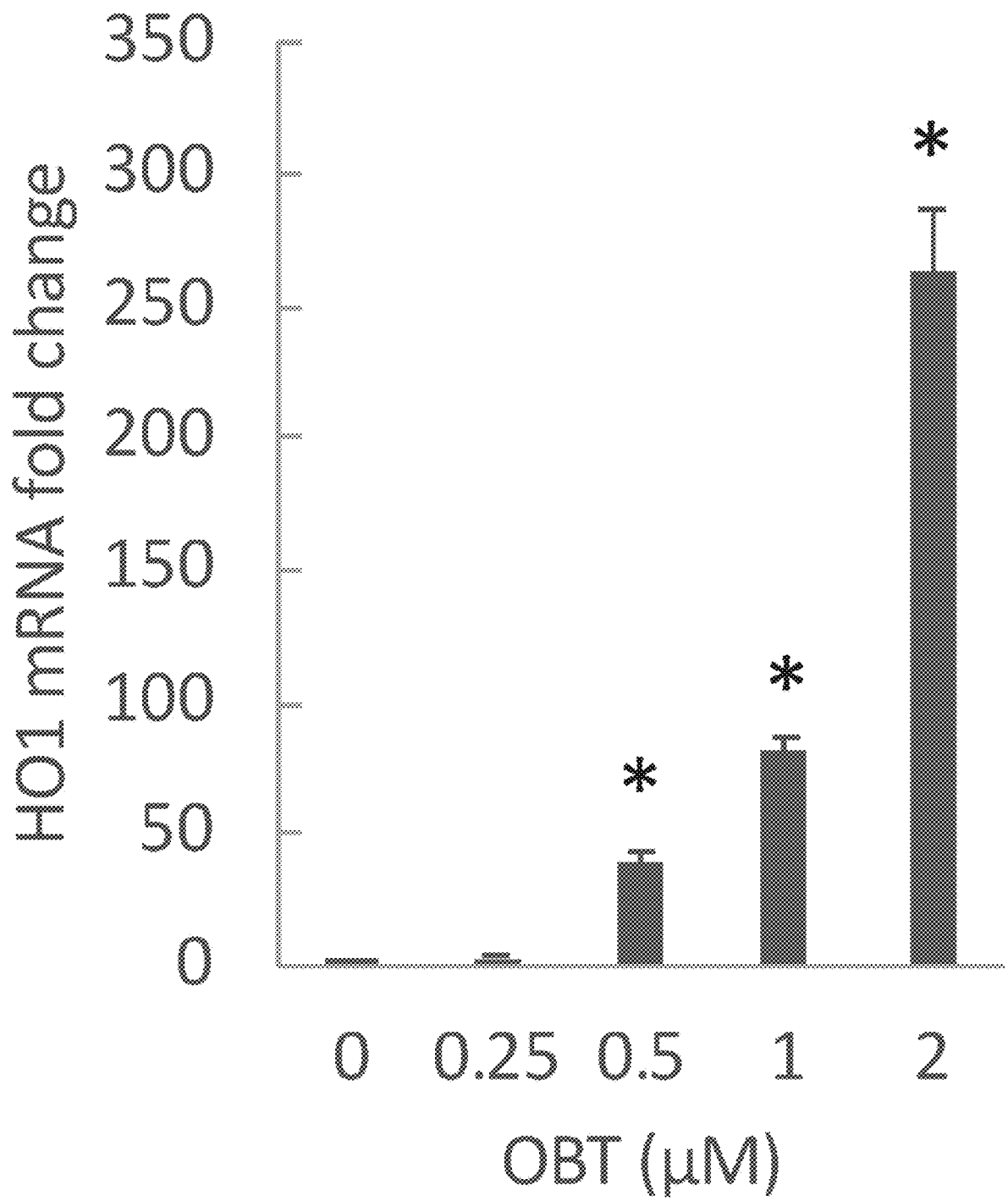
Figure 7E:
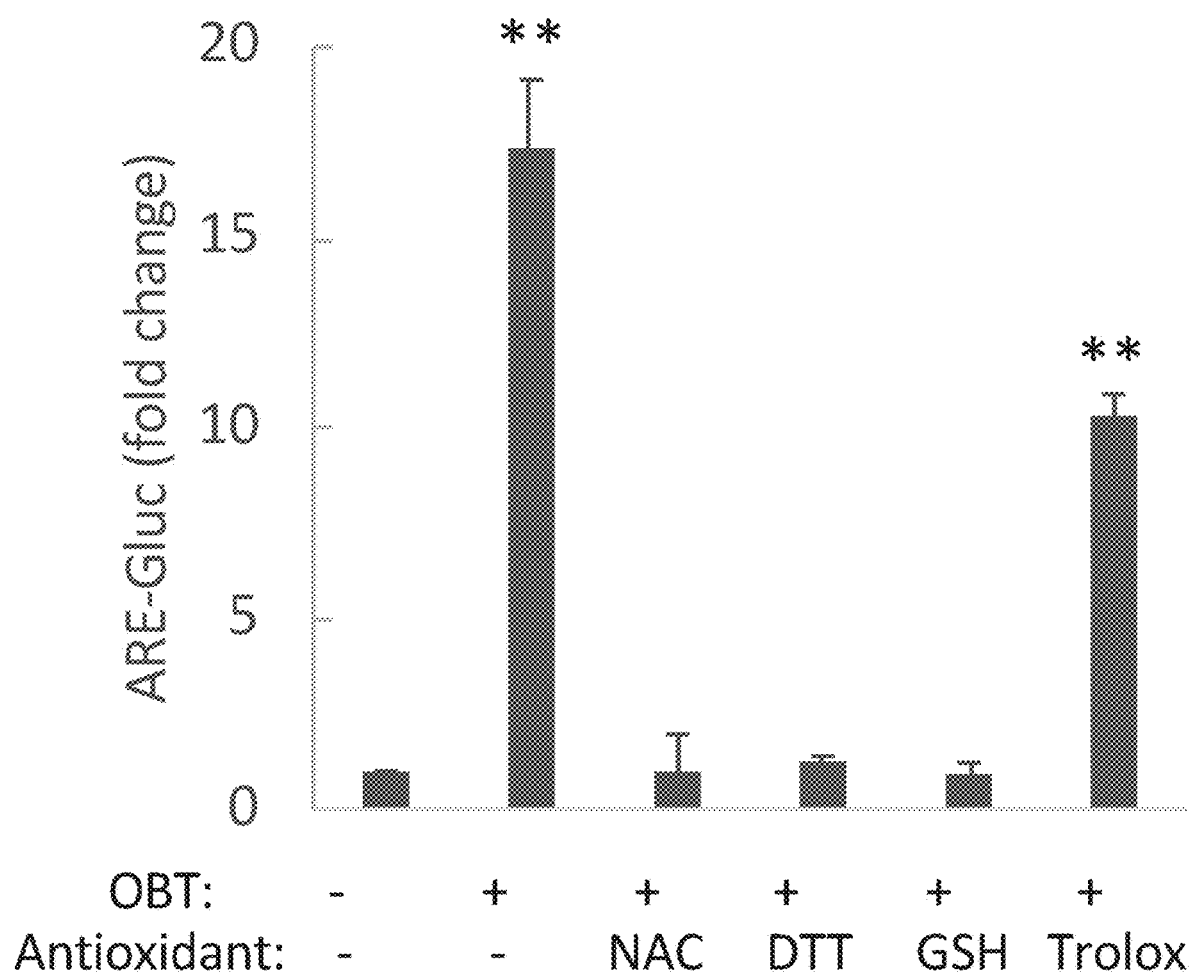
Figure 8A:
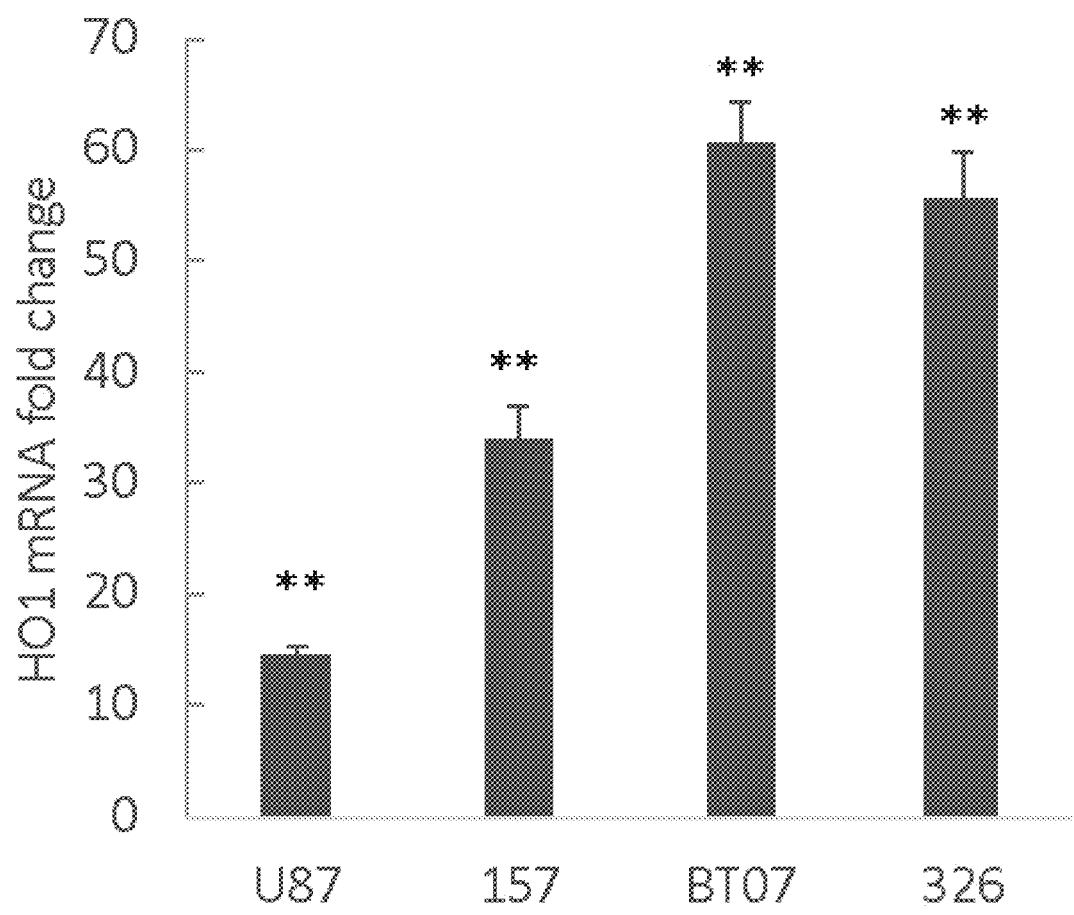
FIG. 8. OBT induces Nrf2 activation. (A) HO1 mRNA expression levels determined by qRT-PCR and normalized to GAPDH in U87 cells and 3 different GSCs (157; BT12; 326) treated with OBT (1 µM) for 8 hours. (B) NQO1 and Txnrd2 mRNA levels in U87 and MDA-MB-231 cells after treatment with different doses of OBT. (C-D) MDA-MB-231 (C) and U87 cells (D) expressing the ARE-Gluc and SV40-Vluc reporters were treated with OBT or tBHQ. Aliquots of the conditioned medium were assayed for Gluc and Vluc activity. Data presented as a ratio of Gluc/Vluc and normalized to vehicle control (set at 1). (E) U87 cells were treated with DMSO (control) or OBT (1 µM) and different antioxidants. Cell viability was measured four days later. Data expressed as percentage of cell viability normalized to the control, showing that DTT and GSH completely rescued OBT-mediated cell death, whereas Trolox provided a partial rescue. Statistical significance depicts the difference between the samples treated with OBT alone as compared to the combination of OBT with the antioxidants. *$P<0.05$; **$P<0.001$ Student t test.
Figure 8C:
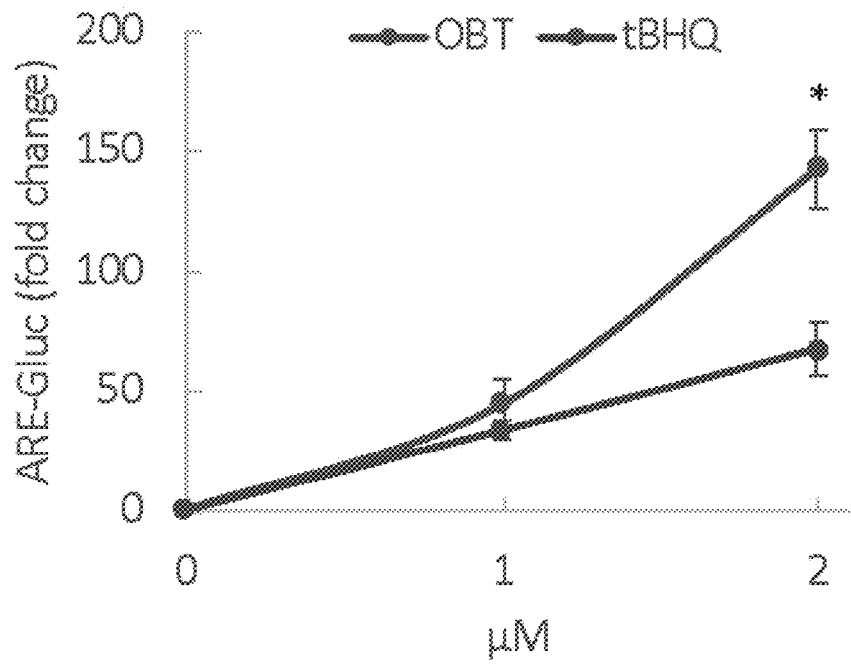
Figure 8D:
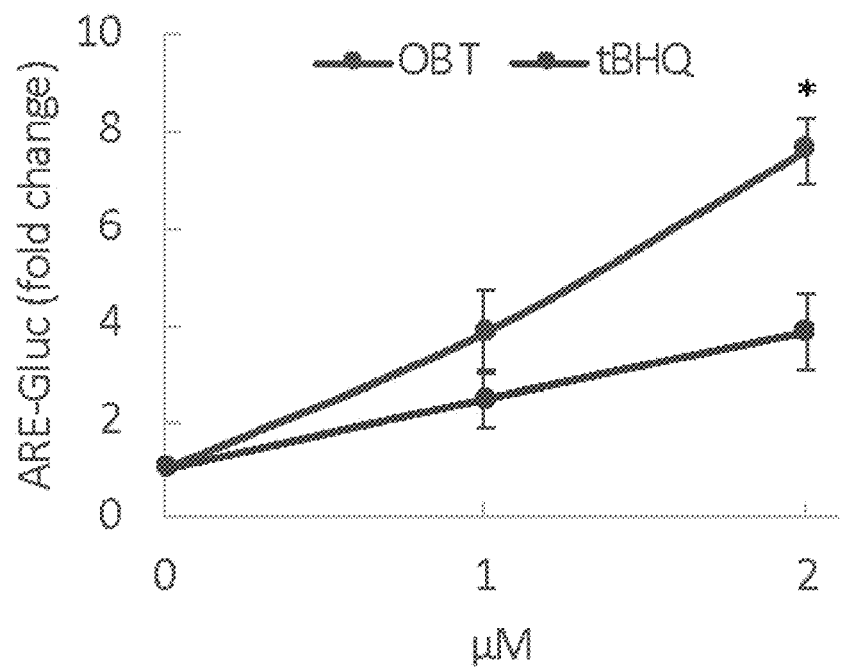
Figure 8E:
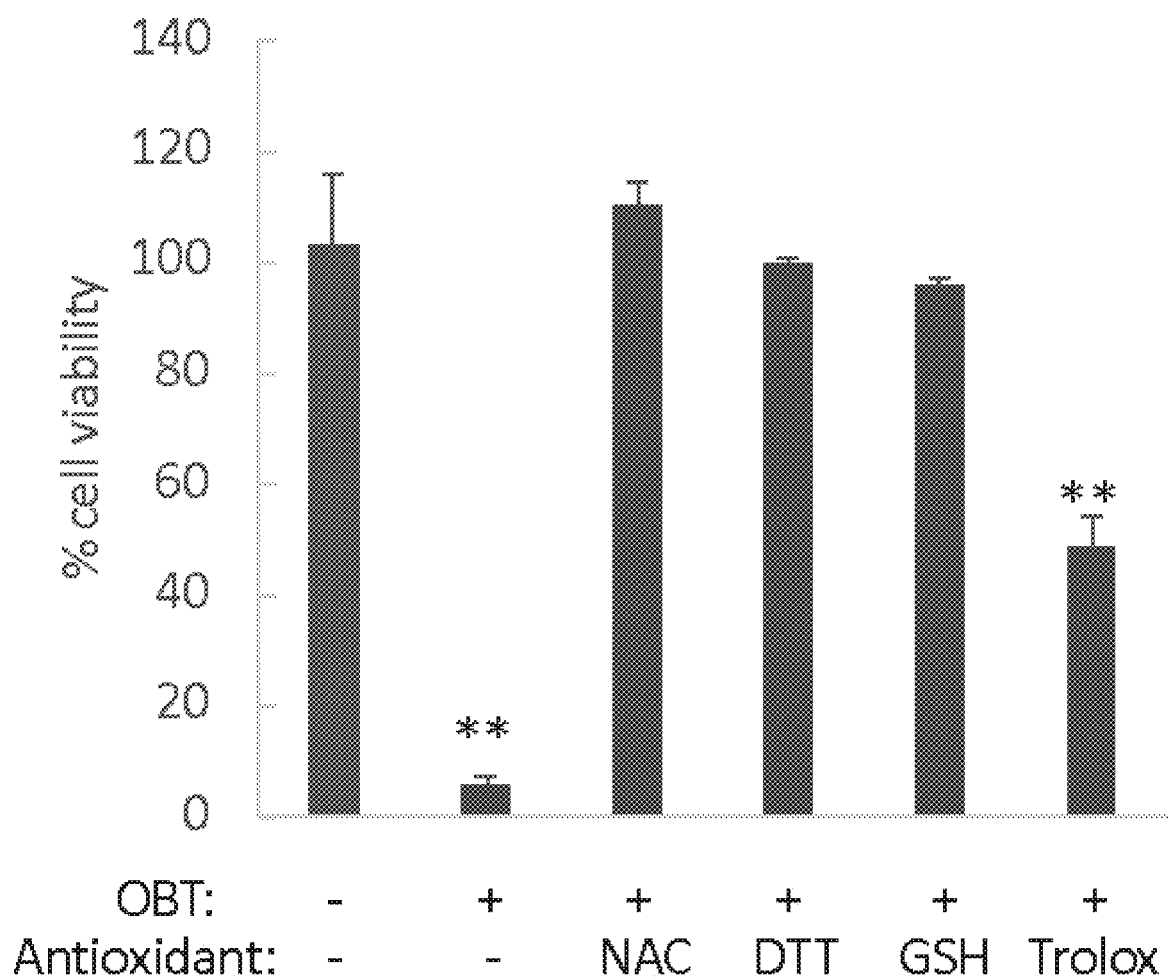

To gain a better insight into the molecular mechanism of OBT and its effect on the global proteome, a multiplexed quantitative mass spectrometry-based proteomics method was implemented using the isobaric labeling strategy with Tandem Mass Tag (TMT) reagents and the MS3 method (Refs. 12-14). Global proteomics analysis in two different patient-derived GSCs specimens at 20 h after treatment with a subtoxic dose of OBT, identified heme oxygenase 1 (HMOX1; HO1) as the top upregulated protein in both lines (FIG. 7A-B). Gene Ontology category analysis of the most upregulated proteins after treatment (using DAVID bioinformatics platform) showed that the most significantly enriched category was "oxidation-reduction process" containing the upregulated proteins HMOX1, PHS2, GLRX1, VKORL, BLURB, and CDO1. To further explore the functional network of these proteins, the STRING database was interrogated for high-confidence direct interactors of these proteins (FIG. 7C), and a network was found of densely connected proteins containing five of the upregulated proteins as well as Nrf2, a master regulator of oxidative damage response and Keap1, the E3-ligase regulating the ubiquitin-mediated degradation of Nrf2 (FIG. 7C). A strong increase in HO1 mRNA expression in response to OBT was detected across different cancer cells (FIG. 7D and FIG. 8A). The Nrf2 target genes NQO1 and TXNRD2 were also upregulated following OBT treatment (FIG. 8B). To further support these findings independently, a functional ARE luciferase reporter was designed which was strongly activated following treatment with sub-toxic doses of OBT, even higher than the positive control tert-butylhydroquinone (tBHQ), a potent activator of Nrf2 (Ref 15) (FIG. 8C-D). Importantly, OBT-induced ARE activation and loss of cell viability was completely reversed by the addition of various thiol nucleophilic antioxidants including NAC, dithiothreitol (DTT), GSH, but only partially by Trolox, an antioxidant that is devoid of thiol groups (FIG. 7E and FIG. 8E).

Figure 7F:
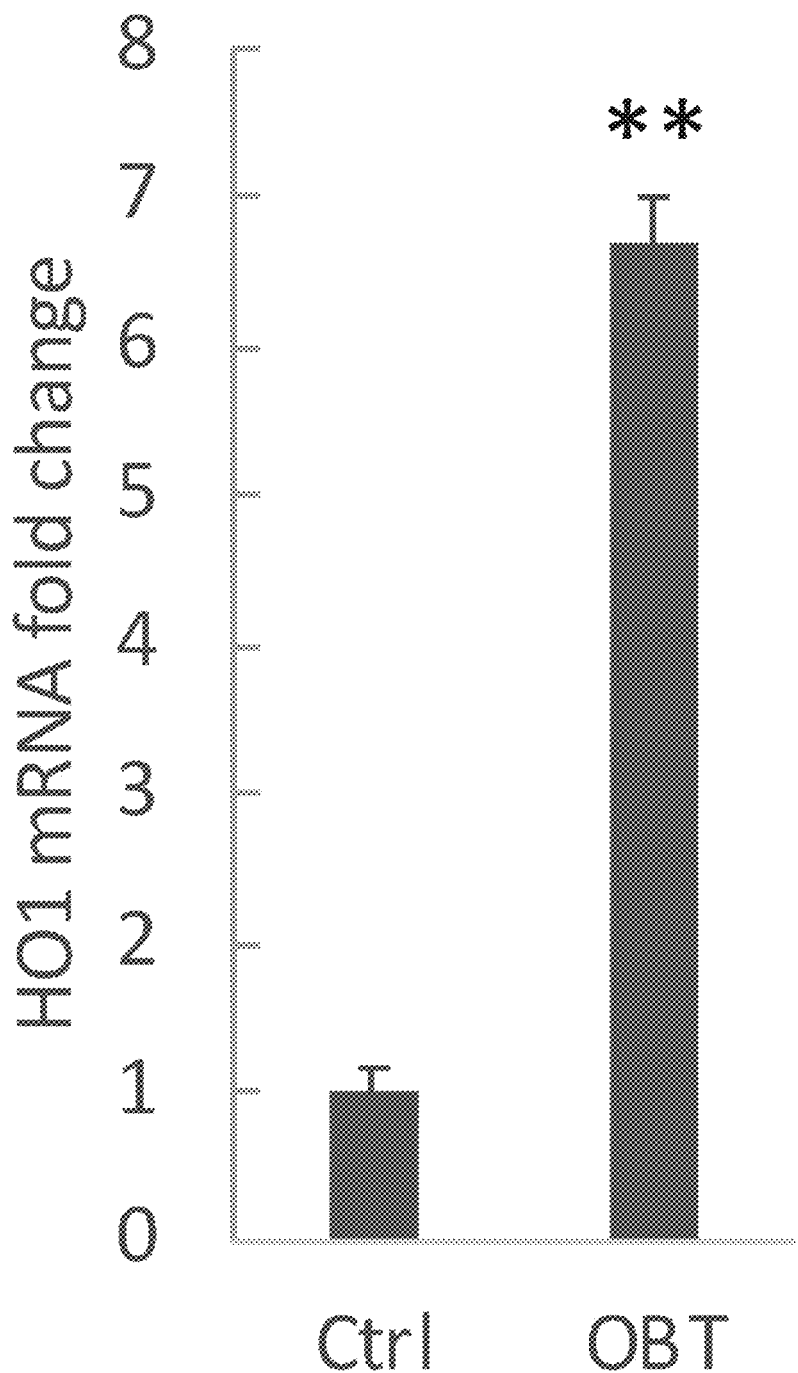

Finally, it was confirmed that OBT-mediated Nrf2 activation in vivo using a breast cancer mouse model generated by injecting MDA-MB-231 into the fat pad of nude mice (Ref 8). Treatment with OBT (7.5 mg/kg for four consecutive days) resulted in 7-fold upregulation of HO1 transcripts in the tumor, consistent with our findings in cell culture (FIG. 7F). Taken together, these results confirm that OBT acts as an inducer of Nrf2 both in culture and in vivo.

Example 3—OBT is a Cysteine-Modifying Compound Targeting Keap1

Figure 7G:
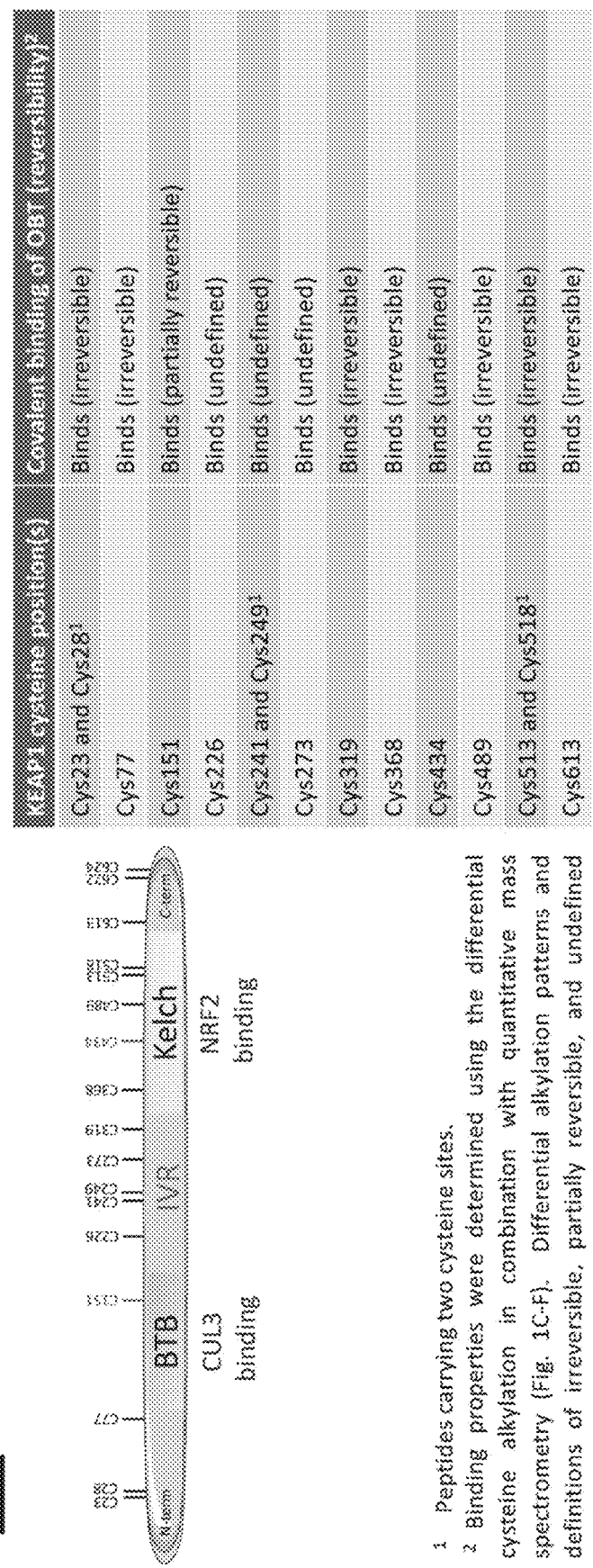
Figure 9A:
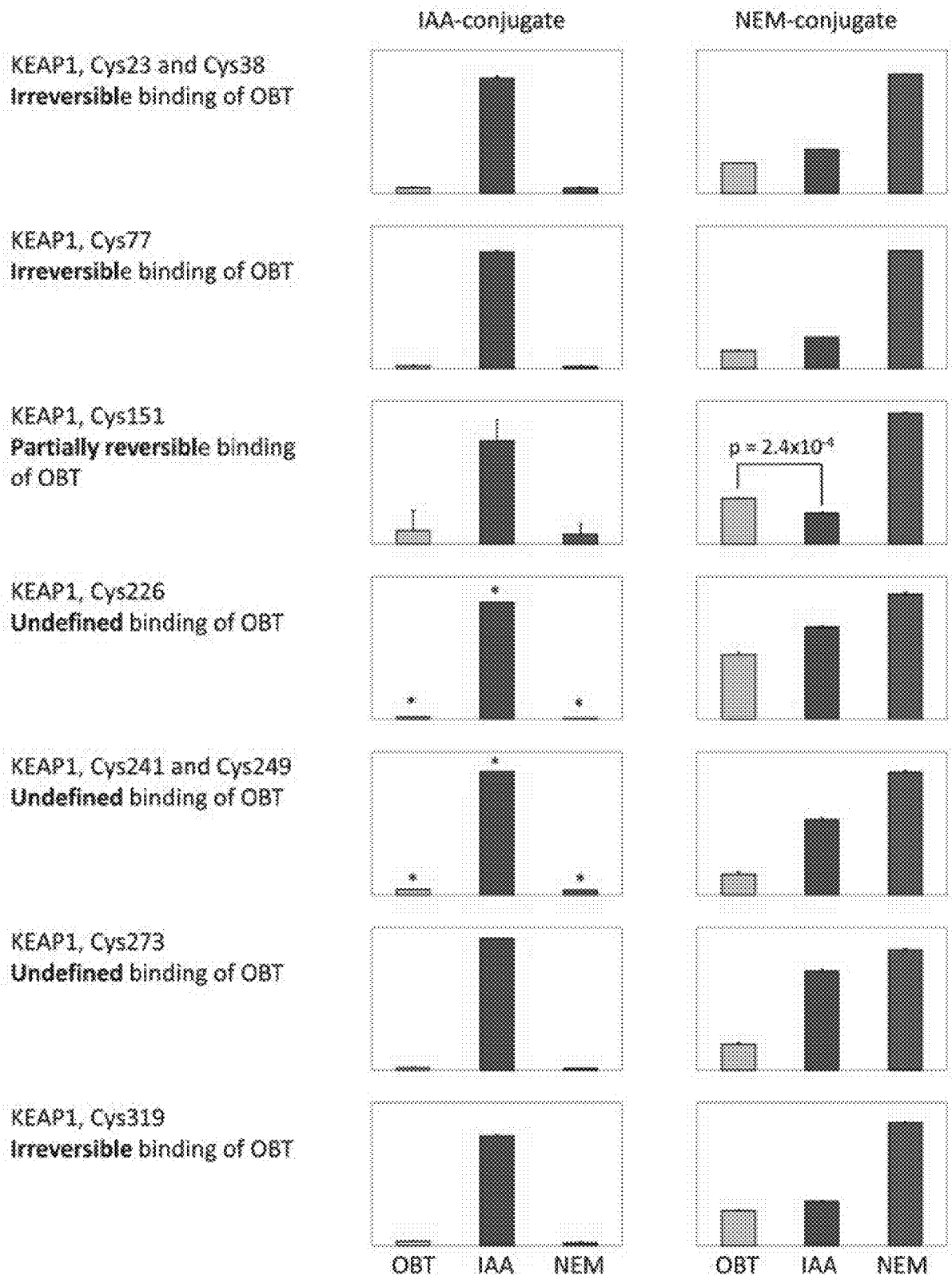
FIGS. 9A and 9B. Mapping of OBT covalent biding to cysteine residues in Keap1. Differential alkylation patterns for Keap1 cysteine containing peptides. Interpretation guidance of the patterns is given in FIG. 6C. The IAA-conjugate pattern defines if OBT is binding to the indicated cysteine-residue; OBT is binding to all twelve quantified cysteines. The NEM-pattern is defining the nature of the OBT binding. Three different categories were observed: irreversible binding, with OBT and IAA channels at an intensity at least 2-fold lower than the NEM channel, and the OBT channel not being significantly ($p \leq 0.01$) higher than the IAA channel intensity; partially reversible binding, as irreversible binding but with an OBT channel intensity significantly higher than the IAA intensity; undefined binding, the IAA channel intensity is at least as high as the NEM channel intensity.
Figure 9B:
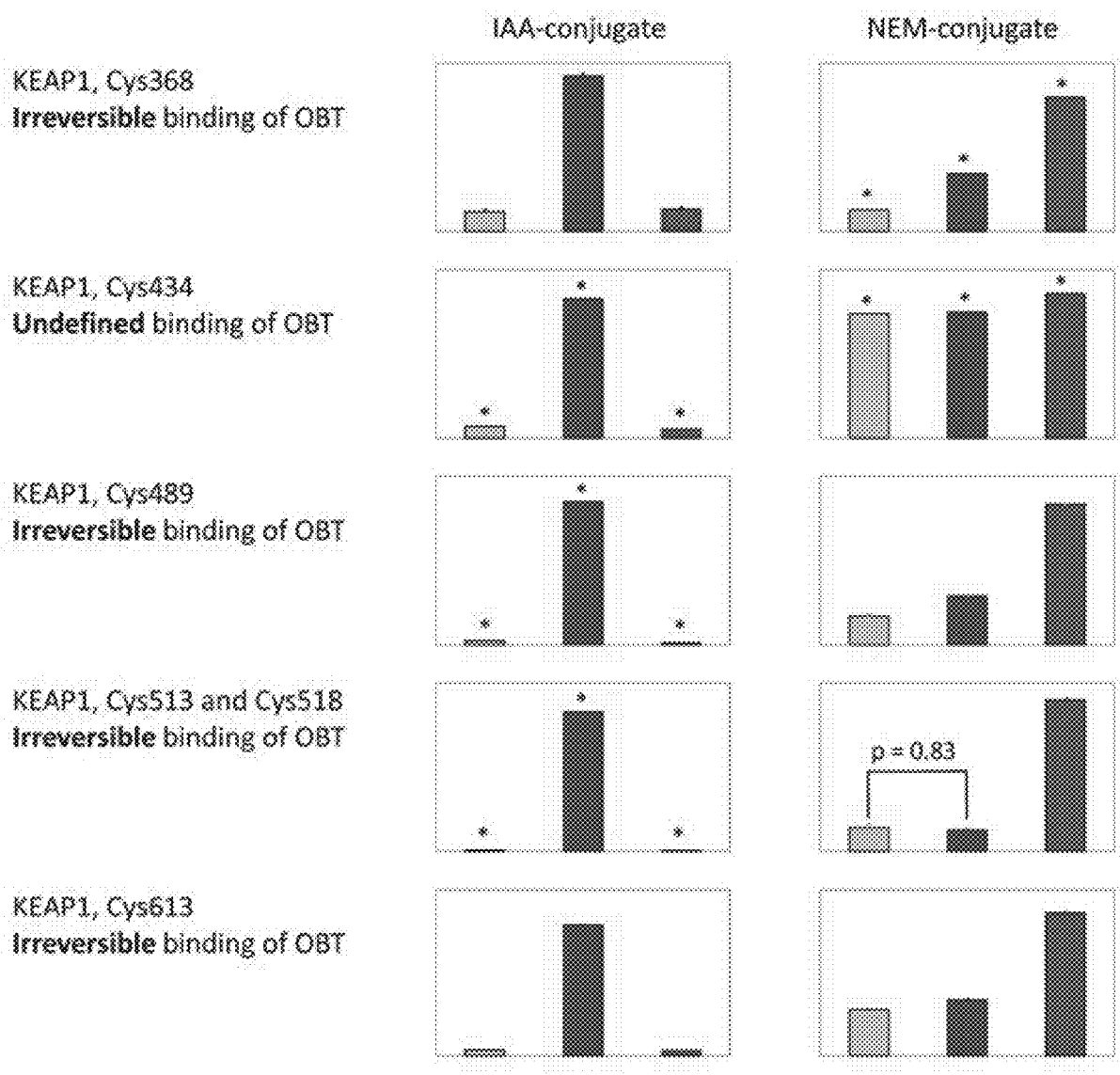

Several thiol reactive Nrf2 activators have been shown to bind Keap1, suggesting that OBT could function in similar fashion (Ref. 16). To investigate if Keap1 is also OBT target, the mass spectrometry-based approach described in FIG. 6 and Example 1 was applied to Keap1. Similar to the experiment with bovine catalase, OBT was found to bind covalently to all identified cysteine sites, thus confirming that this compound can directly bind to Keap1. Importantly, under the experimental conditions, this modification was found to be partially reversible at Cys151 located in the BTB domain (CUL3 binding site) and Cys434 located in the Kelch domain (Nrf2 binding site) of KEAP1 (FIGS. 7G, 9A, and 9B).

Figure 10A:
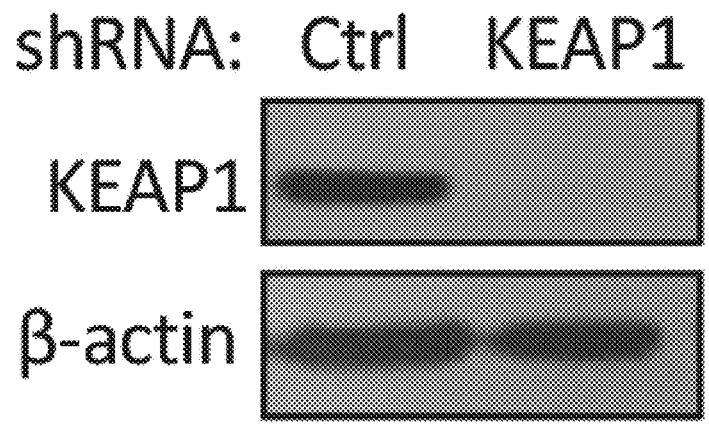
FIG. 10 OBT targets Keap1 and induces its degradation. (A) Western blot analysis of Keap1 protein in U87 cells stably expressing shCtrl or shKeap1. (B) ARE-Gluc activity (normalized to Vluc) sixteen hrs post-OBT treatment in U87 glioma cells expressing a non-targeting shRNA (control; shCtrl) or shKeap1. (C) U87 cells stably expressing shCtrl or shKeap1 were treated with different doses of OBT and cell viability was measured after four days. (D) U87 cells were treated with 1 µM OBT and cell lysates were collected at the indicated time points and analyzed for Keap1 protein levels by Western blotting with β-actin as loading control. (E) Keap1 protein levels in U87 cells treated with the indicated doses of OBT for 8 hours. (F) 293T cells transfected to express HA-tagged Keap1 or Keap1ΔBTB were treated with OBT (2 or 4 µM) or control. Cell lysates were collected after 6 hours and immunoblotting was performed using anti-Keap1 and anti-HA antibodies. (G) 293T cells were treated with OBT (2 µM) and/or MG132 (10 µM) for 6 hours before immunoprecipitation with anti-HA antibody. Ubiquitination was determined using anti-Ubiquitin antibody. (H) MDA-MB-231 cells (wild-type) or same cells stably expressing shCtrl or shCUL3 were transfected to express HA-Keap1 and treated with OBT (3 µM), CHX (3 µg/mL) and/or MG132 for 6 hours. Keap1 levels were detected using anti-HA. (I) Mice-bearing patient-derived GBM8 GSC tumors were treated with 3 doses of OBT (10 mg/kg within a 24 h period) or vehicle control (n=5/group) and imaged 4 h after the last OBT administration. Representative FDG-PET-CT scans (left) and signal quantification (right) showing that OBT lead to a 50% decrease in FDG tumor uptake, determined using tumor to muscle ratio with muscle as the background. *$P<0.05$; **$P<0.001$ Student t-test.
Figure 10B:
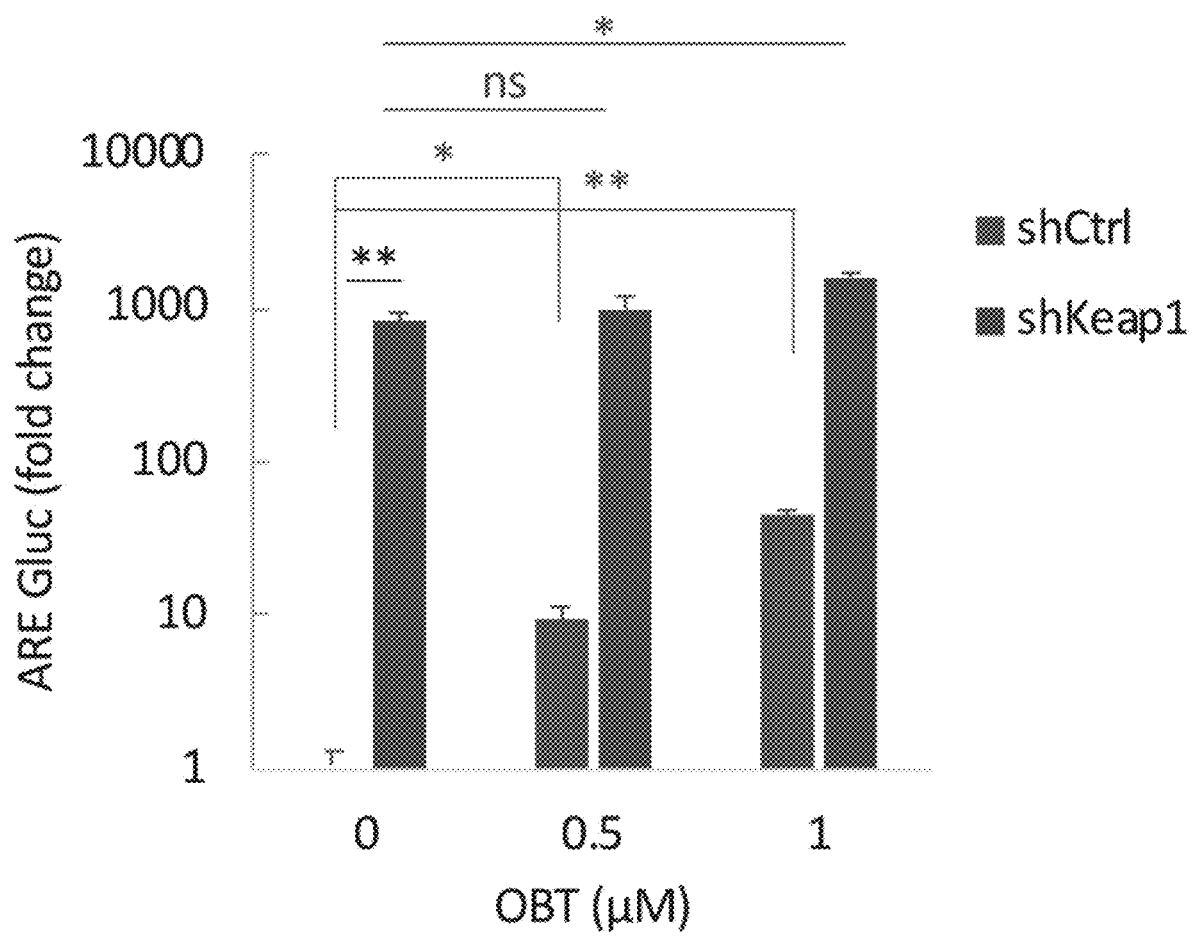
Figure 10C:
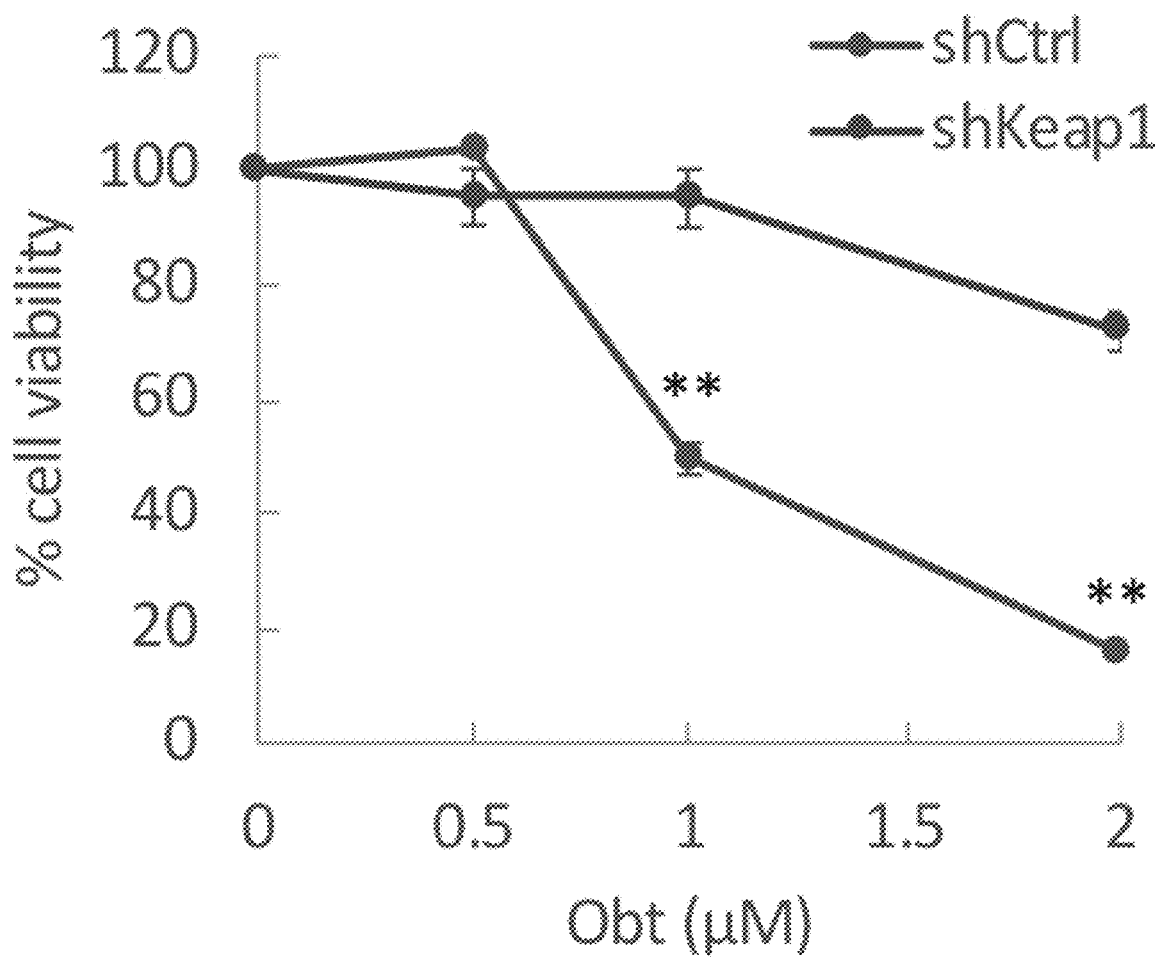
Figure 13A:
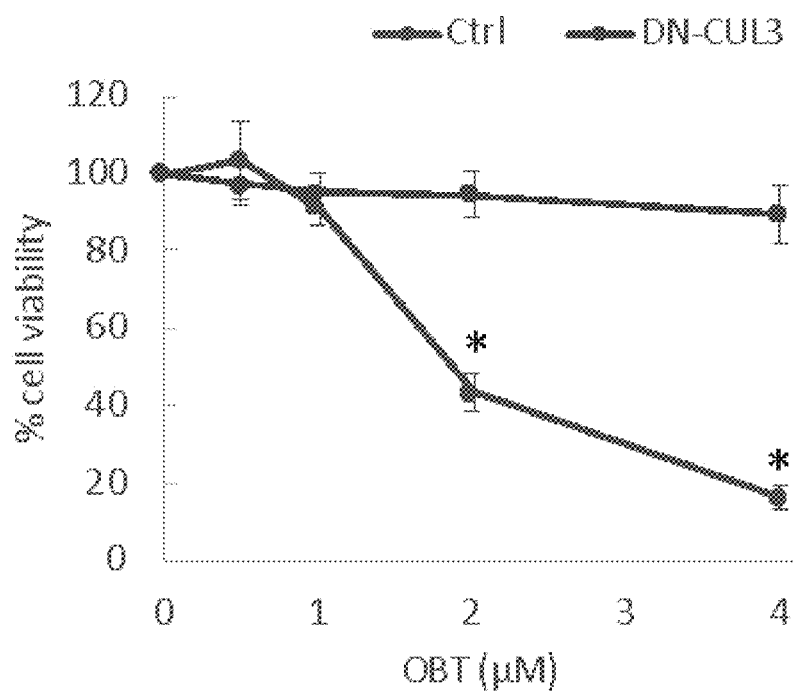
FIG. 13 (A) MDA-MB231 cells expressing an empty vector (Ctrl) or dominant negative CUL3 (DN-CUL3) were treated with OBT before measuring cell viability after 3 days. (B) MDA-MB231 cells were co-treated with OBT and DMSO (control) or MLN4924 (1 µM) and cell viability was measured three days later. (C) MDA-MB231 cells were transfected with Keap1 wild-type (wt), Keap1ΔBTB or Keap1C151S, and co-treated with CHX (3 µg/mL) and OBT (4 µM) or vehicle control. Cell lysates were collected after 8 hours and immunoprecipitation was performed using anti-HA antibody followed by immunoblotting for Keap1 and HA. *$P<0.05$ Student t test.
Figure 13B:
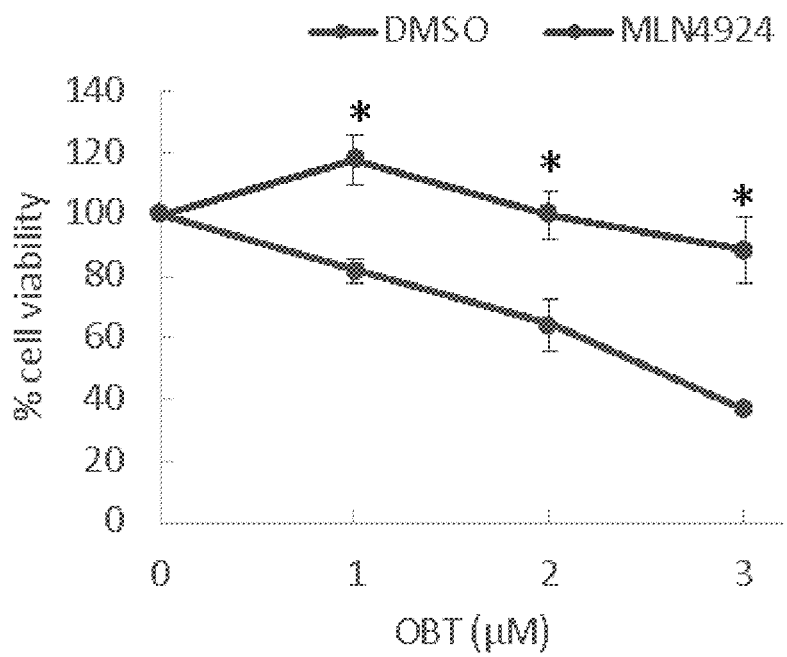
Figure 13C:
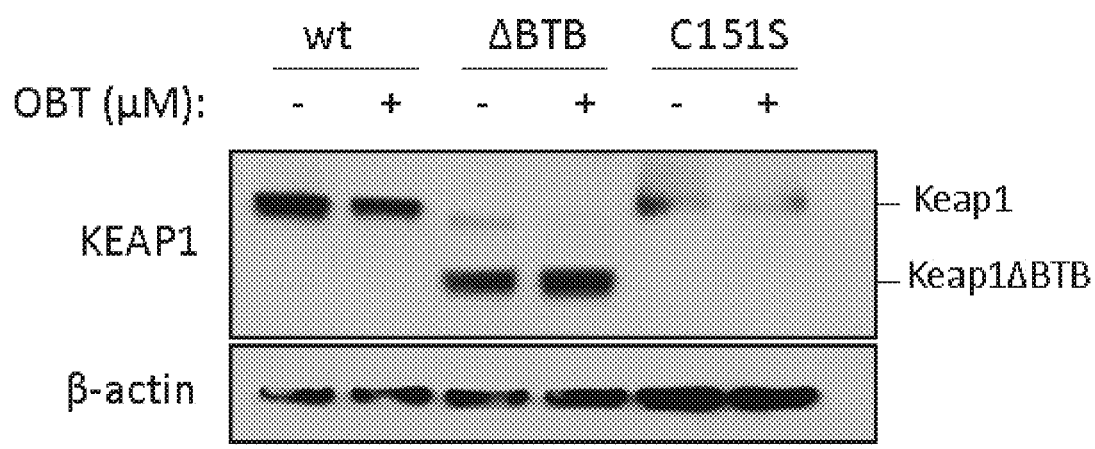

Next, the effect of OBT treatment on cells was evaluated following stable downregulation of Keap1. Silencing of Keap1 with shRNA (shKeap1) expectedly resulted in stabilization of Nrf2, leading to a major increase in ARE reporter activity (FIGS. 10A-B and FIG. 13A). There was no strong potentiation of OBT-mediated ARE activation in cells expressing shKeap1 as compared to a non-targeting shRNA (shCtr1), detected using the ARE reporter (FIGS. 10A-B and FIG. 13B) and mRNA expression of HO1 and NQO1 (FIG. 13C). Further, silencing of Keap1 decreased cell death following treatment with OBT (FIG. 10C and FIG. 13D). These data suggest that either Keap1 expression is necessary for binding of OBT to Keap1 cysteine residues, thus stabilizing and activating Nrf2, or that a strong activation of Nrf2 protects against OBT-mediated cytotoxicity.

Figure 12A:
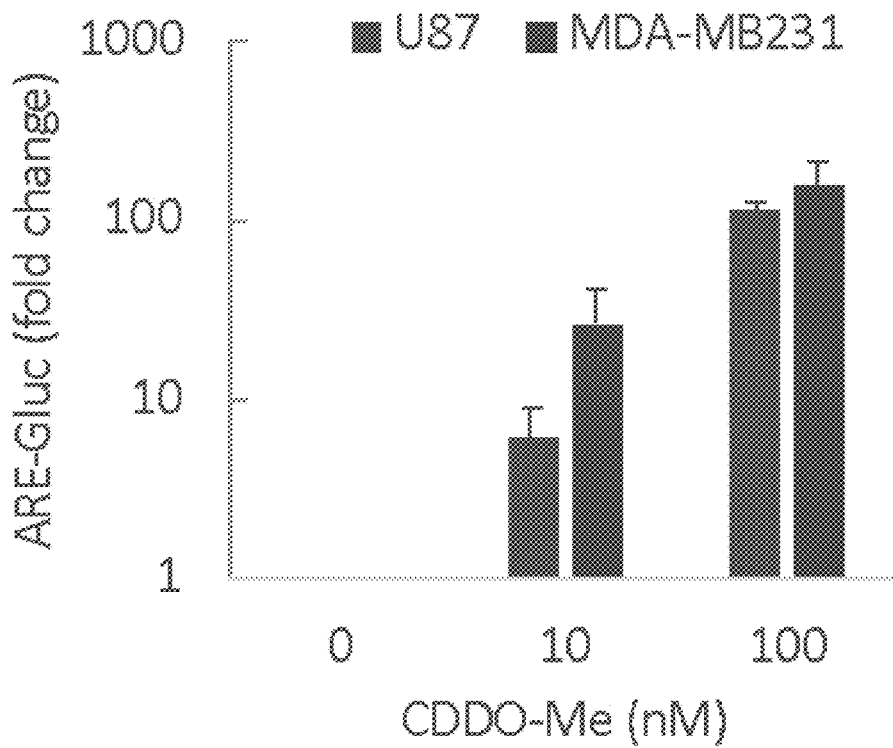
FIG. 12 (A) U87 and MDA-MB231 cells expressing ARE-Gluc and SV40-Vluc reporters were treated with CDDO-Me at the indicated doses. Aliquots of the conditioned medium were assayed for Gluc and Vluc activity. Data expressed as the ratio of Gluc/Vluc, normalized to vehicle control (set at 1). (B) Cell viability of MDA-MB231 cells after 3 days of treatment with CDDO-Me. (C) ARE-Gluc activity normalized to SV40-Vluc in U87 cells treated with OBT (1 cinnamaldehyde (CINN, 100 diethyl fumarate (FUM, 50 µM) or sulforaphane (SULF, 5 µM). (D) Cell viability in U87 cells treated with CINN, FUM or SULF (same doses as in C). (E) U87 cells were co-treated with OBT (at the indicated doses) and either CINN, FUM or SULF (same doses as in C). Cell viability was determined after three days of treatment. *$P<0.05$ Student t test.
Figure 12B:
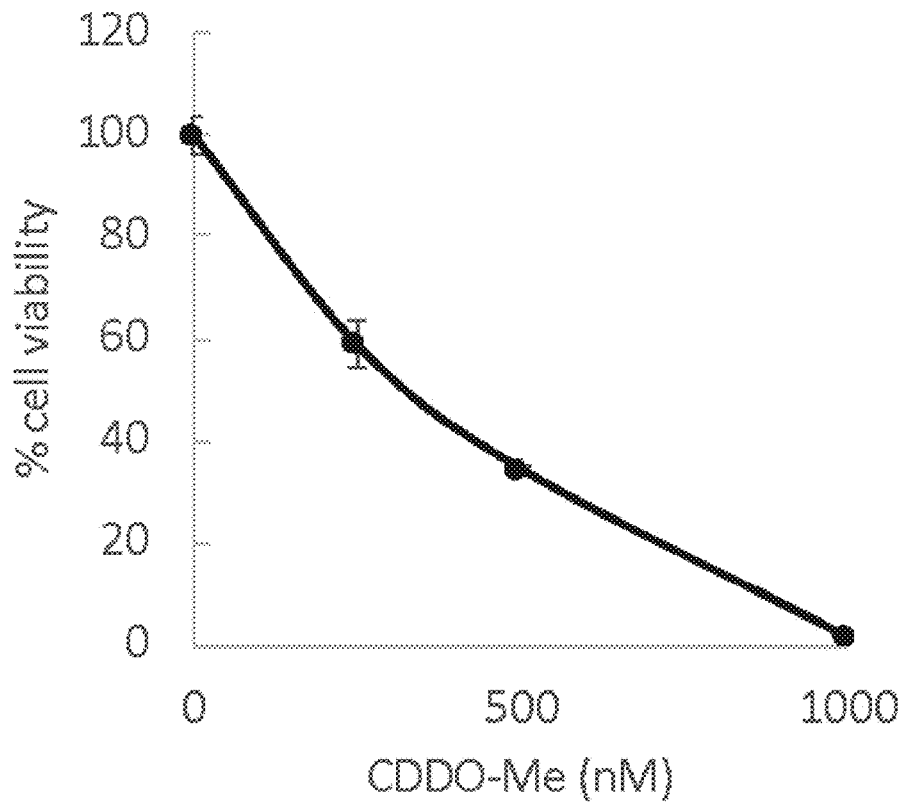
Figure 12C:
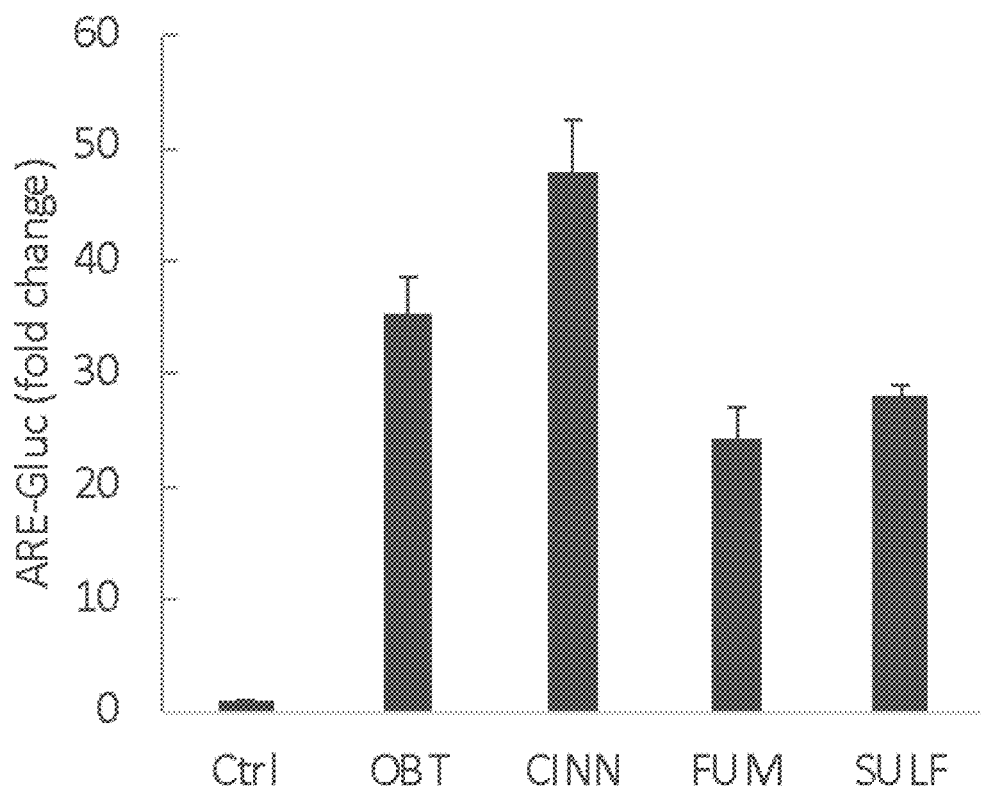
Figure 12D:
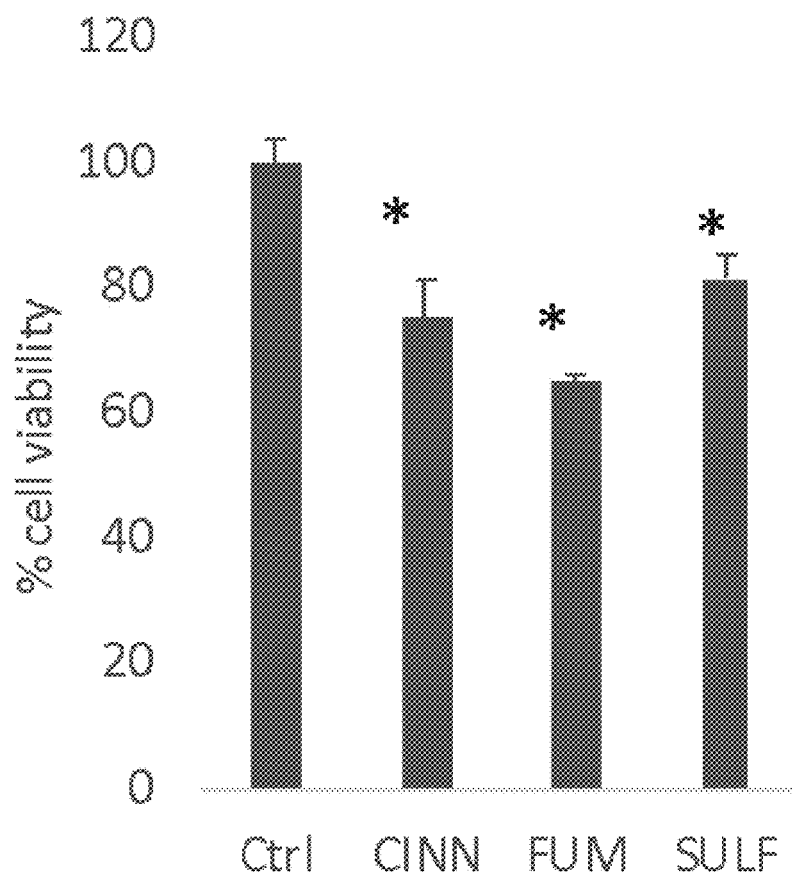
Figure 12E:
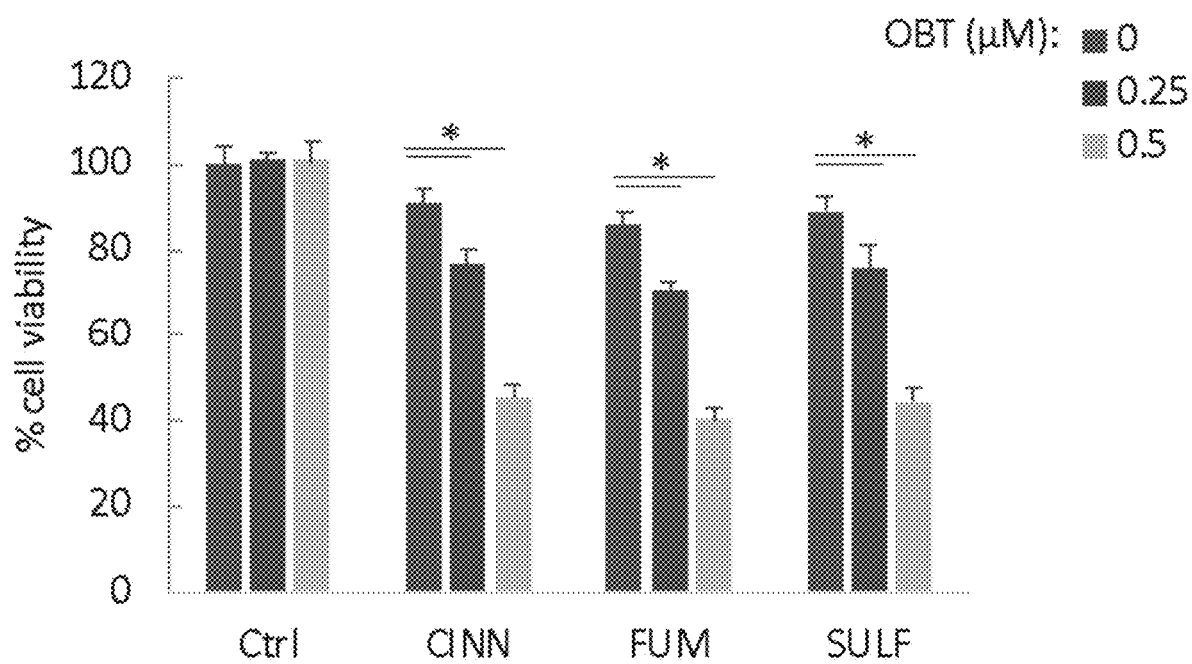

Numerous anticancer drugs have been shown to activate Nrf2 (Ref. 16). This experiment tested if reactive electrophiles and oxidants known as transient activators of Nrf2 could induce cell death when added to breast and brain cancer cells, similar to OBT. We first confirmed ARE-inducing properties of the triterpenoid CDDO-Me (2-cyano-3,12-dioxoolean-1,9-dien-28-oic acid-methyl ester) (Ref. 17), currently being clinically tested for the treatment of leukemia and solid tumors as well as other diseases. U87 and MDA-MB-231 cells expressing ARE-Gluc reporter treated with CDDO-Me showed increased reporter activity (FIG. 12A). Higher doses of this compound led to a marked decrease in cell viability in U87 cells (FIG. 12B). Treatment of U87 cells with additional Nrf2 activators, cinnamaldehyde (Ref 18), diethyl fumarate (Ref 19) and sulforaphane (Ref. 20) also resulted in increased ARE activity and a moderate decrease in U87 cell viability at the doses tested (FIGS. 12C-D). When combined with OBT, all three compounds showed increased cytotoxicity (FIG. 12E). These results suggest that increased electrophile or oxidant concentrations are likely to cause further cysteine modifications in the cellular proteome along with a stress response evident by an upregulation of Nrf2 signaling, thus increasing cytotoxicity.

Example 4—OBT Promotes the Degradation of Keap1

Figure 10D:
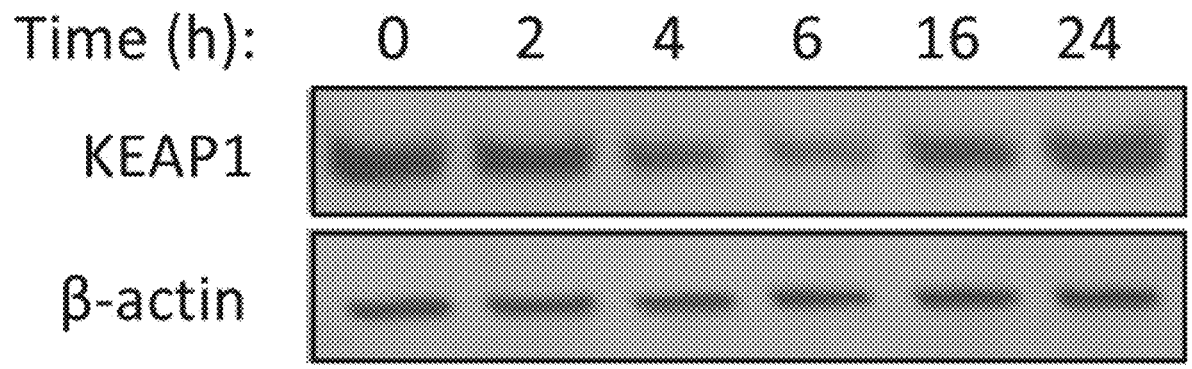
Figure 10E:
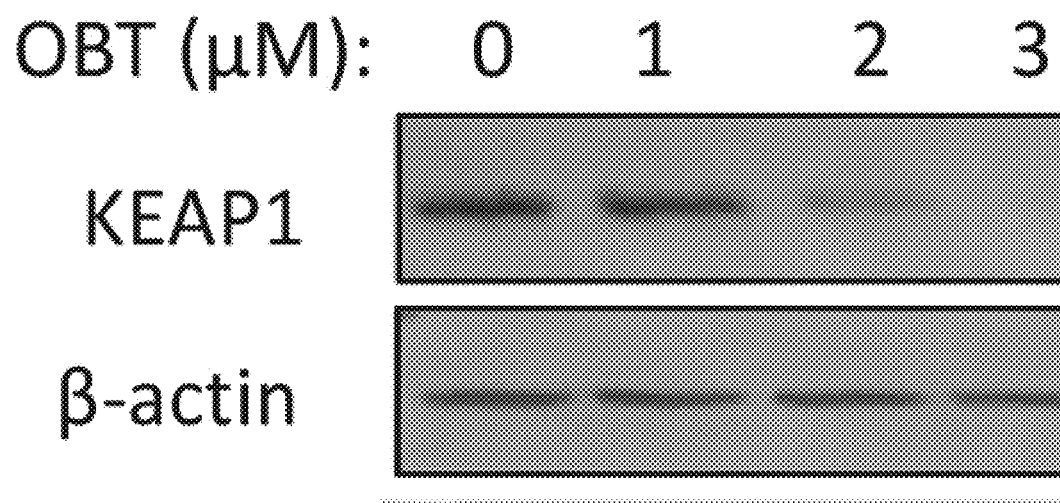
Figure 10F:
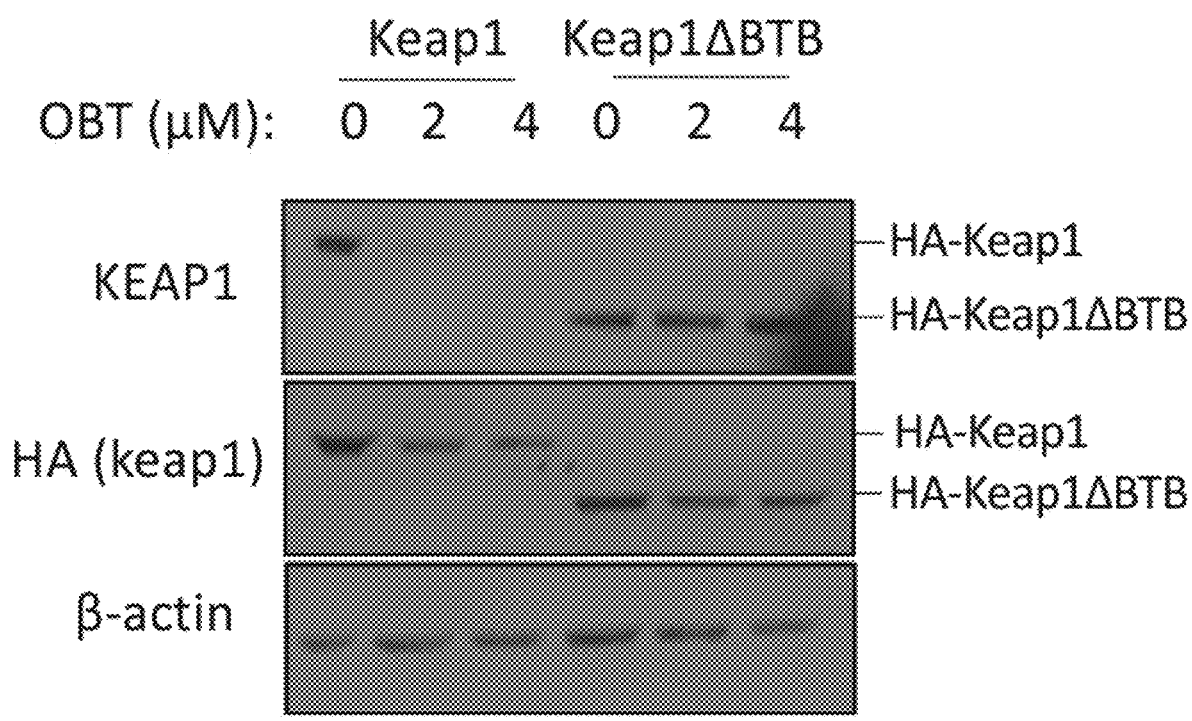

It was next determined whether OBT-mediated covalent modification of Keap1 affects stability of this protein. Immunoblot analysis showed a time- and dose-dependent decrease in Keap1 protein levels as early as 4 h following treatment with OBT, which were restored to physiological levels at 24 h (FIG. 10D-E). Within this time frame (<24 h), it was previously shown that treatment with OBT results in early morphological changes, elevated ROS levels, and activation of apoptosis in tumor cells (Ref 8). To further confirm Keap1 protein degradation, HA-tagged Keap1 was expressed or Keap1 with a deleted BTB domain (Keap1ΔBTB) (Ref 21) which is essential for Keap1 binding to CUL3 and activation of Keap1-CUL3 E3 ligase activity. We did not observe any decrease in Keap1 protein levels in cells expressing BTB-mutated Keap1 (FIG. 10F), suggesting that the E3 ligase activity is required for OBT-mediated degradation of Keap1. Further, similar to Keap1 knockdown, silencing of CUL3 with shRNA prevented ARE activation following treatment with OBT and decreased cell death (FIGS. 13B and D). Ectopic expression of a dominant-negative CUL3 mutant (DN-CUL3) also protected against OBT-induced cell death, further corroborating these findings (FIG. 13A). The neddylation of CUL3 is essential for its ubiquitin ligase activity (Ref 22). To determine if CUL3 activation is essential for OBT-induced cell death, cells were co-treated with OBT and the neddylation inhibitor MLN4924 and observed protection against cell death (FIG. 13B). Overall, these findings confirm that E3 ligase activity is required for targeting of tumor cells with OBT.

Figure 10G:
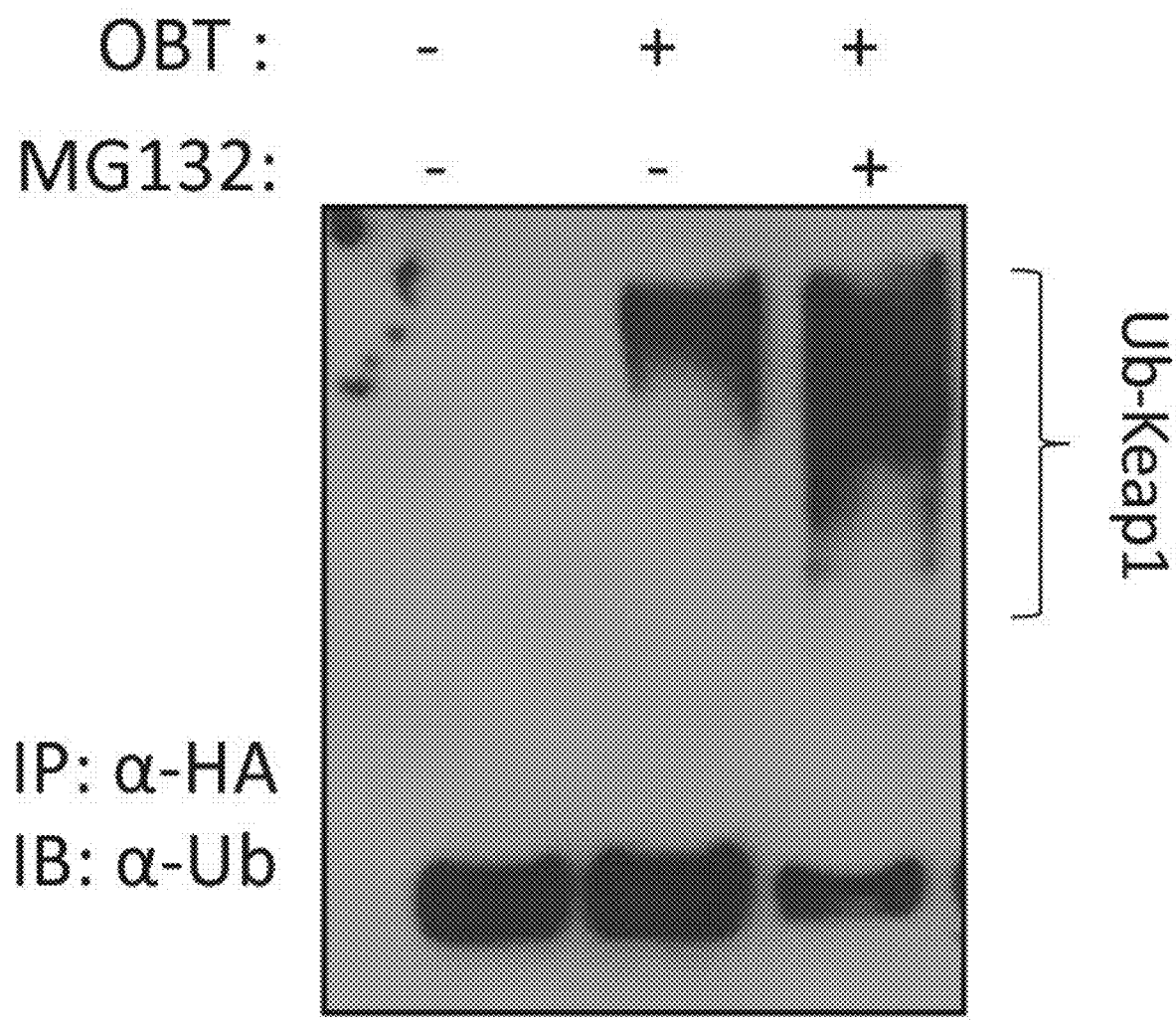
Figure 10H:
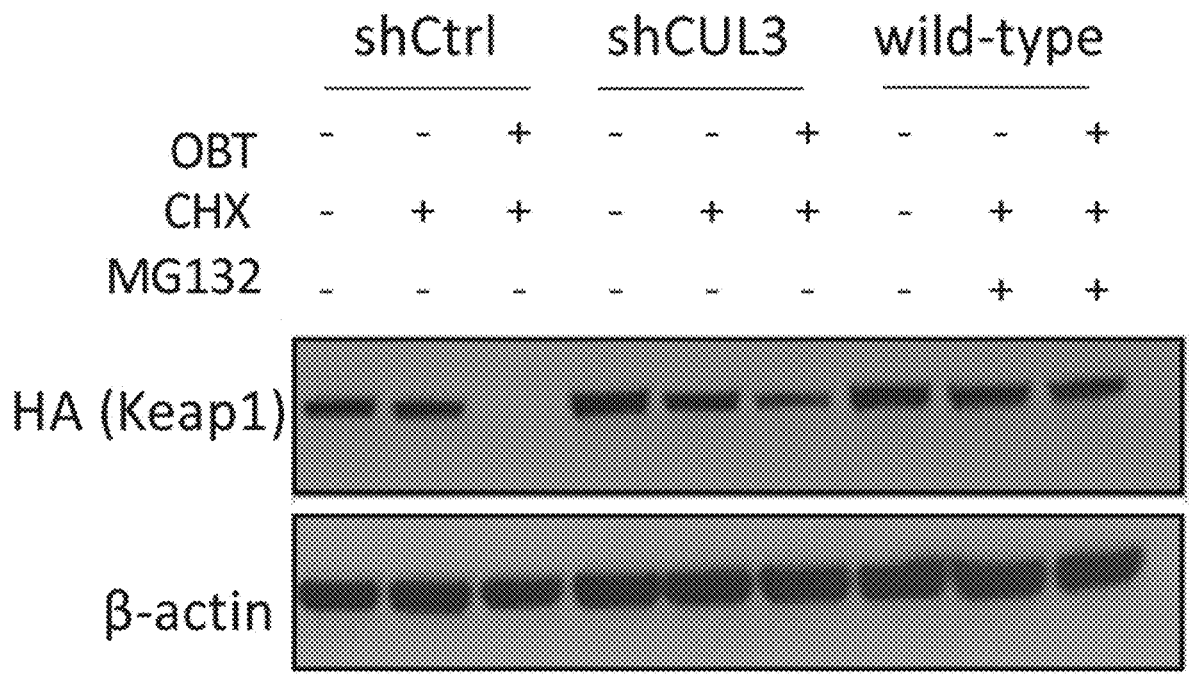

Since ubiquitination of Keap1 could lead to its degradation (Ref. 21), this process was evaluated following OBT treatment by immunoblotting. Indeed, OBT treatment effectively resulted in ubiquitination of Keap1 (FIG. 10G). Additionally, downregulation of CUL3 or co-treatment with the proteasome inhibitor MG332 prevented OBT-mediated degradation of Keap1 (FIG. 10H). Among the reactive cysteines of Keap1, $C_{353}$ was found to be necessary for Keap1-alkylating ARE inducers that promote the dissociation of the Keap1-CUL3 complex, thus stabilizing Nrf2. Accordingly, mutation of $C_{353}$ impairs its alkylation by electrophiles such as sulforaphane, tBHQ or AI-3 and impairs Nrf2 activation (Refs. 24-26). However, serine substitution of Cys-151 (Keap1$C_{151}$S) did not protect against OBT-mediated degradation of Keap1 (FIG. 13C). Overall, these results confirm that OBT treatment leads to degradation of Keap1 and that CUL3 is an important regulator of this process.

Figure 10I:
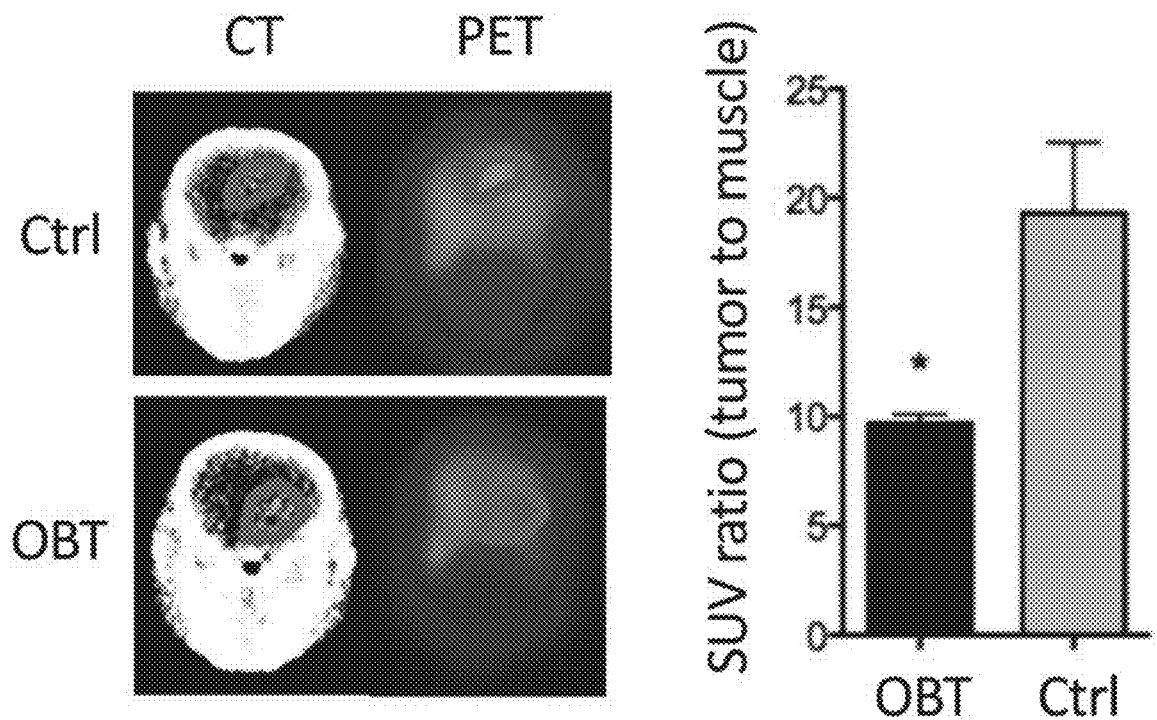
Figure 11A:
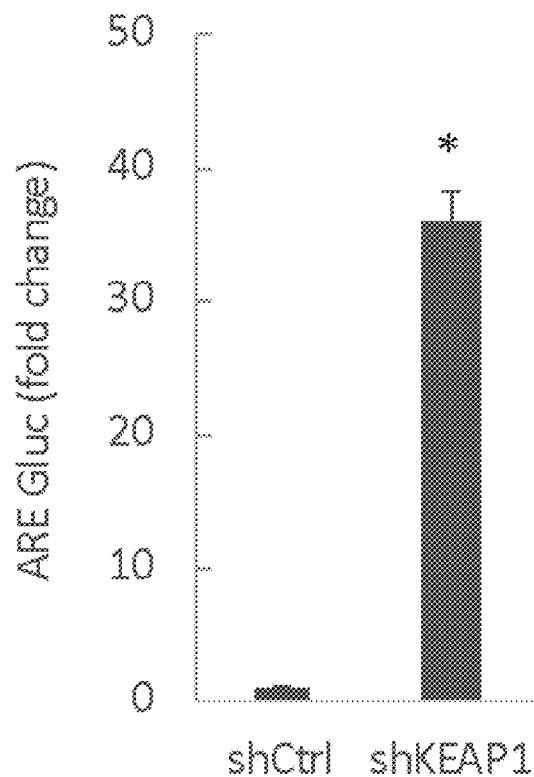
FIG. 11 OBT targets Keap1 and activates Nrf2 pathway. (A) MDA-MB231 cells expressing ARE-Gluc and SV40-Vluc reporters were transduced with shCtrl or shKeap1. Four days later, aliquots of the conditioned medium were assayed for Gluc and Vluc activity. The data is expressed as the ratio of Gluc/Vluc, normalized to vehicle control (set at 1). (B) ARE-Gluc activity normalized to SV40-Vluc in MDA-MB231 expressing shCtrl, shKeap1 or shCUL3 after treatment with different doses of OBT. (C) HO1 and NQO1 mRNA expression determined in U87 cells expressing either shCtrl or shKeap1 following 8 hrs of OBT treatment. (D) MDA-MB231 cells stably expressing shCtrl, shKeap1 or shCUL3 were treated with different doses of OBT and cell viability was measured after four days. *$P<0.05$; **$P<0.001$ Student t test.
Figure 11B:
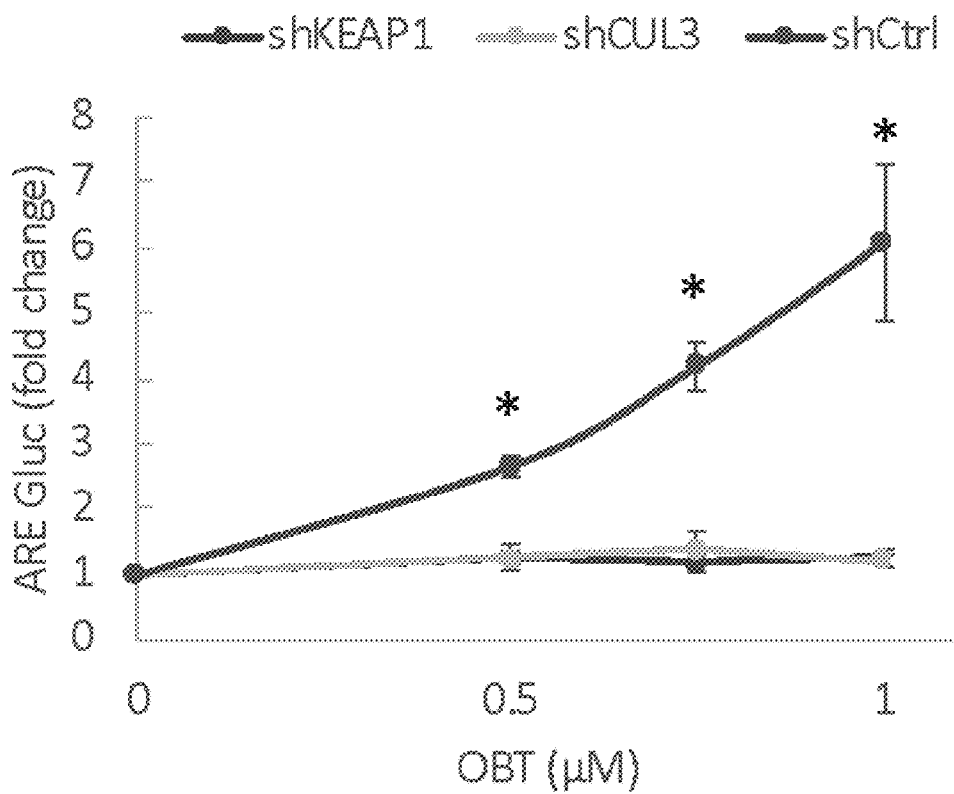
Figure 11C:
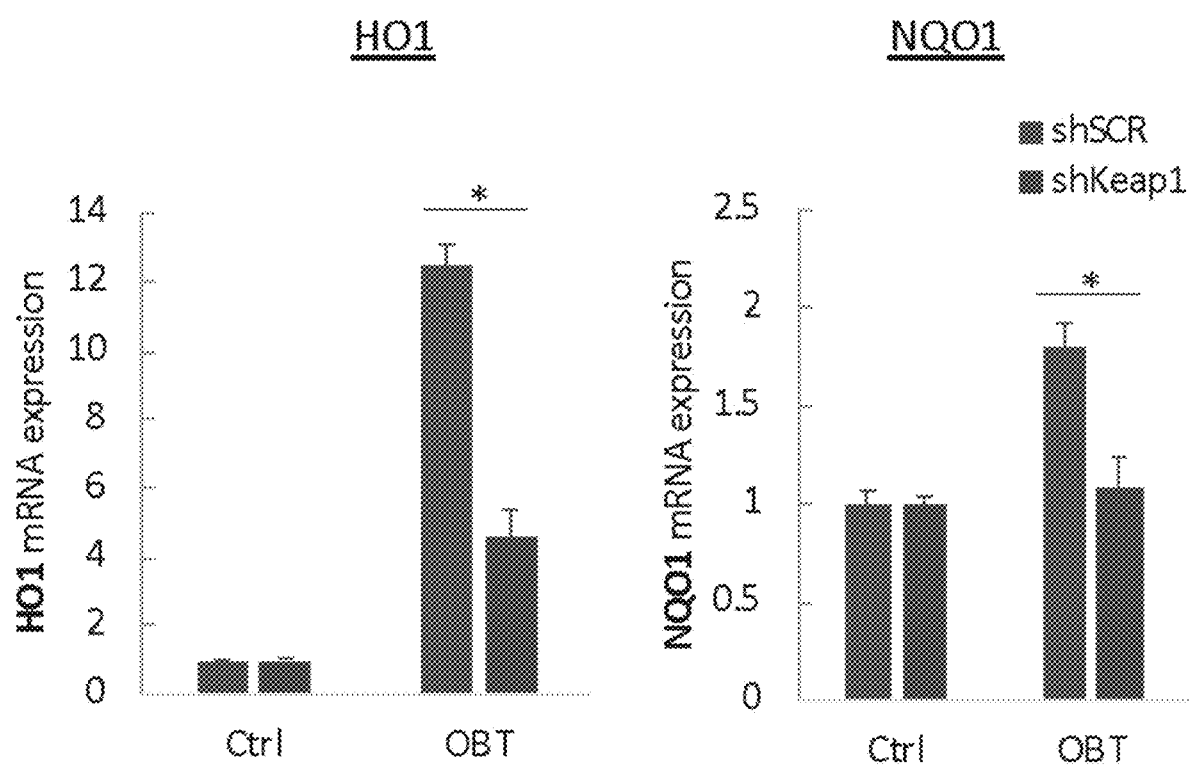
Figure 11D:
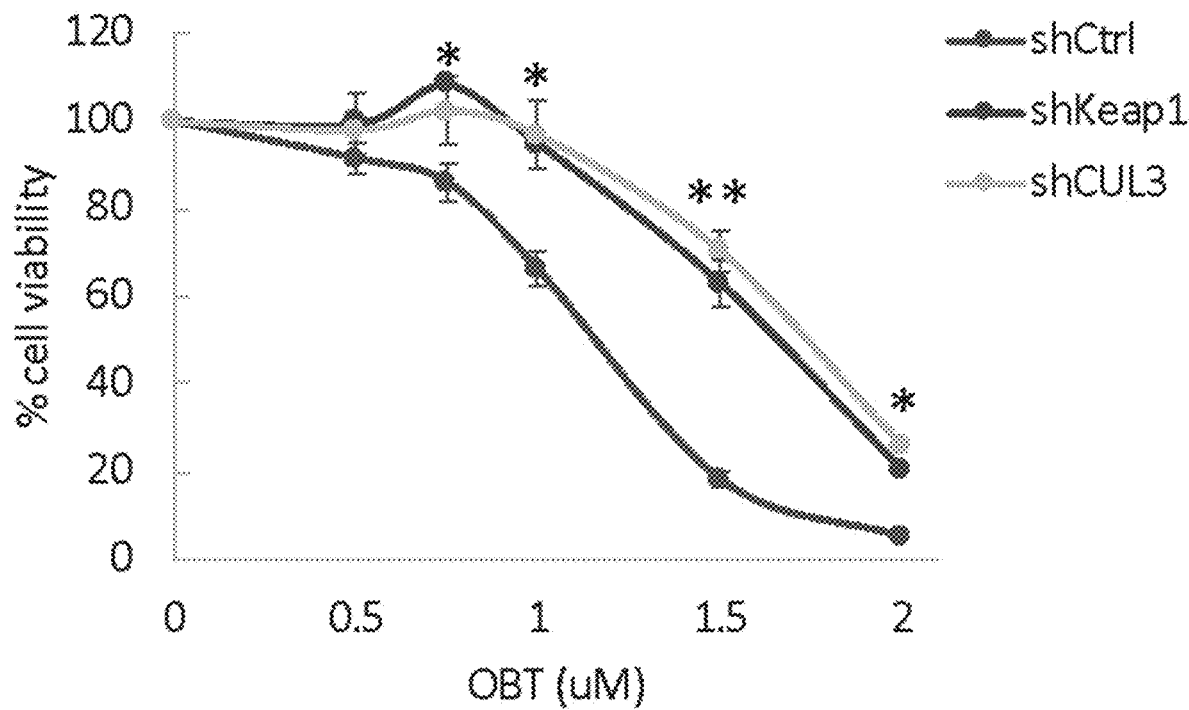
Figure 14A:
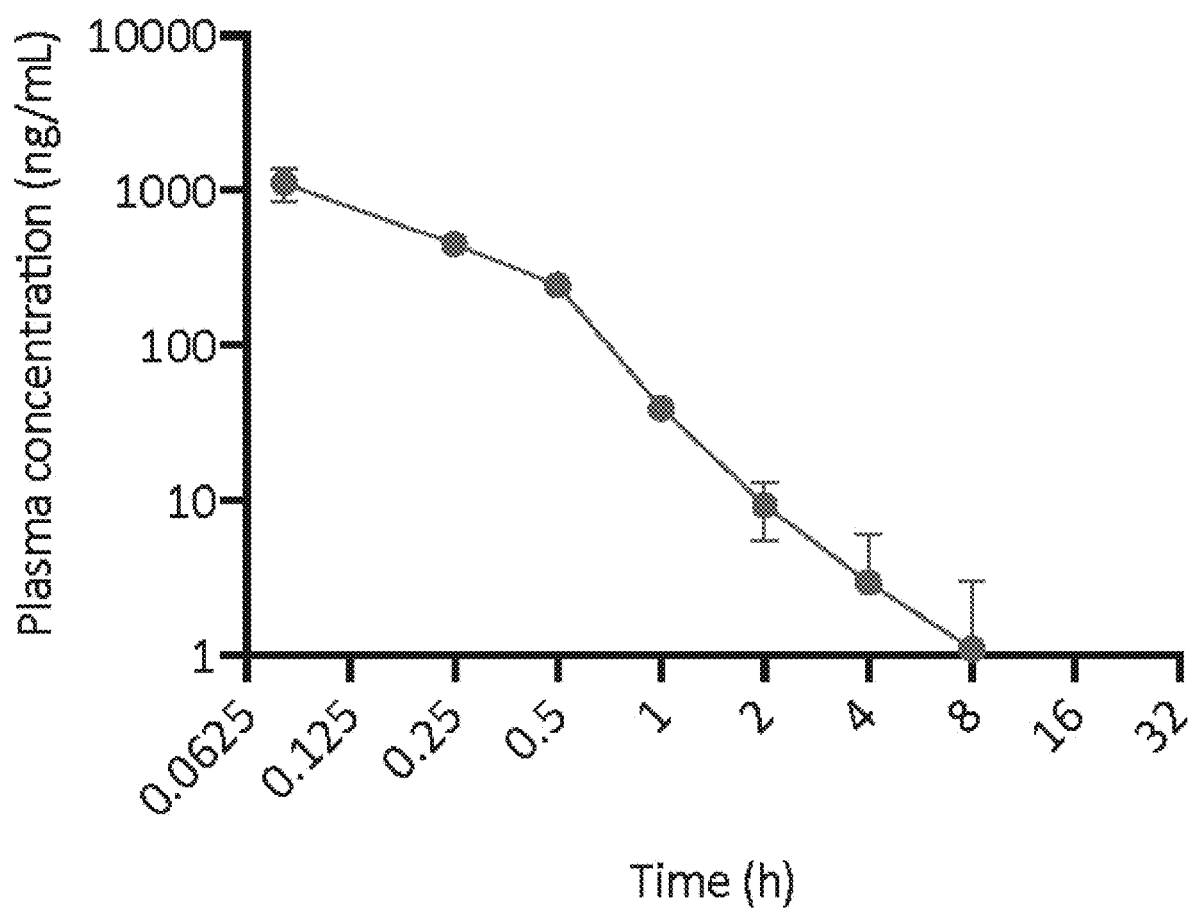
FIG. 14 Pharmacokinetics analysis of OBT. (A) Average plasma concentration-time profiles of OBT following a single intraperitoneal administration (i.p.; 7.5 mg/kg) in male Swiss Albino mice. Data analyzed by LC-MS/MS. Plasma concentrations were detected up to 24 hrs with Tmax of 0.5 hr. The Vss was 3-fold higher than the normal volume of total body water (0.7 L/kg) indicating extravascular distribution. (B-C) Average brain concentration (B) and brain/plasma ratio (C) at 0.5 or 4 hours following a single i.p. administration of OBT. The brain-to-plasma ratios ranged from 0.27 to 0.5 at 0.5 hr and 4 hrs respectively. (D) Mice-bearing fat pad MDA-MB231 tumors expressing Fluc were treated with either DMSO vehicle control (n=5) or AEN36-Tris (10 mg/kg) daily over 22 days. At different time points, tumor volume was monitored by Fluc bioluminescence imaging, and tumor-associated photons were calculated and presented as the average radiance ±SD. *P<0.05 Student t test.
FIG. 14E contains chemical structure of OBT-JQ1.
Figure 14B:
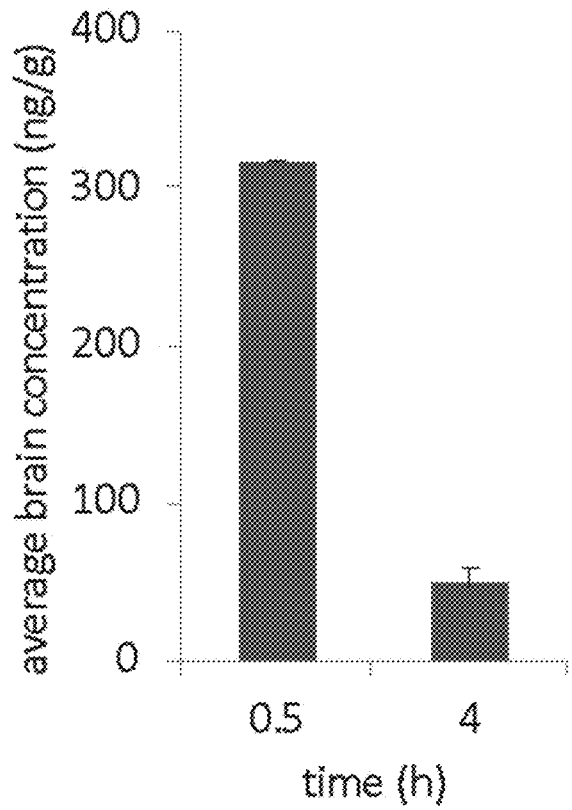
Figure 14C:
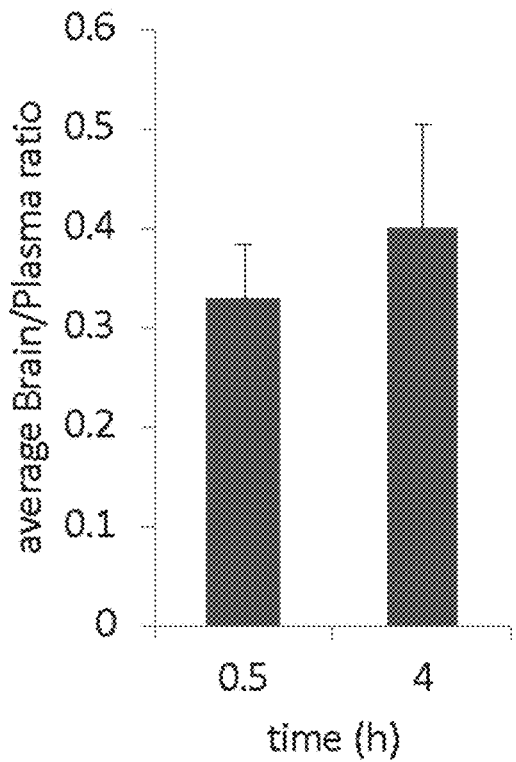
Figure 14D:
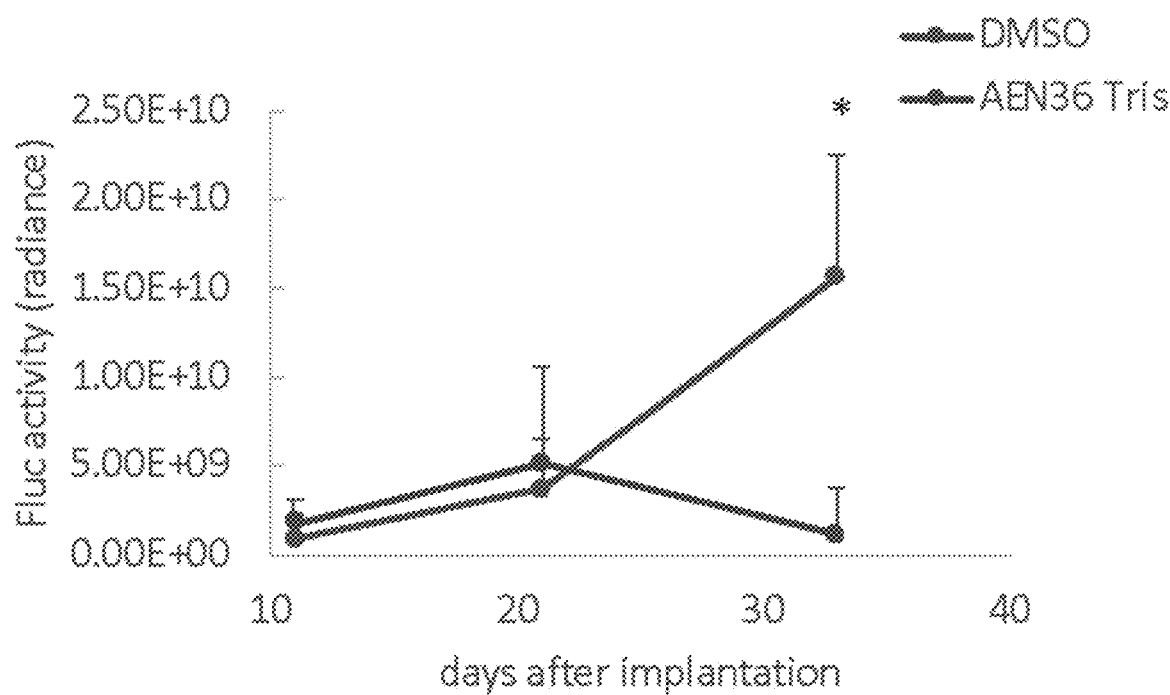
Figure 14E:
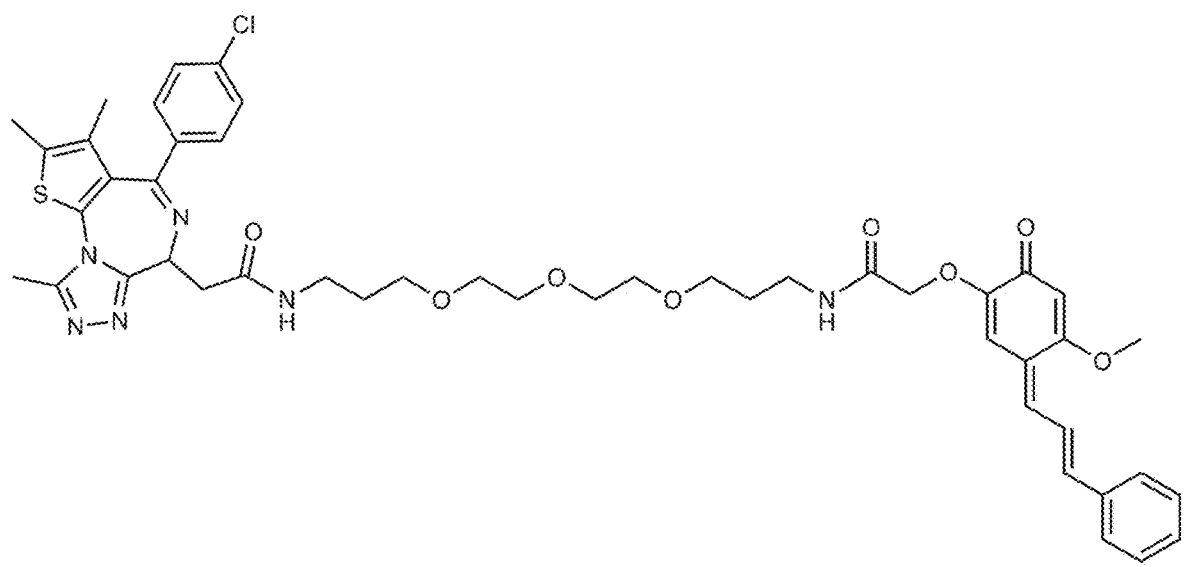
Figure 15:
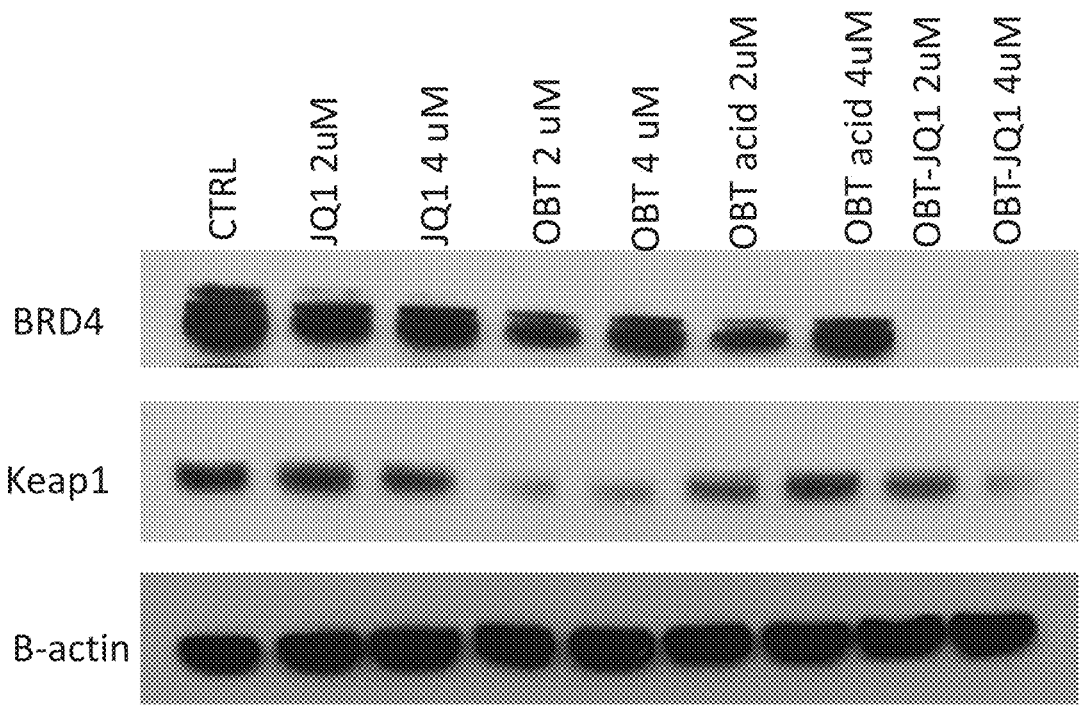
FIG. 15 shows that OBT-JQ1 promotes targeted degradation of BRD4 in glioma cells.
Figure 16:
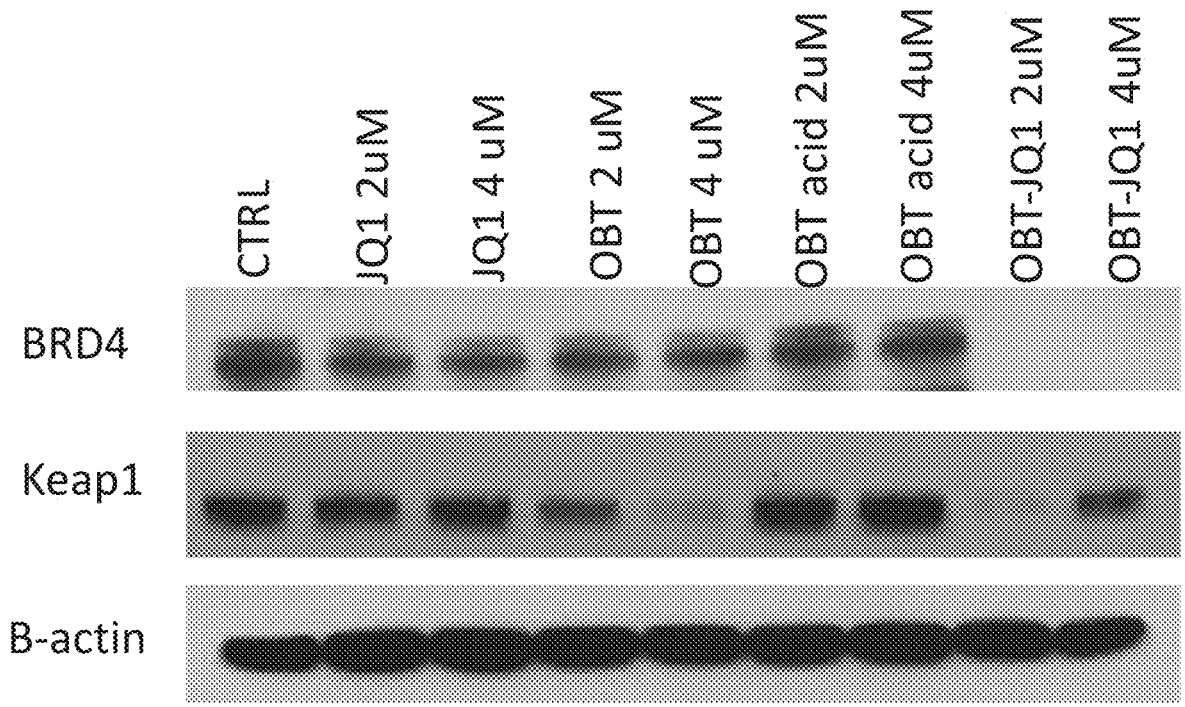
FIG. 16 shows that OBT-JQ1 promotes targeted degradation of BRD4 in breast cancer cells.
Figure 17:
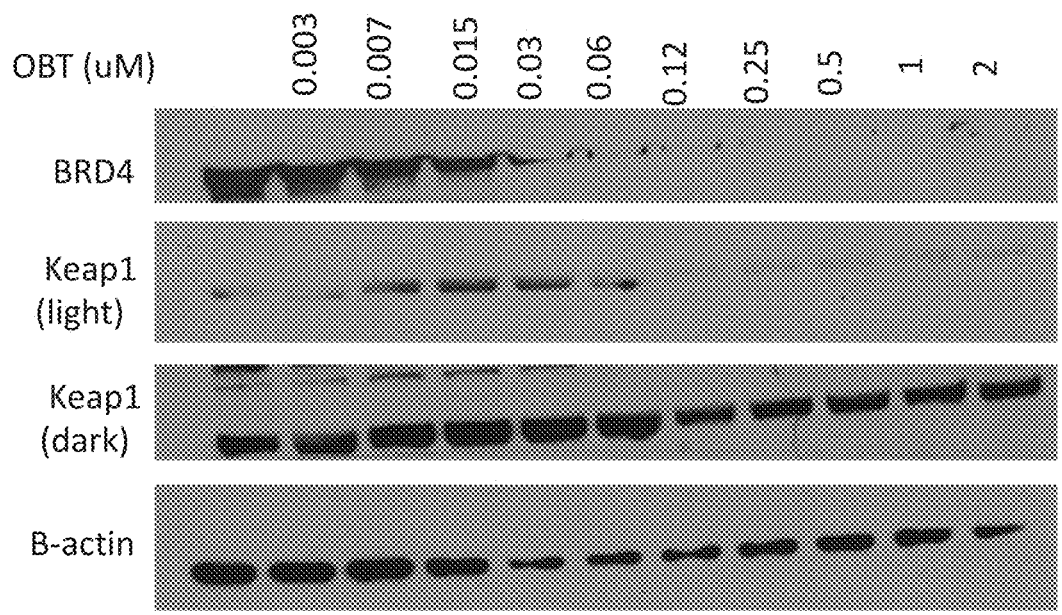
FIG. 17 shows that OBT-JQ1 promotes targeted degradation of BRD4 in patient-derived glioma cells.
Figure 18:
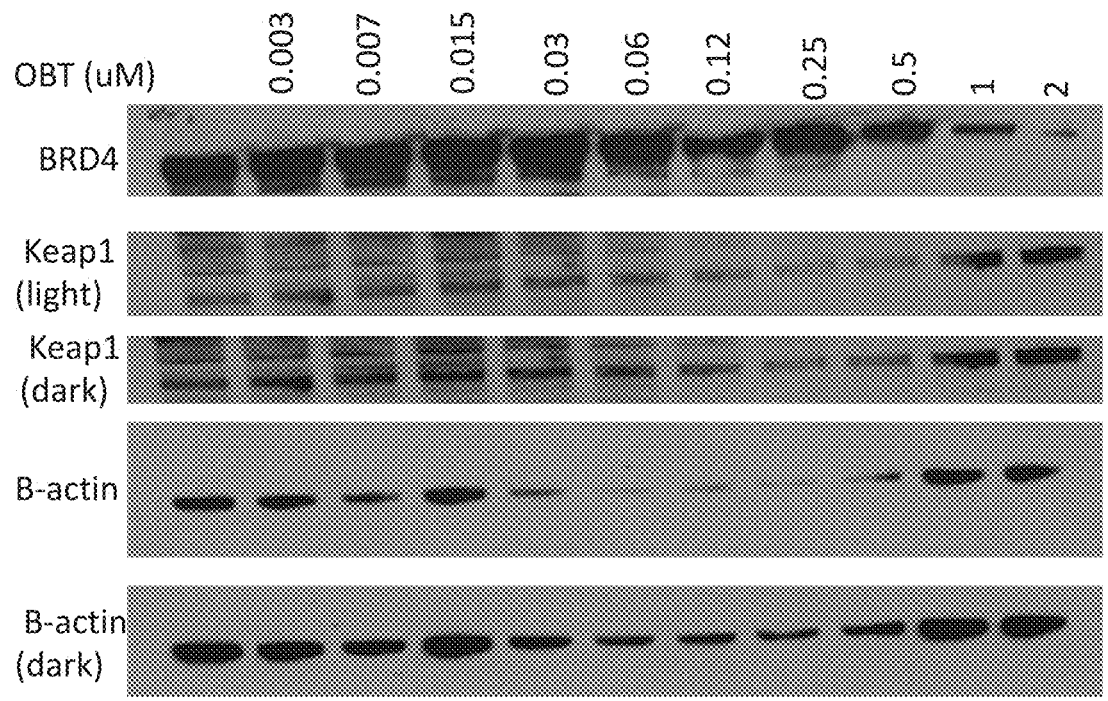
FIG. 18 shows that OBT-JQ1 promotes targeted degradation of BRD4 in patient-derived breast cancer cells.
Figure 19:
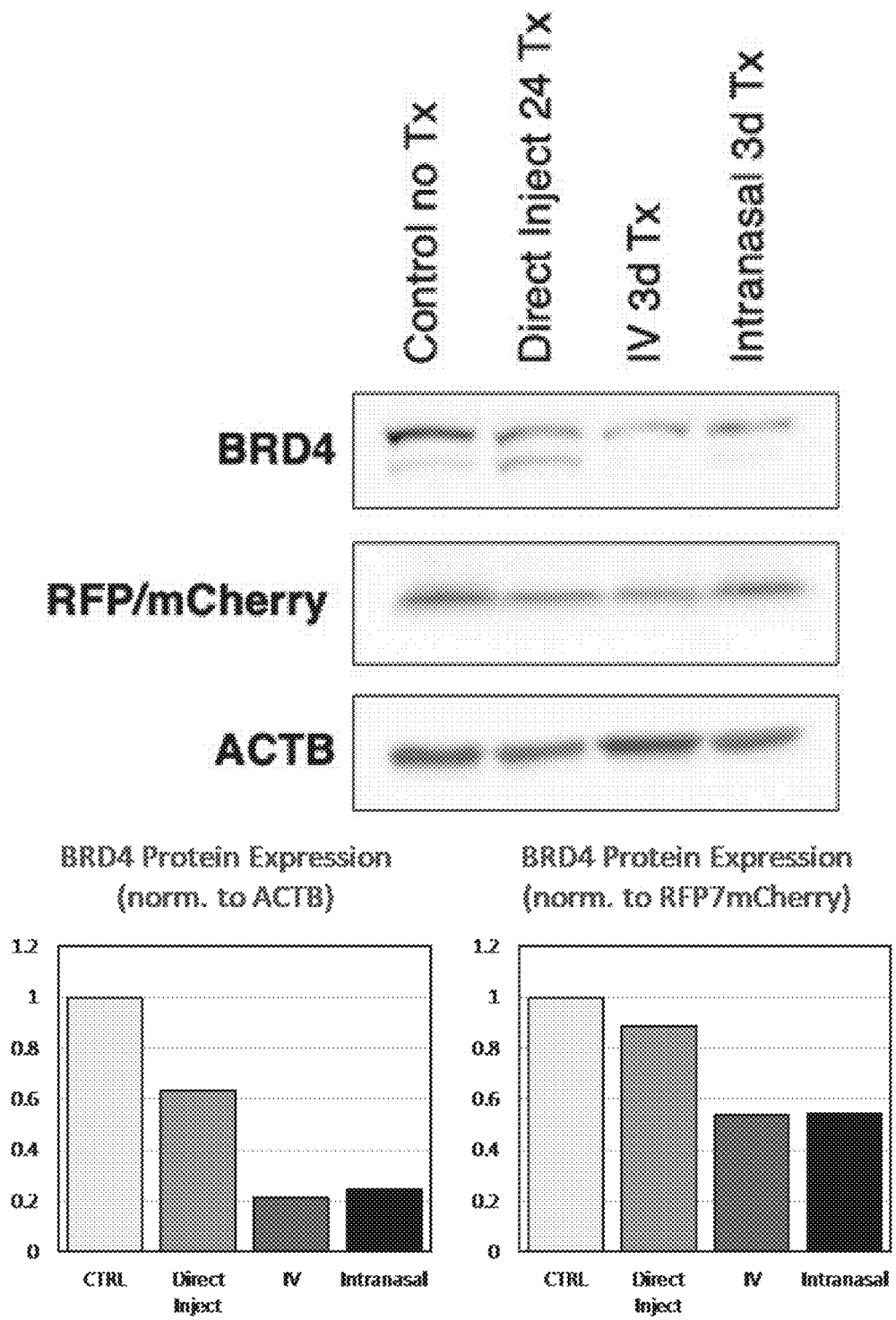
FIG. 19 shows that OBT-JQ1 induces BRD4 degradation in mouse glioma model in vivo. Mice-bearing glioma tumors were injected with 1 mg/kg OBT-JQ1 using different routes. Brain tumors were removed, lysed and analyzed by Western blotting.
Figure 20:
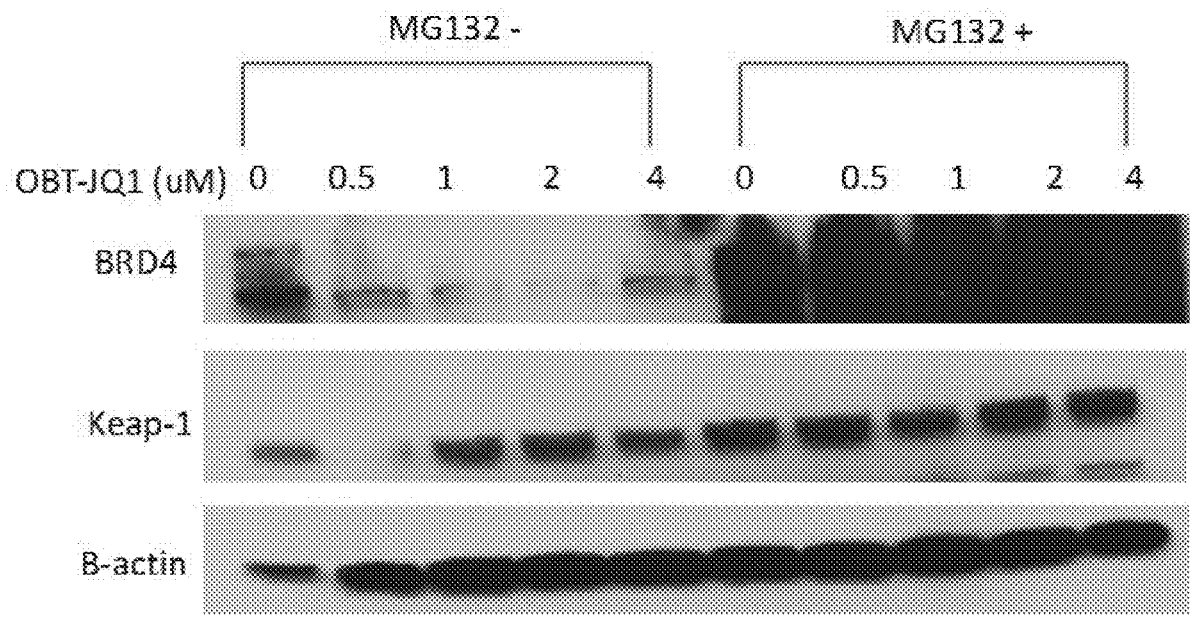
FIG. 20 shows that blocking proteasome reverses the effect of OBT-JQ1.
Figure 21:
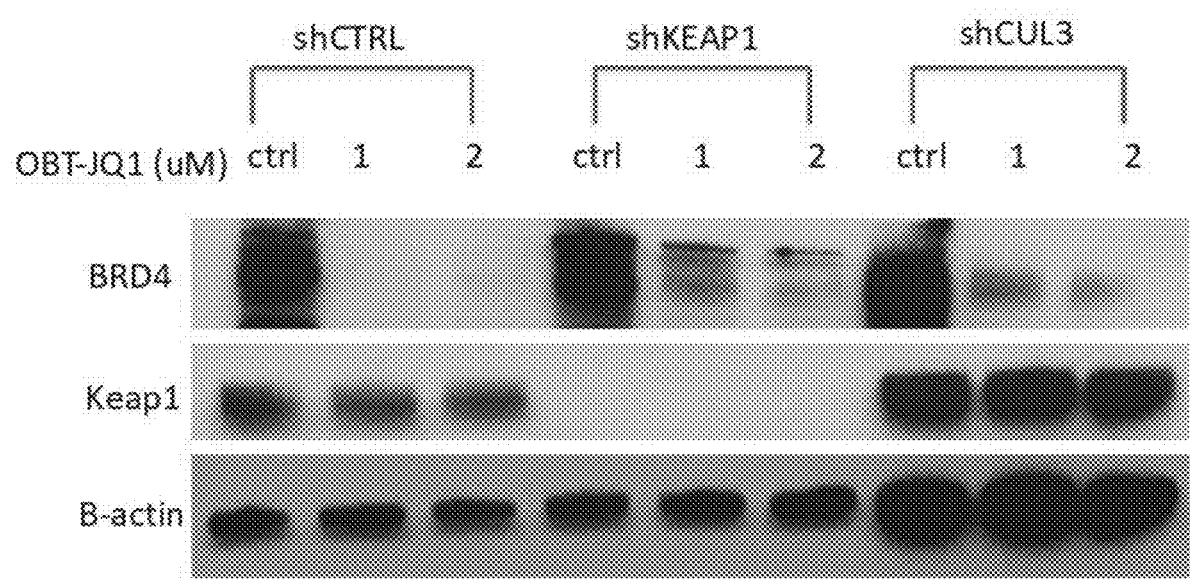
FIG. 21 shows that OBT-JQ1 is not specific to only CUL3. Results show that OBT-JQ1 retains PROTAC activity in Keap1 and CuL3 knockdown experiments, supporting a conclusion that it may also act as recruiting element for other ubiquitin ligase complexes.
Figure 22:
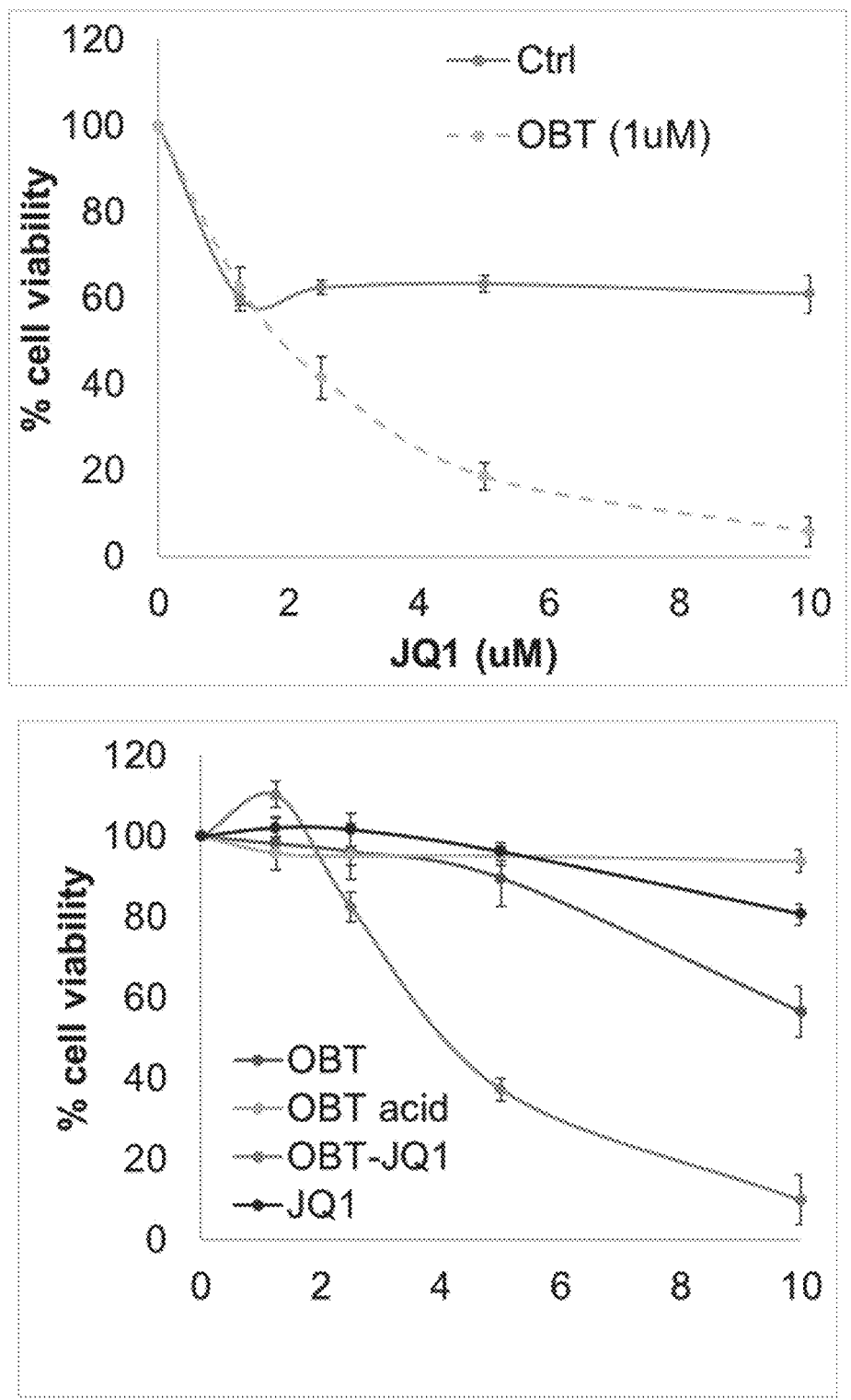
FIG. 22 shows that OBT synergizes with JQ1 in cancer cells.
Figure 23:
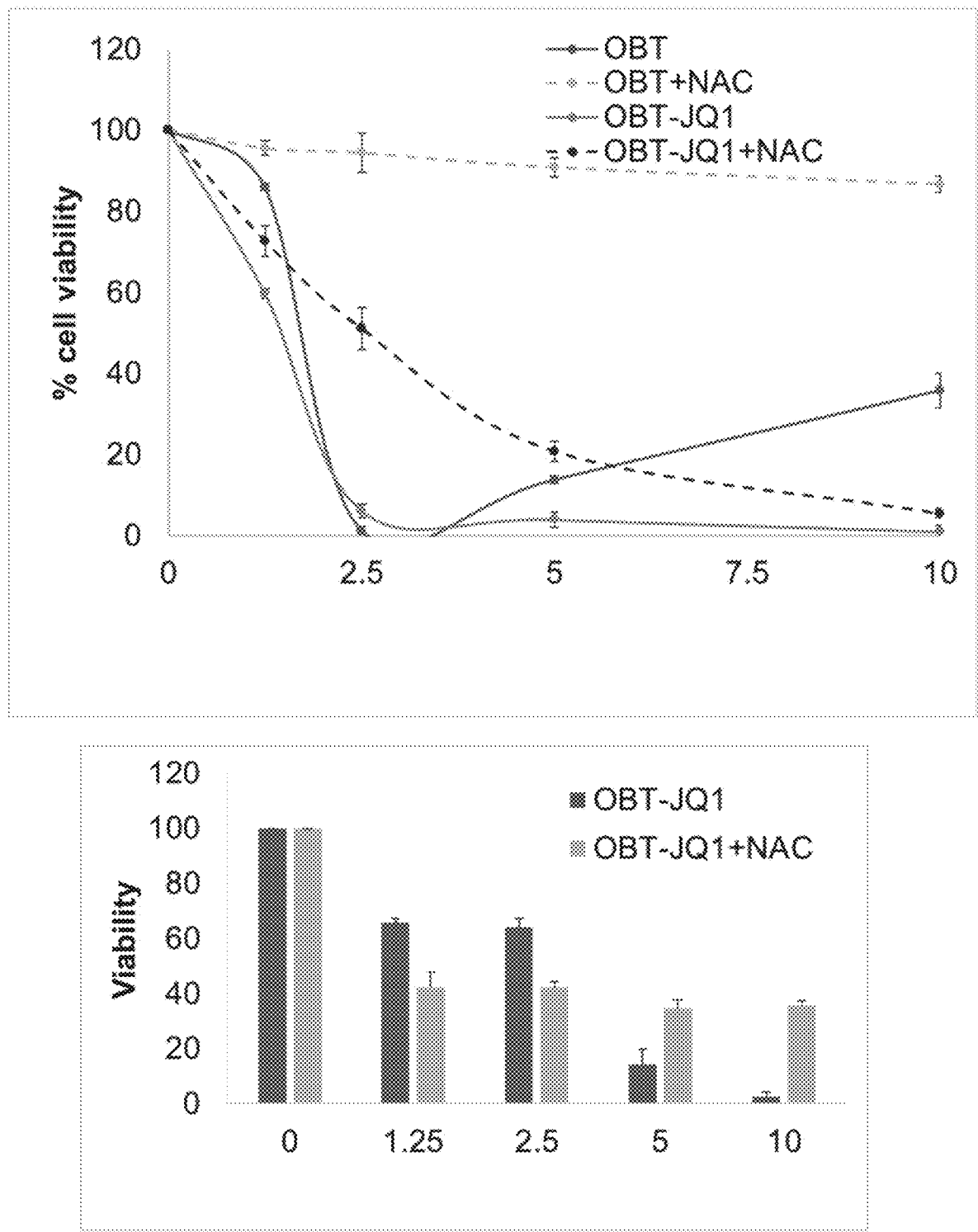
FIG. 23 shows that OBT-JQ1-induced cell death is not protected by antioxidant NAC. Hence, the cell death is not only caused by ROS.

Example 5—OBT and its Analog Effectively Target Tumors in Preclinical Mouse Models Pharmacokinetic profiling of OBT in mice showed high systemic plasma clearance with terminal plasma half-life of 24 minutes following intraperitoneal injection (FIG. 14A). Furthermore, it was found that OBT efficiently penetrates the intact blood-brain barrier (BBB) (FIG. 14B-C). To confirm that OBT is able to penetrate the brain and functionally target brain tumors, positron emission tomography (PET) was used with the PET-tracer 2 [$^{18}$F] fluoro-2-deoxy-D-glucose (FDG), which measures the rate of tumor glucose uptake in a mouse orthotopic GSCs model. OBT-treated mice exhibited approximately a 50% decrease in FDG tumor uptake as measured by FDG-PET imaging (FIG. 10I). Finally, compound AEN36 Tris with most improved pharmacological properties including enhanced potency, stability and solubility, was selected in this experiment and evaluated for in vivo antineoplastic effect in a breast cancer mammary fat pad tumor xenograft model. Treatment with AEN36 Tris (10 mg/kg daily for 22 days) induced a significant decrease in tumor volume, compared to the control group, as assessed by bioluminescence imaging (FIG. 14D). In summary, OBT and its prodrugs penetrate the BBB. Furthermore, prodrugs show enhanced solubility compared to OBT while retaining the antineoplastic properties.

Discussion of Examples 1-5

Small molecules that react with cysteine side chains within Keap1 (Ref. 26) or target the Kelch domain of Keap1 (Ref 27) have been identified. The experimental results provide evidence that the natural compound OBT activates the Nrf2 pathway by binding covalently to cysteine residues within the BTB-domain of Keap1 leading to its ubiquitination and subsequent proteasomal degradation. This directly impacts the ability of the CUL3-Keap1 ubiquitin ligase complex to degrade Nrf2, resulting in Nrf2 stabilization and downstream activation of ARE-mediated transcription (FIG. 1). It is highly likely that OBT also interacts with other thiol-rich proteins; however, the experimental data supports that Keap1 is a major functional target for OBT and that the BTB-CUL3 ubiquitin ligase complex is required for OBT-mediated degradation. Cysteine-reactive compound likely engages other secondary targets in order to promote an overall stress response. In fact, downregulation of Keap1 was not sufficient to induce the same level of cytotoxicity observed after treatment with OBT or other Nrf2 activators, confirming this hypothesis.

The transcription factor Nrf2 is often viewed as a pleiotropic gene. Whether its activation or inhibition is beneficial for tumor treatment remains a paradox and seems to depend on various factors such as the cell type, tumor stage, and genetic aberrations within the tumor (Ref. 2-4). Nrf2 has been suggested to act as a tumor suppressor, thus its activation can suppress carcinogenesis (Refs. 2, 28-20). Nrf2 activation was shown to decrease tumor growth in established tumors (Ref. 31), and several antineoplastic drugs enhance Nrf2 activity (Ref. 16). In this study, we have demonstrated that, in addition to OBT, several other reactive electrophiles and oxidants known as transient activators of Nrf2 can induce cytotoxicity in tumor cells. On the other hand, activation of Nrf2 by cancer targeting drugs can also lead to unfavorable clinical outcomes because of Nrf2 ability to enhance chemoresistance (ref 28). One plausible explanation of this paradox is that, unlike somatic mutations and oncogene-mediated signaling that promote a sustained Nrf2 activation accompanied by numerous adaptation mechanisms, pharmacological activation of Nrf2 is transient and does not necessarily phenocopy constitutive Nrf2 activation (Ref. 3, 4). Despite these controversies, several Nrf2 activators have been developed as antineoplastic compounds in preclinical studies (Ref. 32), and at least one such compound, sulforaphane, has advanced to a phase 2 clinical trial for the treatment of metastatic breast cancer (NCT02970682).

The dose-response curve of many chemopreventive agents as well as chemotherapeutic drugs is U-shaped (Ref. 2), resulting in opposing effects between low and high doses of the same agent. For example, synthetic oleanane triterpenoids exert chemopreventive functions at low doses but are also able to induce oxidative stress and apoptosis at higher doses (Refs. 28, 33). The same model could be applied to OBT where lower doses of the compound lead to a strong Nrf2 activation while at higher doses, OBT acts as a potent pro-oxidant that targets cancer cells leading to DNA damage and apoptosis as was previously shown (Ref. 8).

In conclusion, a mechanistic understanding was established of the mode of action of OBT. OBT is a reversible covalent modifier of cysteine-residues in Keap1, targeting it for proteosomal degradation, leading to strong activation of Nrf2. In addition, prodrugs of OBT were developed with improved in vivo activity and pharmacological properties. Finally, given that impaired Keap1 activity and Nrf2 activation leads to increased expression of antioxidant and detoxification genes, and their role in neuroprotection (Refs. 19, 34, 35), OBT and its prodrugs are useful for inflammatory disorders such as diabetes, Alzheimer's disease and Parkinson disease (Ref. 36).

Example 6— Preparation of Compounds AF20a and AF20b (E)-4-(1-((2-hydroxyethyl)thio)-3-phenylallyl)-5-methoxybenzene-1,2-diol (AF20a) and (E)-4-(3-((2-hydroxyethyl)thio)-3-phenylprop-1-en-1-yl)-5-methoxybenzene-1,2-diol (AF20b).

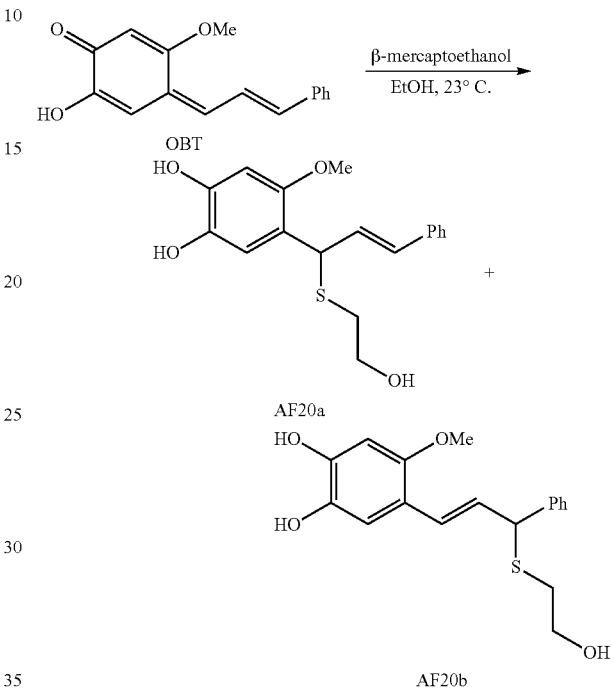

To a 20-mL flask containing a magnetic stir bar was added obtusaquinone (10 mg, 0.0393 mmol), absolute EtOH (2 mL), and β-mercaptoethanol (8 uL, 0.114 mmol). Over the course of the reaction, the sparingly-soluble orange solid is converted to the adduct, which is homogenous in absolute EtOH and gives rise to a light yellow homogenous solution. After 1 h, analysis by LCMS indicated that the reaction was not complete, aditional β-mercaptoethanol (4 uL, 0.057 mmol) was added. At t=2 h, the reaction was complete. The solution is concentrated and dried under high vacuum to yield the desired product as amber oil with AF20a as the major regioisomer (~10:1). Regioisomer A: 1H NMR (400 MHz, MeOD) δ 7.36 (d, J=8.0 Hz, 2H), 7.26 (t, J=7.5 Hz, 2H), 7.18 (d, J=7.4 Hz, 1H), 6.89 (s, 1H), 6.46 (s, 1H), 6.45 (d, J=15.6, 1H), 6.33 (dd, J=15.6, 8.4 Hz, 1H), 5.02 (d, J=8.4 Hz, 1H), 3.74 (s, 3H), 3.62 (t, J=7.2 Hz, 2H), 2.59-2.43 (m, 1H). 13C NMR (101 MHz, MeOD) δ 151.6, 146.3, 140.2, 138.4, 131.5, 131.0, 129.6, 128.5, 127.4, 120.6, 116.3, 101.7, 62.4, 57.0, 45.3, 34.8. MS (ESP) m/z (M–H)⁻331.28, [calculated $C_{18}H_{19}O_4S$: 331.1].

Example 7— Preparation of Compounds AEN36a-Bis and AEN36b-Bis (E)-4-(1-((2-hydroxyethyl)thio)-3-phenyl allyl)-5-methoxy-1,2-phenyl ene diacetate (AEN36a-Bis) and (E)-

4-(3-((2-hydroxyethyl)thio)-3-phenylprop-1-en-1-yl)-5-methoxy-1,2-phenylene diacetate

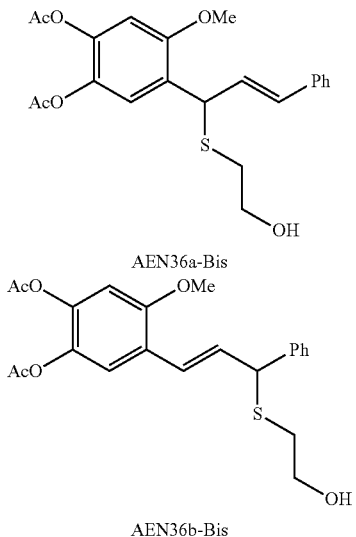

AEN36a-Bis

AEN36b-Bis

To a 20-mL flask containing a magnetic stir bar and AF20 was added pyridine (786 uL, 0.05 M) and Ac$_2$O (7.4 uL, 0.786 mmol). After 16 h, additional Ac$_2$O (1.5 uL, 0.0159 mmol) was added. At t=18.5 h, the reaction was completed as judged by LCMS. The reaction mixture was concentrated to afford an amber oil. Purified by flash column chromatography (045% MeOH/CH$_2$C$_{12}$) to afford a 1:0.24 mixture of AEN36a-Bis and AEN36b-Bis (5.2 mg, 32%) as a yellow oil, which eventually equilibrated at room temperature in CDCl3 to a 1:1.4 mixture of both isomers. Regioisomer A: $^1$H NMR (400 MHz, CDCl$_3$) δ 7.47-7.19 (m, 6H), 6.73 (s, 1H), 6.56 (d, J=15.6 Hz, 1H), 6.33 (dd, J=15.7, 8.2 Hz, 1H), 5.07 (d, J=8.4 Hz, 1H), 3.86 (s, 3H), 3.72 (t, J=5.9 Hz, 2H), 2.71 (m, 2H), 2.29 (s, 3H), 2.27 (s, 3H). $^{13}$C NMR (101 MHz, CDCl3) δ 168.6, 168.2, 154.3, 141.5, 136.4, 135.4, 131.7, 128.6, 127.8, 127.6, 127.0, 126.5, 122.9, 106.4, 60.5, 56.2, 43.6, 34.8, 20.7, 20.6. Regioisomer B: $^1$H NMR (400 MHz, CDCl$_3$) δ 7.46-7.19 (m, 6H), 6.77 (s, 1H), 6.74 (d, J=15.8 Hz, 1H), 6.31 (dd, J=15.8, 9.1 Hz, 1H), 4.64 (d, J=9.1 Hz, 1H), 3.81 (s, 3H), 3.72 (t, J=5.9 Hz, 2H), 2.82-2.58 (m, 2H), 2.29 (s, 3H), 2.27 (s, 3H). $^{13}$C NMR (101 MHz, CDCl3) δ 168.7, 168.2, 154.6, 141.8, 140.1, 135.4, 130.6, 128.8, 127.9, 127.7, 124.7, 124.0, 120.9, 106.3, 60.6, 56.0, 52.2, 34.8, 20.7, 20.6. MS (ESI$^+$) m/z (M+Na)$^+$439.12, [calculated C$_{22}$H24NaO6S: 439.1].

Example 8— Preparation of Compounds AEN36a-Tris and AEN36b-Tris (E)-4-(1-((2-acetoxyethyl)thio)-3-phenylallyl)-5-methoxy-1,2-phenylene diacetate (AEN36a-Tris) and (E)-4-(3-((2-acetoxyethyl)thio)-3-phenylprop-1-en-1-yl)-5-methoxy-1,2-phenylene diacetate (AEN36b-Tris)

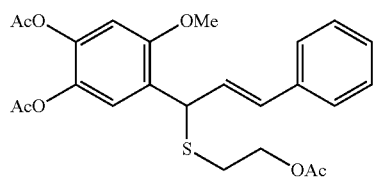

-continued

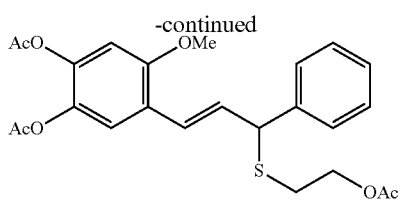

To a 20-mL flask containing a magnetic stir bar and 155 mg (0.39 mmol) AF20 was added 5 mL pyridine and 160 µL Ac$_2$O (1.6 mmol) and stirred overnight. The solution was concentrated and dried under high vacuum to yield the desired product as amber oil with AEN36a-Tris as the major regioisomer (~10:1). Flash column chromatography (0410% MeOH/CH$_2$Cl$_2$) afforded the desired products as a yellow oil as mixtures of regioisomers (170 mg, 95%) Regioisomer A: $^1$H NMR (400 MHz, CDCl3) δ 7.38-7.23 (m, 6H), 6.73 (s, 1H), 6.54 (d, J=15.6 Hz, 1H), 6.29 (dd, J=15.6, 8.6 Hz, 1H), 5.12 (d, J=8.6 Hz, 1H), 4.29-4.16 (m, 2H), 3.84 (s, 3H), 2.71 (m, 2H), 2.28 (s, 3H), 2.27 (s, 3H), 2.06 (s, 3H). MS (ESI$^+$) m/z (M+H)$^+$459.3, [calculated C$_{24}$H26NaO7S: 458.14].

Example 9— Preparation of OBT-JQ1

Reagents and equipment: Reagents were purchased from Chem-Impex International, Aldrich, Fluka, Sigma-Aldrich Co., and Combi-Blocks and used without further purification unless otherwise noted. JQ1-acid was obtained from the Qi lab at DFCI. Thin layer chromatography was performed with pre-coated aluminum-backed TLC plates (VWR, Aluminum Oxide 60, Neutral F254 & Silica Gel 60, Neutral F254). Visualization of TLC plates was performed with ninhydrin, iodine, or an UVGL-25 Compact UV Lamp 254/365 UV (UVP 115V-60 Hz/0.16 A). Purifications were either performed with aluminum oxide (Brockmann I, Sigma-Aldrich), silica (Silicycle), or on a Biotage Isolera 4 Purification System equipped with a 200-400 nm diode array detector. For flash purifications, Biotage SNAP Flash Chromatography Cartridges were used (KP-C$_{18}$-Sil & KP-NH). Analytical LC/MS was performed on a Waters 2545 HPLC equipped with a 2998 diode array detector, a 2424 evaporative light scattering detector, a 2475 multichannel fluorescence detector, and a Waters 3100 ESI-MS module, using a XTerraMS C18 5 µm, 4.6×50 mm column at a flow rate of 5 mL/min with a linear gradient (95% A: 5% B to 100% B 90 sec and 30 sec hold at 100% B, solvent A=water+0.1% formic acid, solvent B=acetonitrile+0.1% formic acid). Proton, carbon, and fluorine nuclear magnetic resonance ($^1$H, $^{13}$C, and $^{19}$F NMR spectra) were recorded on a Bruker Avance III 400 spectrometer. Chemical shifts for protons are reported in parts per million (ppm) and are referenced to residual solvent peaks. Data is reported as follows: chemical shift, multiplicity (s=singlet, br s, =broad singlet, d=doublet, t=triplet, q=quartet, p=pentet, m=multiplet), proton coupling constants (J, Hz), and integration.

81

Step 1—Tert-butyl 2-(((Z)-4-methoxy-6-oxo-3-((E)-3-phenylallylidene)cyclohexa-1,4-dien-1-yl)oxy)acetate (NCP 182)

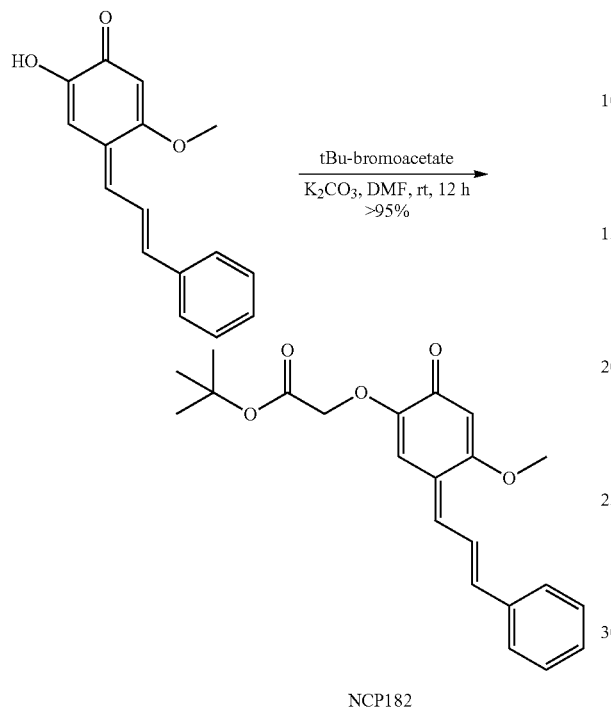

NCP182

(Z)-2-hydroxy-5-methoxy-4-((E)-3-phenylallylidene)cyclohexa-2,5-dien-1-one (OBT, 25.0 mg, 98.3 umol, 1 eq) was dissolved in DMF (2 mL) then tert-butyl bromoacetate (18.9 uL, 128 umol, 1.3 eq) was added followed by K$_2$CO$_3$ (54.3 mg, 393 umol, 4 eq) and the reaction mixture was stirred for 12 h at room temperature while protected from light. The reaction mixture was concentrated to dryness in vacuo then the crude solid was partitioned between 50 mL EtOAc and 50 mL 0.2 N NaHCO$_3$ solution. The aqueous layer was separated and the organic was washed once more with 50 mL 0.2 N NaHCO$_3$ solution, followed by one saturated brine wash. The organic layer was dried over Na$_2$SO$_4$, filtered, and concentrated to dryness in vacuo to yield the desired compound as an orange oil. Yield=35.0 mg, >95%. MS (Ho m/z (M+H)$^+$ 369.32, [calculated C$_{22}$H$_{24}$O$_5$: 368.16].

82

Step 2—2-(((Z)-4-methoxy-6-oxo-3-((E)-3-phenylallylidene)cyclohexa-1,4-dien-1-yl)oxy)acetic acid (NCP210)

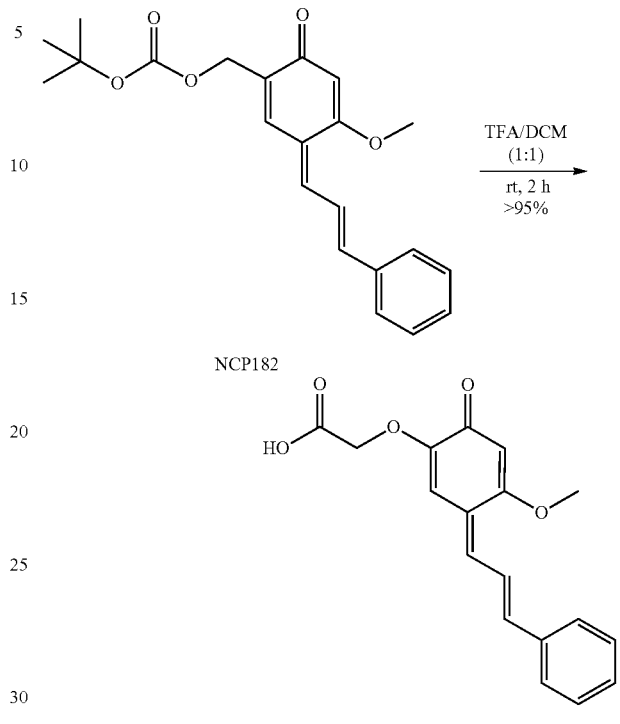

tert-butyl 2-(((Z)-4-methoxy-6-oxo-3-((E)-3-phenylallylidene)cyclohexa-1,4-dien-1-yl)oxy)acetate (NCP182, 35.0 mg, 98 umol) was dissolved in 5 mL TFA/DCM (1:1) and the resulting deep purple solution was allowed to stand at room temperature with an open cap for 2 h. The reaction mixture was concentrated to dryness in vacuo and the resulting crude solid was partitioned between 50 mL DCM and 50 mL saturated brine solution. The aqueous layer was separated and the organic layer was washed once more with saturated brine. The organic layer was dried over Na$_2$SO$_4$, filtered, and concentrated to dryness in vacuo to yield the desired as an orange solid. Yield=30 mg, >95%. MS (ESI$^{+/-}$) m/z (M+H)$^+$313.26, m/z (M–H)$^-$ 311.32, [calculated C$_{18}$H$_{16}$O$_5$: 312.10].

Step 3—N-(3-(2-(2-(3-aminopropoxy)ethoxy)ethoxy)propyl)-2-(4-(4-chlorophenyl)-2,3,9-trimethyl-6H-thieno[3,2-f][1,2,4]triazolo[4,3-a][1,4]diazepin-6-yl)acetamide (NCP235)

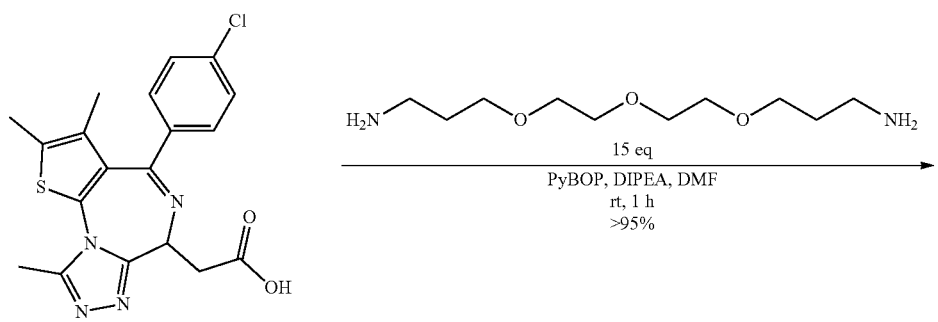

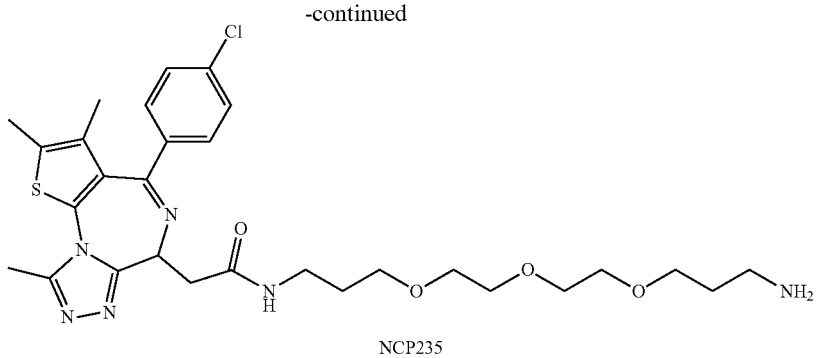

NCP235

2-(4-(4-chlorophenyl)-2,3,9-trimethyl-6H-thieno[3,2-j][3,2,4]triazolo[4,3-a][3,4]diazepin-6-yl)acetic acid (JQ3-Acid, 8.0 mg, 20 umol, 3 eq) was dissolved in DMF (400 uL) and DIPEA (7 uL, 40 umol, 2 eq) was added. To this solution was added PyBOP (32 mg, 24 umol, 3.2 eq) and the activation was allowed to proceed at room temperature for 30 min. This solution was then added dropwise to a solution of 3,3'-((oxybis(ethane-2,3-diyl))bis(oxy))bis(propan-3-amine) (66.0 mg, 300 umol, 35 eq) and DIPEA (7 uL, 40 umol, 2 eq) over 5 min at room temperature. The reaction was allowed to proceed for 3 h then the reaction mixture was injected onto a reverse-phase column and purified via reverse-phase flash chromatography. Yield=33 mg, >95% as a yellow oil. MS (ESI$^{+/-}$) m/z (M+H)$^+$603.33, m/z (M−H)$^−$ 603.53, [calculated $C_{29}H_{39}C_1N_6O_4S$: 602.24].

Step 4—2-(4-(4-chlorophenyl)-2,3,9-trimethyl-6H-thieno[3,2-f][1,2,4]triazolo[4,3-a][1,4]diazepin-6-yl)-N-(1-(((Z)-4-methoxy-6-oxo-3-((E)-3-phenylallylidene)cyclohexa-1,4-dien-1-yl)oxy)-2-oxo-7,10,13-trioxa-3-azahexadecan-16-yl)acetamide (NCP229)

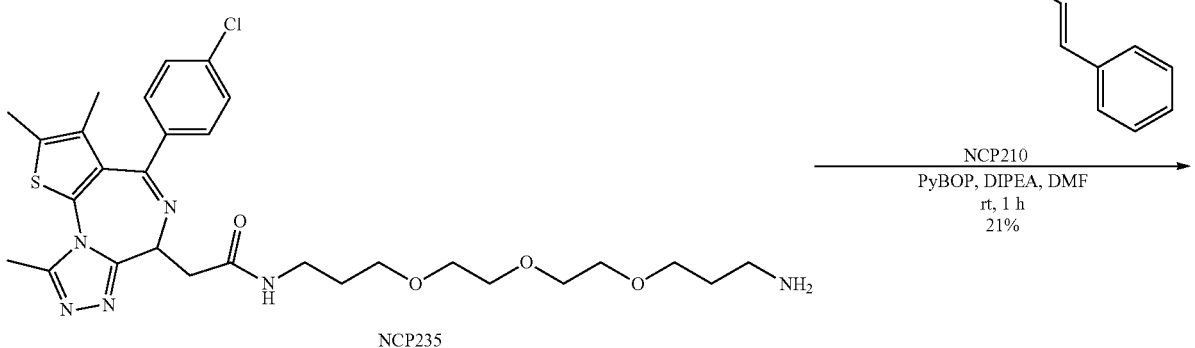

NCP235

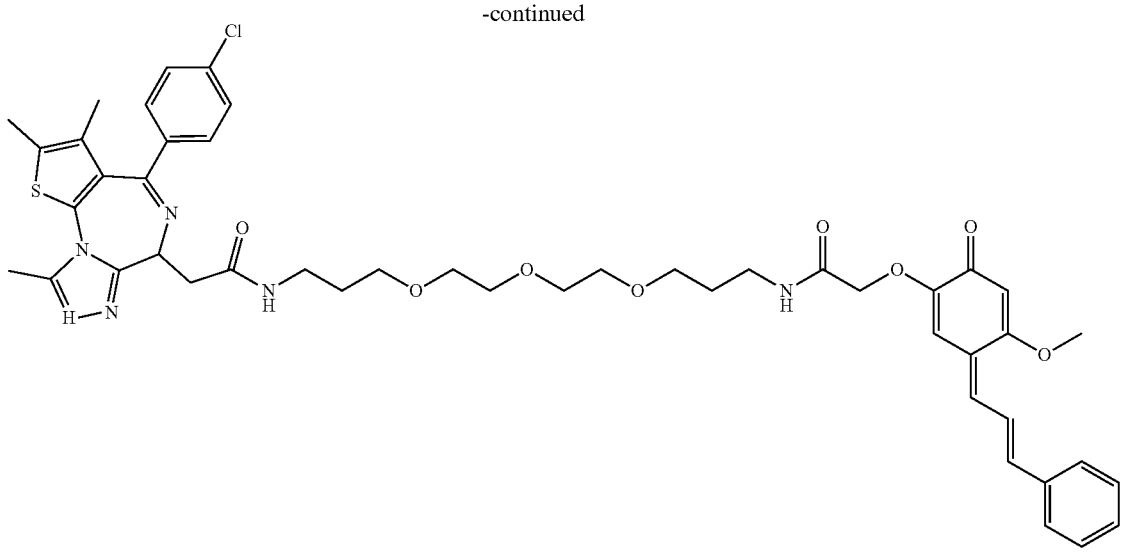

NCP229

2-(((Z)-4-methoxy-6-oxo-3-((E)-3-phenylallylidene)cyclohexa-1,4-dien-1-yl)oxy)acetic acid (NCP210, 5.0 mg, 16 umol, 1 eq) was dissolved in DMF (400 uL) with DIPEA (14 uL, 80 umol, 5 eq). To the solution was added PyBOP (10 mg, 19 umol, 1.2 eq) and the activation was allowed to proceed at room temperature for 10 min, before N-(3-(2-(2-(3-aminopropoxy)ethoxy)ethoxy)propyl)-2-(4-(4-chlorophenyl)-2,3,9-trimethyl-6H-thieno[3,2-f][1,2,4]triazolo[4,3-a][1,4]diazepin-6-yl)acetamide (NCP235, 11 mg, 18 umol, 1.1 eq) was added and the reaction was stirred for 1 h at room temperature. The mixture was injected onto a reverse-phase column and purified via reverse-phase flash chromatography. Yield=2.9 mg, 21% as an orange oil. MS (ESI$^{+/-}$) m/z (M+H)$^+$897.47, m/z (M−H)$^-$895.52, [calculated $C_{47}H_{53}ClN_6O_8S$: 896.33].

Example 10— Preparation of Bis-OBT

N,N'-(((oxybis(ethane-2,1-diyl))bis(oxy))bis(propane-3,1-diyl))bis(2-(((Z)-4-methoxy-6-oxo-3-((E)-3-phenylallylidene)cyclohexa-1,4-dien-1-yl)oxy)acetamide) (NCP254)

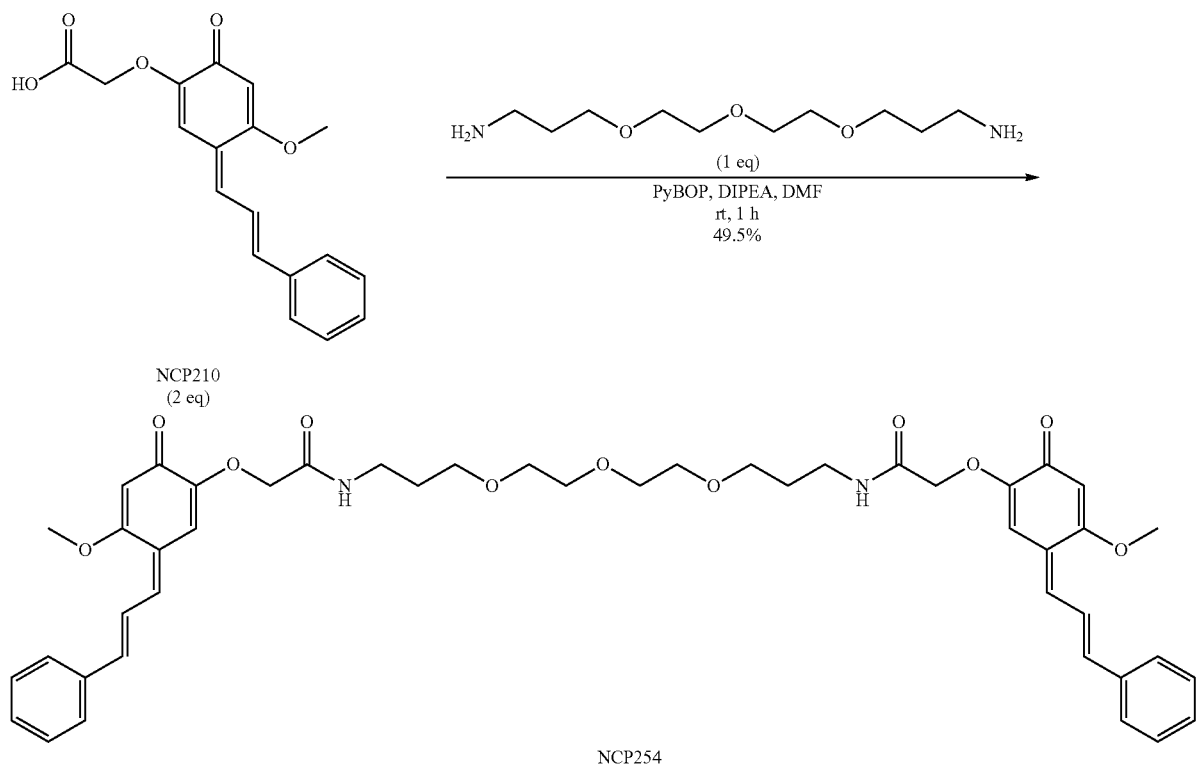

NCP254

2-(((Z)-4-methoxy-6-oxo-3-((E)-3-phenylallylidene)cyclohexa-1,4-dien-1-yl)oxy)acetic acid (NCP210, 5.0 mg, 16 umol, 2 eq) was dissolved in DMF (500 uL) then DIPEA (7 uL, 39 umol, 5 eq) and PyBOP (8.5 mg, 16 umol, 2 eq) were added and activation was allowed to proceed at room temperature for 15 min. To the solution was added 3,3'-((oxybis(ethane-2,1-diyl))bis(oxy))bis(propan-1-amine) (1.7 mg, 7.8 umol, 1 eq) and the reaction was stirred for 1 h at room temperature. The mixture was injected onto a reverse-phase column and purified via reverse-phase flash chromatography. Yield=3.1 mg, 49.5% as an orange oil. MS (ESI$^{+/-}$) m/z (M+H)$^+$809.72, m/z (M−H)$^-$ 807.79, [calculated $C_{46}H_{52}N_2O_{11}$: 808.36].

Example 11— Preparation of OBT-Thalidomide 2-((2-(2,6-dioxopiperidin-3-yl)-1,3-dioxoisoindolin-4-yl)oxy)-N-(2-(2-(2-(2-(((Z)-4-methoxy-6-oxo-3-((E)-3-phenylallylidene)cyclohexa-1,4-dien-1-yl)oxy)acetamido)ethoxy)ethoxy)ethyl)acetamide (NCP278)

a reverse-phase column and purified via reverse-phase flash chromatography. Yield=10 mg, 82.6% as an orange oil. MS (ESI$^{+/-}$) m/z (M+H)$^+$757.51, m/z (M−H)$^-$ 755.63, [calculated $C_{39}H_{40}N_4O_{12}$: 756.26].

Example 12—OBT-JQ1 Induces BRD4 Degradation

FIGS. 15-23 show that OBT-JQ1 induces BRD4 degradation in brain tumors (mouse glioma model) in vivo. CT2A glioma cells expressing mCherry fluorescent protein were implanted in the brain of mice and 2 weeks later, once tumor reached a significant size, mice were injected with 0.7 mg/kg body weight of OBT-JQ1 using different injection routes (1) direct intratumoral injection (single injection), intravenously (once/day over 3 days) and intranasally (once/day over 3 days, an injection route that typically bypasses the blood-brain barrier). 24 hrs after the last injection, brains were removed and the tumor was lysed and analyzed by Western blotting for BRD4 and mCherry and actin loading controls. Results showed that all 3 injection routes yielded efficient

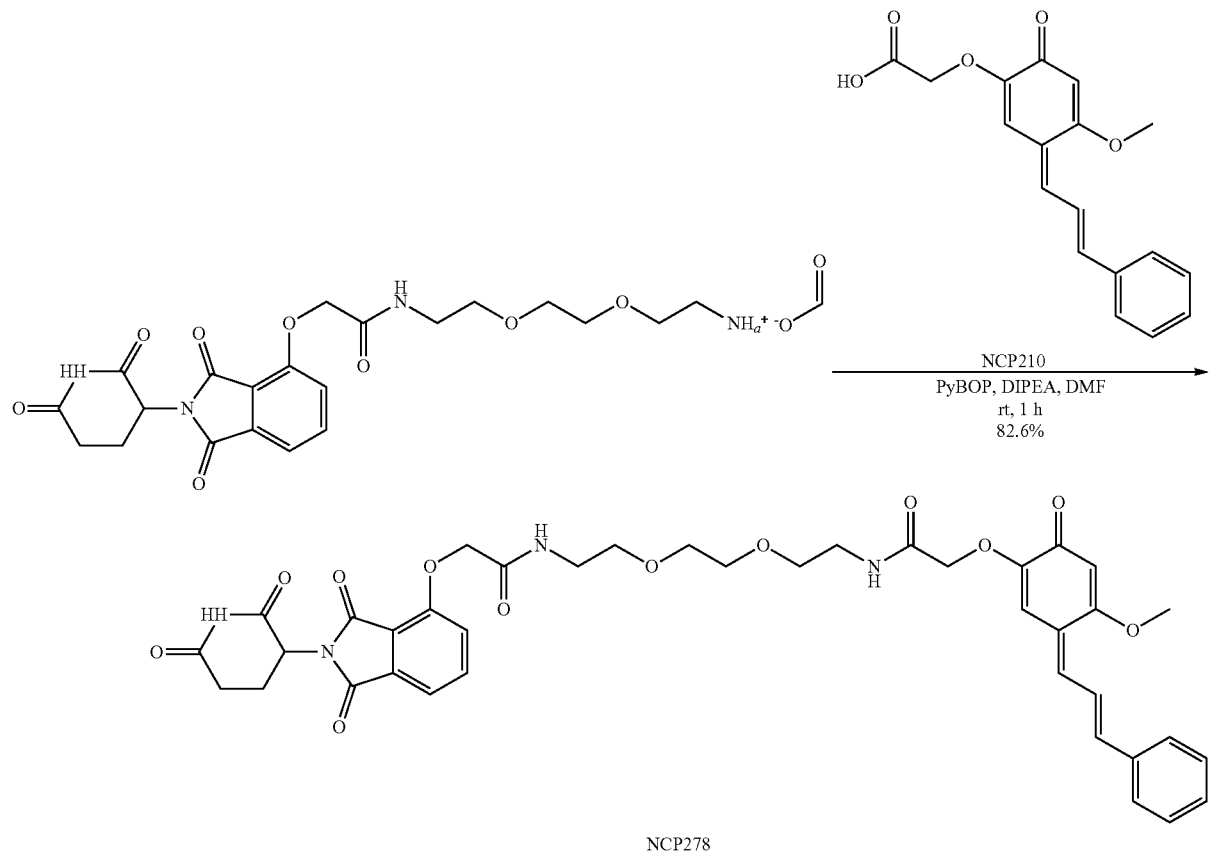

NCP278

2-(((Z)-4-methoxy-6-oxo-3-((E)-3-phenylallylidene)cyclohexa-1,4-dien-1-yl)oxy)acetic acid (NCP210, 5.0 mg, 16 umol, 1 eq) was dissolved in DMF (250 uL) with DIPEA (14 uL, 80 umol, 5 eq). To the solution was added PyBOP (10 mg, 19 umol, 1.2 eq) and the activation was allowed to proceed at room temperature for 10 min, before 2-(2-(2-(2-((2-(2,6-dioxopiperidin-3-yl)-1,3-dioxoisoindolin-4-yl)oxy)acetamido)ethoxy)ethoxy)ethan-1-aminium formate (9.8 mg, 19 umol, 1.2 eq) was added and the reaction was stirred for 1 h at room temperature. The mixture was injected onto BRD4 degradation showing that the exemplified compounds are active in vivo and importantly, the compounds penetrates the brain and the tumor.

Example 13—OBT Induces Glioma Cytotoxic T Cells

FIGS. 24 and 25 show that OBT induces glioma cytotoxic T cells.

To evaluate the effect of OBT on glioma secretome, CT2A mouse glioma cells were treated with OBT (4 μM) for 24 hrs and analyzed cell lysates by cytokine/chemokine array. GBM cells responded to OBT, Nrf2 and ROS induction, by activating several cytokines known to be involved in immune cell chemotaxis and migration (CCL2, CXCL10, IL-6). One of the most striking results from this array is that OBT induced secretion of many cytokines involved in immune response modulation (e.g. CD40, CXCL2, CCL5, CXCL-10, IL-6; FIG. 24). Interestingly, the CD40/CD40L axis bridges signaling between innate and adaptive immune system, increasing antigen presentation and costimulatory capacity of dendritic cells, leading to activation of cytotoxic T cells and NK cells. These innate immunity-related factors may directly contribute to control tumor growth or shape the development of adaptive immunity. Thus, OBT can induce factors that induces activation of tumor immune response.

Figure 25A:
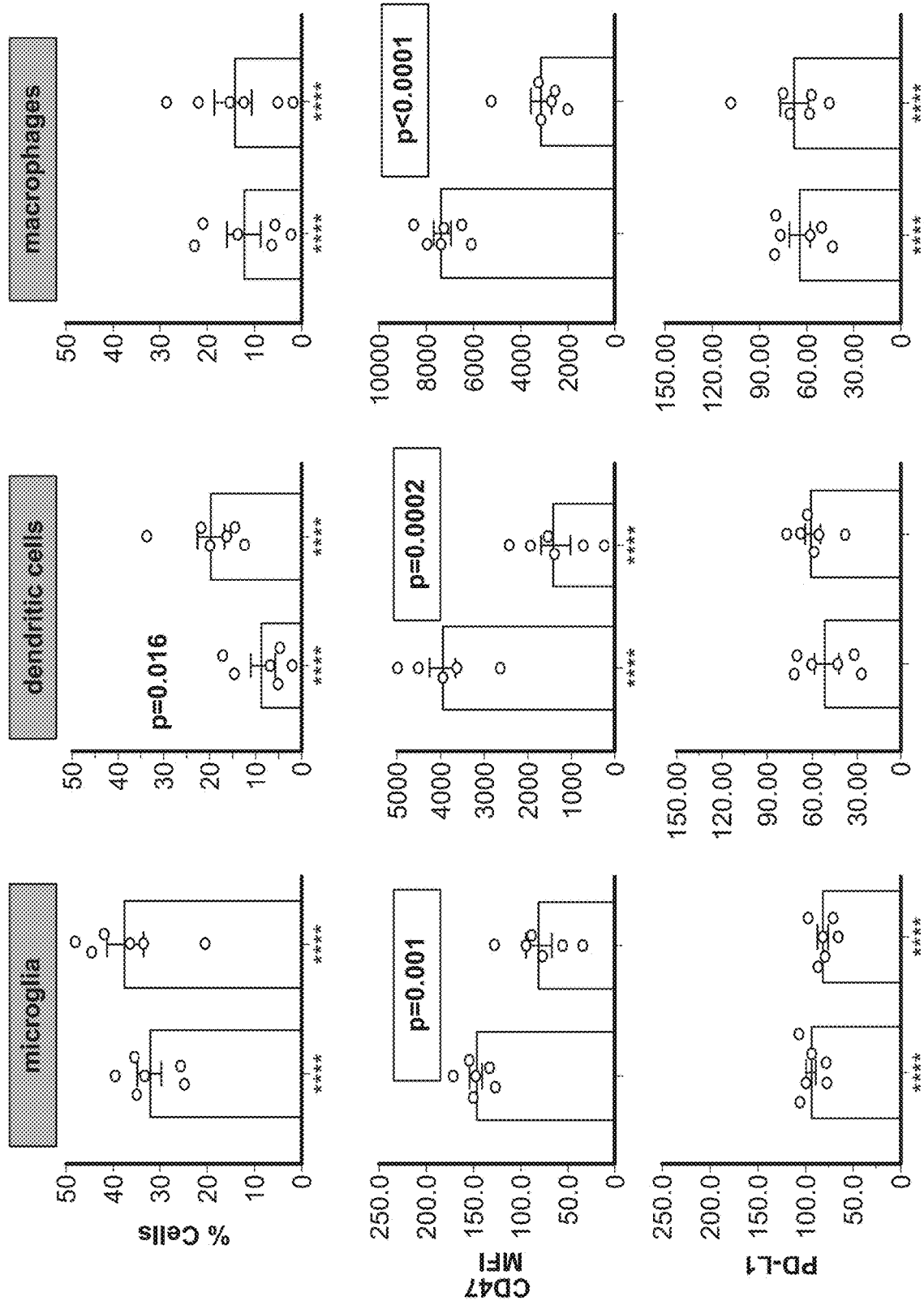
Figure 25B:
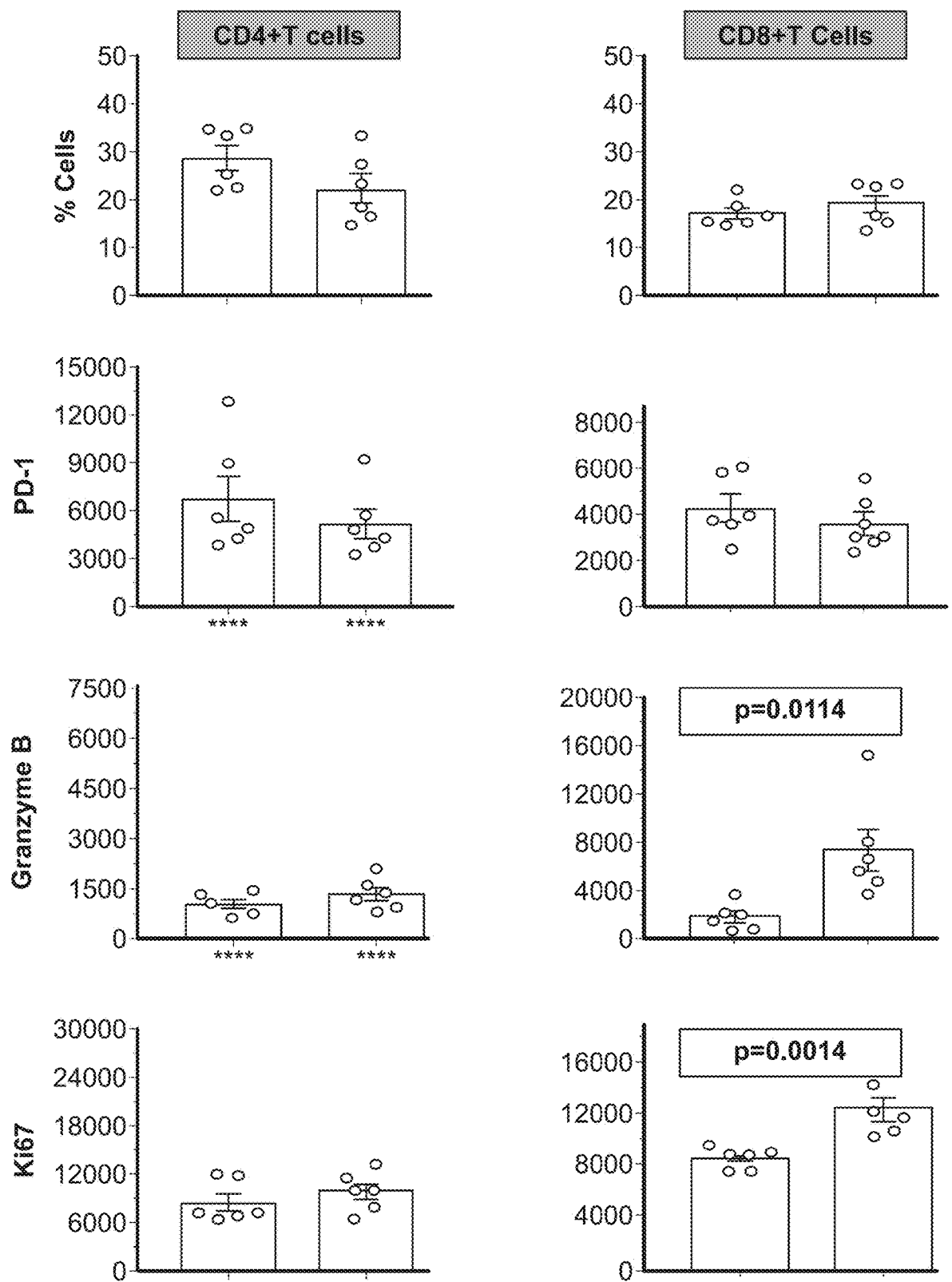
Figure 26:
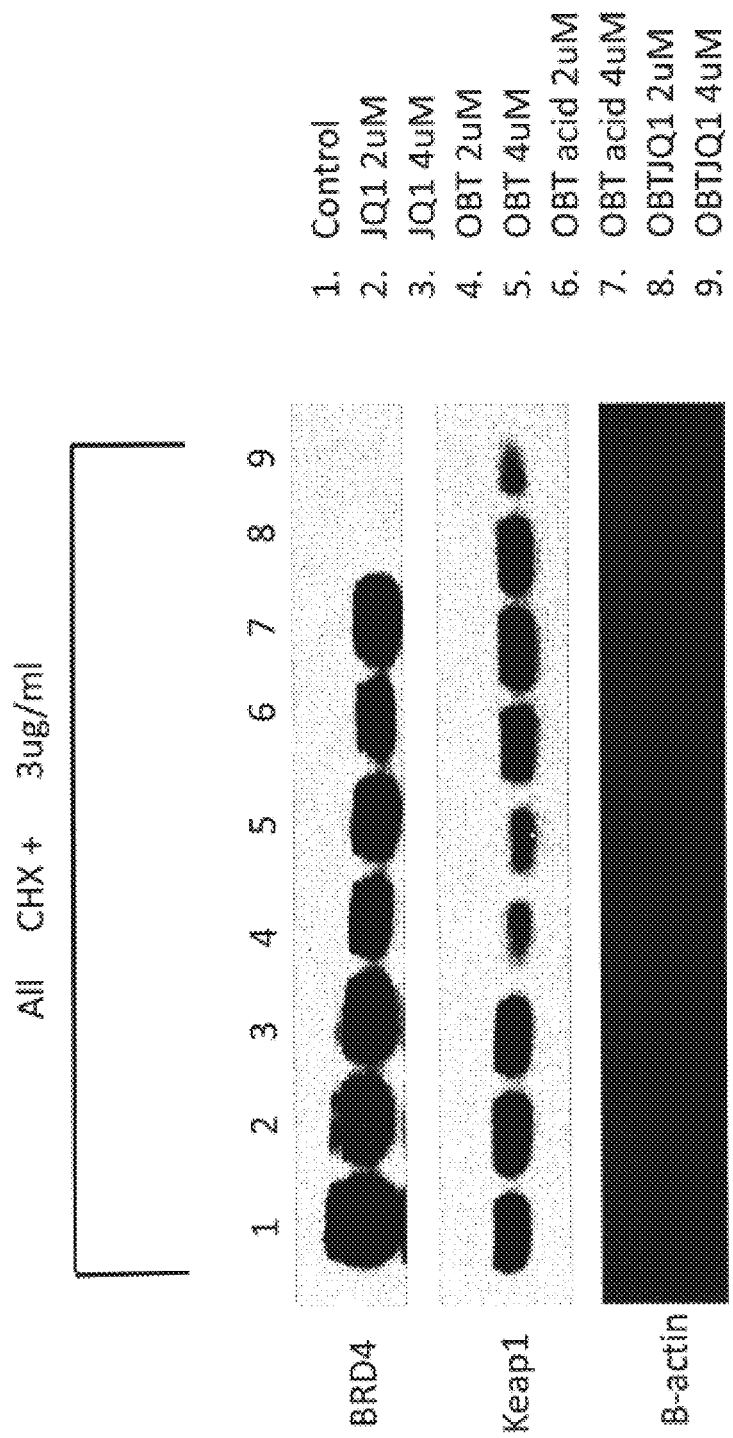
FIG. 26 shows that MDA-MR231 cells were plated and 24 later they were treated with the indicated doses of JQ1, OBT, or OBT prodrugs in the presence of cycloheximide ("CHX"). Proteins were extracted at 8 h post treatment. Immunoblot analysis for BRD4 and KEAP1 is shown.
Figure 27:
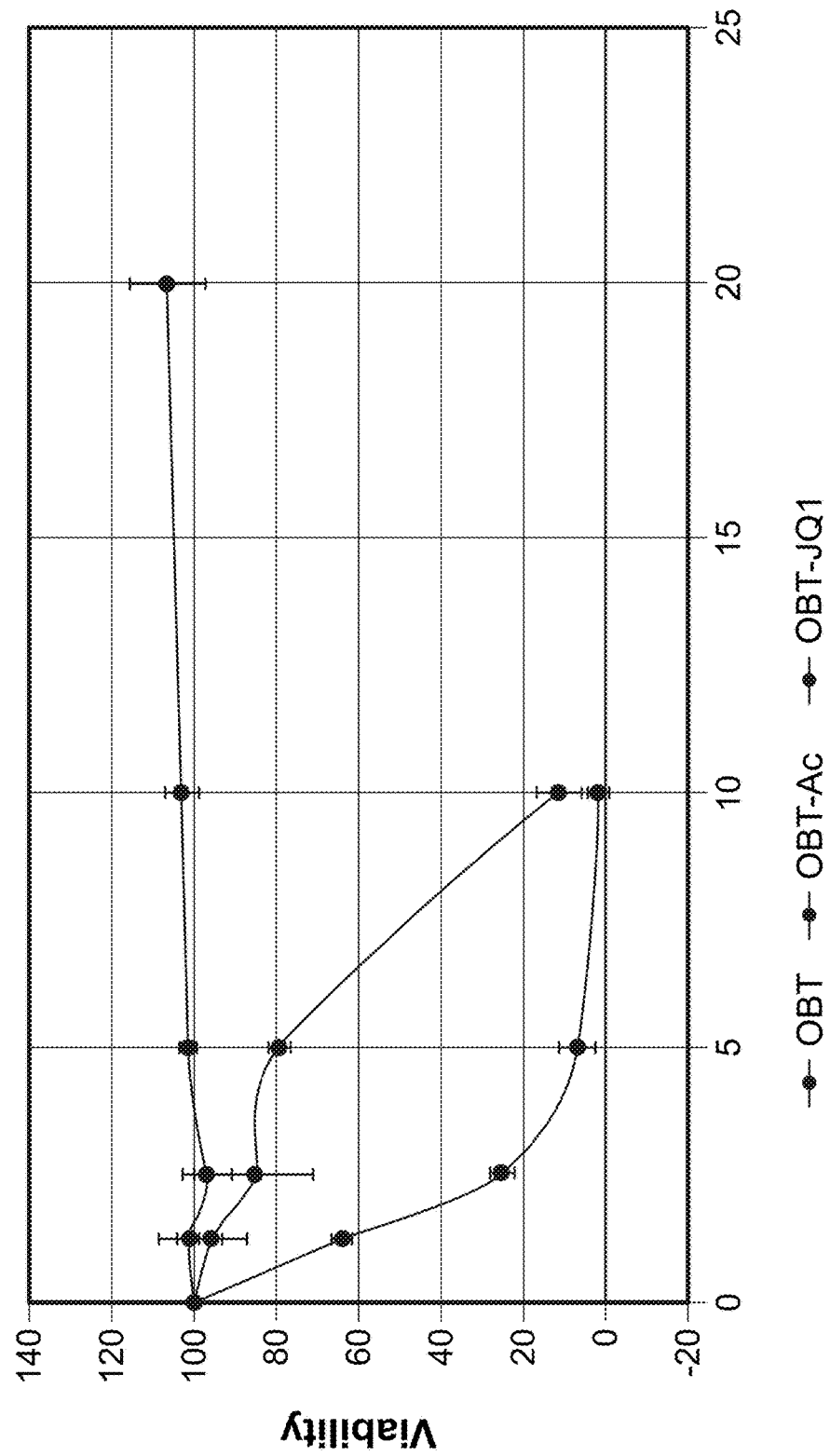
FIG. 27 shows OBT (and its prodrugs) and OBT-JQ1 effect on survival or breast cancer cells (MDA-MB231). Cells were plated 24 h prior to the addition of the compound. Cell viability was measured 4 days post treatment.
Figure 28:
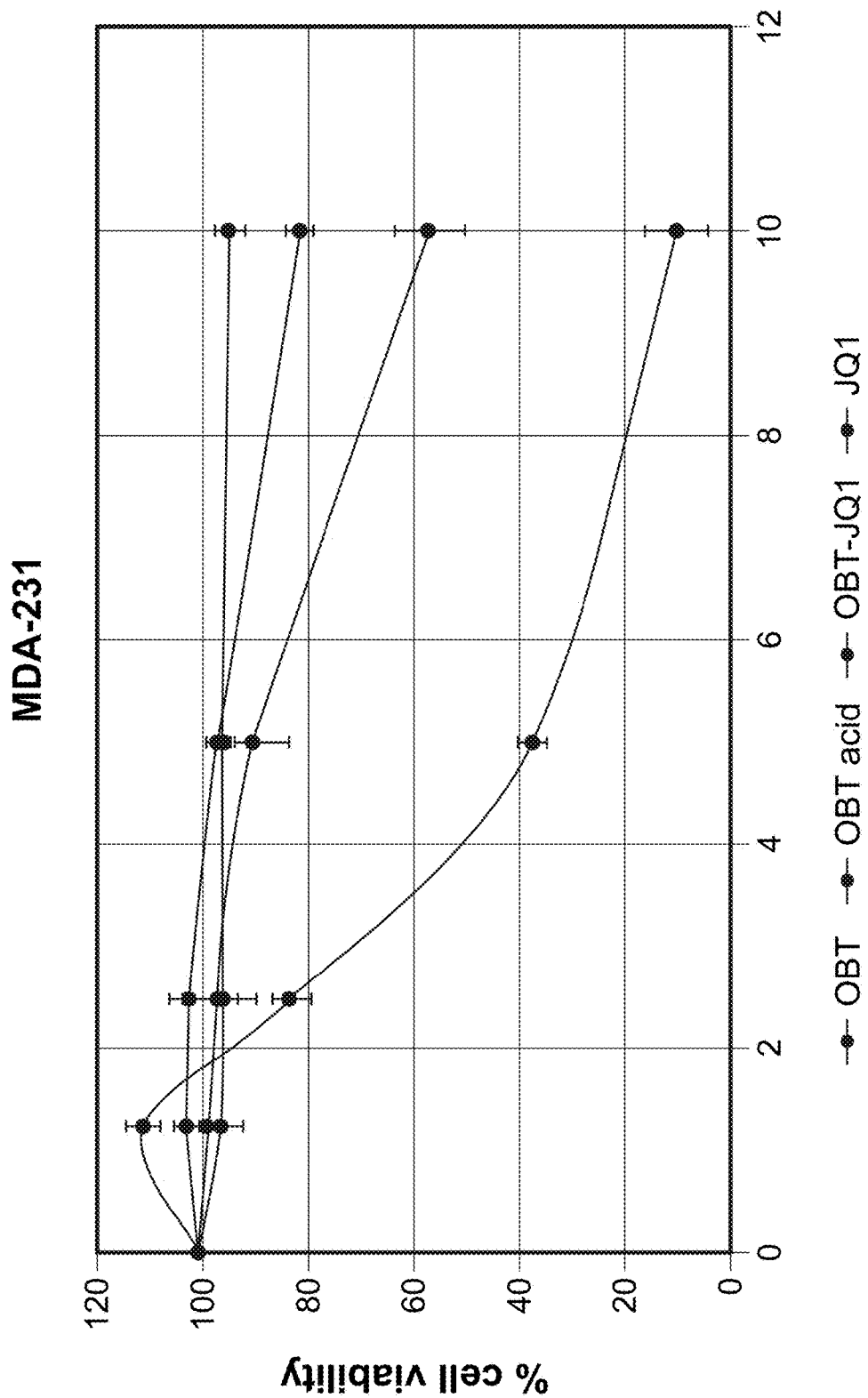
FIG. 28 OBT, its prodrugs, and OBT-JQ1 and JQ1 effect of survival of breast cancer cells (MDA-MB231). Cells were plated 24 h prior to the addition of the compound. Cell viability was measured 3 days prost treatment.
Figure 29A:
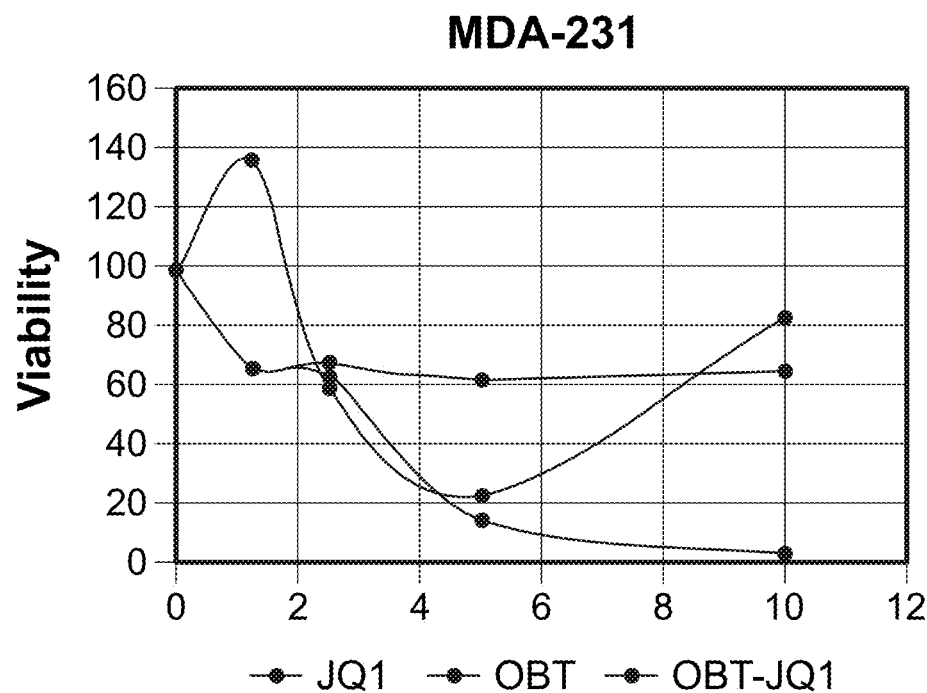
FIG. 29 (A) OBT and compound OBT-JQ1 and JQ1 effect on survival of breast cancer cells (MDA-MB231). Cells were plated 24 h prior to the addition of the compound. Cell viability was measured 2 days 2 days post treatment. (B) Effect of the OBT-JQ1 on cell viability, with and without NAC, 2 days post treatment.
Figure 29B:
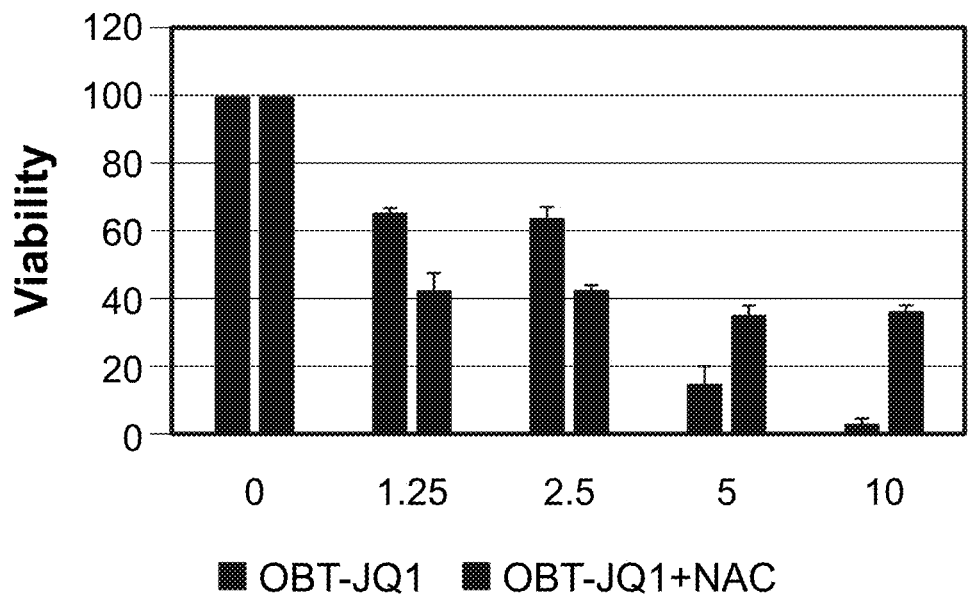

The effect of OBT on glioma immunomodulation in vivo was next evaluated. 50,000 CT2A cells expressing Fluc were implanted in the striatum of immunocompetent $C_{57}BL/6$ mice. Two weeks post-injection, mice were i.p. injected with OBT (7.5 mg/kg body weight/day) or PBS/DMSO control, over 4 days (n=6/group). Mice were sacrificed, brains removed, and tumor tissues dissected out and homogenized. Tumor-infiltrating immune cells were purified, immunophenotyped into major phagocytic and antigen-presenting cells that participate in both innate and adaptive immunity, specifically microglia ($CD45^{lo}CD11b^+$), dendritic cells ($CD45^{hi}CD11c^+MHCII^+$) and macrophages ($CD45^{hi}CD11b^+F/480^+$), and analyzed for different markers for exhaustion/cytotoxicity by flow cytometry as previously described.[96,97] The summary of the results is as follows: While the number of microglia and macrophages were not changed, there was a significant increase in dendritic cells, responsible for uptake of tumor antigen to prime the immune response (FIG. 25A). OBT did not have an effect on PD-L1, but significantly downregulated CD47, a "don't-eat-me" signal to the innate immune system which also modulates the adaptive immune response on all three cell types (FIG. 25A). OBT increased intratumoral CD8+ cytotoxic T cells with higher levels of both Ki-67 and granzyme B (markers for increased activation of effector cells, abrogation of suppressive immune cells) and decreased CD4+ regulatory T cells (Treg; $CD25^+Foxp3^+$), typically used by the tumour to escape the immune system, leading to an increase in the ratio of CD8+ T cells over Tregs (FIG. 25B-D). OBT did not change the levels of CD4+ T cells or their expression of any of these markers (FIG. 25B). CTLA-4, PD-1, Lag-3 and Tim-3 levels (hallmark for exhausted and anergic T cells) were not changed on any of these cells (FIG. 25B; only showing PD-1).

To confirm reversion of T cell exhaustion and activation of cytotoxic T cells by OBT, tumour-infiltrating CD4+ and CD8+ T cells (n=3) were isolated and cultured in the presence of anti-CD3 and anti-CD28 antibodies to mimic an antigenic stimulation. CD8+ T cells isolated from OBT-treated tumours were significantly more responsive to antigenic stimulus as measured by an increase in cell proliferation, Ki67 and granzyme B levels (FIG. 25E), while no change was observed in CD4+ T cells. Altogether, these data suggest that OBT activates anti-GBM immunity leading to activation of cytotoxic T cells.

REFERENCES

1. Kensler, T. W.; Wakabayashi, N.; Biswal, S., Cell survival responses to environmental stresses via the Keap1-Nrf2-ARE pathway. *Annu Rev Pharmacol Toxicol* 2007, 47, 89-116.

2. Kensler, T. W.; Wakabayashi, N., Nrf2: friend or foe for chemoprevention? *Carcinogenesis* 2010, 31 (1), 90-9.

3. Rojo de la Vega, M.; Chapman, E.; Zhang, D. D., NRF2 and the Hallmarks of Cancer. *Cancer cell* 2018, 34 (1), 21-43.

4. Cuadrado, A.; Rojo, A. I.; Wells, G.; Hayes, J. D.; Cousin, S. P.; Rumsey, W. L.; Attucks, O. C.; Franklin, S.; Levonen, A. L.; Kensler, T. W.; Dinkova-Kostova, A. T., Therapeutic targeting of the NRF2 and KEAP1 partnership in chronic diseases. *Nature reviews. Drug discovery* 2019, 18 (4), 295-317.

5. Nasiri, H. R.; Linge, S.; Ullmann, D., Thermodynamic profiling of inhibitors of Nrf2:Keap1 interactions. *Bioorg Med Chem Lett* 2016, 26 (2), 526-9.

6. Marcotte, D.; Zeng, W.; Hus, J. C.; McKenzie, A.; Hession, C.; Jin, P.; Bergeron, C.; Lugovskoy, A.; Enyedy, I.; Cuervo, H.; Wang, D.; Atmanene, C.; Roecklin, D.; Vecchi, M.; Vivat, V.; Kraemer, J.; Winkler, D.; Hong, V.; Chao, J.; Lukashev, M.; Silvian, L., Small molecules inhibit the interaction of Nrf2 and the Keap1 Kelch domain through a non-covalent mechanism. *Bioorg Med Chem* 2013, 21 (14), 4011-9.

7. Dinkova-Kostova, A. T.; Kostov, R. V.; Canning, P., Keap1, the cysteine-based mammalian intracellular sensor for electrophiles and oxidants. *Archives of biochemistry and biophysics* 2017, 617, 84-93.

8. Badr, C. E.; Van Hoppe, S.; Dumbuya, H.; Tjon-Kon-Fat, L. A.; Tannous, B. A., Targeting cancer cells with the natural compound obtusaquinone. *Journal of the National Cancer Institute* 2013, 105 (9), 643-53.

9. Salminen, A.; Lehtonen, M.; Paimela, T.; Kaarniranta, K., Celastrol: Molecular targets of Thunder God Vine. *Biochemical and biophysical research communications* 2010, 394 (3), 439-42.

10. Iverson, S. L.; Hu, L. Q.; Vukomanovic, V.; Bolton, J. L., The influence of the p-alkyl substituent on the isomerization of o-quinones to p-quinone methides: potential bioactivation mechanism for catechols. *Chem Res Toxicol* 1995, 8 (4), 537-44.

11. Bolton, J. L.; Dunlap, T., Formation and Biological Targets of Quinones: Cytotoxic versus Cytoprotective Effects. *Chem Res Toxicol* 2017, 30 (1), 13-37.

12. Ting, L.; Rad, R.; Gygi, S. P.; Haas, W., MS3 eliminates ratio distortion in isobaric multiplexed quantitative proteomics. *Nat Methods* 2011, 8 (11), 937-40.

13. McAlister, G. C.; Nusinow, D. P.; Jedrychowski, M. P.; Wuhr, M.; Huttlin, E. L.; Erickson, B. K.; Rad, R.; Haas, W.; Gygi, S. P., MultiNotch MS3 enables accurate, sensitive, and multiplexed detection of differential expression across cancer cell line proteomes. *Analytical chemistry* 2014, 86 (14), 7150-8.

14. McAlister, G. C.; Huttlin, E. L.; Haas, W.; Ting, L.; Jedrychowski, M. P.; Rogers, J. C.; Kuhn, K.; Pike, I.; Grothe, R. A.; Blethrow, J. D.; Gygi, S. P., Increasing the multiplexing capacity of TMTs using reporter ion isotopologues with isobaric masses. *Anal Chem* 2012, 84 (17), 7469-78.

15. Li, J.; Johnson, D.; Calkins, M.; Wright, L.; Svendsen, C.; Johnson, J., Stabilization of Nrf2 by tBHQ confers protection against oxidative stress-induced cell death in human neural stem cells. *Toxicological sciences: an official journal of the Society of Toxicology* 2005, 83 (2), 313-28.

16. Wang, X. J.; Hayes, J. D.; Wolf, C. R., Generation of a stable antioxidant response element-driven reporter gene cell line and its use to show redox-dependent activation of nrf2 by cancer chemotherapeutic agents. *Cancer research* 2006, 66 (22), 10983-94.
17. Prestera, T.; Zhang, Y.; Spencer, S. R.; Wilczak, C. A.; Talalay, P., The electrophile counterattack response: protection against neoplasia and toxicity. *Adv Enzyme Regul* 1993, 33, 281-96.
18. Chew, E. H.; Nagle, A. A.; Zhang, Y.; Scarmagnani, S.; Palaniappan, P.; Bradshaw, T. D.; Holmgren, A.; Westwell, A. D., Cinnamaldehydes inhibit thioredoxin reductase and induce Nrf2: potential candidates for cancer therapy and chemoprevention. *Free radical biology & medicine* 2010, 48 (1), 98-111.
19. Lastres-Becker, I.; Garcia-Yague, A. J.; Scannevin, R. H.; Casarejos, M. J.; Kugler, S.; Rabano, A.; Cuadrado, A., Repurposing the NRF2 Activator Dimethyl Fumarate as Therapy Against Synucleinopathy in Parkinson's Disease. *Antioxid Redox Signal* 2016, 25 (2), 61-77.
20. Prestera, T.; Holtzclaw, W. D.; Zhang, Y.; Talalay, P., Chemical and molecular regulation of enzymes that detoxify carcinogens. *Proceedings of the National Academy of Sciences of the United States of America* 1993, 90 (7), 2965-9.
21. Furukawa, M.; Xiong, Y., BTB protein Keap1 targets antioxidant transcription factor Nrf2 for ubiquitination by the Cullin 3-Rocl ligase. *Molecular and cellular biology* 2005, 25 (1), 162-71.
22. Petroski, M. D.; Deshaies, R. J., Function and regulation of cullin-RING ubiquitin ligases. *Nat Rev Mol Cell Biol* 2005, 6 (1), 9-20.
23. Zhang, D. D.; Lo, S. C.; Sun, Z.; Habib, G. M.; Lieberman, M. W.; Hannink, M., Ubiquitination of Keap1, a BTB-Kelch substrate adaptor protein for Cul3, targets Keap1 for degradation by a proteasome-independent pathway. *The Journal of biological chemistry* 2005, 280 (34), 30091-9.
24. Zhang, D. D.; Hannink, M., Distinct cysteine residues in Keap1 are required for Keap1-dependent ubiquitination of Nrf2 and for stabilization of Nrf2 by chemopreventive agents and oxidative stress. *Molecular and cellular biology* 2003, 23 (22), 8137-51.
25. Wakabayashi, N.; Dinkova-Kostova, A. T.; Holtzclaw, W. D.; Kang, M. I.; Kobayashi, A.; Yamamoto, M.; Kensler, T. W.; Talalay, P., Protection against electrophile and oxidant stress by induction of the phase 2 response: fate of cysteines of the Keap1 sensor modified by inducers. *Proceedings of the National Academy of Sciences of the United States of America* 2004, 101 (7), 2040-5.
26. Hur, W.; Sun, Z.; Jiang, T.; Mason, D. E.; Peters, E. C.; Zhang, D. D.; Luesch, H.; Schultz, P. G.; Gray, N. S., A small-molecule inducer of the antioxidant response element. *Chemistry & biology* 2010, 17 (5), 537-47.
27. Hu, L.; Magesh, S.; Chen, L.; Wang, L.; Lewis, T. A.; Chen, Y.; Khodier, C.; Inoyama, D.; Beamer, L. J.; Emge, T. J.; Shen, J.; Kerrigan, J. E.; Kong, A. N.; Dandapani, S.; Palmer, M.; Schreiber, S. L.; Munoz, B., Discovery of a small-molecule inhibitor and cellular probe of Keap1-Nrf2 protein-protein interaction. *Bioorg Med Chem Lett* 2013, 23 (10), 3039-43.
28. Sporn, M. B.; Liby, K. T., NRF2 and cancer: the good, the bad and the importance of context. *Nature reviews. Cancer* 2012, 12 (8), 564-71.
29. Hayes, J. D.; McMahon, M.; Chowdhry, S.; Dinkova-Kostova, A. T., Cancer chemoprevention mechanisms mediated through the Keap1-Nrf2 pathway. *Antioxid Redox Signal* 2010, 13 (11), 1713-48.
30. Hu, R.; Saw, C. L.; Yu, R.; Kong, A. N., Regulation of NF-E2-related factor 2 signaling for cancer chemoprevention: antioxidant coupled with antiinflammatory. *Antioxid Redox Signal* 2010, 13 (11), 1679-98.
31. Saddawi-Konefka, R.; Seelige, R.; Gross, E. T.; Levy, E.; Searles, S. C.; Washington, A., Jr.; Santosa, E. K.; Liu, B.; O'Sullivan, T. E.; Harismendy, O.; Bui, J. D., Nrf2 Induces IL-17D to Mediate Tumor and Virus Surveillance. *Cell reports* 2016, 16 (9), 2348-58.
32. Cloer, E. W.; Goldfarb, D.; Schrank, T. P.; Weissman, B. E.; Major, M. B., NRF2 Activation in Cancer: From DNA to Protein. *Cancer research* 2019, 79 (5), 889-898.
33. Liby, K. T.; Sporn, M. B., Synthetic oleanane triterpenoids: multifunctional drugs with a broad range of applications for prevention and treatment of chronic disease. *Pharmacol Rev* 2012, 64 (4), 972-1003.
34. Steele, M. L.; Fuller, S.; Patel, M.; Kersaitis, C.; Ooi, L.; Munch, G., Effect of Nrf2 activators on release of glutathione, cysteinylglycine and homocysteine by human U373 astroglial cells. *Redox Biol* 2013, 1, 441-5.
35. Bell, K. F.; Fowler, J. H.; Al-Mubarak, B.; Horsburgh, K.; Hardingham, G. E., Activation of Nrf2-regulated glutathione pathway genes by ischemic preconditioning. *Oxid Med Cell Longev* 2011, 2011, 689524.
36. Canning, P.; Sorrell, F. J.; Bullock, A. N., Structural basis of Keap1 interactions with Nrf2. *Free radical biology & medicine* 2015, 88 (Pt B), 101-107.
37. Wakimoto, H.; Kesari, S.; Farrell, C. J.; Curry, W. T., Jr.; Zaupa, C.; Aghi, M.; Kuroda, T.; Stemmer-Rachamimov, A.; Shah, K.; Liu, T. C.; Jeyaretna, D. S.; Debasitis, J.; Pruszak, J.; Martuza, R. L.; Rabkin, S. D., Human glioblastoma-derived cancer stem cells: establishment of invasive glioma models and treatment with oncolytic herpes simplex virus vectors. *Cancer research* 2009, 69 (8), 3472-81.
38. Mao, P.; Joshi, K.; Li, J.; Kim, S. H.; Li, P.; Santana-Santos, L.; Luthra, S.; Chandran, U. R.; Benos, P. V.; Smith, L.; Wang, M.; Hu, B.; Cheng, S. Y.; Sobol, R. W.; Nakano, I., Mesenchymal glioma stem cells are maintained by activated glycolytic metabolism involving aldehyde dehydrogenase 1A3. *Proc Natl Acad Sci USA* 2013, 110 (21), 8644-9.
39. Teng, J.; Carla da Hora, C.; Kantar, R. S.; Nakano, I.; Wakimoto, H.; Batchelor, T. T.; Chiocca, E. A.; Badr, C. E.; Tannous, B. A., Dissecting inherent intratumor heterogeneity in patient-derived glioblastoma culture models. *Neuro-oncology* 2017, 19 (6), 820-832.
40. Badr, C. E., et al. Real-time monitoring of nuclear factor kappaB activity in cultured cells and in animal models. Molecular imaging 8, 278-290 (2009).
41. Maguire, C. A., et al. Triple bioluminescence imaging for in vivo monitoring of cellular processes. Molecular therapy. Nucleic acids 2, e99 (2013).
42. Badr, C. E., Hewett, J. W., Breakefield, X. O. & Tannous, B. A. A highly sensitive assay for monitoring the secretory pathway and ER stress. *PloS one* 2, e571 (2007).
43. Edwards, A. & Haas, W. Multiplexed Quantitative Proteomics for High-Throughput Comprehensive Proteome Comparisons of Human Cell Lines. *Methods Mol Biol* 1394, 1-13 (2016).
44. Eng, J. K., McCormack, A. L. & Yates, J. R. An approach to correlate tandem mass spectral data of peptides with amino acid sequences in a protein database. *J Am Soc Mass Spectrom* 5, 976-989 (1994).
45. Huttlin, E. L., et al. A tissue-specific atlas of mouse protein phosphorylation and expression. *Cell* 143, 1174-1189 (2010).

46. Elias, J. E. & Gygi, S. P. Target-decoy search strategy for increased confidence in large-scale protein identifications by mass spectrometry. *Nature methods* 4, 207-214 (2007).

OTHER EMBODIMENTS

It is to be understood that while the present application has been described in conjunction with the detailed description thereof, the foregoing description is intended to illustrate and not limit the scope of the present application, which is defined by the scope of the appended claims. Other aspects, advantages, and modifications are within the scope of the following claims.

What is claimed is:
1. A compound selected from Formula (Ia) and Formula (Ib):

or a pharmaceutically acceptable salt thereof, wherein:
n is selected from 0, 1, and 2;
$X^1$ is selected from N and $CR^1$;
$X^2$ is selected from N and $CR^2$;
$X^3$ is selected from N and $CR^3$;
$X^4$ is selected from N and $CR^4$;
$X^5$ is selected from N and $CR^5$;
provided that no more than three of $X^1$, $X^2$, $X^3$, $X^4$, and $X^5$ are N;
$R^1$, $R^2$, $R^3$, $R^4$, $R^5$ and $R^{11}$ are each independently selected from H, halo, CN, $NO_2$, $C_{1-6}$ alkyl, $C_{1-6}$ haloalkyl, $C_{2-6}$ alkenyl, $C_{2-6}$ alkynyl, $OR^{a1}$, $SR^{a1}$, $C(O)R^{b1}$, $C(O)NR^{c1}R^{d1}$, $C(O) OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$, $S(O)R^{b1}$, $S(O)NR^{c1}R^{d1}$, $S(O)_2R^{b1}$, and $S(O)_2 NR^{c1}R^{d1}$, wherein said $C_{1-6}$ alkyl, $C_{2-6}$ alkenyl, and $C_{2-6}$ alkynyl are each optionally substituted with 1, 2, 3, 4, or 5 substituents independently selected from halo, CN, $NO_2$, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$, $S(O)R^{b1}$, $S(O)NR^{c1}R^{d1}$, $S(O)_2R^{b1}$ and $S(O)_2NR^{c1}R^{d1}$;
$R^6$ and $R^7$ are each independently selected from H, $C_{1-6}$ alkyl, $C_{1-6}$ haloalkyl, $C_{2-6}$ alkenyl, and $C_{2-6}$ alkynyl, wherein said $C_{1-6}$ alkyl, $C_{2-6}$ alkenyl, and $C_{2-6}$ alkynyl are each optionally substituted with 1, 2, or 3 substituents independently selected from halo, CN, $NO_2$, $OR^{a1}$, $SR^{a1}$ $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$, $S(O)R^{b1}$, $S(O)NR^{c1}R^{d1}$, $S(O)_2R^{b1}$ and $S(O)_2NR^{c1}R^{d1}$, $R^8$ is selected from halo, CN, $NO_2$, $C_{1-6}$ alkyl, $C_{1-6}$ haloalkyl, $C_{2-6}$ alkenyl, $C_{2-6}$ alkynyl, ORal, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$, $S(O)R^{b1}$, $S(O)NR^{c1}R^{d1}$, $S(O)_2 R^{b1}$, and $S(O)_2NR^{c1}R^{d1}$, wherein said $C_{1-6}$ alkyl, $C_{2-6}$ alkenyl, and $C_{2-6}$ alkynyl are each optionally substituted with 1, 2, 3, 4, or 5 substituents independently selected from halo, CN, $NO_2$, ORal, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$, $S(O)R^{b1}$, $S(O)NR^{c1}R^{d1}$, $S(O)_2 R^{b1}$ and $S(O)_2NR^{c1}R^{d1}$, $R^9$ and $R^{10}$ are each independently selected from H, $C(O)R^{b1}$, $C(O)NR^{c1}R^{d1}$, $C(O)OR^{a1}$, $S(O)R^{b1}$, $S(O) NR^{c1}R^{d1}$, $S(O)_2R^{b1}$, and $S(O)_2NR^{c1}R^{d1}$;
$R^{12}$ is selected from $C_{1-6}$ alkyl, $C_{2-6}$ alkenyl, $C_{2-6}$ alkynyl, $C_{3-10}$ cycloalkyl, and a peptide, wherein said $C_{1-6}$ alkyl, $C_{2-6}$ alkenyl, $C_{2-6}$ alkynyl, and $C_{3-10}$ cycloalkyl are each optionally substituted with 1, 2, 3, 4, or 5 substituents independently selected from halo, CN, $NO_2$, $OR^{a1}$, $SR^{a1}$, $C(O)R^{b1}$, $C(O)NR^{c1}R^{d1}$, $C(O)OR^{a1}$, $OC(O)R^{b1}$, $OC(O)NR^{c1}R^{d1}$, $NR^{c1}R^{d1}$, $NR^{c1}C(O)R^{b1}$, $NR^{c1}C(O)OR^{a1}$, $NR^{c1}C(O)NR^{c1}R^{d1}$, $NR^{c1}S(O)R^{b1}$, $NR^{c1}S(O)_2R^{b1}$, $NR^{c1}S(O)_2NR^{c1}R^{d1}$, $S(O)R^{b1}$, $S(O) NR^{c1}R^{d1}$, $S(O)_2R^{b1}$ and $S(O)_2NR^{c1}R^{d1}$;
each $R^{b1}$ is independently selected from H, $C_{1-12}$ alkyl, $C_{1-4}$ haloalkyl, $C_{2-6}$ alkenyl, $C_{2-6}$ alkynyl, and $C_{3-10}$ cycloalkyl, wherein said $C_{1-6}$ alkyl, $C_{2-6}$ alkenyl, $C_{2-6}$ alkynyl, and $C_{3-10}$ cycloalkyl are each optionally substituted with 1, 2, or 3 substituents independently selected from $R^g$;
each $R^{a1}$, $R^{c1}$ and $R^{d1}$ is independently selected from H, $C_{1-6}$ alkyl, $C_{1-4}$ haloalkyl, $C_{2-6}$ alkenyl, $C_{2-6}$ alkynyl, $C_{3-10}$ cycloalkyl, $C(O)R^{b2}$, $C(O)NR^{c2}R^{d2}$, $C(O)OR^{a2}$, $NR^{c2}R^{d2}$, $S(O)R^{b2}$, $S(O)NR^{c2}R^{d2}$, $S(O)_2R^{b2}$, and $S(O)_2 NR^{c2}R^{d2}$; wherein said $C_{1-6}$ alkyl, $C_{2-6}$ alkenyl, $C_{2-6}$ alkynyl, and $C_{3-10}$ cycloalkyl are each optionally substituted with 1, 2, or 3 substituents independently selected from $R^g$;
each $R^{a2}$, $R^{b2}$, $R^{c2}$, and $R^{d2}$ is independently selected from H, $C_{1-6}$ alkyl, $C_{1-4}$ haloalkyl, $C_{2-6}$ alkenyl, $C_{2-6}$ alkynyl, and $C_{3-10}$ cycloalkyl; wherein said $C_{1-6}$ alkyl, $C_{2-6}$ alkenyl, $C_{2-6}$ alkynyl, and $C_{3-10}$ cycloalkyl are each optionally substituted with 1, 2, or 3 substituents independently selected from $R^g$;
or any $R^{c1}$ and $R^{d1}$ together with the N atom to which they are attached form a 4-, 5-, 6-, or 7-membered heterocycloalkyl group optionally substituted with 1, 2, or 3 substituents independently selected from $R^g$;
or any $R^{c2}$ and $R^{d2}$ together with the N atom to which they are attached form a 4-, 5-, 6-, or 7-membered heterocycloalkyl group optionally substituted with 1, 2, or 3 substituents independently selected from $R^g$; and
each $R^g$ is independently selected from OH, $NO_2$, CN, halo, $C_{1-6}$ alkyl, $C_{2-6}$ alkenyl, $C_{2-6}$ alkynyl, $C_{1-4}$ haloalkyl, $C_{1-6}$ alkoxy, $C_{1-6}$ haloalkoxy, cyano-$C_{1-3}$ alkylene, HO—$C_{1-3}$ alkylene, amino, $C_{1-6}$ alkylamino, di($C_{1-6}$ alkyl)amino, thio, $C_{1-6}$ alkylthio, $C_{1-6}$ alkylsulfinyl, $C_{1-6}$ alkylsulfonyl, carbamyl, $C_{1-6}$ alkylcarbamyl, di($C_{1-6}$ alkyl)carbamyl, carboxy, $C_{1-6}$ alkylcarbonyl, $C_{1-6}$ alkoxycarbonyl, $C_{1-6}$ alkylcarbonylamino, $C_{1-6}$ alkylsulfonylamino, aminosulfonyl, $C_{1-6}$ alkylaminosulfonyl, di($C_{1-6}$ alkyl)aminosulfonyl, aminosulfonylamino, $C_{1-6}$ alkylaminosulfonylamino, di($C_{1-6}$ alkyl)aminosulfonylamino, aminocarbonylamino, $C_{1-6}$ alkylaminocarbonylamino, and di($C_{1-6}$ alkyl)aminocarbonylamino.

2. The compound of claim 1, wherein the compound is a compound of Formula (Ia):

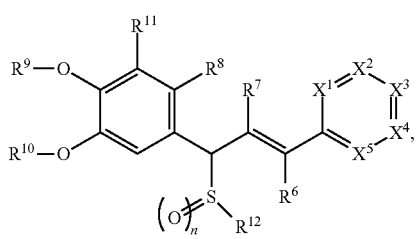

(Ia)

or a pharmaceutically acceptable salt thereof.

3. The compound of claim 2, wherein the compound of Formula (Ia) has formula:

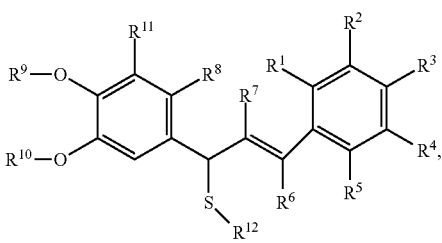

or a pharmaceutically acceptable salt thereof.

4. The compound of claim 1, wherein:

$R^1$, $R^2$, $R^3$, $R^4$, $R^5$ and $R^{11}$ are each independently selected from H, halo, CN, $NO_2$, OH, $NH_2$, $C_{1-6}$ alkyl, $C_{1-6}$ haloalkyl, $C_{1-6}$ alkoxy, $C_{1-6}$ haloalkoxy, $C_{1-6}$ alkylamino, and di($C_{1-6}$ alkyl) amino;

$R^6$ and $R^7$ are each selected from H, $C_{1-6}$ alkyl, and $C_{1-6}$ haloalkyl;

$R^8$ is selected from halo, $C_{1-6}$ alkyl, $C_{1-6}$ haloalkyl, $C_{1-6}$ alkoxy, and $C_{1-6}$ haloalkoxy;

$R^9$ and $R^{10}$ are each independently selected from H and $C(O)R^{b1}$;

each $R^{b1}$ is independently $C_{1-12}$ alkyl;

$R^{12}$ is selected from $C_{1-6}$ alkyl and a peptide, wherein said $C_{1-6}$ alkyl is optionally substituted with 1, 2, or 3 substituents independently selected from $OR^{a1}$, $SR^{a1}$, $C(O)OR^{a1}$, and $NR^{c1}R^{d1}$;

each $R^{a1}$, $R^{c1}$, and $R^{d1}$ is independently selected from H, $C_{1-6}$ alkyl, $C_{1-4}$ haloalkyl, and $C(O)R^{b2}$; and each $R^{b2}$ is independently selected from $C_{1-6}$ alkyl and $C_{1-4}$ haloalkyl.

5. The compound of claim 4, wherein the compound has formula:

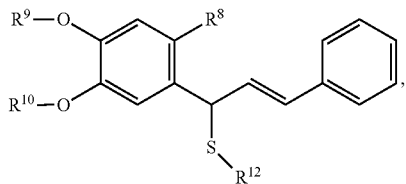

or a pharmaceutically acceptable salt thereof, wherein:

$R^8$ is $C_{1-6}$ alkoxy.

6. The compound of claim 1, selected from any one of the following compounds:

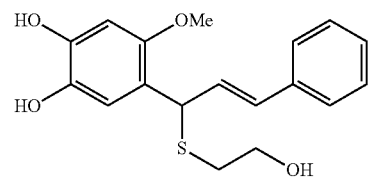

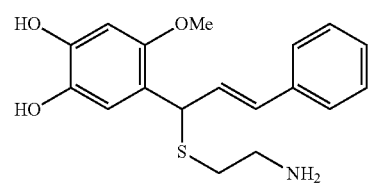

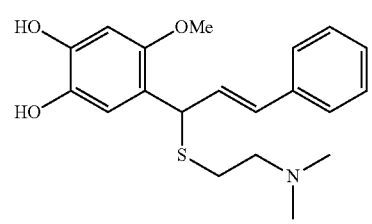

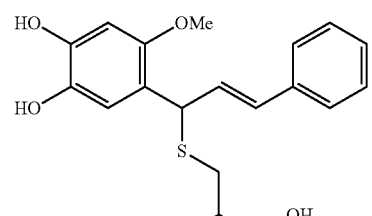

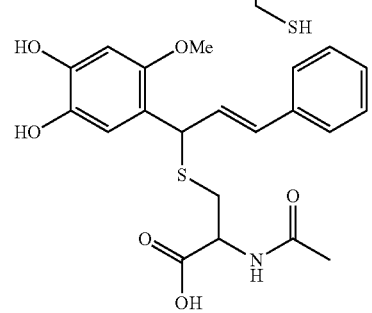

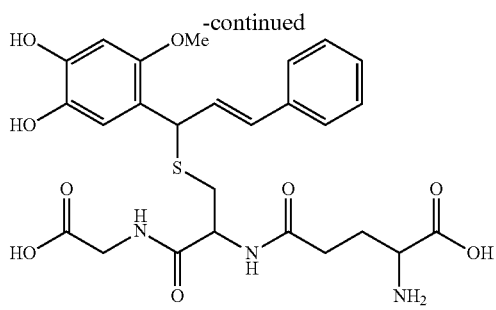

or a pharmaceutically acceptable salt thereof.

7. The compound of claim 1, having Formula (Ib):

$$\text{(Ib)}$$

or a pharmaceutically acceptable salt thereof.

8. The compound of claim 7, wherein the compound has formula:

or a pharmaceutically acceptable salt thereof.

9. The compound of claim 8, wherein:
$R^1, R^2, R^3, R^4, R^5$ and $R^{11}$ are each independently selected from H, halo, CN, $NO_2$, OH, $NH_2$, $C_{1-6}$ alkyl, $C_{1-6}$ haloalkyl, $C_{1-6}$ alkoxy, $C_{1-6}$ haloalkoxy, $C_{1-6}$ alkylamino, and di($C_{1-6}$ alkyl) amino;
$R^6$ and $R^7$ are each selected from H, $C_{1-6}$ alkyl, and $C_{1-6}$ haloalkyl;
$R^8$ is selected from halo, $C_{1-6}$ alkyl, $C_{1-6}$ haloalkyl, $C_{1-6}$ alkoxy, and $C_{1-6}$ haloalkoxy;
$R^9$ and $R^{10}$ are each independently selected from H and $C(O)R^{b1}$;
each $R^{b1}$ is independently $C_{1-12}$ alkyl;
$R^{12}$ is selected from $C_{1-6}$ alkyl and a peptide, wherein said $C_{1-6}$ alkyl is optionally substituted with 1, 2, or 3 substituents independently selected from $OR^{a1}$, $SR^{a1}$, $C(O)OR^{a1}$, and $NR^{c1}R^{d1}$,
each $R^{a1}$, $R^{c1}$, and $R^{d1}$ is independently selected from H, $C_{1-6}$ alkyl, $C_{1-4}$ haloalkyl, and $C(O)R^{b2}$;
each $R^{b2}$ is independently selected from $C_{1-6}$ alkyl and $C_{1-4}$ haloalkyl.

10. The compound of claim 9, wherein the compound has formula:

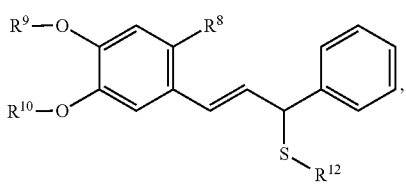
or a pharmaceutically acceptable salt thereof, wherein:
R⁸ is $C_{1-6}$ alkoxy.
11. The compound of claim 1, selected from any one of the following compounds:
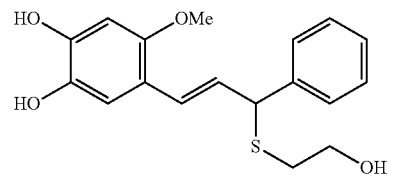
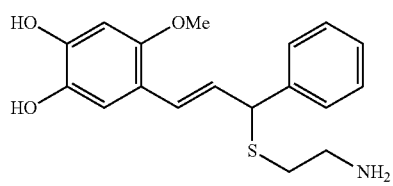
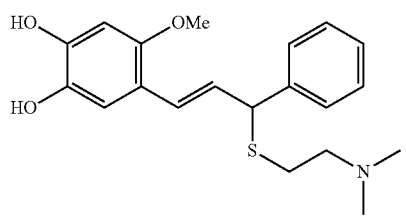
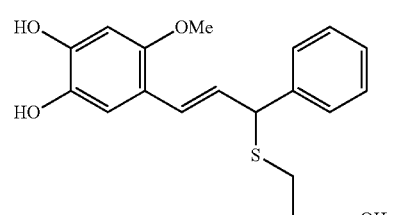
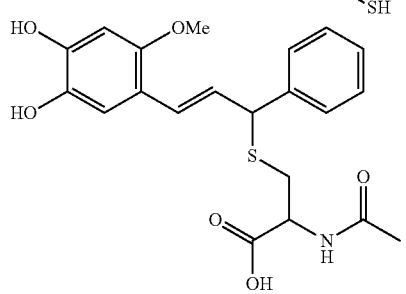
-continued
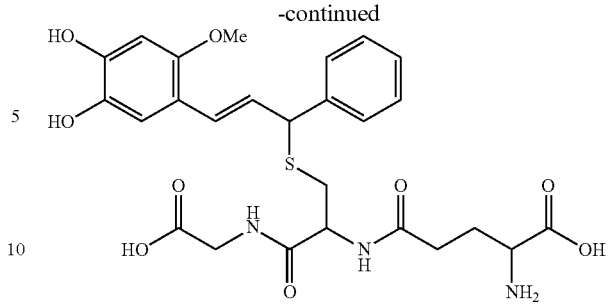
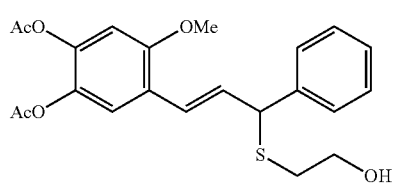
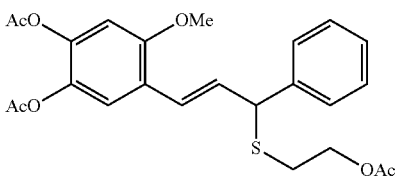
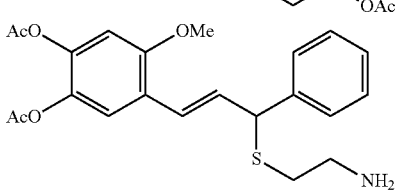
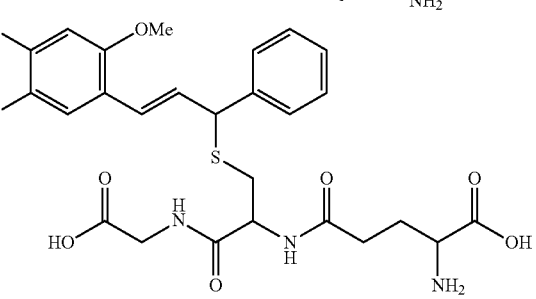
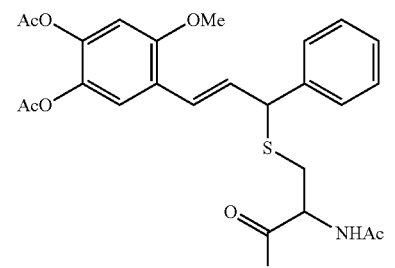
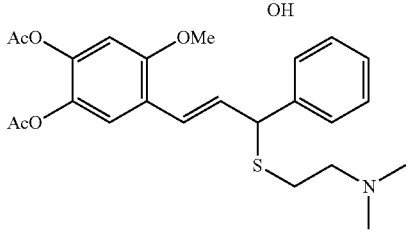

-continued

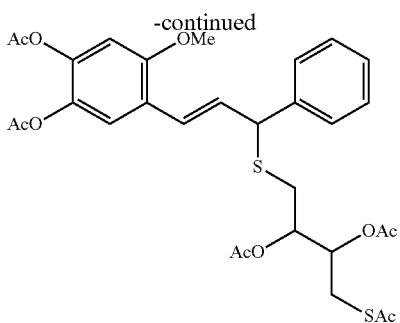

or a pharmaceutically acceptable salt thereof.

12. The compound of claim 1, selected from any one of the following compounds:

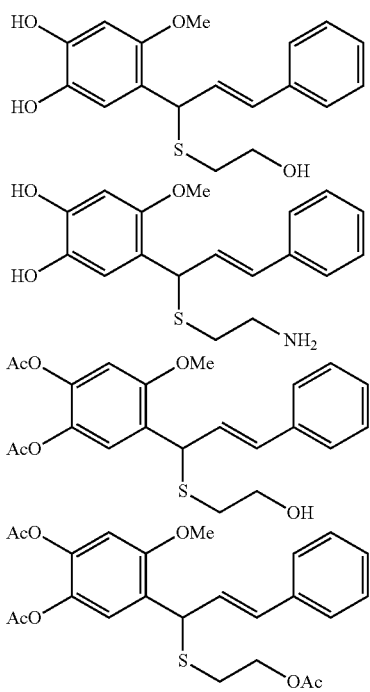

or a pharmaceutically acceptable salt thereof.

13. The compound of claim 1, selected from any one of the following compounds:

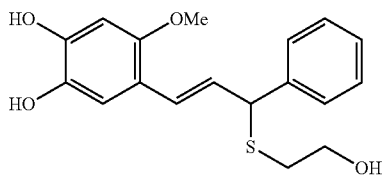

-continued

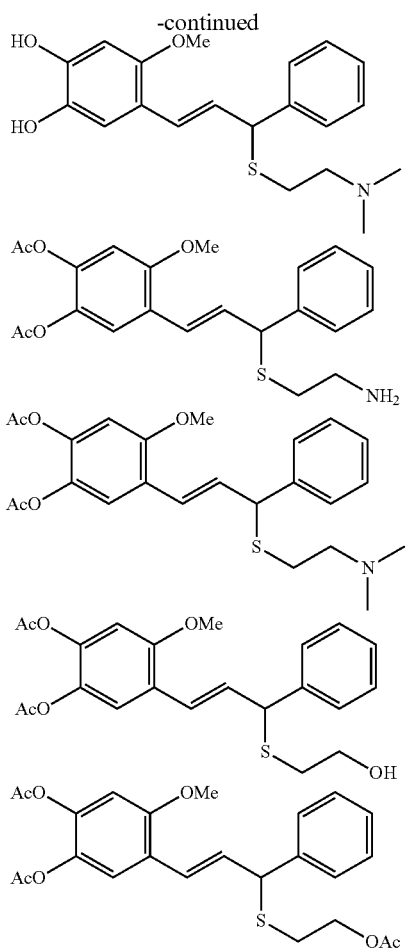

or a pharmaceutically acceptable salt thereof.

14. A pharmaceutical composition comprising a compound of claim 1, or a pharmaceutically acceptable salt thereof, and a pharmaceutically acceptable carrier.

15. A method of treating a disease or condition in which Nrf2 pathway is implicated, the method comprising administering to a subject in need thereof a therapeutically effective amount of a compound of claim 1, or a pharmaceutically acceptable salt thereof.

16. The method of claim 15, wherein the disease or condition is cancer.

17. The method of claim 16, wherein the cancer is selected from brain cancer and breast cancer.

18. The method of claim 15, wherein the disease or condition is a neurodegenerative disease.

19. The method of claim 18, wherein the neurodegenerative disease is selected from Alzheimer's disease, Parkinson's disease, Huntington's disease, Lewy body disease, dementia, motor neuron disease, multiple sclerosis, and amyotrophic lateral sclerosis.

20. The method of claim 15, wherein the disease or condition is selected from diabetes and stroke.

* * * * *